United States Patent
Kondiles et al.

(10) Patent No.: US 12,511,302 B2
(45) Date of Patent: Dec. 30, 2025

(54) FACILITATING QUERY EXECUTIONS VIA ROLE REASSIGNMENT MODALITY

(71) Applicant: Ocient Holdings LLC, Chicago, IL (US)

(72) Inventors: George Kondiles, Chicago, IL (US); Jason Arnold, Chicago, IL (US); S. Christopher Gladwin, Chicago, IL (US); Joseph Jablonski, Chicago, IL (US); Daniel Coombs, Chicago, IL (US); Andrew D. Baptist, Mt. Pleasant, WI (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/653,594

(22) Filed: May 2, 2024

(65) Prior Publication Data

US 2024/0281449 A1    Aug. 22, 2024

Related U.S. Application Data

(63) Continuation of application No. 17/678,282, filed on Feb. 23, 2022, now Pat. No. 12,008,005, which is a
(Continued)

(51) Int. Cl.
*G06F 16/2458* (2019.01)
*G06F 3/0484* (2022.01)
(Continued)

(52) U.S. Cl.
CPC .... *G06F 16/2462* (2019.01); *G06F 16/24553* (2019.01); *G06F 16/248* (2019.01); *G06F 3/0484* (2013.01)

(58) Field of Classification Search
CPC .......... G06F 16/2462; G06F 16/24553; G06F 16/248
See application file for complete search history.

(56) References Cited

U.S. PATENT DOCUMENTS

| | | |
|---|---|---|
| 5,548,770 A | 8/1996 | Bridges |
| 6,230,200 B1 | 5/2001 | Forecast |

(Continued)

OTHER PUBLICATIONS

"Efficient Mid-Query Re-Optimization of Sub-Optimal Query Execution Plans", ACM SIGMOD Record, vol. 27, Issue 2, pp. 106-117, Jun. 1, 1998 (Year: 1998).*
(Continued)

*Primary Examiner* — Apu M Mofiz
*Assistant Examiner* — Farhad Agharahimi
(74) *Attorney, Agent, or Firm* — GARLICK & MARKISON; Timothy W. Markison

(57) ABSTRACT

A query processing system operates by: receiving a first query request that indicates a first query for execution by a database system; determining a first plurality of query execution mode options for execution of the first query via the database system; generating first role reassignment restriction data for the first query based on a first plurality of query operators of the first query; selecting a first selected query execution mode from the first plurality of query execution mode options based on role reassignment modality corresponding to the first selected query execution mode comparing favorably to the first role reassignment restriction data; and generating a resultant for the first query by facilitating execution of the first query in accordance with the first selected query execution mode.

20 Claims, 58 Drawing Sheets

Related U.S. Application Data continuation of application No. 16/879,218, filed on May 20, 2020, now Pat. No. 11,294,916.

(51) Int. Cl.
*G06F 16/2455* (2019.01)
*G06F 16/248* (2019.01)

(56) References Cited

U.S. PATENT DOCUMENTS

| | | | |
|---|---|---|---|
| 6,633,772 | B2 | 10/2003 | Ford |
| 7,499,907 | B2 | 3/2009 | Brown |
| 7,908,242 | B1 | 3/2011 | Achanta |
| 9,177,079 | B1 | 11/2015 | Ramachandran et al. |
| 9,596,298 | B1 * | 3/2017 | Bekiroglu ........... H04L 67/1001 |
| 10,521,430 | B1 | 12/2019 | Schreier et al. |
| 2001/0051949 | A1 | 12/2001 | Carey |
| 2002/0032676 | A1 | 3/2002 | Reiner |
| 2004/0162853 | A1 | 8/2004 | Brodersen |
| 2007/0078838 | A1 | 4/2007 | Chung |
| 2008/0059489 | A1 * | 3/2008 | Han ..................... G06F 16/245 |
| 2008/0133456 | A1 | 6/2008 | Richards |
| 2008/0270372 | A1 | 10/2008 | Hsu et al. |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2011/0228668 | A1 * | 9/2011 | Pillai .................. G06F 11/2023 370/217 |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | Mcwilliams |
| 2013/0103787 | A1 * | 4/2013 | Glover ................. G06F 9/5083 709/217 |
| 2013/0117257 | A1 * | 5/2013 | Meijer ................ G06F 16/2462 707/719 |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2017/0083588 | A1 * | 3/2017 | Lang ................. G06F 16/24526 |
| 2019/0050726 | A1 * | 2/2019 | Azaria .................... G06N 3/08 |
| 2019/0332703 | A1 * | 10/2019 | Feldman ................ G06N 20/00 |

OTHER PUBLICATIONS

A new high performance fabric for HPC, Michael Feldman, May 2016, Intersect360 Research.

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

International Searching Authority; International Search Report and Written Opinion; International Application No. PCT/US2021/026118; Jul. 22, 2021; 9 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends in Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10

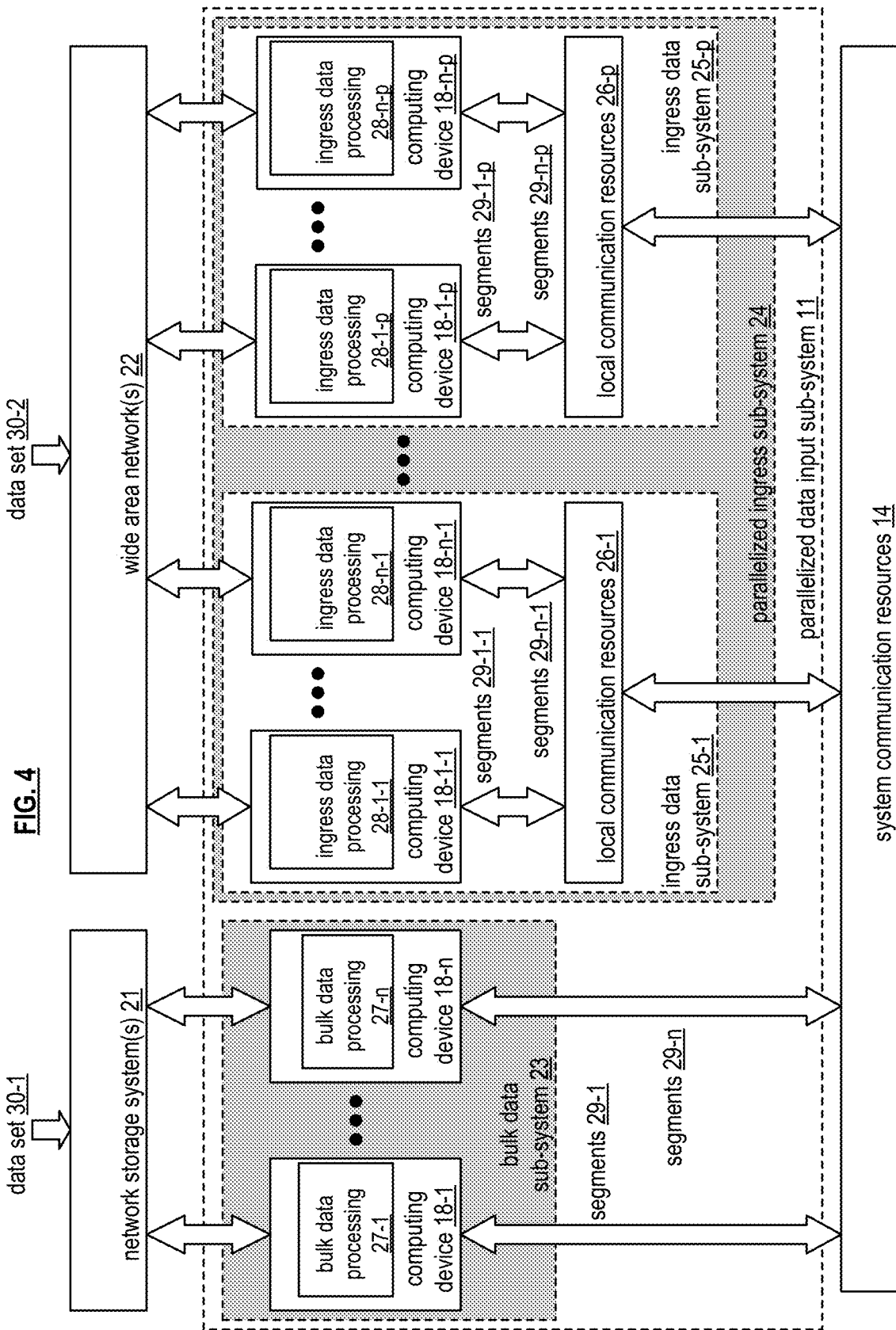

computing device 18 computing device 18 computing device 18 node 37 node 37 node 37 node 37 data set

FIG. 18 data for segment 1 (raw segment)

primary organization column (e.g., time stamp)

selected key column (e.g., engine on or off)

| | | | |
|---|---|---|---|
| 1 | a | on | 101 | a2c |
| 2 | b | off | 112 | a1k |
| 3 | c | off | 211 | d5s |
| 4 | d | on | 074 | c4l |
| 5 | e | on | 364 | b5e |
| 6 | f | off | 489 | c4q |
| 7 | g | on | 015 | e8f |
| 8 | h | off | 611 | a1a |

FIG. 19 divide segment by columns into data slabs

| 1 | a | on | 101 | a2c |
| 2 | b | off | 112 | a1k |
| 3 | c | off | 211 | d5s |
| 4 | d | on | 074 | c4l |
| 5 | e | on | 364 | b5e |
| 6 | f | off | 489 | c4q |
| 7 | g | on | 015 | e8f |
| 8 | h | off | 611 | a1a | data slab

FIG. 20 sort data slabs based on key column(s)

| 1 | a | on | 101 | a2c |
| 4 | d | on | 074 | c4l |
| 5 | e | on | 364 | b5e |
| 7 | g | on | 015 | e8f |
| 2 | b | off | 112 | a1k |
| 3 | c | off | 211 | d5s |
| 6 | f | off | 489 | c4q |
| 8 | h | off | 611 | a1a | sorted data slab

2405

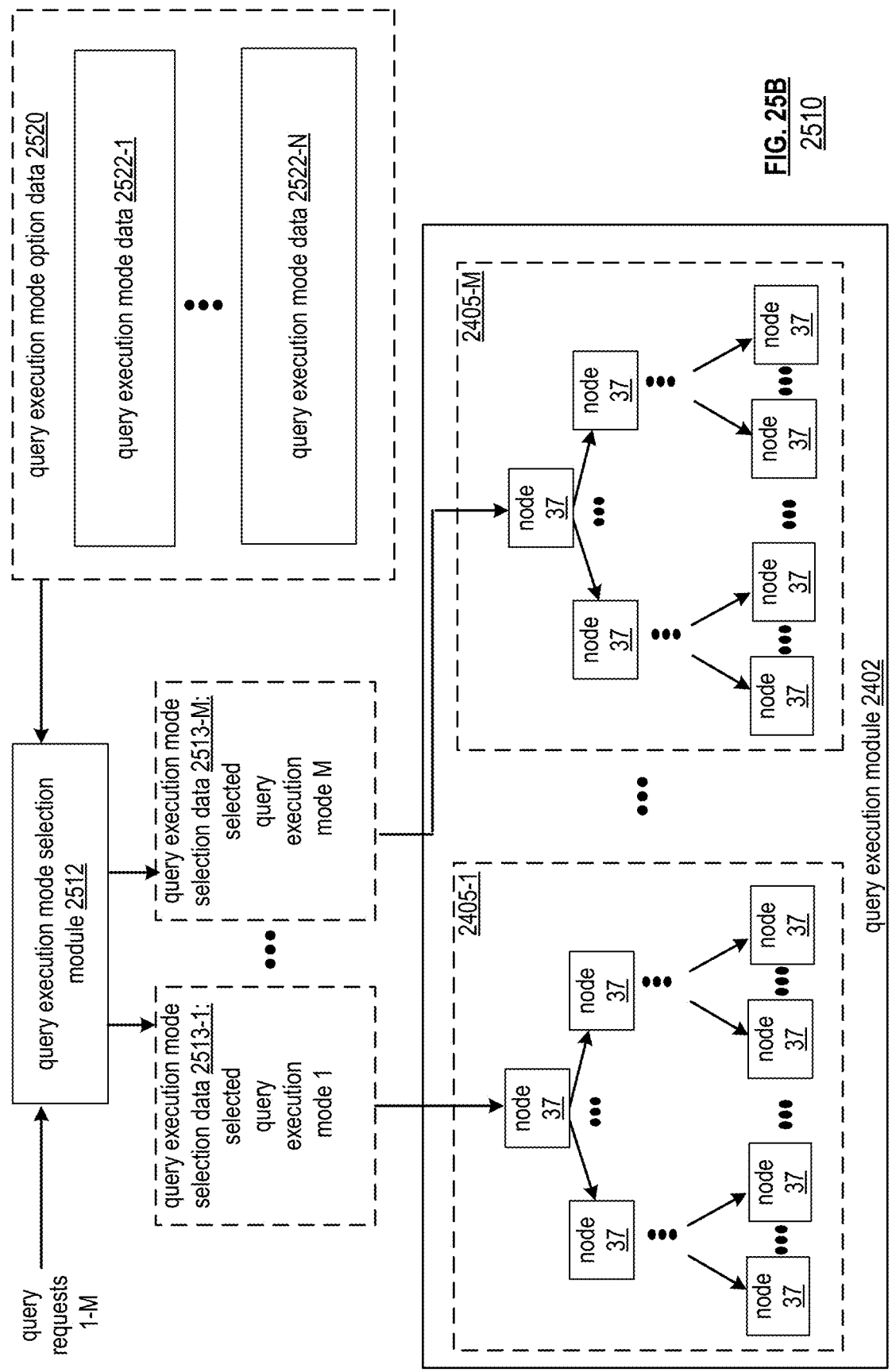

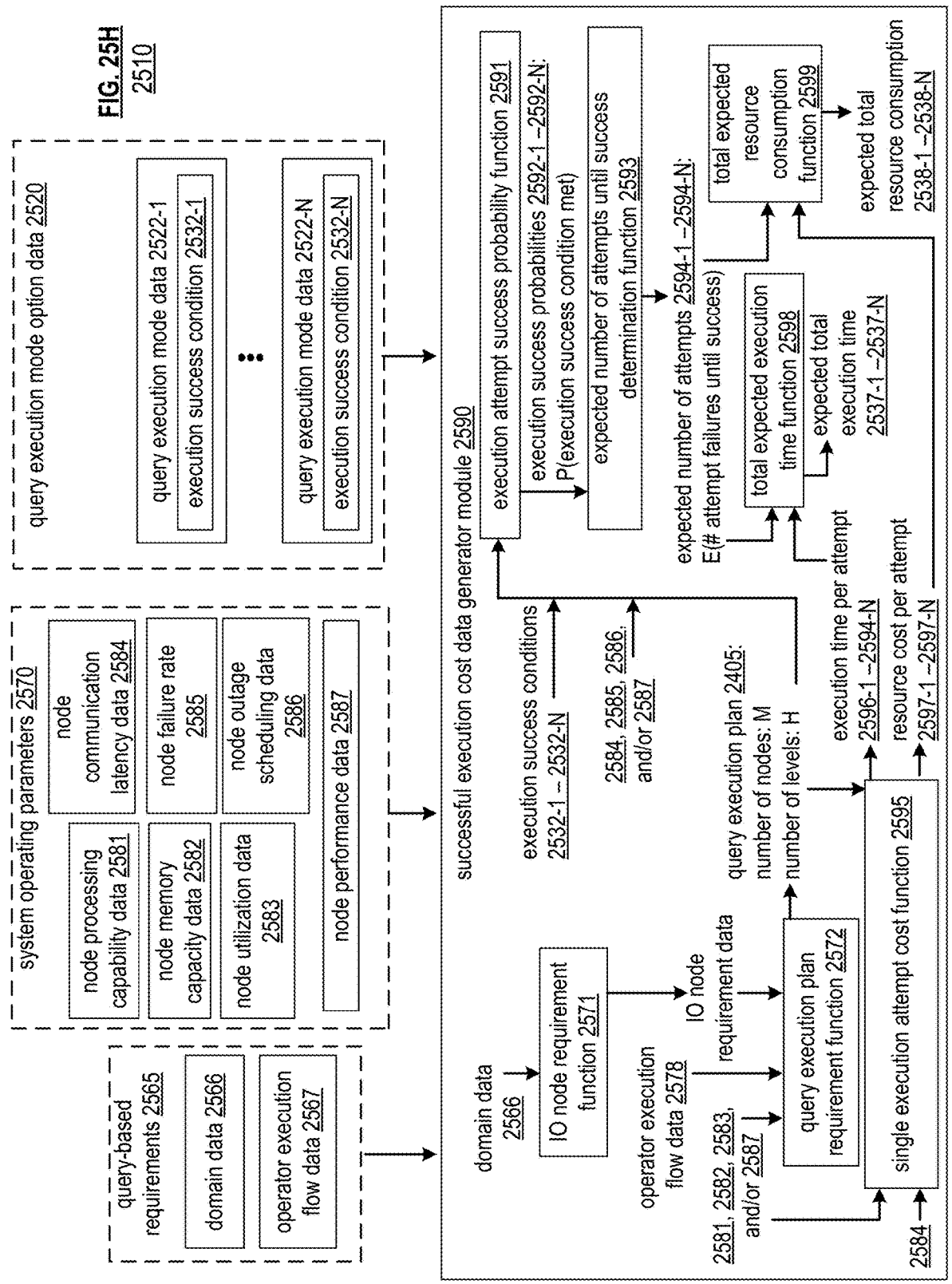

2510

2510 query processing system 2510 query execution module 2402

2402

2402

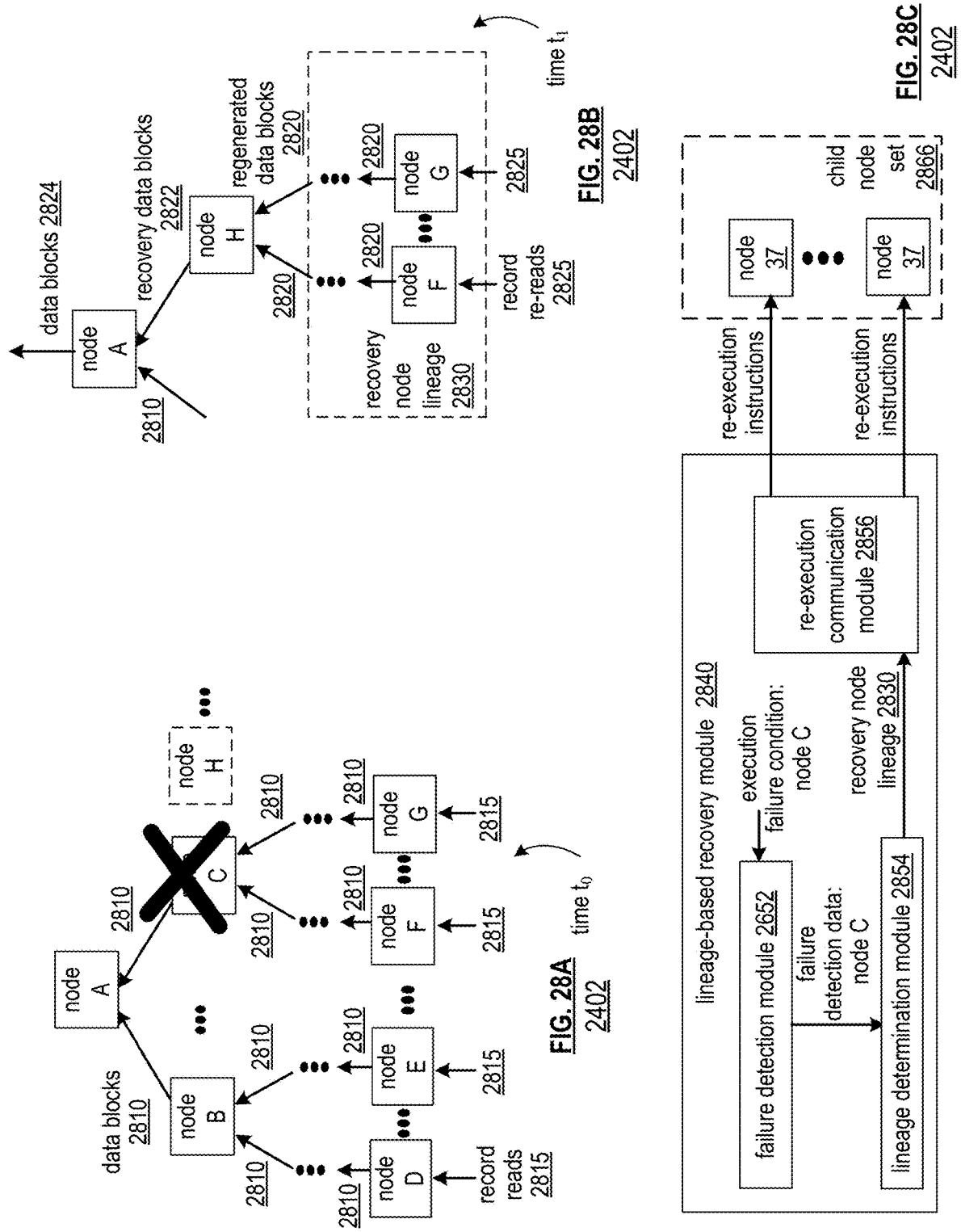

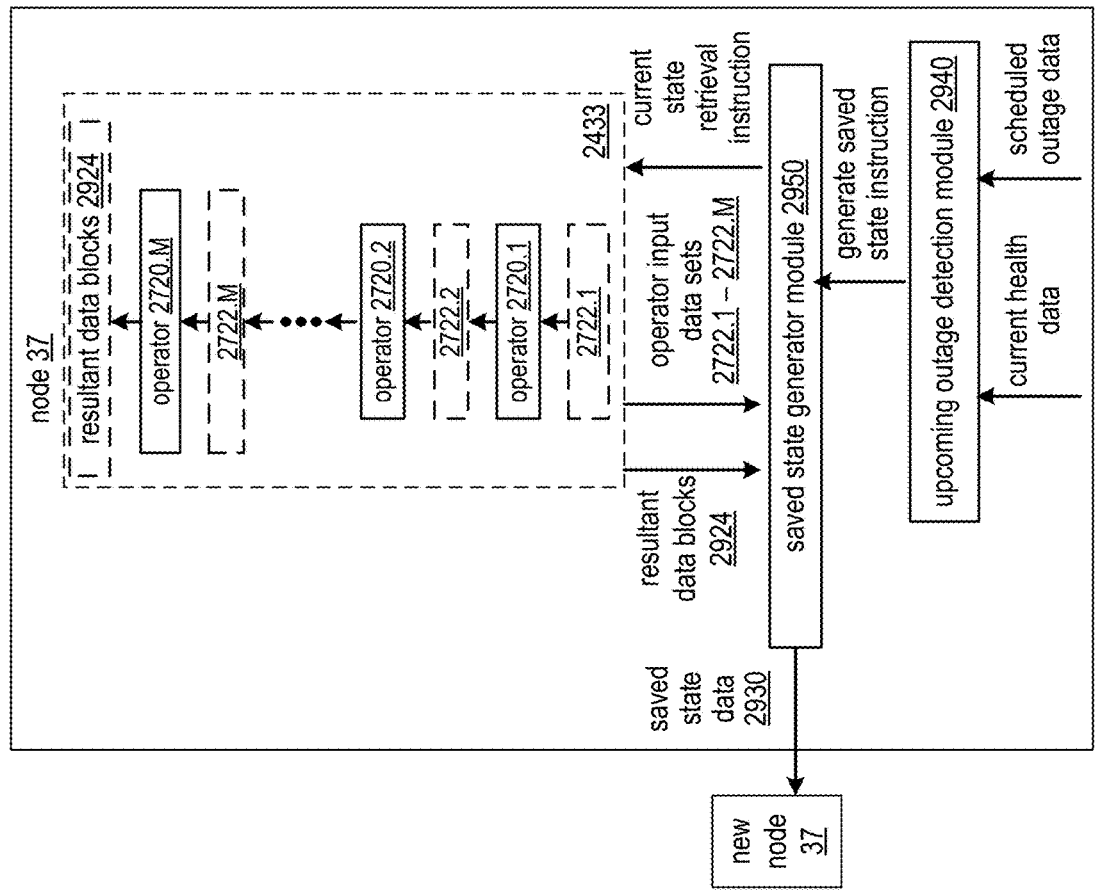

2510 query processing system 2510

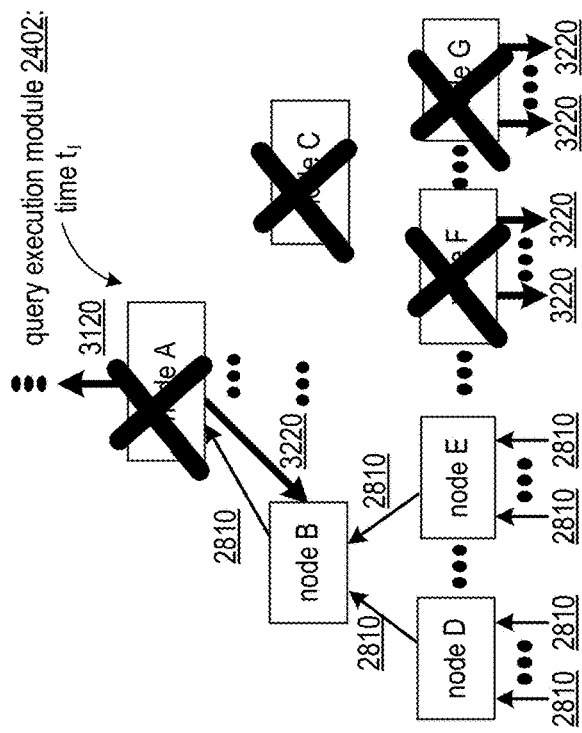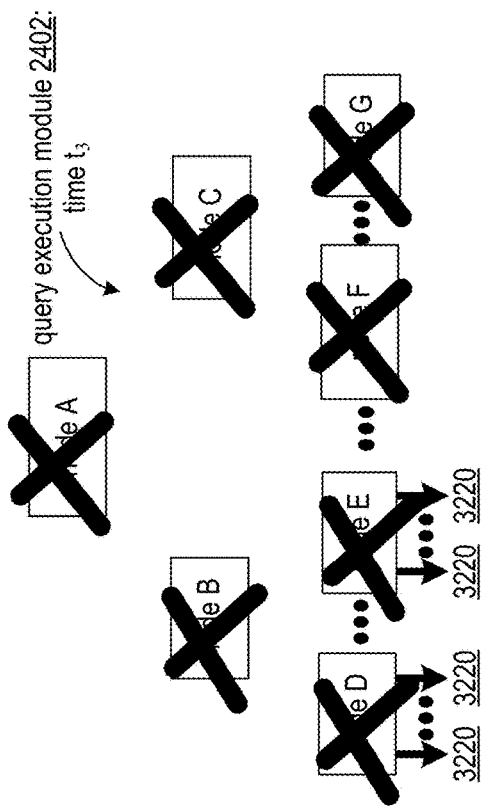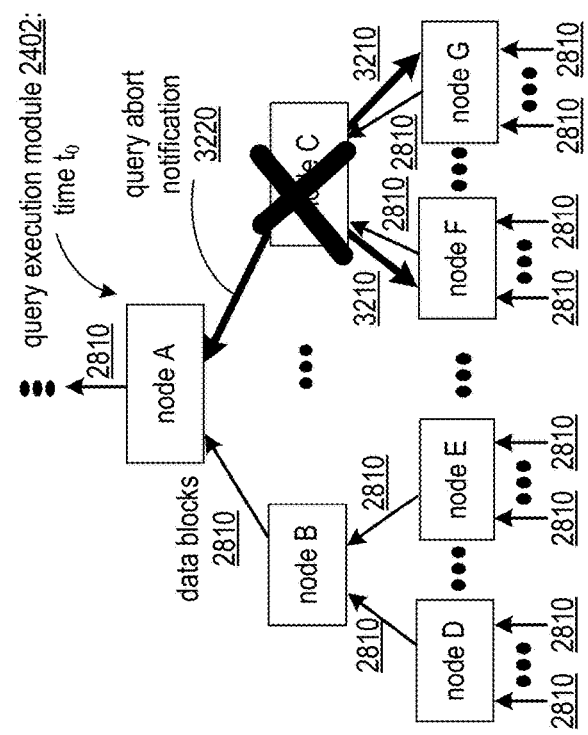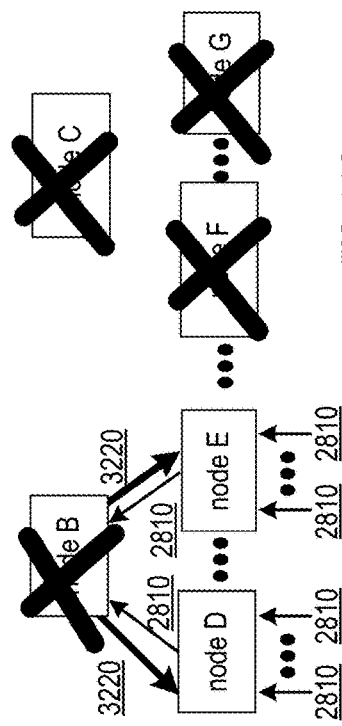
FIG. 32A
FIG. 32B
FIG. 32C
FIG. 32D

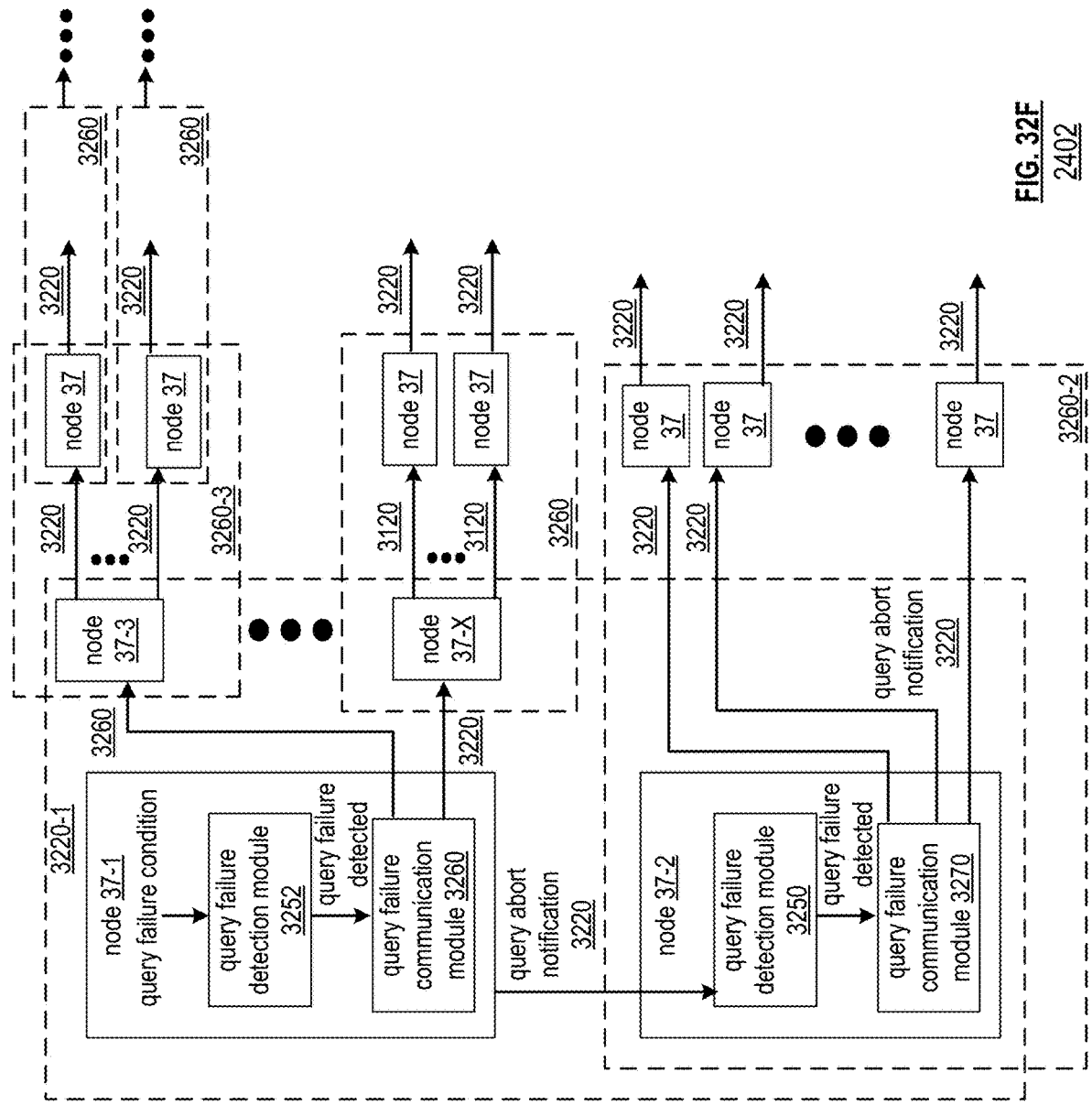

FACILITATING QUERY EXECUTIONS VIA ROLE REASSIGNMENT MODALITY

CROSS-REFERENCE TO RELATED APPLICATIONS

The present U.S. Utility Patent Application claims priority pursuant to 35 U.S.C. § 120 as a continuation of U.S. Utility application Ser. No. 17/678,282, entitled "REASSIGNMENT OF NODES DURING QUERY EXECUTION", filed Feb. 23, 2022, which is a continuation of U.S. Utility application Ser. No. 16/879,218, entitled "FACILITATING QUERY EXECUTIONS VIA MULTIPLE MODES OF RESULTANT CORRECTNESS", filed May 20, 2020, issued as U.S. Pat. No. 11,294,916 on Apr. 5, 2022, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIG. 4 is a schematic block diagram of an embodiment of a parallelized data input sub-system in accordance with the present invention;

FIGS. 15-23 are schematic block diagrams of an example of processing a table or data set for storage in the database system in accordance with the present invention;

FIGS. 25A-25F are schematic block diagrams of embodiments of a query processing system that implement a query execution mode selection module in accordance with various embodiments of the present invention;

FIG. 25H is a schematic block diagram of a query processing system that implements a successful execution cost data generator module in accordance with various embodiments of the present invention;

FIGS. 28A-28C are schematic block diagrams of embodiments of a query execution module that implements lineage-based recovery in accordance with various embodiments of the present invention;

FIGS. 29A-29C are schematic block diagrams of embodiments of a query execution module that generates saved state data in accordance with various embodiments of the present invention;

FIGS. 32A-32F are schematic block diagrams of a query execution module that facilitates transmission of query abort notifications in accordance with various embodiments of the present invention.

DETAILED DESCRIPTION OF THE INVENTION

Figure 1:
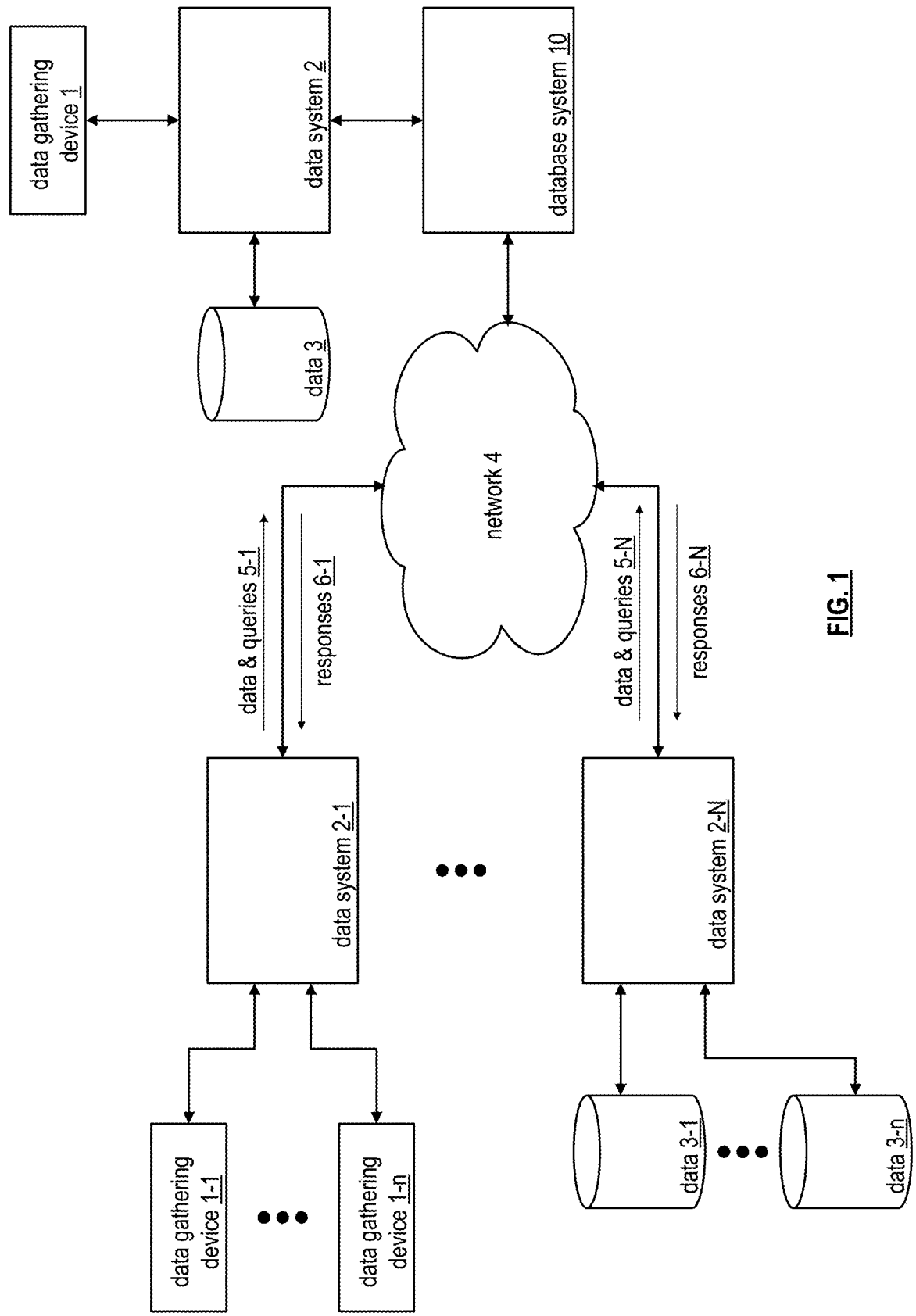
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
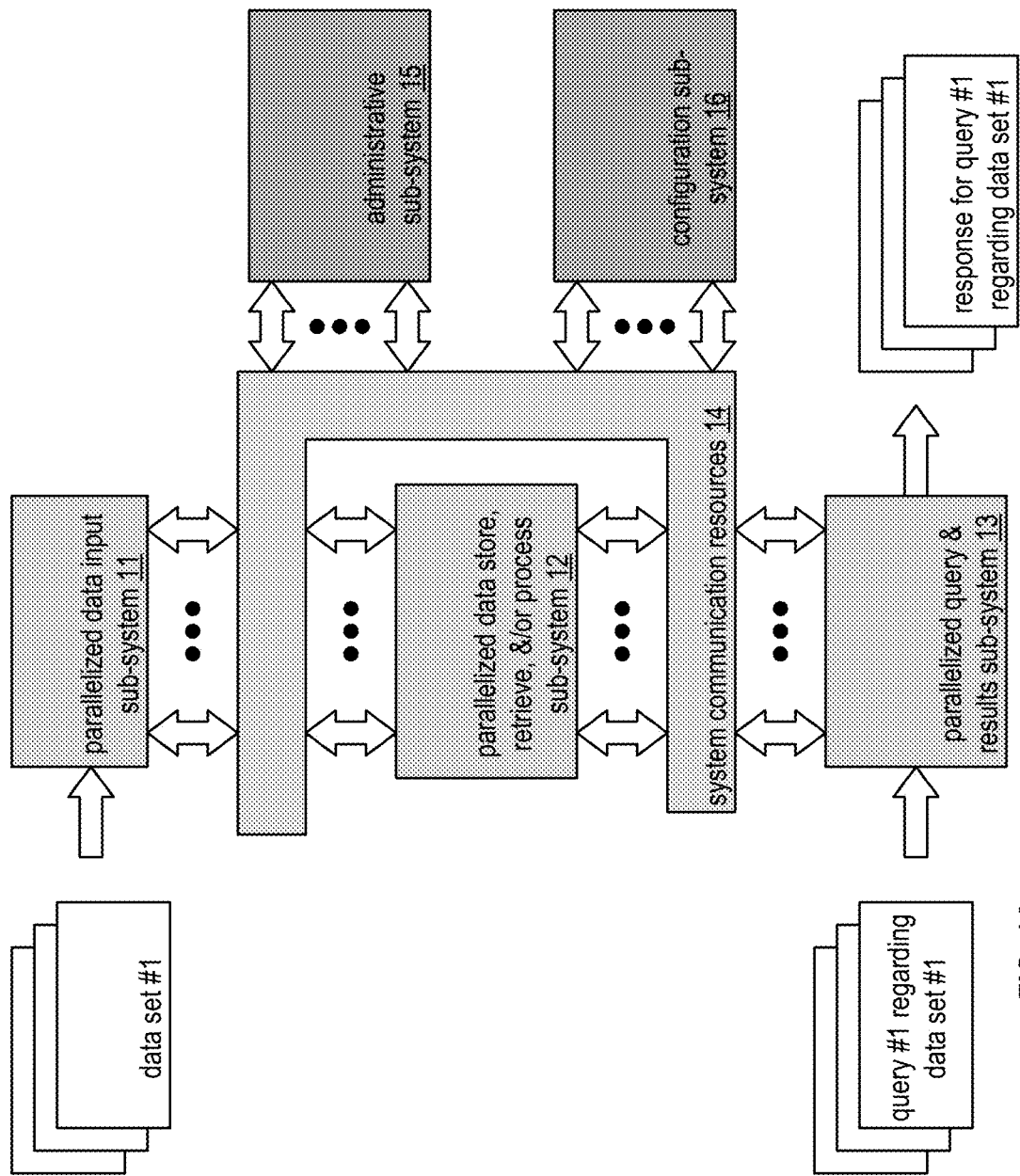
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
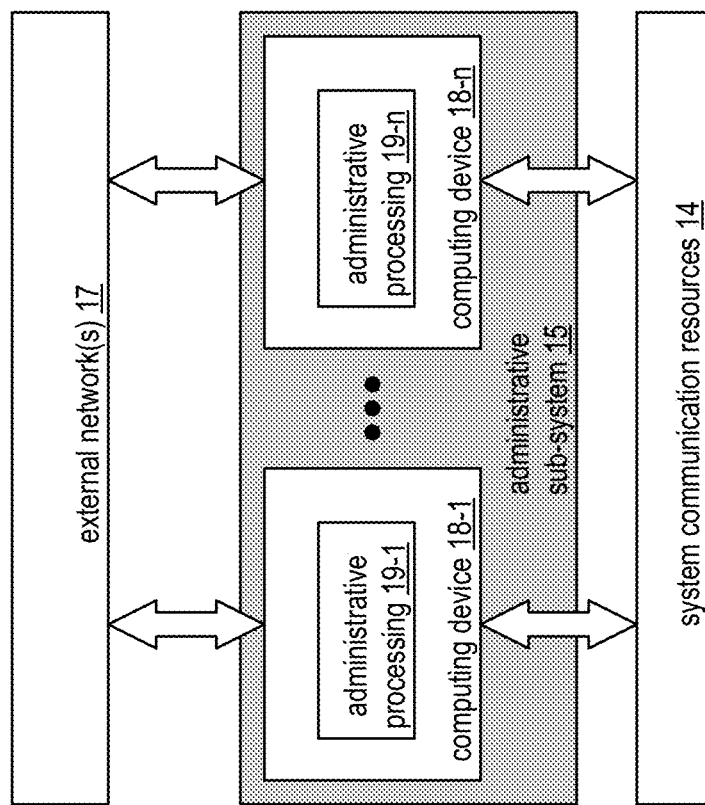
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
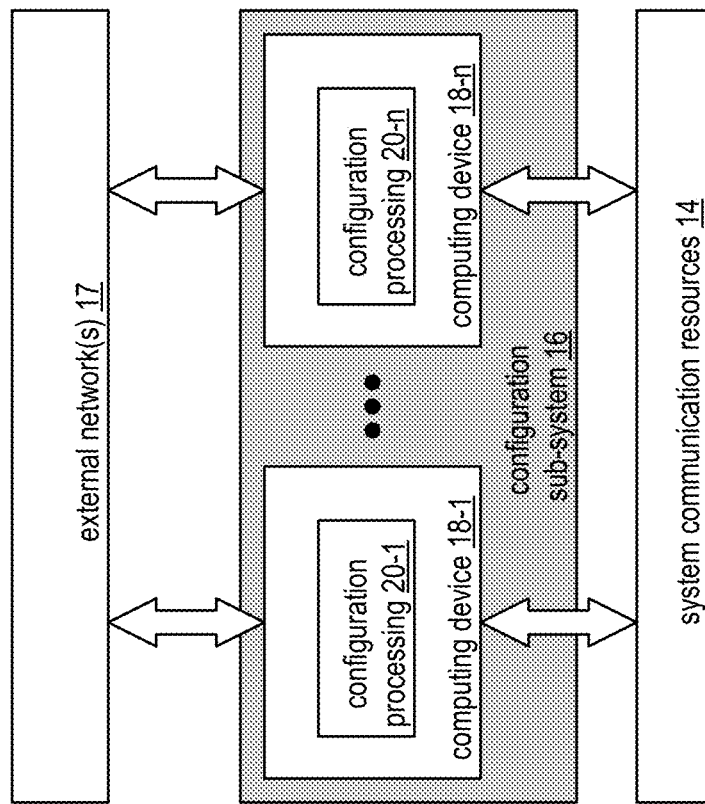
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
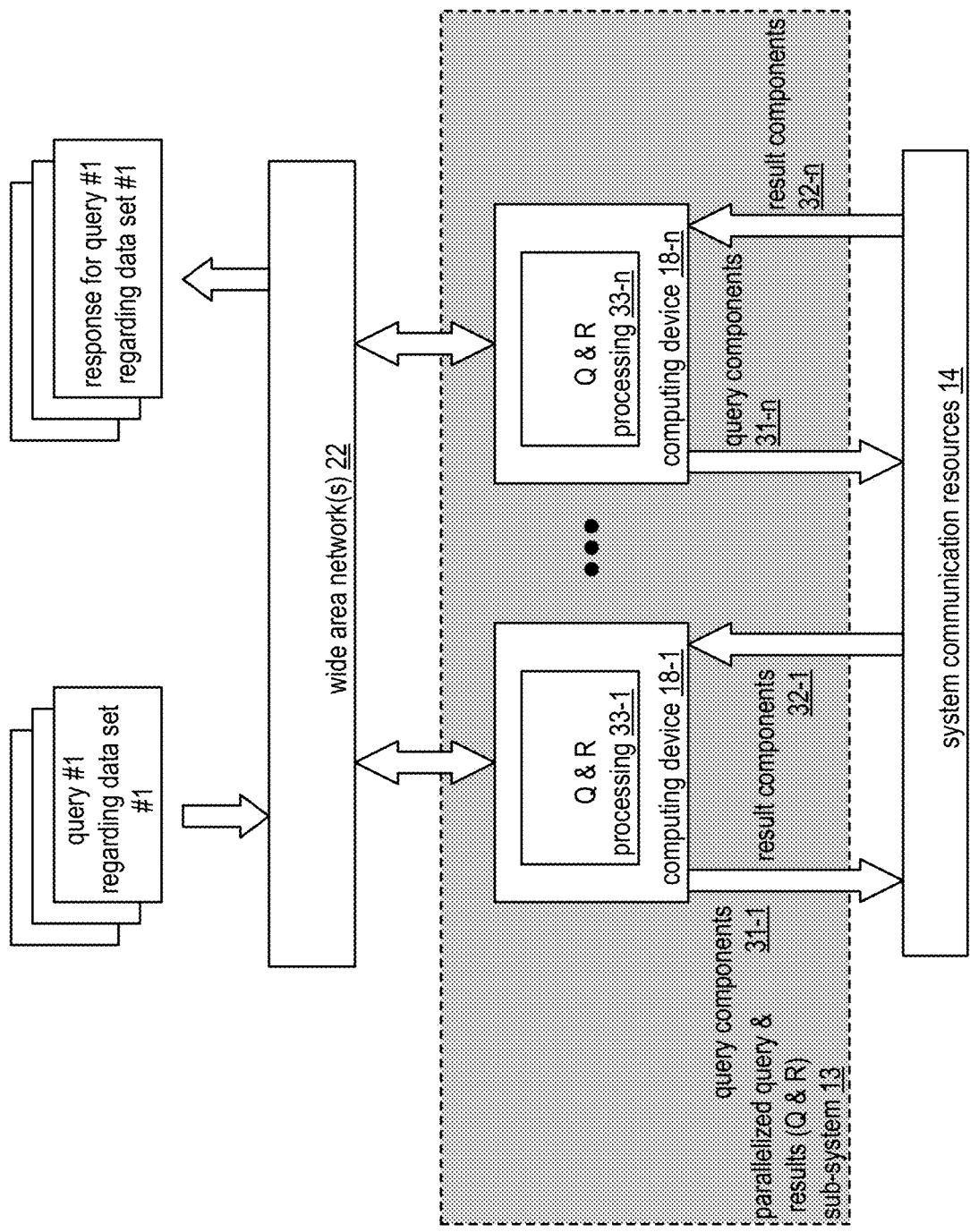
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
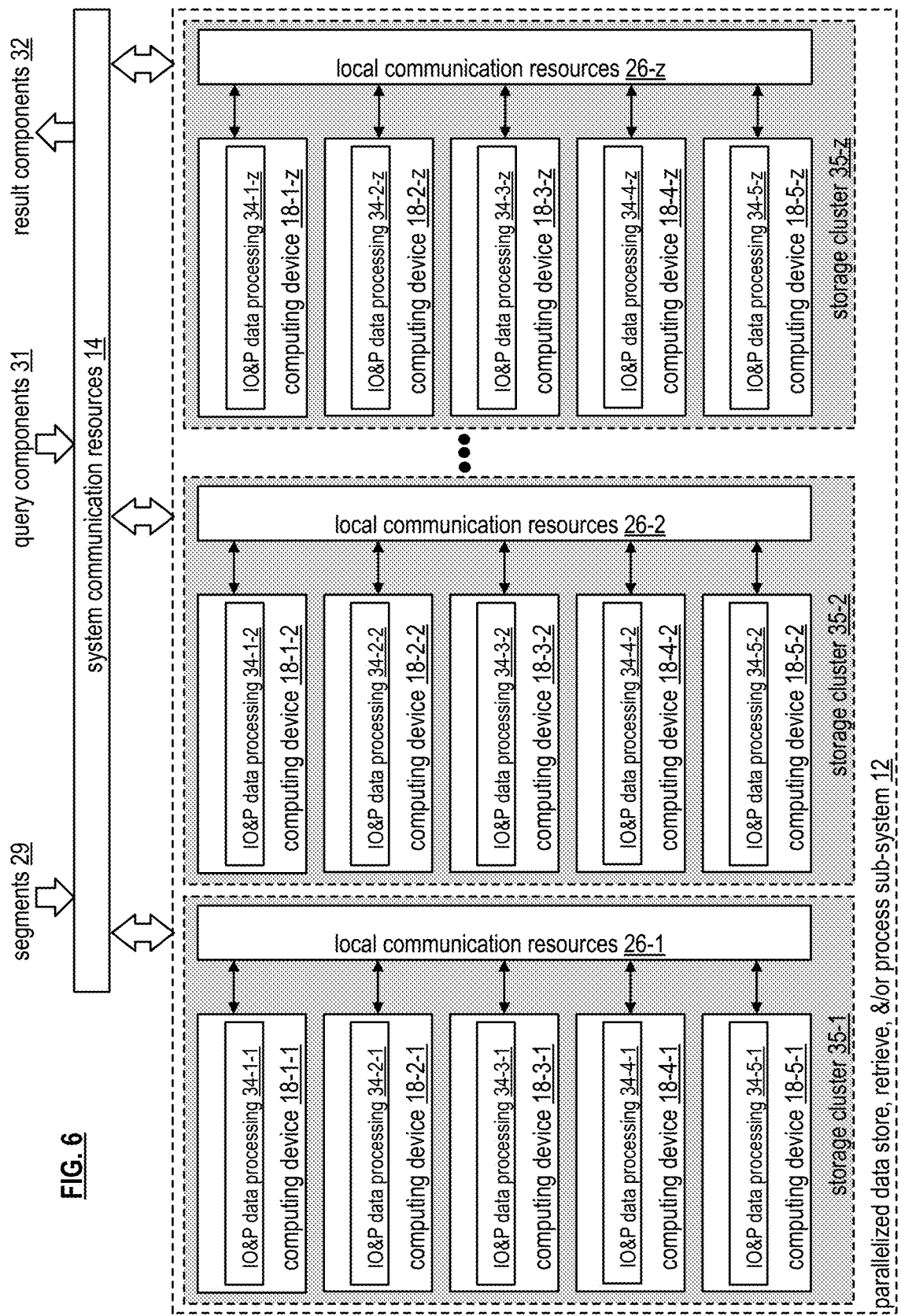
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
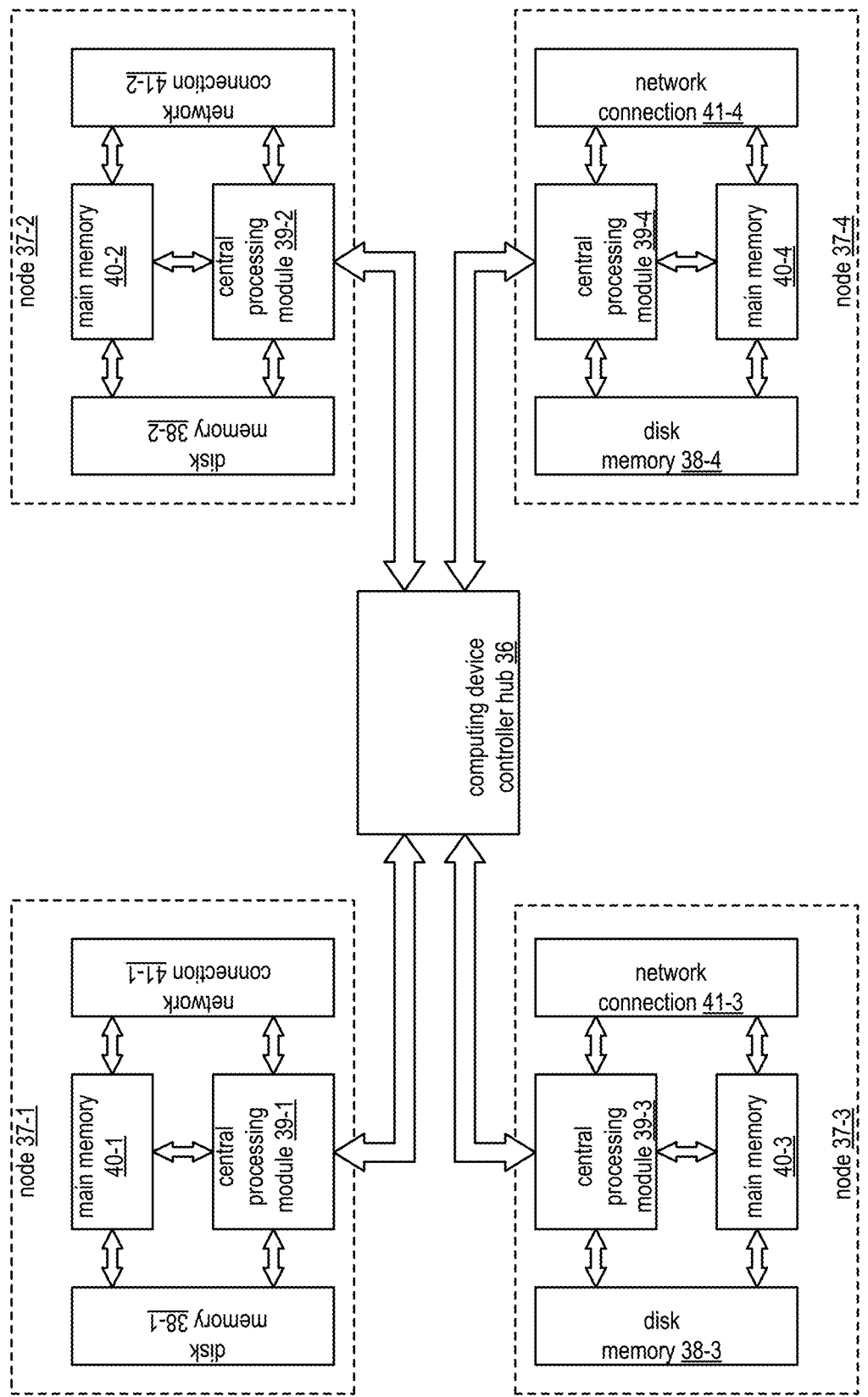
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
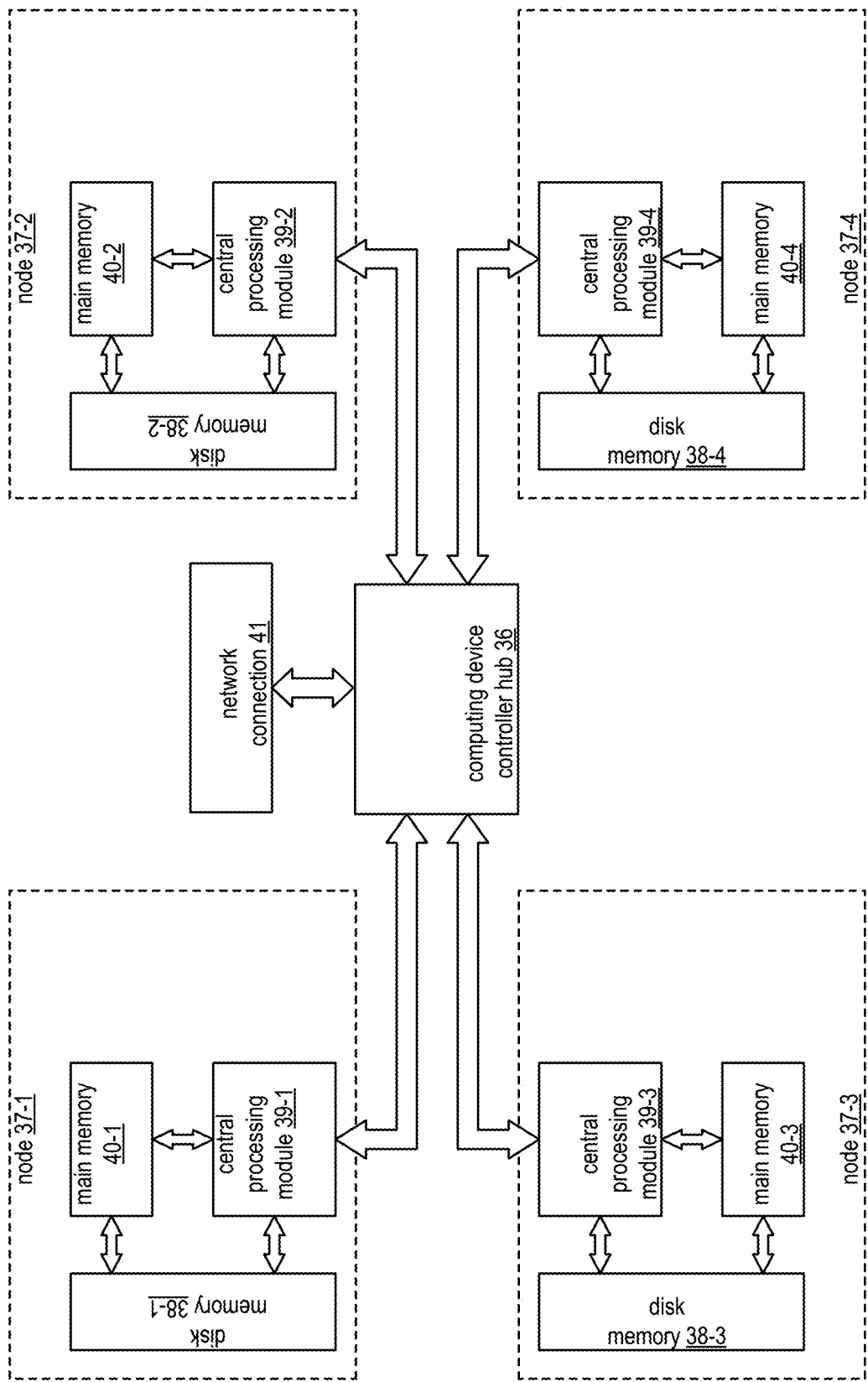
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
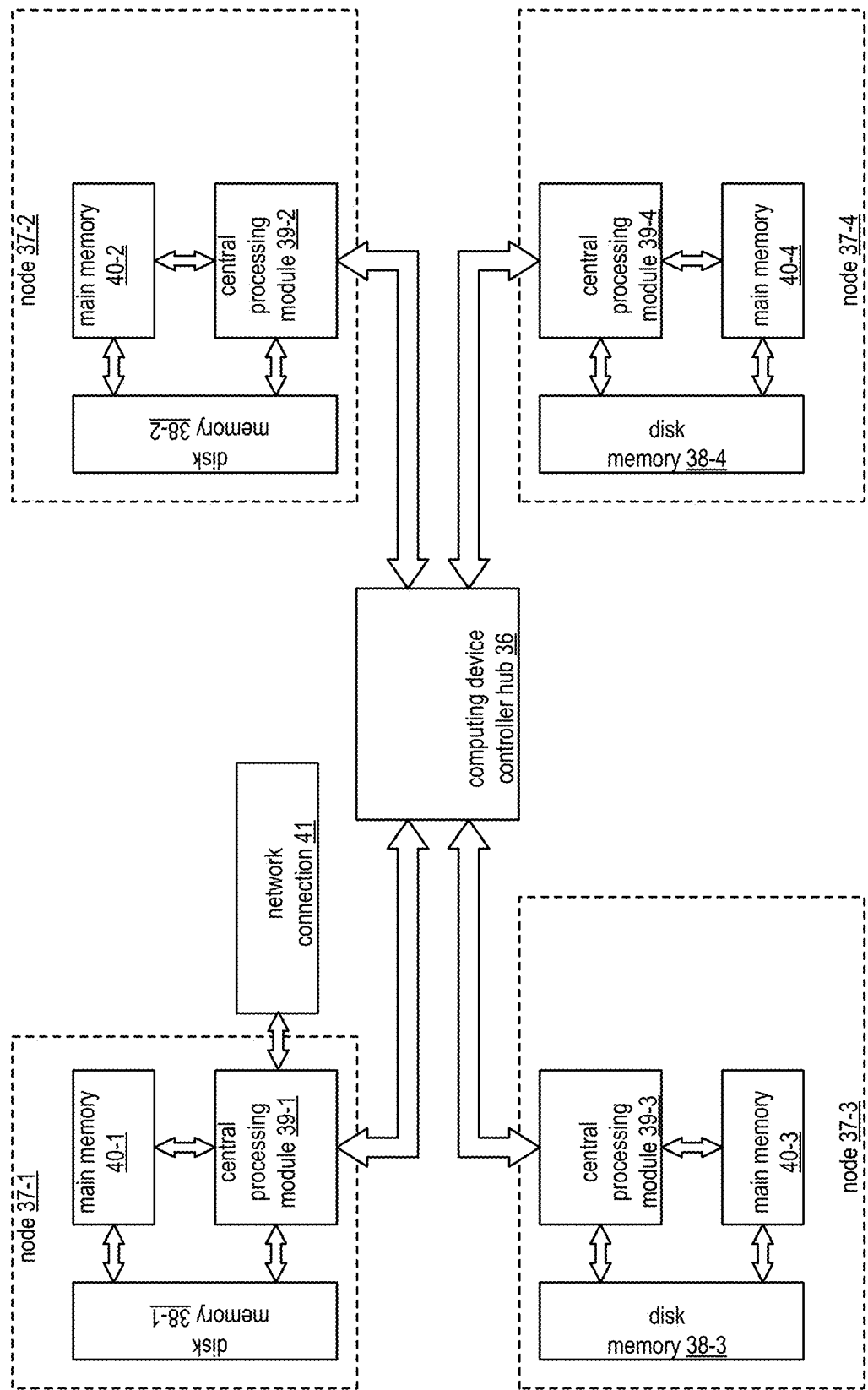
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
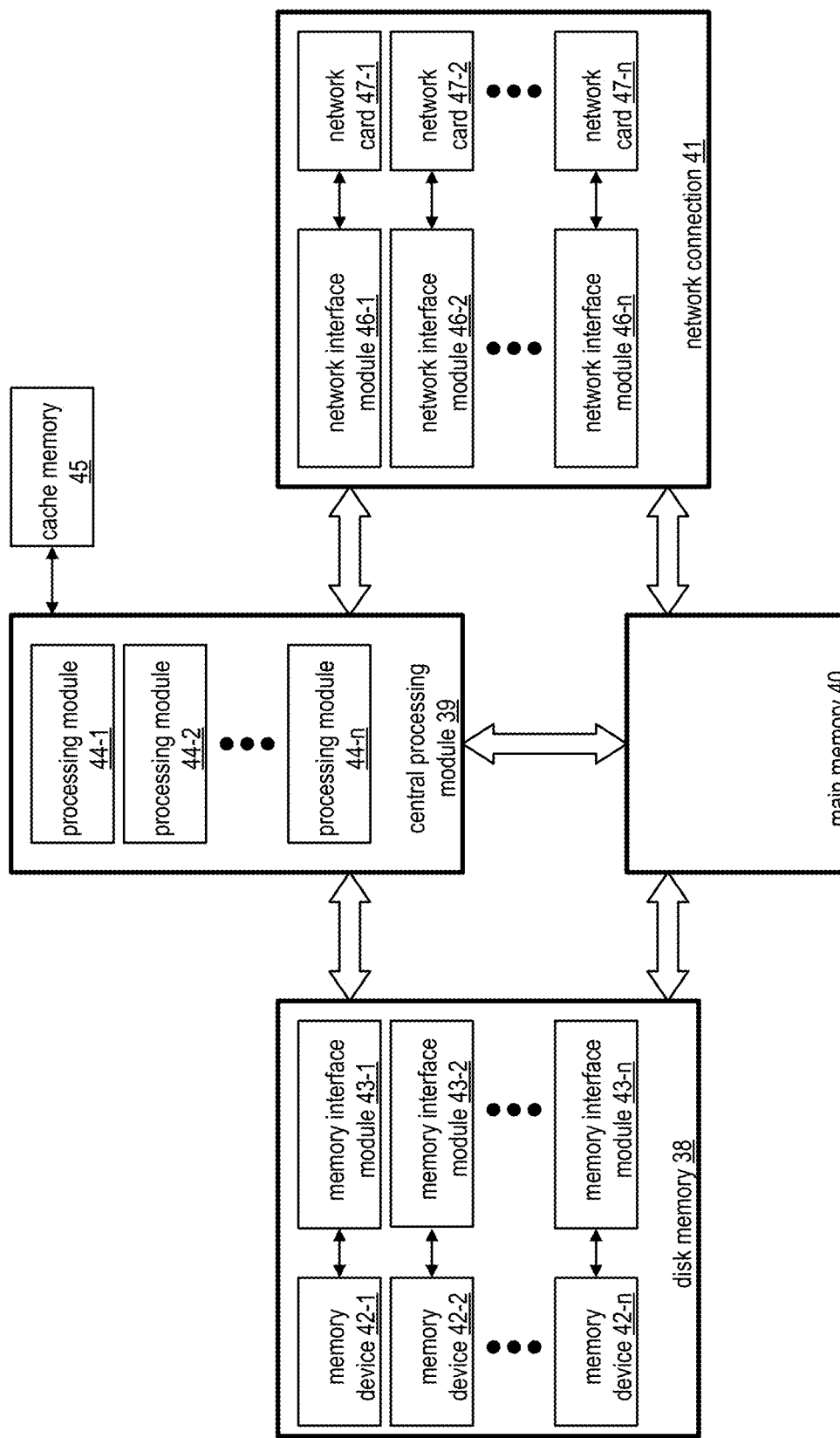
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
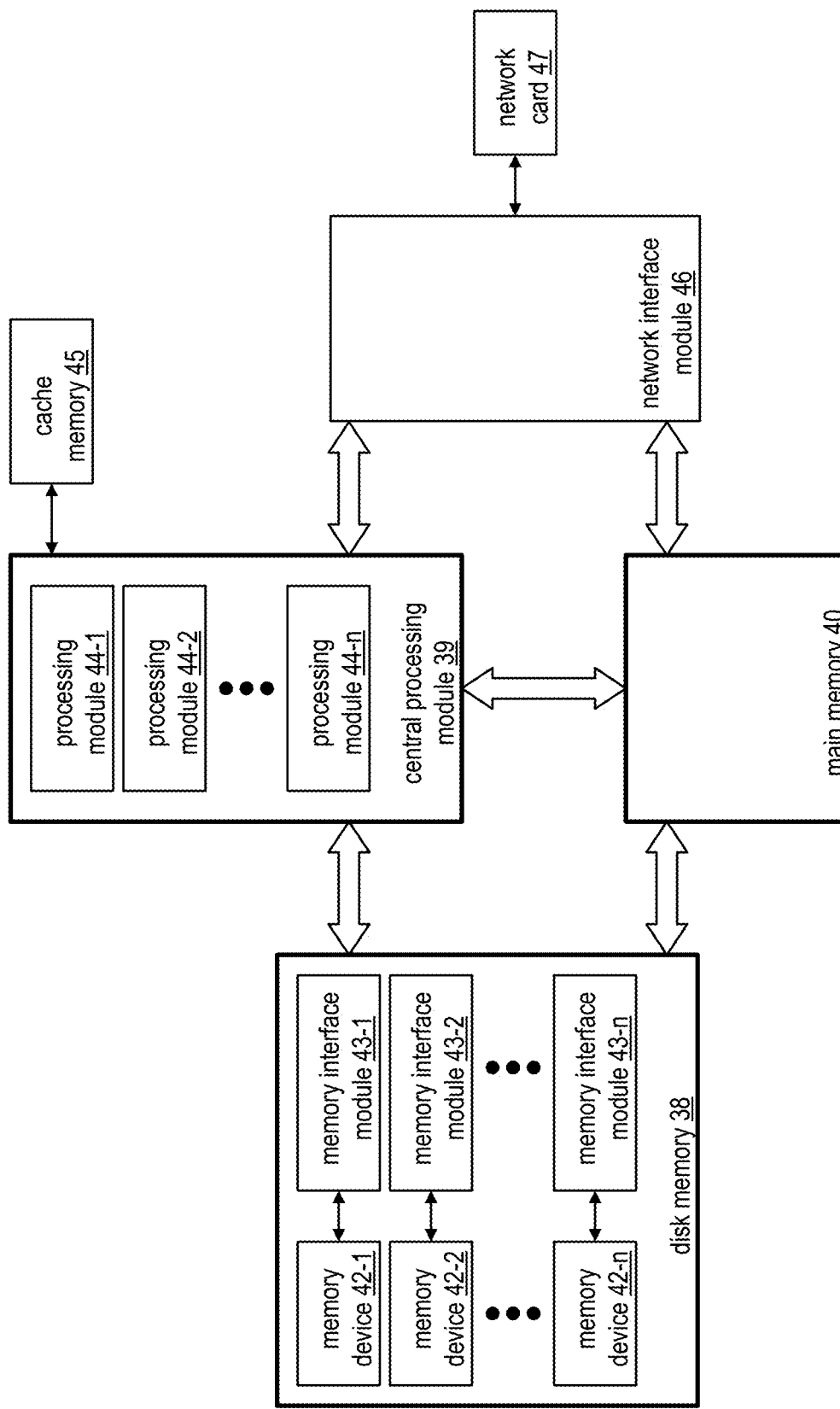
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
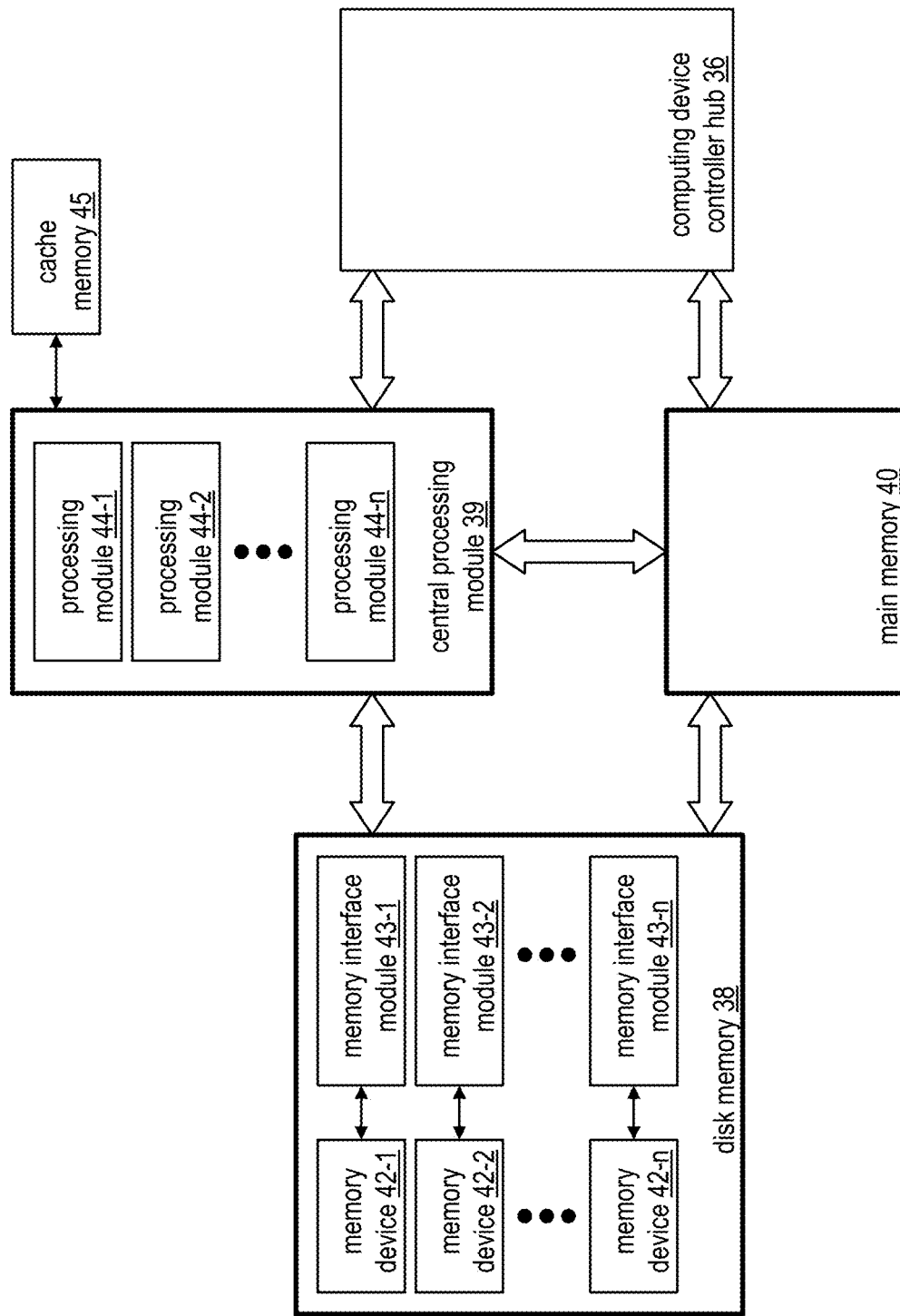
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
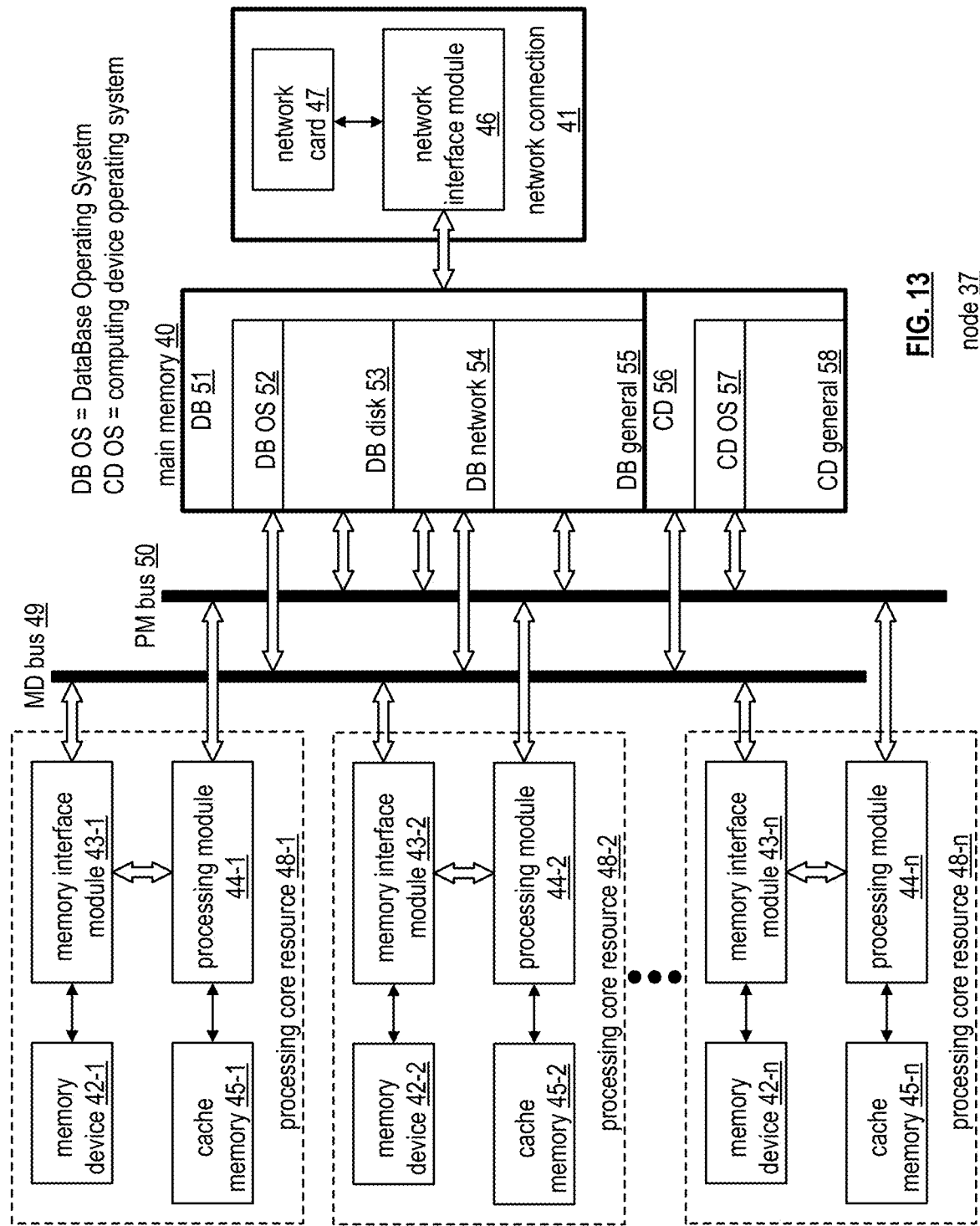
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
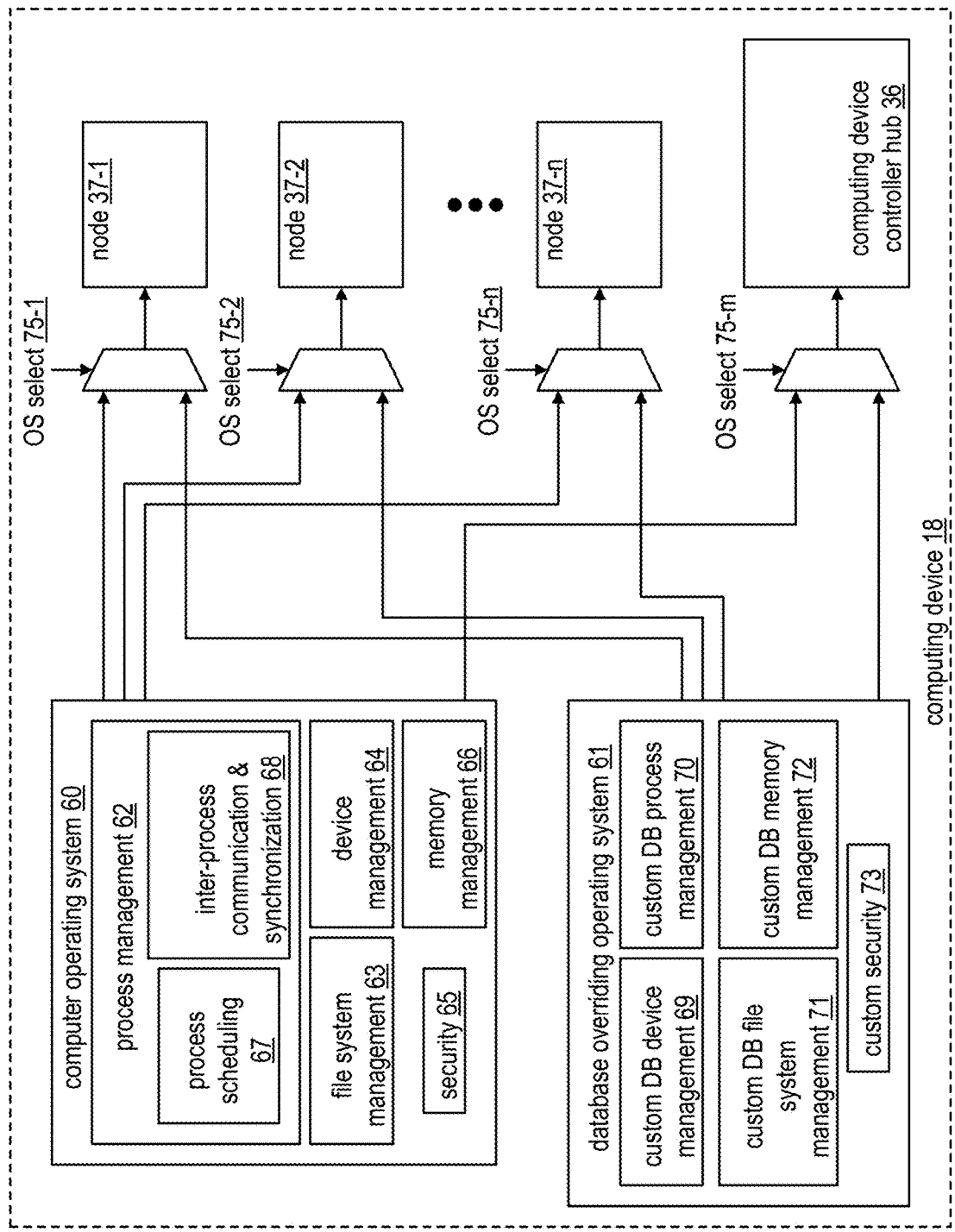
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
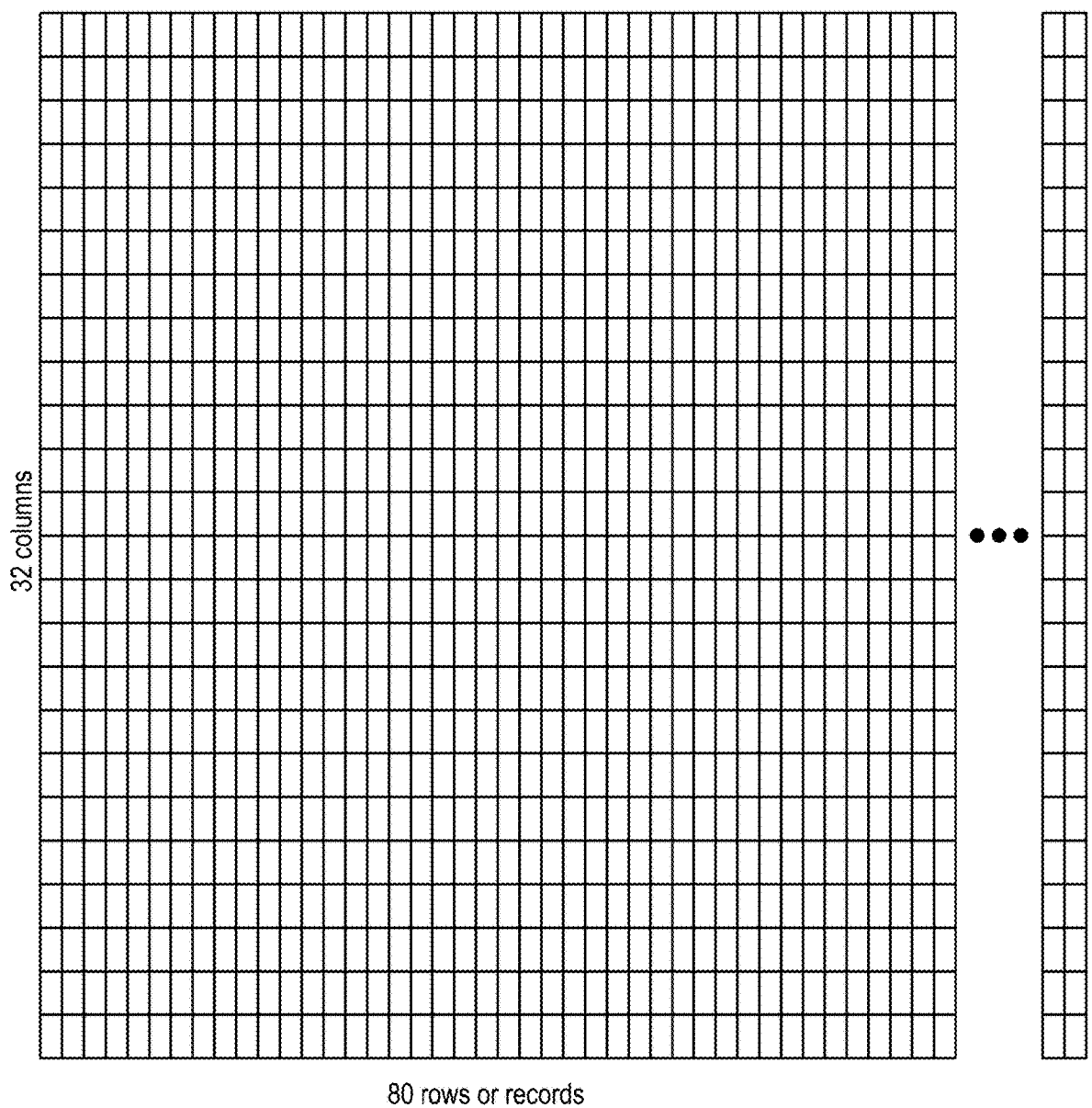

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
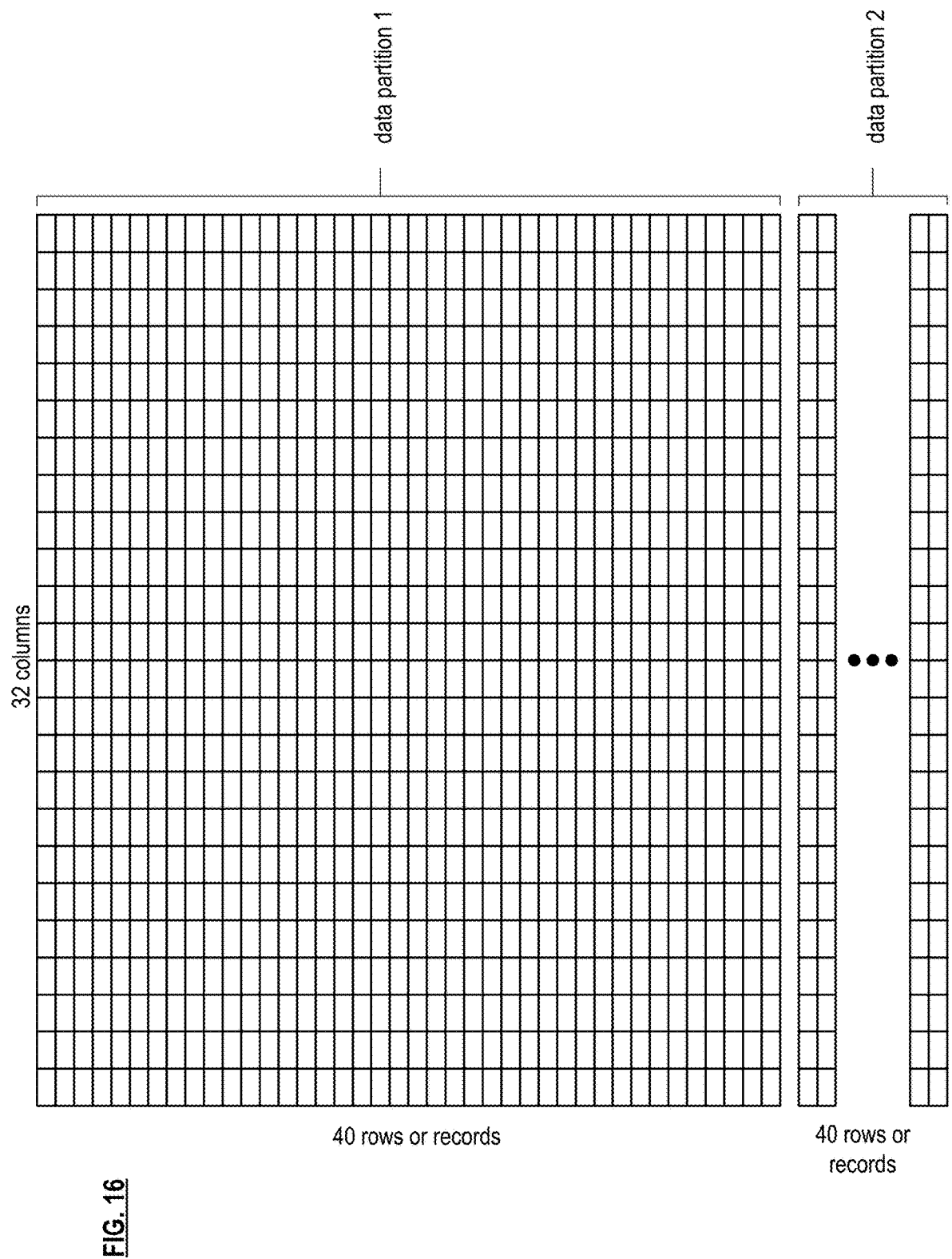

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
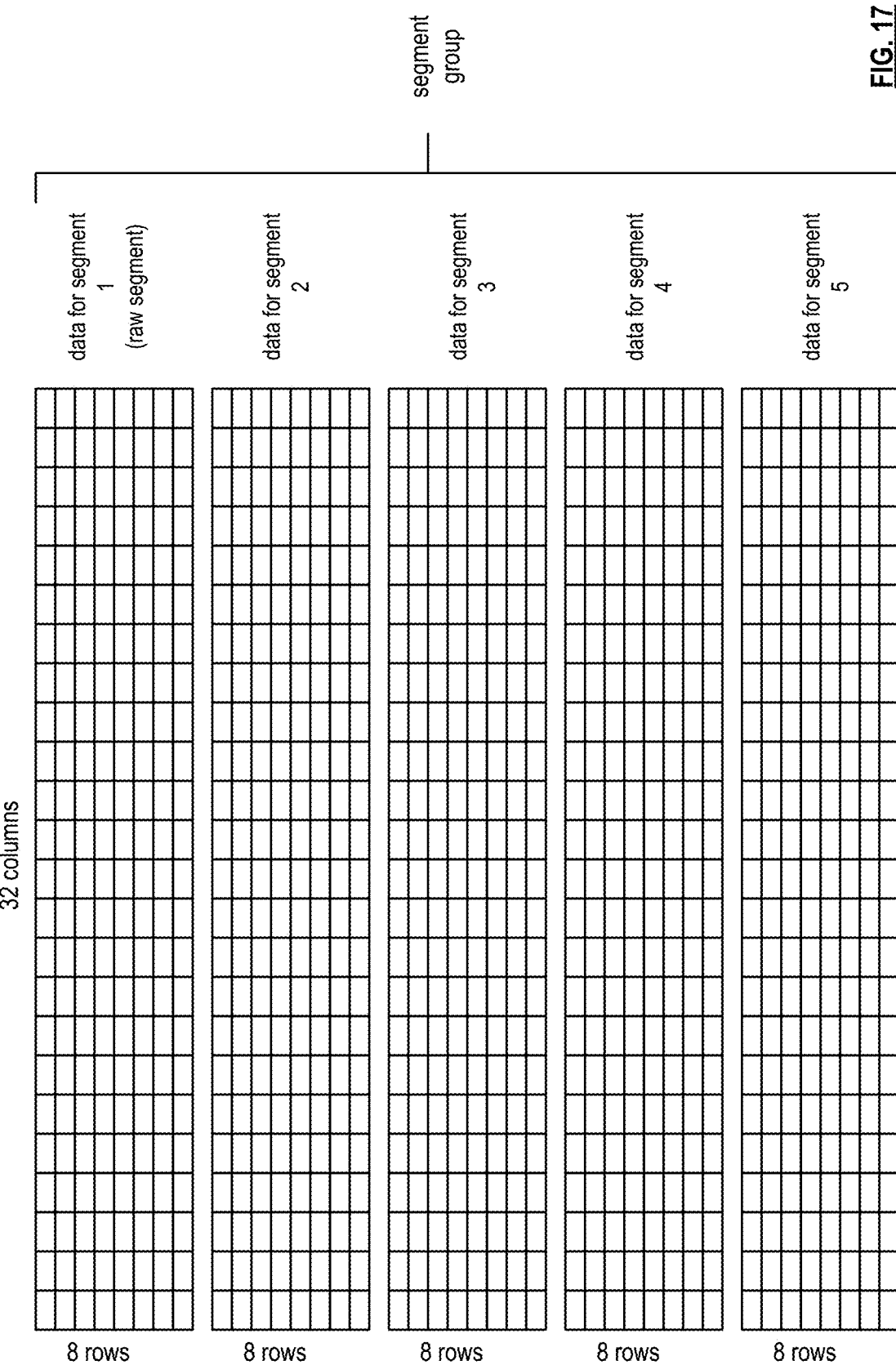

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
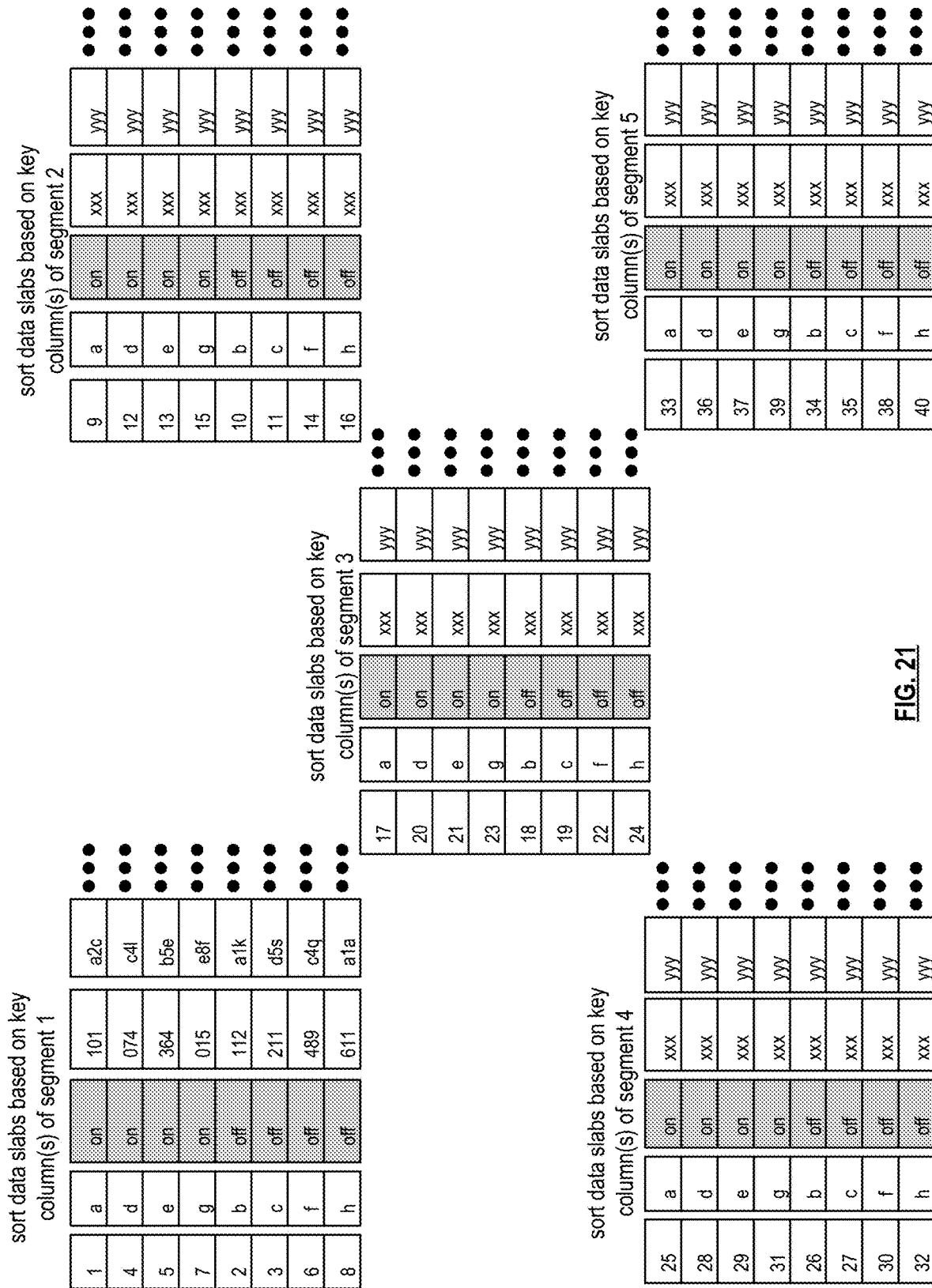

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
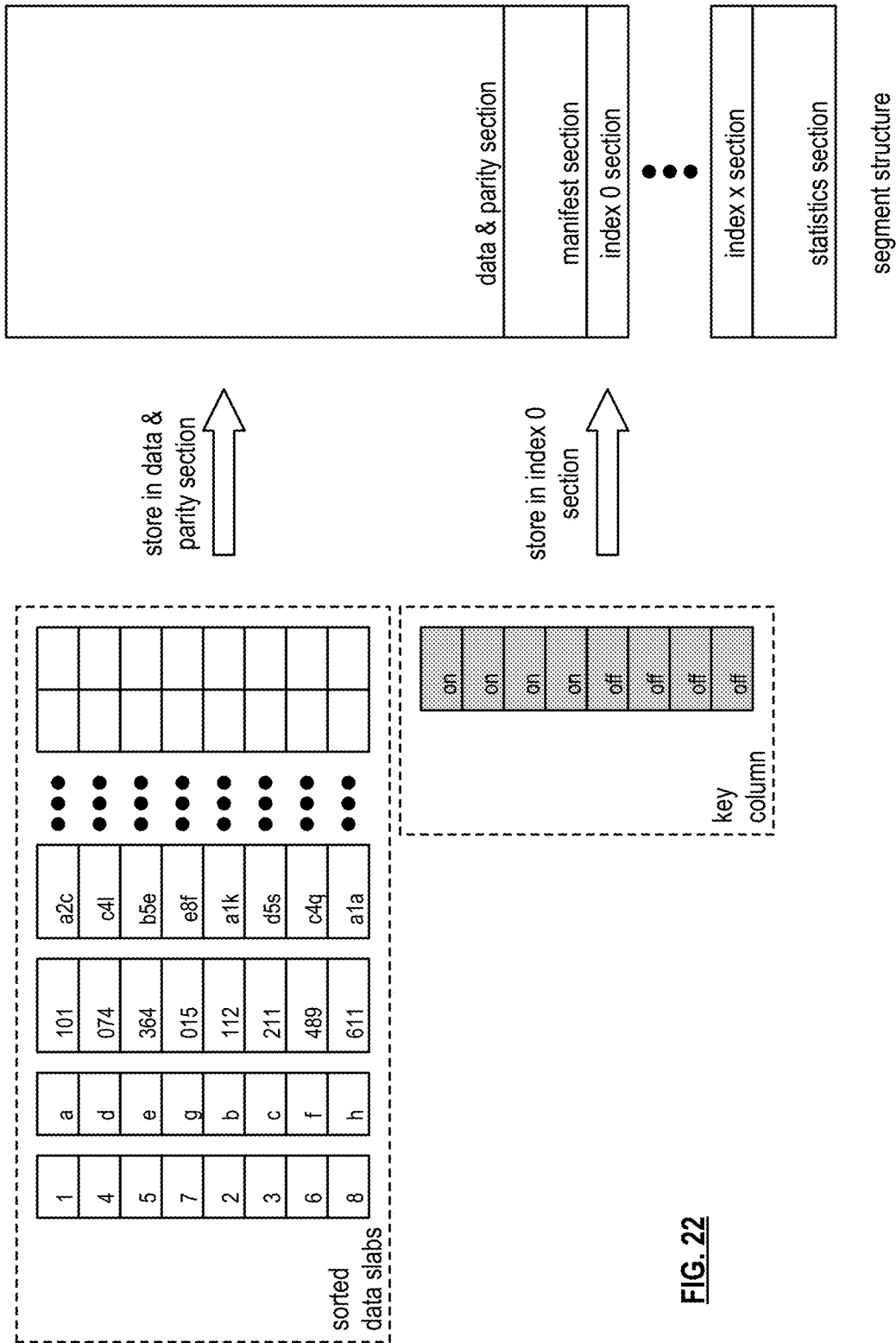

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
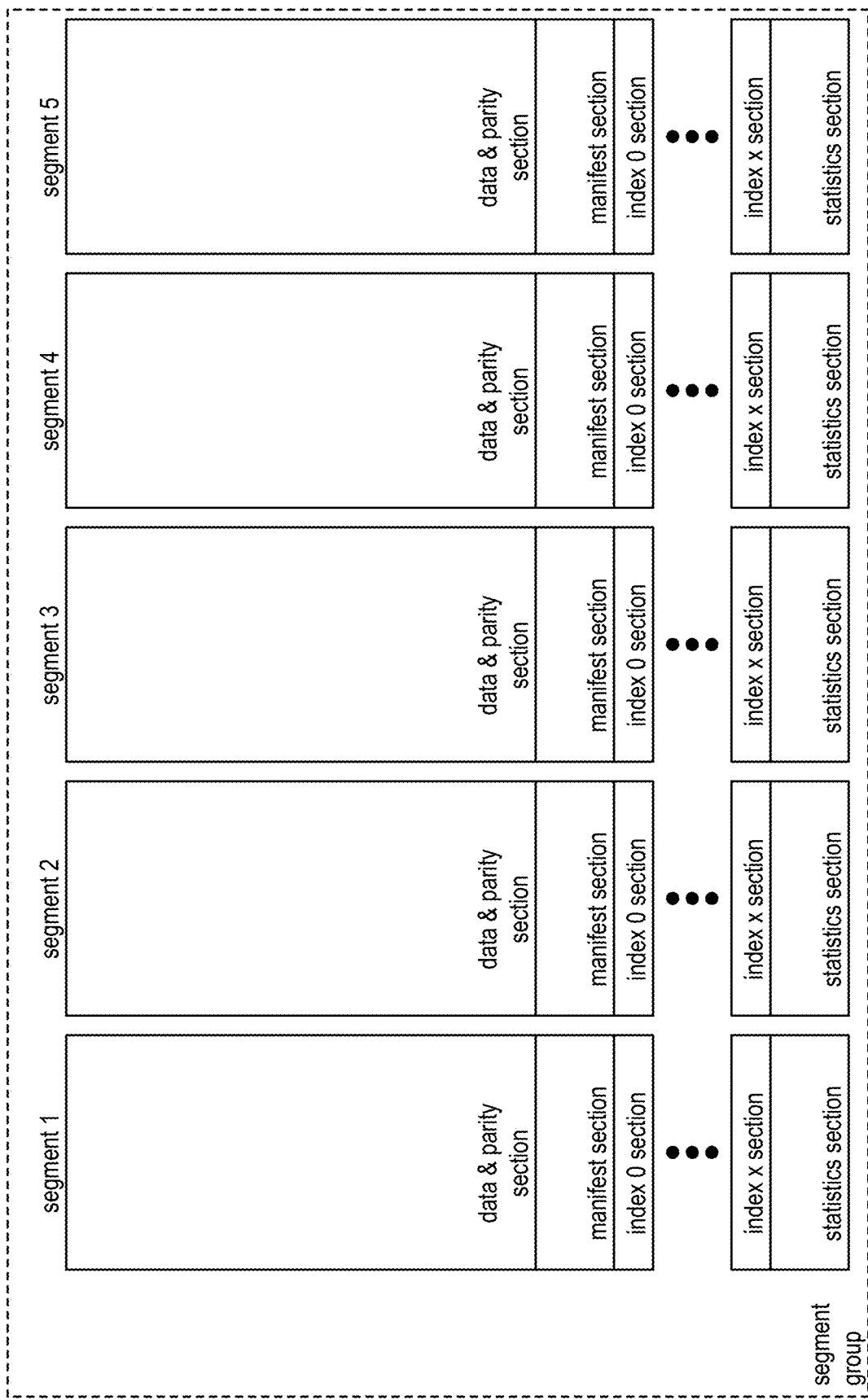

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
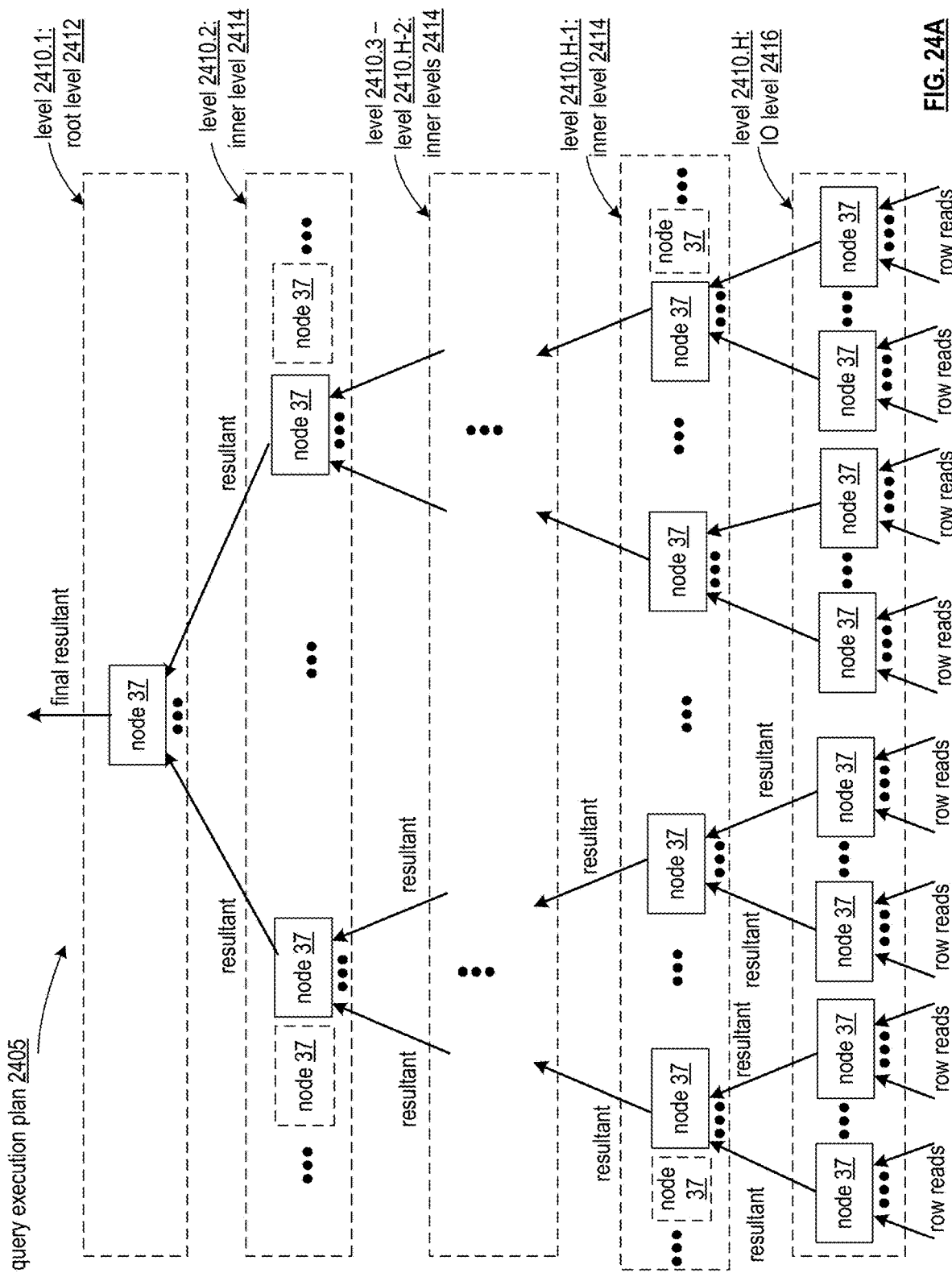
FIG. 24A is a schematic block diagram of a query execution plan implemented via a plurality of nodes in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
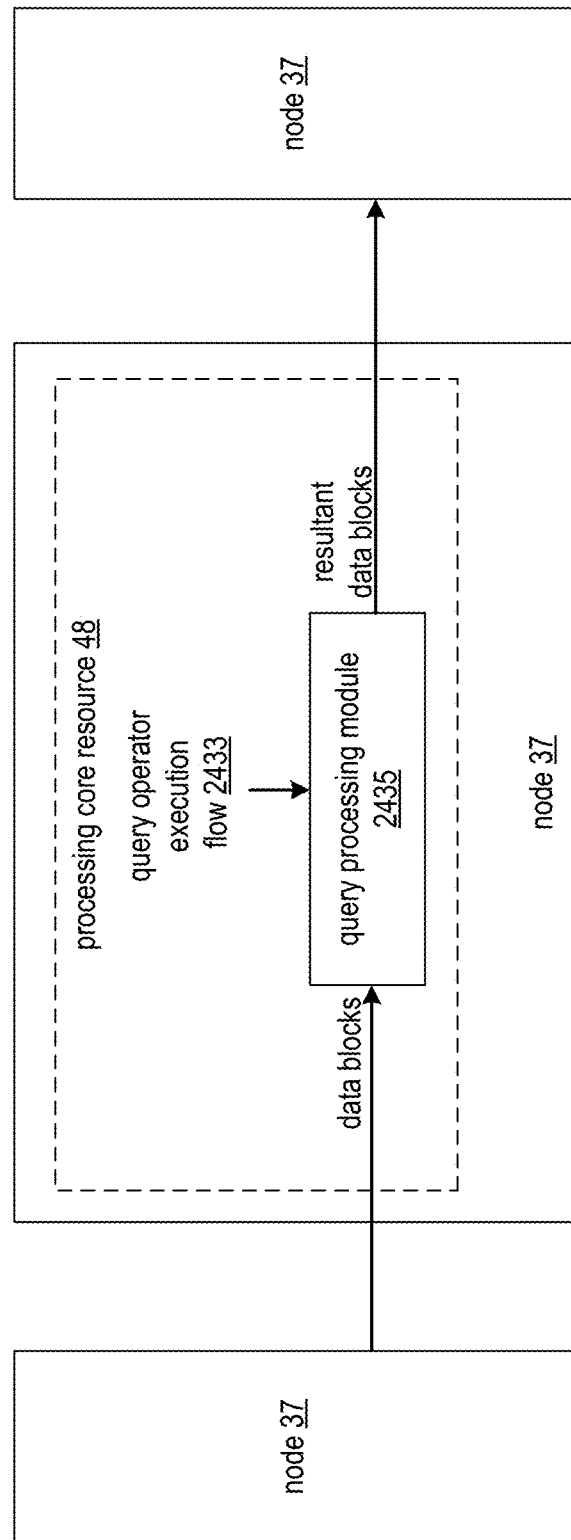
FIGS. 24B-24D are schematic block diagrams of embodiments of a node that implements a query processing module in accordance with various embodiments of the present invention.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-*n* via a corresponding one of the set of processing core resources 48-1-48-*n*. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 25A:
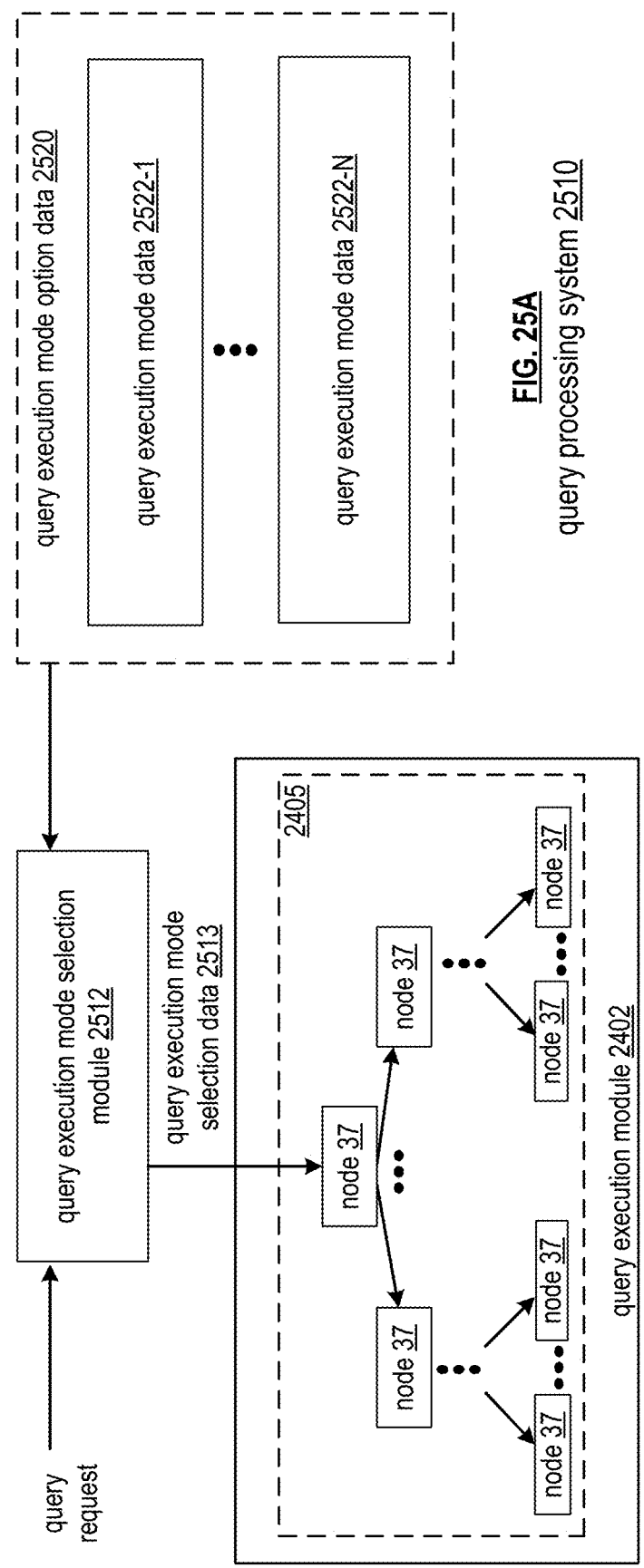
Figure 25C:
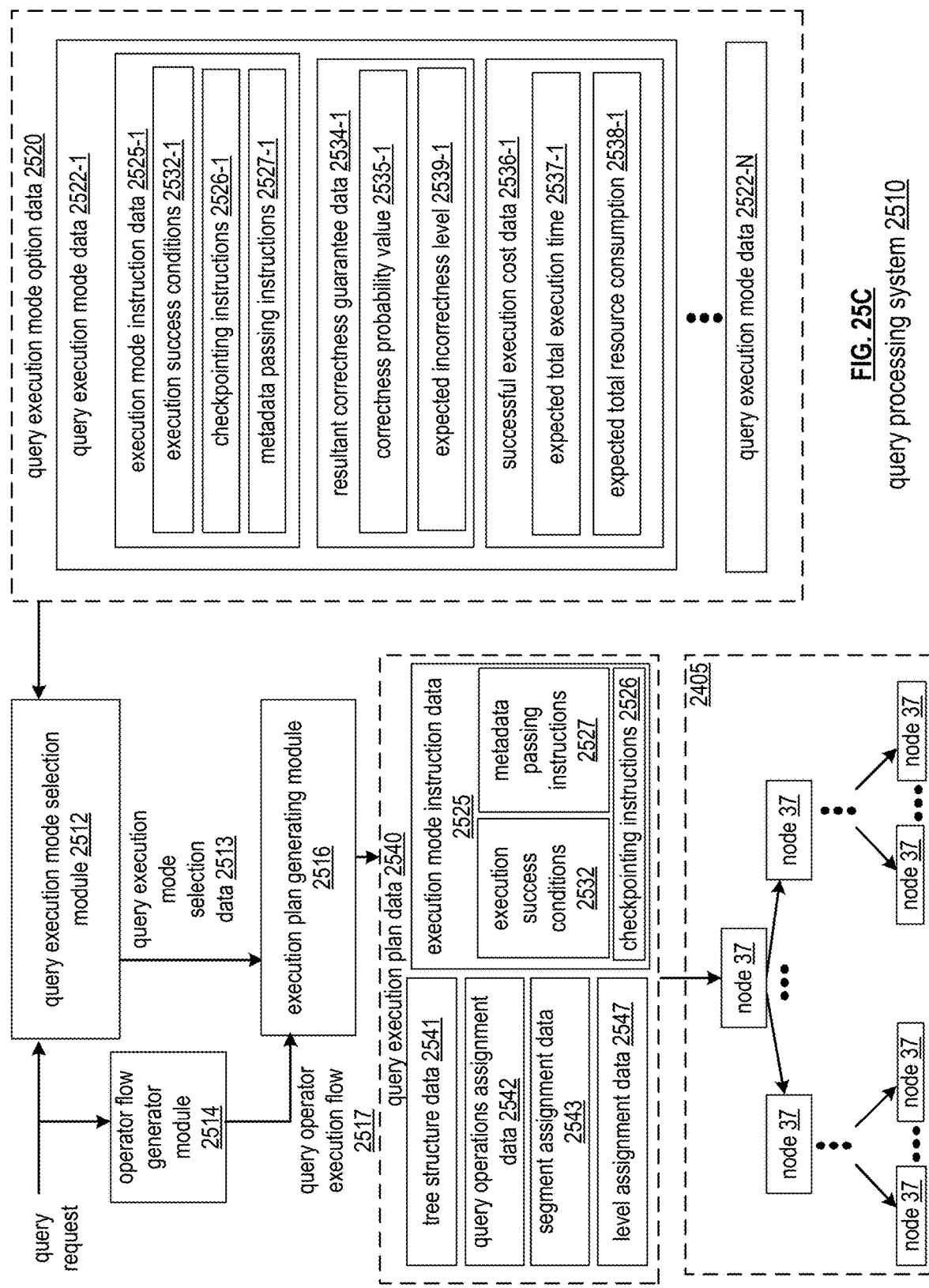

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-*n* of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted record data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
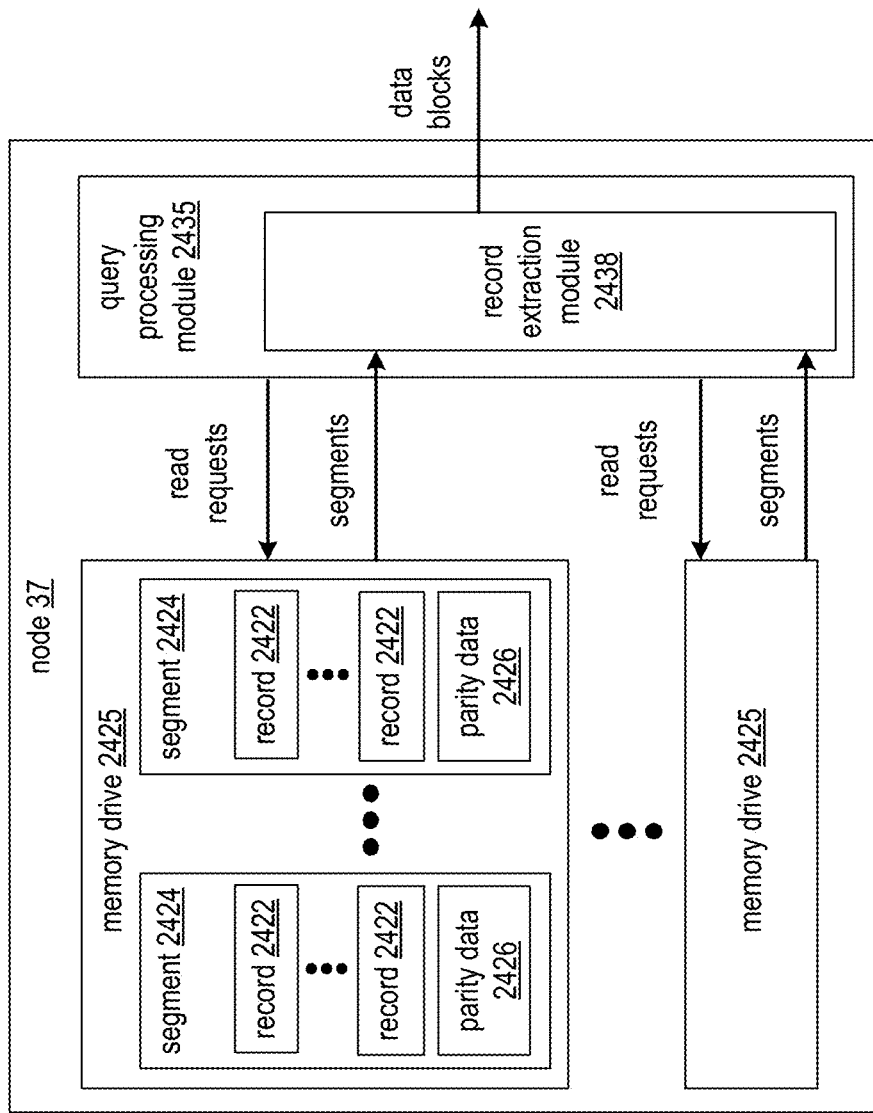
Figure 24D:
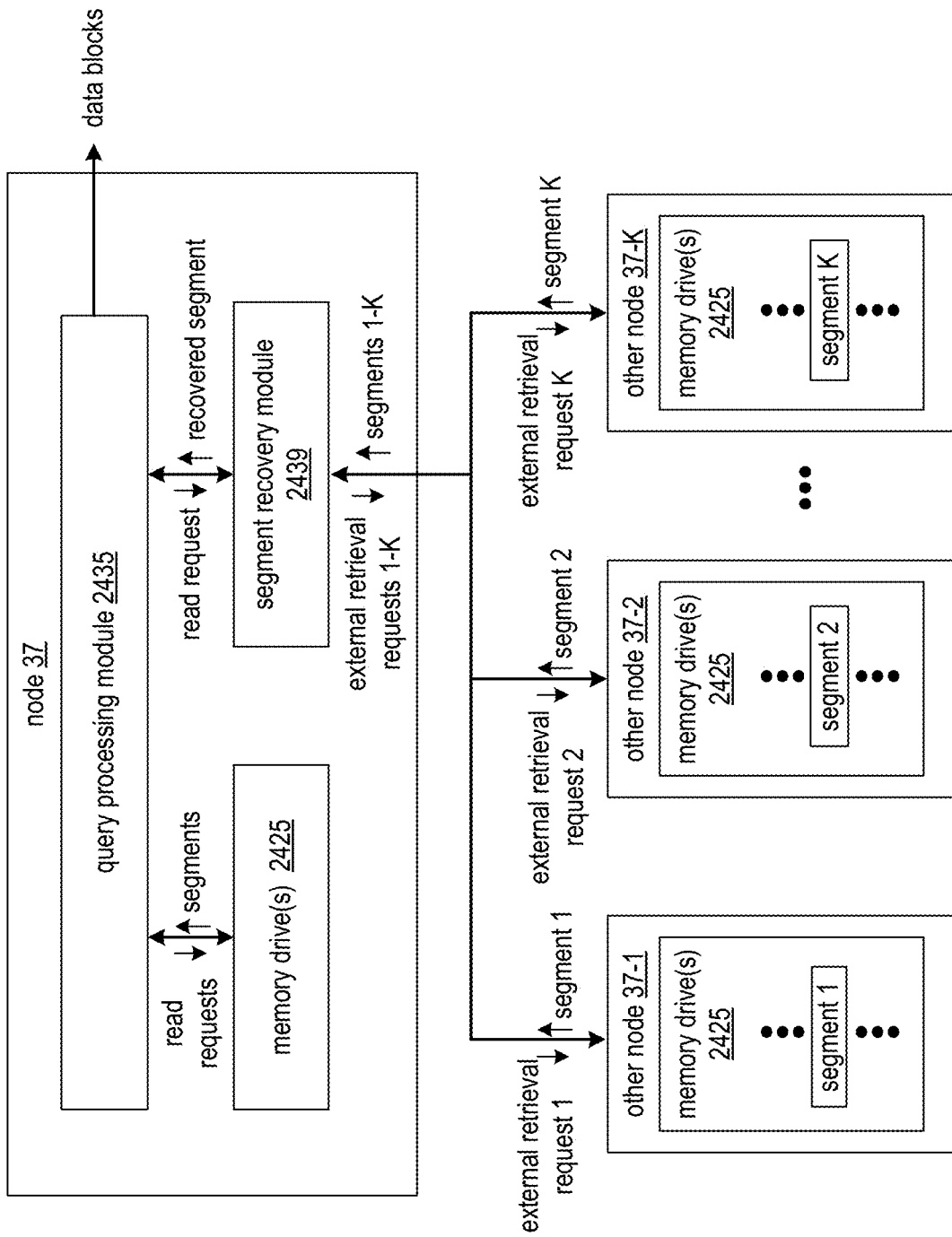

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
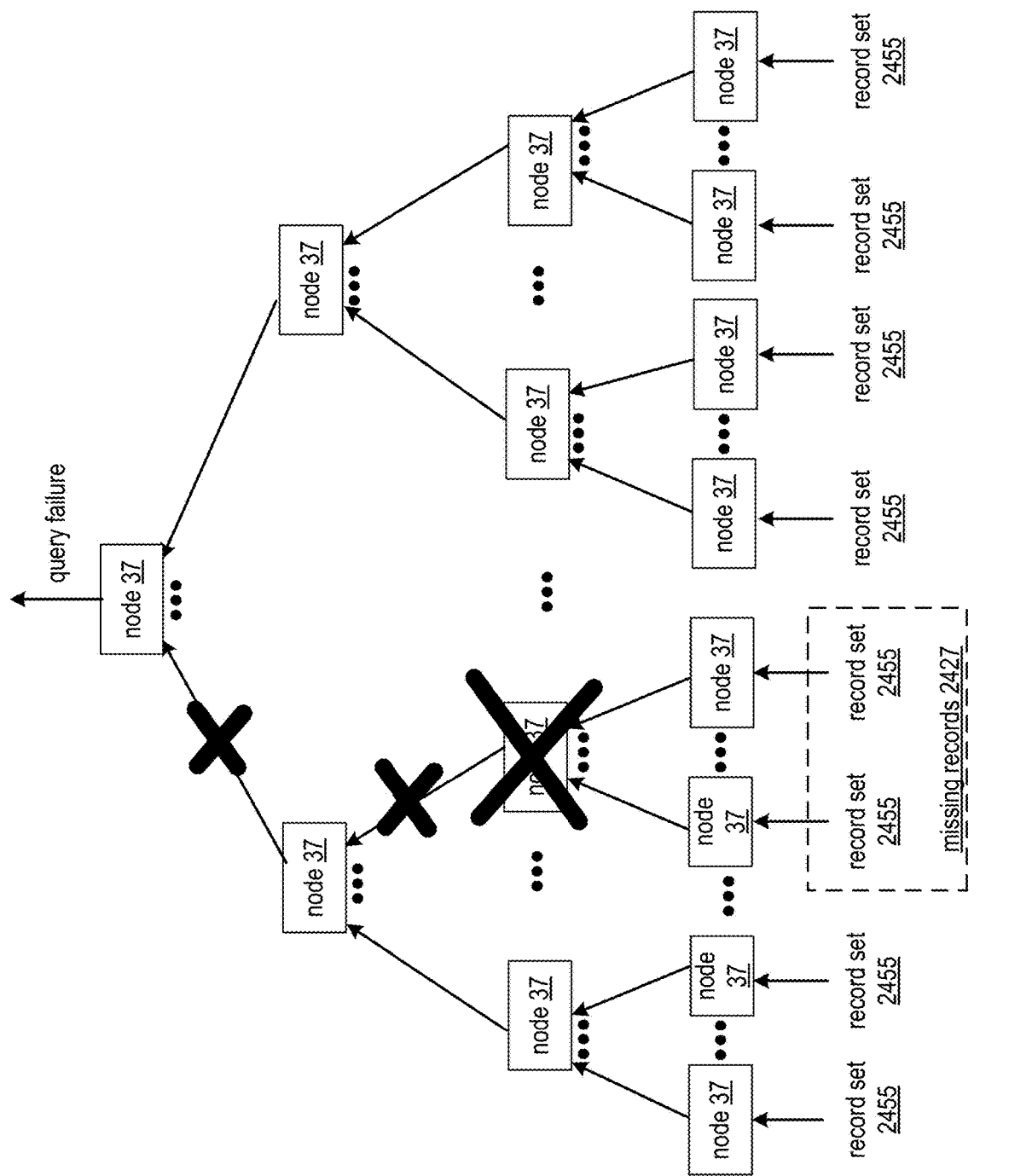
FIG. 24E is a schematic block diagram of an example embodiment of a query execution plan implemented via a plurality of nodes that encounters a node failure in accordance with various embodiments of the present invention.

FIG. 24E illustrates such example of a query execution plan 2405 where at least node 37 fails, does not produce the entire set of necessary data blocks, determines it did not receive all necessary data blocks from the previous node, cannot communicate with the next node 37, cannot receive communication with the previous node 37, and/or otherwise does not communicate all required output data blocks as necessitated by the query execution plan 2405. In this example, such a node is denoted by the 'X' in FIG. 24E. The 'X's in communication flowing upward via the tree structure of the query execution plan 2405 denote this failure was either communicated as a notification and/or denotes that the required set of data blocks were not able to be generated in the upward flow along these channels. In this case, the only resultant that can be generated by the root node cannot be guaranteed to be correct. In particular, a plurality of records, segregated into a set of distinct record sets 2455 that are assigned to be read by each of a set of distinct nodes 37 at the IO level 2416, were required to be processed by the query. However, multiple record sets 2455 in this example are not reflected in the final resultant, as some or all of the partial resultant data blocks were never sent by the failed node 37 denoted by the 'X'. These record sets 2455 can thus be designated as missing records 2427. Thus, the root node can either generate an incorrect final resultant from other full sets of data blocks received from other nodes, despite this set of missing records without all correct information and/or can discard these fully processed incoming data blocks and reinitiate execution of this query.

In this fashion, query success requires that the final resultant that was generated based on all required records being processed and/or all nodes 37 in the query execution plan 2405 participating correctly and completely, and thus is designed to guarantee query correctness. This model of query correctness is ideal in cases where generation of an accurate resultant is required, and/or where resources make re-execution of failed queries possible. However, at scale, query failure may be essentially unavoidable.

In particular, consider the case where a query execution plan requires a very large number of nodes due to being processed on a very large amount of records. Furthermore, this very large amount of data may require a lengthy amount of time to be processed via the query execution plan 2405. For example, if the database system is operable to store and/or perform query executions upon exabytes of data, the number of required nodes and/or corresponding time to execute queries will be substantially large. The mechanism of query execution described thus far requires that exactly one node be responsible for each portion of a query execution, and thus all of these nodes must be fully operational and/or be communicating with the system correctly for the entirety of the time span beginning with receiving the first data block from another lower-level nodes and/or retrieving records from memory drives, and ending with sending its last data block to the next node. Even if the probability of a node failure of an individual node is very small, the probability that no nodes of a query execution plan fail for the entirety of their given processing of the query diminishes as the number of nodes in the query execution plan increases and further diminishes as the length of time required for each node's processing of the query increases.

To illustrate this concept, consider a simple, illustrative example case where probability of node outage of a single node in a given unit of time is $10^{-6}$, where each node is expected to take this unit of time to execute its portion of the query in a query execution plan, and where the query execution plan includes a billion nodes. The probability of query success, given that there aren't other factors that would induce other types of failure of the query, is equal to the probability that every node 37 does not fail, as this model of query execution requires that every node 37 operates successfully. The probability of a single node operating successfully during its query execution in this case is equal to $1-10^{-6}=0.999999$. The probability of every node operating successfully during their respective query execution, assuming the nodes operate independently and/or have independent probabilities of failure, is equal to $(0.999999)^{10^{\wedge}9}$, which is approximately equal to zero. Thus, the query is expected to fail with probability of substantially 1, which means that not only will the query be required to be re-executed, it will likely be required to be re-executed over and over again with no success. It would be futile in this case to re-execute this query while requiring complete query correctness. This simple example serves to demonstrate that an alternative solution is required to handle queries at scale.

FIGS. 25A-25L illustrate embodiments of a query processing system 2510 of a database system 10 that implements a query execution mode selection module 2512 to facilitate execution of different queries under different execution modes. In particular, different execution modes can facilitate different levels of guaranteed query correctness, where some modes do not necessarily guarantee that a query is completely correct and thus does not require successful operation of every node in the query execution plan 2405. This improves database systems by enabling query correctness to be guaranteed to different levels on a query-to-query basis, ensuring that types of queries that require and can be reasonably executed in accordance with perfect and/or high levels of correctness can be executed in accordance with perfect and/or high levels of correctness, while also ensuring that queries that will likely not be possible to execute at high levels of correctness due to scale of the system and/or number of records being read are executed in accordance with lower levels of correctness to ensure that a resultant can be generated within a reasonable amount of time and/or by utilizing a reasonable amount of resources.

The query processing system 2510 can be utilized to implement, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14. Some or all features of the embodiments discussed in FIGS. 25A-25L can be utilized to implement any embodiment of the query processing system 2510 discussed herein.

At scale, it may not always be ideal to guarantee query correctness. In particular, as a result of the number of nodes participating in a query at scale and/or the amount of time required to process a query at scale, failure of a node mid-query may be probable at scale. A particular mode from a set of query modes can be selected for a given query based on factors such as operators in the query operator execution flow; a user-defined or otherwise determined confidence interval for correctness of the query; a user-defined or otherwise determined time frame in which a resultant should be generated; number or nodes required; probability of node failure; and/or other factors that dictate probability of query failure and/or importance of query correctness. Different queries can be run in accordance with different selected modes based on different factors. For example, queries that must have a correct result and/or that do not have a strict time frame for completion can be executed in accordance with a fixed query plan of fixed data ownership and/or fixed computing clusters of nodes to guarantee correctness, where the query may need to be rerun many times to achieve a result due to node failure in the first set of iterations of execution. Other queries that do not require perfect results can be run under a different mode, for example, where the query plan is dynamic and nodes are reassigned mid-query, and/or where a result is generated even if a node is determined to have failed mid-query.

Some requirements may be set by the database system based on the number of nodes and corresponding failure probability, for example, to prevent use of a particular mode. For example a mode requiring query correctness may be forbidden when the query is expected to fail at least a threshold number or times and/or where the expected number of times the query is expected to be required to run until an iteration with no failure is achieved exceeds a threshold. In some cases, if query correctness is still required, the level of coordination, checkpointing and/or metadata passing can be increased to guarantee query correctness, for example, up to a threshold amount of memory utilization and/or communication latency.

In some cases, if query correctness is required, the query can be performed via distinct and/or overlapping sets of nodes via multiple query plans to reach consensus if such a mode is determined to be more cost effective than other modes of query correctness. In some cases, multiple of the same or different, "looser" modes that don't guarantee correctness but are cost effective can be applied via multiple executions of the query via multiple query plans, where consensus can be determined if the resultants match or are sufficiently similar. This may be determined to be more cost efficient than a single implementation of a mode of execution that guarantees query correctness.

As illustrated in FIG. 25A, for a given query request, the query execution mode selection module 2512 generates query execution mode selection data 2513 indicating a selected one of a set of execution mode options. Information enumerating and/or detailing each of the set of execution mode options can be indicated in query execution mode option data 2520, which can include a plurality of query execution mode data 2522-1-2522-N. Note that while the query execution mode option data 2520 is indicated as a discrete set of N options in FIG. 25A, in some embodiments, at least one of these N options is further configurable and/or includes a set of parameters dictating a plurality of sub-options that can be further selected by the query execution mode selection module 2512. In some cases, one or more of these parameters is a continuous parameter that can be further selected by the query execution mode selection module 2512 enabling an infinite number of execution mode options.

The plurality of query execution mode data 2522-1-2522-N of the query execution mode option data 2520 can be: received by the query processing system 2510; stored locally by at least one memory of the query processing system 2510; accessible by the query processing system 2510; and/or can be otherwise determined by the query processing system 2510. In some cases, some or all of this query execution mode data can be configured via user input to an interactive interface displayed via a display device of a client device communicating with the database system via system communication resources 14 and/or external network(s), for example, in conjunction with the configuration sub-system 16.

The query execution mode selection module 2512 can select from this set of options based on the query itself as indicated by the query request, other instructions included within and/or indicated by the query request, and/or based on the operating parameters ad/or current state of the database system 10. For example, different execution modes can be selected based on the corresponding query, such as the required number of nodes to execute the query, the required amount of data to be accessed in the query, the required amount of time in which the query is to be executed, current load and/or limitations on nodes in the database system 10, a required level of correctness that is guaranteed based on the type of operators and/or data involved in the query, and/or other information regarding the requested query and/or the state of the database system.

In some cases, one query execution mode indicated in corresponding query execution mode data 2522 corresponds to the query execution mode discussed previously in conjunction with FIG. 25F, where the final resultant is guaranteed to be correct, and where the query is rep-executed if any nodes fail, if any nodes do not process and send all their required data blocks, and/or if any records are determined to be missing from being represented in the final resultant. Note that this mode corresponds to utilization of a query execution plan 2405 that is static, where node assignment does not change, regardless of failure, during the query execution. In some cases, some queries are selected to be executed under this guaranteed-correctness mode. However, other query execution mode data 2522 corresponds to other query execution modes that do not necessarily guarantee that the resultant is correct, for example, to be utilized in cases where scale prohibits the guaranteed-correctness mode to be capable of ever completing execution with non-zero probability as illustrated in the simple example of node failure at scale discussed previously.

The selected query execution mode indicated in the query execution mode selection data 2513 can be sent to a query execution module 2402 for execution, where the query execution module 2402 executes the query to generate a resultant in accordance with the selected query execution mode. The query execution module 2402 can be included within and/or can be separate from the query processing system 2510. The query execution module 2402 can be implemented as the parallelized query and/or response sub-system 13 and/or the parallelized data store, retrieve, and/or process subsystem 12.

In some embodiments, the query execution module 2402 can include and/or can otherwise be implemented by utilizing a plurality of nodes 37. The query execution module 2402 can execute a given query utilizing a set of nodes 37 of a query execution plan 2405, where the set of nodes 37 includes some or all of the plurality of nodes 37 utilized to implement the query execution module 2402. In such embodiments, the selected query execution mode indicated in the query execution mode selection data 2513 can be relayed to the set of nodes 37 of the query execution plan 2405 designated for execution of the corresponding query indicated in the given query request. In particular, instructions regarding execution of the query in accordance with the selected query execution mode can be sent to the nodes 37 of the query execution plan 2405 in conjunction with operator execution flow information assigned to nodes 37 for their execution of the query, tree structure information indicating which nodes 37 are assigned for receipt and/or sending of data blocks to assigned other nodes 37, and/or other information communicated to the other nodes 37 that is utilized by the nodes 37 of the query execution plan 2405 to determine and execute their assigned portions of the query and to further determine the next node to which their outputted data blocks are to be sent.

These instructions regarding execution of the query in accordance with the selected query execution mode can be sent in the downward fashion of the tree structure. For example, the query processing system 2510 communicates with the root node 37 at root level 2412 of the query execution plan 2405 for the query and send the instructions for execution of the query in accordance with the selected query execution mode to this root node 37, where the root node 37 determines its children nodes as assigned in the query execution plan 2405 indicated in the received instructions, and propagates these instructions down to its children nodes 37. All children nodes 37 can determine their own children nodes and further propagate the instructions down in this fashion to facilitate the downward flow of the instructions for execution of the query in accordance with the selected query execution mode, where all nodes 37 eventually receive these instructions and thus facilitate execution of the query in accordance with the selected query execution mode. In some embodiments, the query processing system 2510 is implemented by the root node 37 at root level 2412 of the query execution plan 2405, for example, where the root node 37 is fixed for all query execution plans 2405. In these cases, root level node 37 itself selects and communicates the query execution mode under which the query is to be executed via the corresponding query execution plan 2405.

Alternatively or in addition, in some embodiments, one or more individual nodes 37 can implement the query execution module selection module 2512 of FIG. 25A themselves to automatically select the execution mode under which a corresponding query should be executed by the individual node, for example, in accordance with a query execution plan 2405 determined by the individual node 37. For example, each node 37 can independently perform a deterministic function based on the query and/or can otherwise independently implement the query execution module selection module 2512 in a same fashion such that all nodes in the query execution plan 2405 independently determine which of the plurality of modes is selected for execution of a given query determined by each node 37 and/or which of a plurality of corresponding parameters are selected for the selected one of the plurality of modes, and/or where all nodes in the query execution plan 2405 independently select the same one or the plurality of modes for execution of a given query under the same selected corresponding parameters.

FIG. 25B illustrates another embodiment of a query processing system 2510. Some or all features of the query processing system 2510 of FIG. 25B can be utilized to implement the query processing system 2510 of FIG. 25A and/or any other embodiments of the query processing system 2510 discussed herein. In particular, a plurality of query requests 1-M can be determined by the query processing system 2510, for example, corresponding to a plurality of queries to be executed by the database system 10 in sequence and/or concurrently. Query execution mode selection data 2513 can be generated for each of the query requests 1-M, for example, where at least two of the queries of query requests 1-M are selected to be executed in accordance with different execution modes the set of query execution mode options of the query execution mode option data 2520 and/or under the same query execution mode via different selected parameters of this query execution mode.

Each query can be executed via a corresponding query execution plan 2405 of a set of query execution plans 2405-1-2405-M, which can include the same or different set of nodes 37 in the same or different tree structure. Instructions for the selected query execution mode for each query can be communicated to some or all of the nodes 37 in the corresponding one of the plurality of query execution plans 2405-1-2405-M. Each of the plurality of query execution plans 2405-1-2405-M executes the query of the corresponding query request 1-M in accordance with the selected query execution mode indicated in the corresponding one of the plurality of query execution mode selection data 2413-1-2413-M, for example, based on receiving instructions regarding the selected query execution mode and/or otherwise determining the selected query execution mode.

In some cases, at least one same node 37 can be included in multiple ones of the M query execution plans 2405, where such nodes 37 facilitate execution of corresponding multiple queries of the set of query requests 1-M concurrently and/or separately in sequence. For example, two or more of the set of query execution plans can include an identical tree structure of an identical set of nodes. As another example, two or more of the set of query execution plans can otherwise include overlapping nodes 37 assigned to the same or different level of their respective query execution plans 2405. A particular node 37 included in multiple ones of the M query execution plans 2405 corresponding to execution of multiple queries via different query execution modes of the set of query execution mode options can concurrently execute multiple queries via different query execution modes, in accordance with its assigned query operator execution flow for each query and/or its assigned set of segments for retrieval/recovery for each query and in accordance with the query execution mode information for each query.

FIG. 25C illustrates another embodiment of a query processing system 2510. Some or all features of the query processing system 2510 of FIG. 25B can be utilized to implement the query processing system 2510 of FIG. 25A and/or any other embodiments of the query processing system 2510 discussed herein. As illustrated in FIG. 25C, an operator flow generator module 2514 of the query processing system 2510 can be utilized to generate a query operator execution flow 2517, which can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

The query execution mode selection data 2513 can be utilized by a query execution plan generating module 2516 in conjunction with the query operator execution flow 2517 to generate query execution plan data 2540. For example, different query execution modes may dictate that different types of tree structures, different types of node assignments, and/or different sets of nodes 37 be utilized, and the query execution plan 2405 for a given query can thus be further determined based on which particular query execution mode is being implemented to execute the query. As a particular example, some query execution plans can involve dynamic reassignment of nodes mid-query as discussed in further detail herein, and the query execution plan 2405 can be generated to implement node's capability of this dynamic reassignment, in contrast with the static assignment of nodes per query of the query execution plan 2405 discussed previously in conjunction with FIGS. 24A-24E that is utilized to implement the guaranteed-correctness mode. The query execution plan data 2540 that is generated can be communicated to nodes 37 in the corresponding query execution plan 2405, for example, in the downward fashion in conjunction with determining the corresponding tree structure and/or in conjunction with the node assignment to the corresponding tree structure for execution of the query as discussed previously.

The query execution plan data 2540 can indicate tree structure data 2541, for example, indicating child nodes and/or parent nodes of each node 37, indicating which nodes each node 37 is responsible for communicating data block and/or other metadata with in conjunction with the query execution plan 2405, and/or indicating the set of nodes included in the query execution plan 2405 and/or their assigned placement in the query execution plan 2405 with respect to the tree structure. The query execution plan can alternatively or additionally indicate query operations assignment data, for example, indicating the query operator execution flow 2542, further indicating how the query operator execution flow 2542 is to be subdivided into different levels of the query execution plan 2405, and/or assigning particular query operator execution flows 2433 to some or all nodes 37 in the query execution plan 2405 based on the overall query operator execution flow 2542. The query execution plan data 2540 can alternatively or additionally indicate segment assignment data 2543 indicating a set of segments and/or records required for the query and/or indicating which nodes at the IO level 2416 of the query execution plan 2405 are responsible for accessing which distinct subset of segments and/or records of the required set of segments and/or records. The query execution plan data 2540 can alternatively or additionally indicate level assignment data 2547 indicating which one or more levels each node 37 is assigned to in the query execution plan 2405. Nodes 37 can thus determine their assigned participation, placement, and/or role in the query execution plan accordingly based on the tree structure data 2541, query operator execution flow 2542, segment assignment data 2543, and/or indicate level assignment data 2547 based on receiving and/or otherwise determining the corresponding query execution plan data 2540.

The query execution plan data 2540 can indicate execution mode instruction data 2525, which can include execution success condition 2532, metadata passing instructions 2527, and/or checkpointing instructions 2526. Some or all of the execution mode instruction data 2525 can reflect and/or can be determined based on the corresponding execution mode instruction data 2525 indicated by the query execution mode data 2522 of the selected query execution mode. Some or all of the execution mode instruction data 2525 can otherwise determine to facilitate execution of the query in accordance with the selected query execution mode when implemented by nodes in the query execution plan 2405 in accordance with their execution of the query. Nodes 37 can process and/or perform the instructions indicated by the execution mode instruction data 2525 via their own processing resources in accordance with their own execution of the query as assigned in the query execution plan data 2540 based on receiving the query execution plan data 2540 and/or based on otherwise determining they are included in the corresponding query execution plan 2405.

The query execution mode selection module 2512 can select the query execution mode to be utilized for execution of a given query based on evaluation and/or comparison of some or all of the information included in query execution mode data 2522. In particular, the query execution mode data 2522 determined for some or all of the plurality of query execution mode options can include execution mode instruction data 2525, resultant correctness guarantee data 2534, and/or successful execution cost data 2536.

The execution mode instruction data 2525 can indicate instructions, for example, to be communicated to nodes 37 of the corresponding query execution plan 2405 in accordance with execution of the query, where some or all nodes 37 process and/or execute these instructions in conjunction with their execution of the given query. The execution mode instruction data 2525 can include an execution success condition 2532. The execution success condition 2532 can indicate a condition that is required to be met for execution of the corresponding query to be deemed successful, where the query is deemed unsuccessful when this condition is determined to not be met. For example, the final resultant is only returned when the query execution is deemed successful and/or where the query is re-executed when the query execution is deemed unsuccessful.

The execution success condition 2532 can correspond to any condition that can be detected, checked, and/or tested by the root node 37 to determining whether it can and/or did generate a successful final resultant and/or to determine whether to initiate re-execution of the query. The execution success condition 2532 can alternatively or additionally be detected, checked, and/or tested by one or more other nodes 37 in the query execution plan to determine whether or not the query's execution is successful. In some cases, a query execution mode 2522 does not include an execution success condition 2532, for example, where queries operating under this mode will be attempted exactly once, and the resultant that is generated is accepted as it stands.

The execution success condition 2532 can alternatively or additionally indicate a success condition for each particular node's own execution of a given query, which can enable individual nodes to independently determine whether or not their own execution of the query was successful as dictated by the execution success condition 2532 of the selected mode of query execution. For example, a node 37 can communicate success metadata in conjunction with transmission of and/or after transmission of data blocks to a parent node and/or other next node dictated in the query execution plan 2405, where this success metadata indicates whether the node 37 itself had a successful or unsuccessful execution. This metadata can be transferred up the query execution tree, for example, where the root node has success metadata indicating whether each node had a successful execution and/or indicating whether each of a subset of nodes that were capable of transmitting this information successfully had a successful execution. Note that a node's own failed execution of a query may not necessarily deem the execution of the query as a whole as failed, based on the looseness of query correctness enabled by the corresponding query execution mode. For example, in some cases, the execution success condition 2532 of the query as a whole is a function of a number and/or percentage of successes of individual nodes 37.

In the guaranteed-correctness mode of operation described in conjunction with FIG. 24E, the execution success condition 2532 can indicate that success is only achieved when all required data blocks are received by the root node and processed by the root node; can indicate that success is only achieved when no node 37 in the query execution plan 2405 fails; and/or can indicate that success is only achieved when all required records are represented in the final resultant. Similarly, the guaranteed-correctness mode of operation can dictate that a particular node's own execution is successful if it received all necessary data blocks, processed all these necessary data blocks into outputted data blocks, and directed all of these outputted data blocks in a transmission to the next node 37 in the query execution plan 2405.

However, other modes of query execution can have looser requirements for success. For example, a particular query execution mode can have an execution success condition 2532 indicating success when at least a particular number and/or percentage of nodes 37 of the query execution plan 2405 were successful in their own execution of the query. Another mode of query execution can have an execution success condition 2532 indicating success when at least 90% of nodes 37 in the query execution plan 2405 were successful in their execution of the query, for example, where successful execution by a node corresponds to generation and sending of all output data blocks from all required input data blocks as discussed previously. Multiple other modes of query execution in the set of query execution mode options data 2520 can be configured in such a fashion, for example, where different ones of these modes have different threshold percentages of required nodes to be successful and/or where the percentage of nodes required to be successful is a parameter that can be selected from a discrete or continuous set of options by the query execution mode selection module 2512 in generating the query execution mode selection data 2413.

Looking to percentage of successful nodes alone may not be ideal if the query execution plan 2405 is in accordance with a tree structure as illustrated in FIG. 24A. In particular, failure of nodes at higher levels of the query execution plan 2405 can have a greater effect on the final resultant than failure of nodes at lower levels, such as the IO level. The query execution mode option data 2520 can therefore alternatively or additionally include one or more query execution mode options with execution success condition 2532 indicating success when no more than a particular number and/or percentage of records are determined to be missing from representation the final resultant. For example, this can be based on a percentage of records included in the missing records 2427 of FIG. 25F, where missing records 2427 is determined based on the record sets assigned to all IO nodes that are descendants of a failed node 37 in the query execution plan 2405 as illustrated in FIG. 25F. Thus, for a given query, the missing records 2427 can be determined by determining the set of IO level descendants of the set of nodes 37 determined to have failed or determined to otherwise have not sent all required set of data blocks to their assigned parent node. The percentage of missing records can then be calculated based on the number of records and/or number of segments in records sets 2455 determined to be included in the missing records 2427, and further based on the total number of records and/or number of segments assigned for retrieval in the plurality of record sets 2455 for the plurality of nodes 37 at the IO level 2416, and/or otherwise based on the query domain of the query.

As another particular example, a mode of query execution can have an execution success condition 2532 indicating success when no more than 5% of IO level nodes are descendants of nodes 37 that failed. Multiple other modes of query execution in the set of query execution mode options data 2520 can be configured in such a fashion, for example, where different ones of these modes have different threshold percentages of IO level nodes that can be descendants from nodes determined to have failed. Such percentages of IO nodes required to be successful is a parameter that can be selected from a discrete or continuous set of options by the query execution mode selection module 2512 in generating the query execution mode selection data 2413.

In some cases, different IO level nodes are responsible for retrieval of different numbers of records. If there is enough variation in numbers of records retrieved by IO level nodes, it can be more ideal to dictate a required percentage of segments and/or records that must be represented in the final resultant and thus mustn't be included in the missing records 2427. As a particular example, a mode of query execution can have an execution success condition 2532 indicating success when no more than 5% of records 2422 and/or segments 2424 that are assigned to nodes 37 of the IO level are determined to be included in missing records 2427. Multiple other modes of query execution in the set of query execution mode options data 2520 can be configured in such a fashion, for example, where different ones of these modes have different threshold percentages of records and/or segments that can be included in missing records 2427. Such percentages of IO nodes required to be successful is a parameter that can be selected from a discrete or continuous set of options by the query execution mode selection module 2512 in generating the query execution mode selection data 2413.

The execution mode instruction data 2525 can include checkpointing instructions 2526 indicating instructions for checkpointing measures to be made by nodes 37 in accordance with the corresponding query execution mode. This can include instructions regarding saving of checkpoint data and/or transfer of checkpoint data to another node. For example, the checkpoint data that is saved and/or transferred can include data blocks that are received by a node for processing, a current state of a node's query operator execution flow, intermediate and/or final data blocks that are generated by a node 37, and/or data blocks that were already sent by a node 37. The checkpointing instructions 2526 can include further instructions regarding the rate at which such checkpoints be made and/or detected conditions in which such checkpoints be made.

As an example of checkpointing measures that would be implemented in accordance with checkpointing instructions 2526, if a node 37 fails or becomes unavailable for communication during its execution of a query, checkpoint data such as that was sent to a different node 37 can be utilized to resume the node 37's progress. In these cases, query correctness may not be guaranteed due to lack of tracking of the failed node's output data blocks that may have already been sent after the checkpoint, and thus data blocks may be duplicated—however, in modes where perfect query correctness is not guaranteed, such measures can be ideal in improving the level of correctness of the final resultant.

As another example, if the parent node 37 is determined to be unavailable or to become unavailable while one or more child nodes are sending data blocks, if the one or more child nodes saved their data blocks that were already transmitted as checkpoint data, these data blocks can be retransmitted to a new parent node that can replace the failed parent node and process the data blocks accordingly. Again, query correctness may not be guaranteed due the failed parent node possibly already generating its own outputted nodes that another node has received and processed, where some output data blocks by the new parent node will thus be duplicates. This potential untracked duplication may still be acceptable in modes where perfect query correctness is not guaranteed, and such measures can be ideal in improving the level of correctness of the final resultant.

The execution mode instruction data 2525 can include metadata passing instructions, which can indicate when and/or how frequently the checkpoint data is to be passed to other nodes and/or can indicate measures for transfer of other metadata. This metadata can include: execution state data indicating a state of execution of the query; node health data such as flags indicating deterioration of the node; node outage scheduling data indicating when a node is scheduled for an outage, performance measurement data such as communication latency measured in communications received and/or transmitted with other nodes 37 and/or processing latency measured in generating its own data blocks; node success data indicating whether the node detected its own failure and/or whether the node was determined to meet its own execution success condition in query execution; other node failure detection data indicating that the node detected failure of other nodes with which it was communicating based on not receiving and/or not being able to communicate with another node as designated in the query execution plan; and/or other information. The metadata passing instructions can dictate when, how, and/or under which conditions such metadata is to be collected and/or sent to one or more other nodes 37. The metadata passing instructions can dictate which other nodes such metadata is to be sent and/or can dictate a flow of the passing of metadata. For example, the metadata can flow up the tree structure of the query execution plan 2405 in accordance with the sending of data blocks. Alternatively some metadata can be communicated with other nodes that are not communicated with in normal operation of query execution plan 2405, for example, to communicate detection that another node has failed and/or is likely to fail and/or to communicate that the query has failed and that other nodes should halt their futile processing of the failed query.

Note that higher rates of checkpointing and/or metadata passing, and/or greater amounts of information saved and/or transferred via checkpointing and/or metadata passing, can result in slower query execution and/or greater consumption of memory resources and/or communication channels. However, in some cases, this increased execution time and/or consumption of resources may be ideal in cases where checkpointing and/or metadata passing increases probability of query success and/or dictates a query only need to be executed once.

In particular, increased execution time and/or consumption of resources per query execution attempt due to the checkpointing and/or metadata passing mechanisms can yield a lower number of required query executions until query success than execution of the query via the checkpointing and/or metadata passing. Thus, the total execution time and/or total consumption of resources to achieve a successful execution query via the fewer number of executions achieved via the checkpointing and/or metadata passing can still be lower than the total execution time and/or total consumption of resources of the greater number of execution attempts required in the case where no checkpointing and/or metadata passing is utilized.

As another example of the potential benefit of utilizing modes with checkpointing and/or metadata passing, increased execution time and/or consumption of resources of a query execution due to the checkpointing and/or metadata passing mechanisms can yield a greater level of query correctness than if the query were executed where no checkpointing and/or metadata passing is utilized. In some cases, this increased level of query correctness is high enough to render such a query execution as successful, where the lower level of query where no checkpointing and/or metadata passing is utilized requires the query be re-executed, and/or is otherwise less favorable as the final resultant is less accurate and/or has a lower level of confidence.

The resultant correctness guarantee data of the query execution mode data 2522 can include a correctness probability value 2535 and/or expected incorrectness level 2539. For example, different modes of operation can have different levels of confidence that is guaranteed or expected in the final resultant that is outputted in accordance with a successful execution of the query. The correctness probability value 2535 can indicate a probability that the resultant generated via an execution of the query that meets the execution success condition will be entirely correct. As used herein, a "correct" resultant corresponds to a resultant that is produced via execution of a query by the database system that is equivalent to the true resultant, where the true resultant corresponds to the resultant that should be produced under perfect conditions, for example, where the true resultant is produced given that all records are accessed and processed correctly, given that no nodes fail to execute properly, and/or given that the query operator execution flow is applied properly across the query execution plan. A true resultant requires that all required records be accessed and processed exactly one time, where no records are missing or duplicated in processing. For example, if the correctness probability value 2535 indicates a probability of 0.7, the resultant is expected to be entirely correct, where all required records are represented exactly once and processed appropriately to generate the resultant, 70% of the time. Thus, at least one record is expected to be not represented, is duplicated, and/or processed incorrectly 30% of the time. This percentage does not reflect the level of inaccuracy that is expected occur this 30% of the time. However, for some applications, the resultant must be trusted to be accurate to be rendered useful, and any incorrect resultant is considered unacceptable. For example, some end users and/or applications may require resultants to query expressions requesting records with a maximum and/or minimum value must be exact and/or query expressions requiring an exact count of records and/or an exact set of records meeting particular criteria. Such end users and/or applications therefore may only care to receive final resultants if the final resultant is guaranteed to be correct with sufficiently high probability. Thus, a binary determination of whether or not the query resultant is expected to be correct can be sufficient in such cases, where an incorrect resultant is considered unacceptable regardless of whether 0.01% of records were missing and/or duplicated or whether 99% of records were missing and/or duplicated.

However, in other cases, the level to which an incorrect resultant has missing and/or duplicated data can also be useful, for example, where an incorrect resultant is acceptable if no more than 1%, or another threshold percentage, of records are expected to be missing and/or duplicated. The expected incorrectness level 2539 of the resultant correctness guarantee data 2534 can provide more detailed information regarding the level of incorrectness expected in cases where the query resultant is incorrect and/or the level of incorrectness over all resultants, including correct resultants. For example, cases where the query resultant is expected to deviate from the true resultant by a small amount and/or have only a small number of records duplicated and/or missing can be acceptable in some cases. However, inaccurate query resultants tend to greatly deviate from the true resultant by a large amount and/or have a large number of records duplicated and/or missing can be unacceptable.

The expected incorrectness level 2539 can be utilized to further distinguish different modes of query execution by their expected levels of incorrectness, such as their expected levels of deviation from the true resultant. For example, the value indicated by expected incorrectness level 2539 can indicate an amount of data, such as a percentage of required records, that are not utilized exactly once as is required in generating the true resultant. In some cases, the value indicated by expected incorrectness level 2539 and can thus represent the expected percentage of required records that are either missing or duplicated at least once in producing the final resultant for the query.

The expected incorrectness level 2539 of the resultant correctness guarantee data 2534 of some or all query execution mode data 2522 can indicate and/or can be generated based on an expected and/or mean percentage of nodes that experience failure and/or outages during the query's execution. The expected incorrectness level 2539 can alternatively or additionally indicate and/or can be generated based on an expected and/or average percentage of required records that will be included in missing records 2427 in execution of the query. This can be based on a known and/or expected node failure and/or outage rate, and can be further based on a known and/or expected tree structure of the query execution plan. In particular, as discussed previously in conjunction with FIG. 24E, the missing records 2427 can determined based on a number of nodes that failed and their respective level assignment in the query execution plan, where nodes at higher levels induce greater numbers of missing records 2427. For example, the expected percentage of records in missing records 2427 indicated by expected incorrectness level 2539 can be calculated as a function of node failure rate and/or probability of an individual node's failure during a query execution, and can further be calculated based on the tree structure of the query distribution plan, such as a number of nodes at each of the H levels, to account for the disparity in impact of node failures at each of the H levels in calculating the expected percentage of records in missing records 2427.

The expected incorrectness level 2539 can otherwise indicate an expected value, for example, that is computed as a mean value and/or percentage level of inaccuracy of the resultant, which can correspond to a mean number and/or percentage of required records and/or segments that are either missing and/or duplicated in the resultant produced via query execution under the corresponding query execution mode. The expected incorrectness level 2539 can alternatively or additionally indicate a range of missing and/or records, such as a maximum and/or minimum number of missing and/or duplicated records that is expected and/or guaranteed. For example, the expected incorrectness level 2539 can indicate a confidence interval with respect to a corresponding distribution determined for the amount of missing and/or duplicated records dictated by a predefined and/or configured probability value that defines the confidence interval, such as a sufficiently high probability value. The expected incorrectness level 2539 can indicate a probability distribution function, a histogram generated from historical data collected over time, and/or projected distribution of failed nodes, missing records, and/or duplicated records under the corresponding query execution mode. The expected incorrectness level 2539 can otherwise indicate and/or be based on distribution data indicating the level of incorrectness of the resultant produced in query execution under the corresponding query execution mode.

This more detailed information indicated in expected incorrectness level 2539 can be useful in embodiments where different thresholds of the level of missing records 2427 and/or node outages render query resultants as acceptable or unacceptable. Note that in cases where the query success condition is dictated by a threshold maximum percentage of node outages and/or a threshold maximum percentage of missing and/or duplicated records as discussed previously, the expected incorrectness level can indicate that a successful execution of the corresponding will never exceed the threshold maximum percentage of node outages and/or will never exceed the maximum percentage of missing and/or duplicated records. The execution mode can still have a distribution of missing and/or duplicated records, and/or a probability of complete correctness, given that the execution is successful and meets these thresholds. For example, an execution mode requiring at least 0.9 probability of success and/or less than 10% of records missing and/or duplicated to be deemed successful can have this more detailed information regarding what level of incorrectness and/or probability of complete correctness is expected even when these threshold conditions are met, such as expected incorrectness level 2539 indicating that 2% of required records are likely to be missing and/or duplicated with a standard deviation of 0.5% of required records.

In some cases, the expected amount of missing records and expected amount of duplicated records are calculated and/or indicated separately in the expected incorrectness level 2539. For example, in some query expressions, duplications of records may not affect the resultant, may be filtered out via UNION DISTINCT operators, and/or may not hinder the end user from utilizing the end result. In such cases, missing records may be deemed more detrimental in incorrect resultants than duplicated records, or vice versa in other cases. Different queries can have different requirements regarding acceptable levels of records that are missing vs. duplicated. In some cases, only missing records, such as missing records 2427, are considered and utilized in generating expected incorrectness level 2539, where duplicated records are not considered.

In cases where the query mode does not have a query success condition and where the query will only be executed once, the correctness probability value 2535 and/or expected incorrectness level 2539 can be useful in determining whether the single execution of the query will be sufficient for the needs of a particular query request. Additionally, correctness probability value 2535 and/or expected incorrectness level 2539 that indicates the expected the level of correctness of the resultant in any single execution attempt can be utilized to determine: an expected number of execution attempts of and/or standard deviation of the number of execution attempts that will be required to generate a successful resultant meeting the corresponding execution success condition 2532 of the execution mode. This can dictate an expected amount of total execution time, a standard deviation of the total execution time, an expected total amount of resources consumption, and/or a standard deviation of the total resource consumption that will be required to generate a successful resultant meeting the corresponding execution success condition 2532 of the execution mode via the expected number of execution attempts.

This information can be indicated in the successful execution cost data 2536 of the query execution mode data 2522 as expected total execution time 2537 and expected total resource consumption 2538. Entire histograms and/or projected distributions regarding expected total execution time 2537 and expected total resource consumption 2538 can be generated accordingly, for example, based on the expected number of failed attempts before the query success condition is achieved. In some cases, when there is no query success condition and/or where the query execution mode will always be executed once, the expected total execution time 2537 and expected total resource consumption 2538 can indicate the expected total execution time 2537 and expected total resource consumption 2538 of a single execution attempt, for example, based on measured historical data and/or calculated predictions. This information regarding execution time and/or resource consumption a single attempt can be utilized to determine the expected total execution time 2537 and/or expected total resource consumption 2538 for one or more other execution modes with the same query execution instructions that each have a corresponding query success conditions that may dictate multiple attempts are required. For example, the expected total execution time 2537 can be determined based on multiplying the expected execution time of a single attempt with the expected number of executions to achieve success and/or the expected total resource consumption 2538 can be determined based on multiplying the expected resource consumption of a single attempt with the expected number of executions to achieve success.

In some cases, constraints on the total execution time and/or total resource consumption can be set by the end user, can be set by a system administrator, and/or can be automatically determined by the query processing system 2510 based on current system performance and/or current system utilization. This can be utilized to select and/or dictate that the execution success condition 2532 cannot be tighter than a success condition threshold to ensure that a query will not ever be expected to execute more than a threshold number of times, to ensure the expected total execution time 2537 will not exceed a threshold time, and/or to ensure the expected total resource consumption 2538 will not exceed a threshold consumption.

For example, these constraints can dictate that the maximum percentage of failed nodes and/or maximum percentage of missing records set as execution success conditions 2532 cannot fall below a threshold percentage. As a particular example, the constraints can dictate that the maximum percentage of missing records set as execution success conditions 2532 cannot fall below 0.1% based on lower percentages of missing records that fall below 0.1% being determined to induce: an expected number of execution attempts that exceeds the threshold number of times; an expected total execution time that exceeds the threshold time; and/or an expected total resource consumption that exceeds the threshold consumption. Note that the guaranteed-correctness mode described previously is not a viable option in this example because the maximum percentage of failed nodes and/or maximum percentage of missing records required as execution success conditions 2532 are each 0% for the guaranteed-correctness mode. However, any percentage that is at least 0.1% is a viable option in this example because it meets the requirements induced by the constraints.

In some cases, the execution success condition 2532 itself is a parameter that can be selected by the query execution mode selection module 2512. For example, to optimize resultant correctness within the given total execution attempts constraints, total execution time constraints, and/or total resources consumption constraints, the query execution mode selection module 2512 can automatically select the execution success condition 2532 as the tightest possible condition that meets the total execution attempts constraints, total execution time constraints, and/or total resources consumption constraints. In the particular example described above, the query execution mode selection module 2512 automatically selects 0.1% as the maximum percentage of missing records based on 0.1% being the tightest success condition to induce highest probability of resultant correctness and lowest expected incorrectness level while still adhering to the number of execution attempts constraints, execution time constraints, and/or resource consumption constraints.

Note that in cases where these constraints are automatically determined by the query processing system 2510 based on current system performance and/or current system utilization, at a later time where utilization and/or performance of the system becomes more favorable, the total execution attempts constraints, total execution time constraints, and/or total resources consumption constraints can automatically be reset accordingly to reflect looser constraints, such as greater respective threshold amounts, based on the more favorable state of utilization and/or performance of the system. For example, at this later time, the maximum percentage of missing records to be set as execution success condition 2532 that meets the new, looser constraints can be determined to be 0.05%. The query execution mode selection module 2512 automatically selects 0.05% as the maximum percentage of missing records for a query being executed at this later time induce even higher probabilities of resultant correctness and even lower expected incorrectness level while adhering to the loosened number of execution attempts constraints, loosened execution time constraints, and/or loosened resource consumption constraints.

In some cases, some or all of the query execution mode data 2522 is not a fixed value to be evaluated with regards to a particular query request, but is instead represented as a function of the query request and/or the current state of the database system, where some or all values discussed above are computed by the query execution mode selection module as a function of additional parameters dictated by the particular query request. In particular, the correctness probability value 2535, the expected incorrectness level 2539, expected total execution time 2537, and/or expected total resource consumption 2538 can be calculated as a function of the number of records required to be accessed to execute the query, the processing complexity of the query, and/or the number of nodes determined to be required for execution of the query in a corresponding query execution plan 2405.

The number of records required to be accessed to execute the query can be indicated by the query domain indicated by the query. For example, the number of records required to be accessed to execute the query can be based on the number of records stored by the database system 10 that are included in a table indicated by the query, for example, where table sizes are tracked by the database system 10. The processing complexity of the query expression can be based on a complexity of the query operator execution flow 2517 generated from the query expression and/or based on a number of and/or known complexity of the operators included in the query expression. The number of nodes required to execute the query can be determined based on determining a number IO level nodes that currently storing the set of records determined to be required for the query and/or the number of IO nodes required to access the required set of records. A number of additional nodes required to process the query as inner level nodes can be determined based on the shape of the tree structure and the determined number of IO nodes. A number of additional nodes required to process the query as inner level nodes can be alternatively or additionally determined based on a number of nodes determined to be required to handle the processing complexity of the query expression.

The correctness probability value 2535 for some or all execution modes can be calculated as a function of the determined required number of records, the determined processing complexity and/or the determined required number of nodes. For example, the correctness probability value decreases as the required number of records, processing complexity, and/or required number of nodes increases. The expected incorrectness level 2539 for some or all execution modes can be calculated as a function of the determined required number of records, the determined processing complexity and/or the determined required number of nodes. For example, the amount and/or percentage of expected incorrectness level increases as the required number of records, processing complexity, and/or required number of nodes increases.

The expected total execution time 2537 and/or expected total resource consumption 2538 for some or all execution modes can be calculated as a function of the determined required number of records, the determined processing complexity and/or the determined required number of nodes. For example, the expected execution time of a single execution attempt and/or expected resource consumption of a single execution attempt increases as the required number of records, processing complexity, and/or required number of nodes increases. In some cases, the expected number of execution attempts required to achieve the execution success condition 2532 can also increase as the required number of records, processing complexity, and/or required number of nodes increases. This increase in expected execution time and/or expected resource consumption a single execution attempt with increase in required number of records, processing complexity, and/or required number of nodes, coupled with the increase in number of execution attempts with increase in in required number of records, processing complexity, and/or required number of nodes, can thus cause the corresponding increase in expected total execution time 2537 and/or expected total resource consumption 2538.

Furthermore, because the ranges of acceptable execution success conditions 2532 and/or the selected execution success condition 2532 can be selected automatically as a function of the expected total execution time 2537 and/or expected total resource consumption 2538 based on determined constraints for the total execution time and/or total resource consumption as discussed previously; and because the expected total execution time 2537 and/or expected total resource consumption 2538 can be calculated as a function of the number of records required to be accessed to execute the query, the processing complexity of the query, and/or the number of nodes determined to be required for execution of the query; the execution success condition 2532 can therefore also be determined by the query execution mode selection module 2512 as a function of the number of records required to be accessed to execute the query, the processing complexity of the query, and/or the number of nodes determined to be required for execution of the query.

Figure 25D:
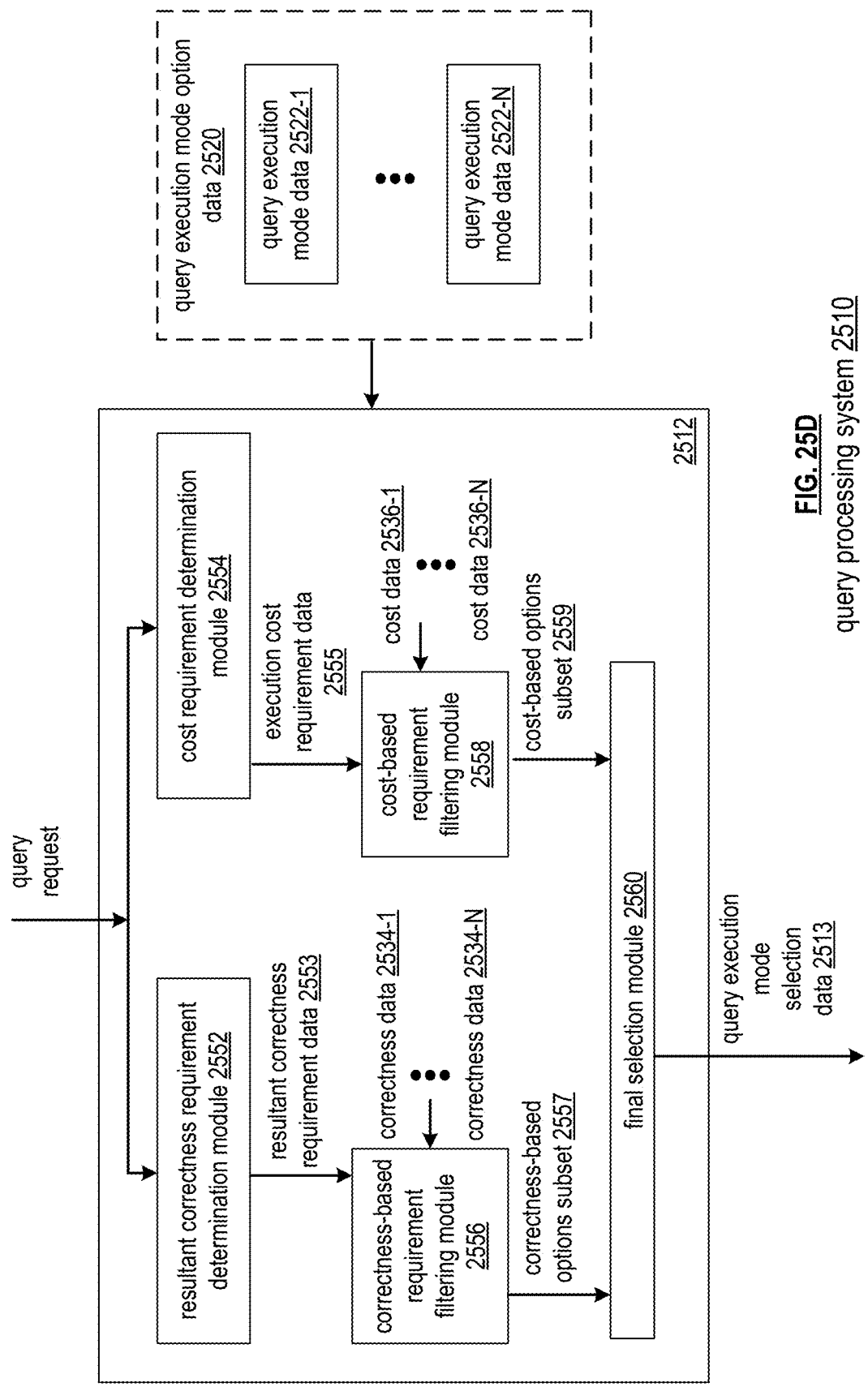

FIG. 25D illustrates an embodiment of query processing system 2510 that generates the query execution mode selection data 2513 for a given query request based on resultant correctness requirements and/or execution cost requirements. Some or all features of query processing system 2510 of FIG. 25D can be utilized to implement the query processing system 2510 of FIG. 25A and/or can be utilized to implement any other embodiment of the query processing system 2510 discussed herein.

A resultant correctness requirement determination module 2552 can be implemented to generate resultant correctness requirement data 2553 indicating, for example, threshold requirements for resultant correctness such as a threshold minimum resultant correctness probability value and/or a maximum threshold percentage of expected incorrectness level. The resultant correctness requirement data 2553 can be based on the query request itself, for example, based on an identifier of an end user and/or requesting entity, where different end users and/or requesting entities have different predetermined and/or configured resultant correctness requirement data 2553. In some cases, the query request includes data indicating the threshold requirements for resultant correctness such as a threshold minimum resultant correctness probability value and/or a maximum threshold percentage of expected incorrectness level in conjunction with the query expression. These threshold requirements for resultant correctness can otherwise be configured by end users and/or administrators, for example, via user input to a client device communicating with the database system 10.

The resultant correctness requirement determination module 2552 can generate the resultant correctness requirement data 2553 based on the query expression of the query, where different types of operators and/or query expressions have different resultant correctness requirement data 2553. As a particular example, the resultant correctness requirement data 2553 can indicate looser resultant correctness requirements, such as a lower threshold minimum resultant correctness probability value and/or a higher maximum threshold percentage of expected incorrectness level based on the data being averaged and/or aggregated in the query expression. The resultant correctness requirement data 2553 can indicate tighter resultant correctness requirements, such as a higher threshold minimum resultant correctness probability value and/or a lower maximum threshold percentage of expected incorrectness level, based on singular records being requested in the query expression, such as a record with a maximum or minimum value. Higher levels of aggregation in query expressions can induce looser resultant correctness requirements, while higher levels of specificity in query expressions can induce tighter resultant correctness requirements.

The resultant correctness requirement data 2553, such as the threshold minimum resultant correctness probability value, the maximum threshold percentage of expected incorrectness level, or other threshold requirements for resultant correctness, can be utilized to filter the set of possible options indicated in the query execution mode option data 2520 to remove options that do not adhere to the resultant correctness requirement data 2553 from the set of possible query execution mode options considered for selection. A correctness-based requirement filtering module 2556 can be implemented to generate a correctness-based options subset 2557 that includes only options that adhere to the resultant correctness requirement data 2553. A final selection module 2560 can select the query execution mode to be implemented for execution of the corresponding query from the correctness-based options subset 2557.

For example, the resultant correctness guarantee data 2534 of each query execution mode data 2422-1-2422-N can be compared to the resultant correctness requirement data 2553, where only query execution modes of the set of options that compare favorably to the resultant correctness requirement data 2553 are included in the correctness-based options subset 2557. This can alternatively and/or additionally include considering one or more discrete and/or continuous parameters of some or all query execution mode options, and further filtering the range of possible parameters that are acceptable for utilization with a query execution mode options based on indicating only a set of possible parameters that, when implemented, would cause the corresponding query execution mode to adhere to the resultant correctness requirement data 2553. As discussed previously, some or all of the resultant correctness guarantee data 2534 for some or all options, such as the correctness probability value 2535 and/or the expected incorrectness level 2539, can be first calculated as a function of the query itself, for example, based on a number of required records for the query, based on processing complexity of the query, and/or based on a number of nodes required to execute the query.

For example, only query execution modes with correctness probability values 2535 that do not fall below and/or otherwise compare favorably to a threshold minimum correctness probability value indicated in the resultant correctness requirement data 2553 are included in the correctness-based options subset 2557. As another example, only query execution modes with expected incorrectness level 2539 indicating an expected percentage of missing information and/or guaranteed maximum percentage of missing information that does not exceed a threshold maximum percentage of missing records indicated in the resultant correctness requirement data 2553 are included in the correctness-based options subset 2557. As another example, only query execution modes with an execution success condition 2532 dictating that no resultant with more than the threshold minimum percentage of missing records indicated in the resultant correctness requirement data 2553 will be deemed successful are included in the correctness-based options subset 2557.

Alternatively or in addition to generating a correctness-based options subset 2557 based on resultant correctness requirement data 2553, the query execution mode selection module 2512 can be operable to similarly generate a cost-based options subset 2559. A cost requirement determination module 2554 can be implemented to generate execution cost requirement data 2555 indicating, for example, threshold requirements for execution time, processing cost, and/or memory cost such as a threshold maximum total execution time and/or a threshold maximum total processing consumption. The execution cost requirement data 2555 can be based on the query request itself, for example, based on an identifier of an end user and/or requesting entity, where different end users and/or requesting entities have different predetermined and/or configured execution cost requirement data 2555. In particular, different end users and/or requesting entities can configure different desired execution time requirements, for example, based on their own desired trade-off between speed of query execution and level of correctness of the resultant that is ultimately generated. In some cases, the query request includes data indicating the threshold requirements for cost such as threshold maximum total execution time and/or a threshold maximum total resource consumption in conjunction with the query expression. These cost threshold requirements can otherwise be configured by end users and/or administrators, for example, via user input to a client device communicating with the database system 10.

The cost requirement determination module 2554 can generate the execution cost requirement data 2555 can be based on current system utilization and/or performance, such as a number of failed and/or unavailable nodes, a number of currently executing and/or pending queries, latency across the system, current utilization of nodes in the system, health of nodes across the system, and/or other information regarding current system utilization and/or performance. For example, if performance levels are lower and/or otherwise less favorable, and/or if utilization is high and/or otherwise less favorable, the threshold cost requirements of the cost requirement data can automatically be set by the cost requirement determination module 2554 as tighter cost requirements, for example, where the threshold maximum total execution time is lower and/or where the threshold maximum total resource consumption is lower to ensure the incoming query does not consume too many resources at this unideal time. If performance levels are higher and/or otherwise more favorable, and/or if utilization is low and/or otherwise more favorable, the threshold cost requirements of the cost requirement data can automatically be set by the cost requirement determination module 2554 as looser cost requirements, for example, where the threshold maximum total execution time is higher and/or where the threshold maximum total resource consumption is higher due to the greater availability and performance of system resources.

The execution cost requirement data 2555, such as the threshold maximum total execution time, the threshold maximum total resource consumption, or other cost threshold requirements, can be utilized to filter the set of possible options indicated in the query execution mode option data 2520 to remove options that do not adhere to the execution cost requirement data 2555 from the set of possible query execution mode options considered for selection. A cost-based requirement filtering module 2558 can be implemented to generate a cost-based options subset 2559 that includes only options that adhere to the execution cost requirement data 2555. The final selection module 2560 can select the query execution mode to be implemented for execution of the corresponding query from the cost-based options subset 2559.

For example, the successful execution cost data 2536 of each query execution mode data 2422-1-2422-N can be compared to the execution cost requirement data 2555, where only query execution modes of the set of options that compare favorably to the execution cost requirement data 2555 are included in the cost-based options subset 2559. This can alternatively and/or additionally include considering one or more discrete and/or continuous parameters of some or all query execution mode options, and further filtering the range of possible parameters that are acceptable for utilization with a query execution mode options based on indicating only a set of possible parameters that, when implemented, would cause the corresponding query execution mode to adhere to the execution cost requirement data 2555. As discussed previously, some or all of the successful execution cost data 2536 for some or all options, such as the expected total execution time 2537 and/or the expected total resource consumption 2538, can be first calculated as a function of the query itself, for example, based on a number of required records for the query, based on processing complexity of the query, and/or based on a number of nodes required to execute the query.

For example, only query execution modes with expected total execution times 2537 that do exceed and/or otherwise compare favorably to a threshold maximum total execution time indicated in the execution cost requirement data 2555 are included in the cost-based options subset 2559. As another example, only query execution modes with expected total resource consumption 2538 that do exceed and/or otherwise compare favorably to a threshold maximum total resource consumption indicated in the cost requirement data are included in the cost-based options subset 2559. As another example, only query execution modes with an execution success condition 2532 that induce expected total execution times and/or expected total processing resources, determined based on an expected number of execution attempts to attain query success as dictated by the execution success condition 2532, that do not exceed or otherwise compare favorably to the threshold maximum total execution time and/or threshold maximum total resource consumption indicated in the execution cost requirement data 2555 are included in the cost-based options subset 2559.

In cases where both resultant correctness requirement data 2553 and execution cost requirement data 2555 is employed, the final selection module 2560 can generate the query execution mode selection data 2513 by selecting from only ones of the set of options that adhere to both the resultant correctness requirement data 2553 and the execution cost requirement data 2555. For example, an intersection of the correctness-based options subset 2557 and the cost-based options subset 2559 can be determined by the final selection module 2560, and the final selection module 2560 can select from the subset of options included in this intersection. The final selection module 2560 can ultimately select an option from the intersection of the correctness-based options subset 2557 and the cost-based options subset 2559, from the full correctness-based options subset 2557, or the full cost-based options subset 2559 based on: a predetermined ranking of the set of options; selecting an option with most favorable resultant correctness guarantee data 2534 such as a highest correctness probability value 2535 and/or a lowest percentage of expected incorrectness level 2539; selecting an option with most favorable successful execution cost data 2536 such as a lowest expected total execution time 2537 and/or a lowest expected total resource consumption 2538; selecting an option with a tightest and/or most favorable execution success condition 2532; user input indicating a selection from this filtered subset of options; a user identified and/or otherwise determined preference of achieving more favorable correctness guarantees at the cost of less favorable execution cost; a user identified and/or otherwise determined preference of achieving more favorable execution cost at the cost of less favorable correctness guarantees; and/or the option having the most favorable score generated as discussed in conjunction with FIG. 25F.

In cases where the resultant correctness requirement data 2553 and execution cost requirement data 2555 are fixed and/or where multiple queries are evaluated via the same resultant correctness requirement data 2553 and execution cost requirement data 2555, different execution modes may still be selected for different incoming queries. This can be the case in embodiments employing the dynamic generation of correctness probability value 2535, expected incorrectness level 2539, expected total execution time 2537, and/or the expected total resource consumption 2538 for different queries as a function of the number of records required for each given query, the processing complexity of each given query, and/or the number of nodes required for each given query.

In particular, consider a case where the same resultant correctness requirement data 2553 and execution cost requirement data 2555 is utilized in selection of query execution mode for a first query and a second query. A first execution mode enabling high degrees of correctness, such as the where the guaranteed-correctness mode, is selected for the first query, for example, based on determining that the first query is a lightweight query to be performed on a small table with a small number of records, and can thus be handled via a small number nodes where probability of query failure, even in the first execution mode, is low due to the number of nodes being small. In particular, the low probability of query failure for the first query due to the smaller number of nodes means that the first query is likely to succeed in a small number of attempts, and the corresponding total execution time and/or total resource consumption expected for execution of the first query via the first execution mode is low enough that the first execution mode meets the execution cost requirement data, despite its high degrees of correctness.

While these high degrees of correctness are favorable for every query when possible, this mode is removed from consideration for execution of the second query, for example, based on determining that the second query is a more intensive query to be performed on a much larger table with a much larger number of records, and thus requires a much larger number nodes where probability of query failure under the first execution mode is much higher due to the number of nodes being larger. In particular, the high probability of query failure for the second query due to the larger number of nodes means that the second query is likely to succeed via greater number of attempts, and the corresponding total execution time and/or total resource consumption expected for execution of the second query via the first execution mode is larger, and thus does not meet the same execution cost requirement data. A second execution mode that has less favorable correctness guarantees is selected based on this second execution mode meeting the cost requirement data for the second query.

Figure 25E:
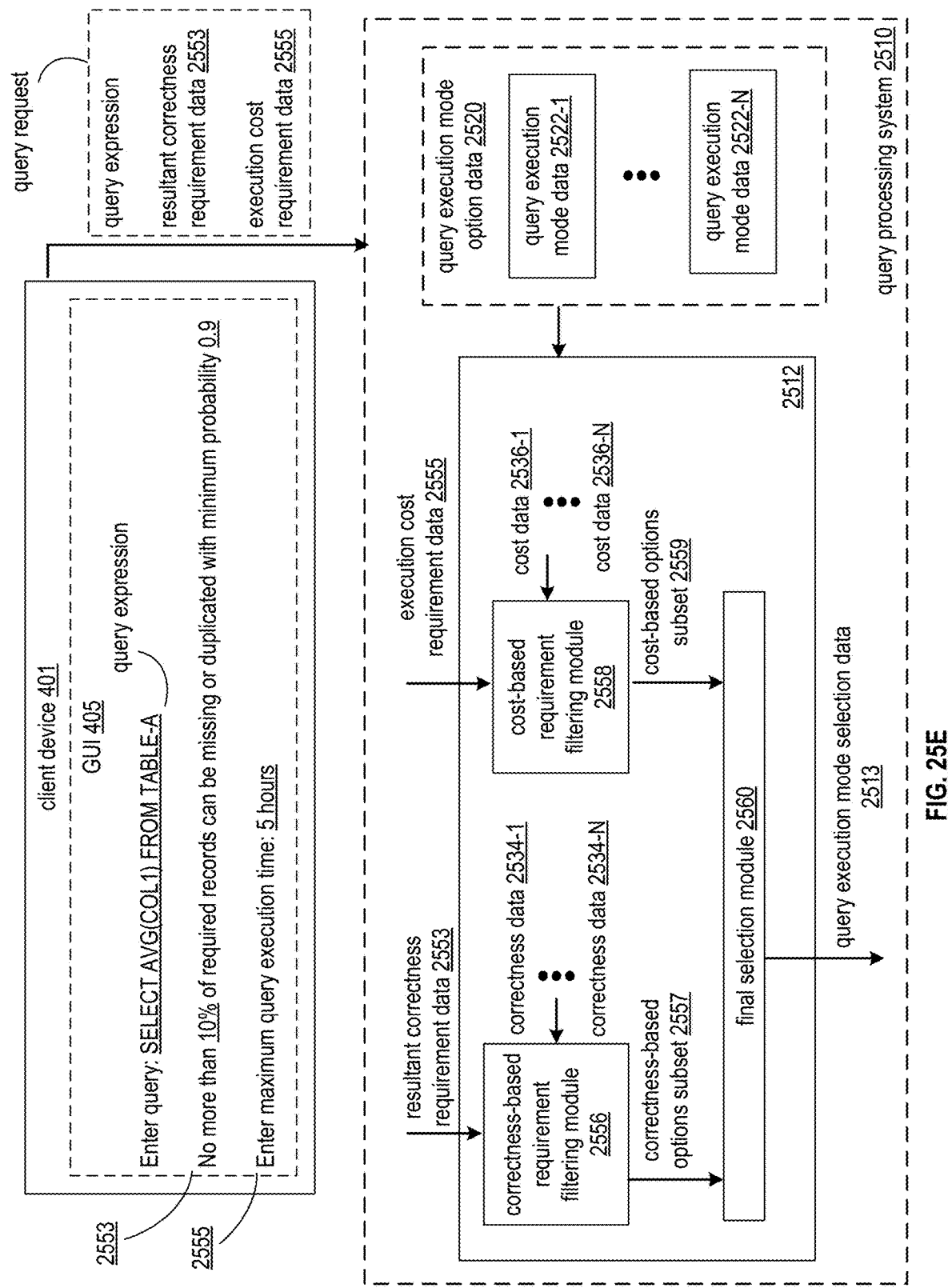
Figure 25F:
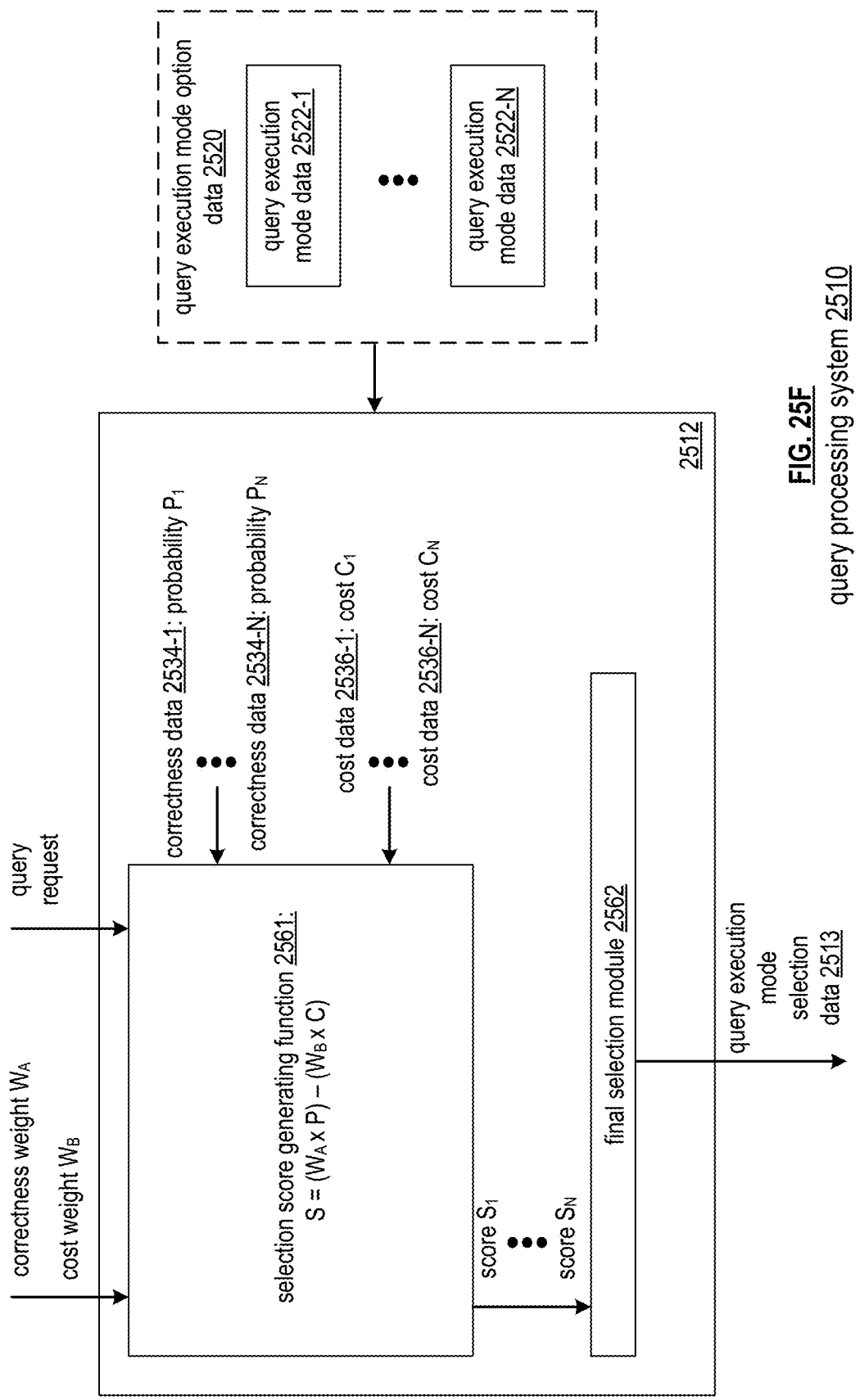

FIG. 25E illustrates a particular embodiment of the query processing system 2510 of FIG. 25A that receives some or all of the resultant correctness requirement data 2553 and/or the execution cost requirement data 2555 from a client device 401. The client device 401 can be associated with a particular end user that requests queries for execution by the database system 10. For example, a same client device that generates and sends a query request indicating a query for execution by the database system 10 can also generate and send the resultant correctness requirement data 2553 and/or the execution cost requirement data 2555 for this query. This enables a higher level of end user configuration of their respective queries, for example, based on their own trade-off of how accurate they wish the resultant to be and how long they wish to wait for a resultant.

The client device 401 can be implemented by utilizing a computing device 18 and/or another computing device associated with an end user. In some cases, the client device 401 is implemented by the configuration sub-system 16. The client device 401 can include and/or communicate with a display device that displays a graphical user interface (GUI) 405. The GUI 405 can display prompts, and the user can enter responses to the prompts via user input. The client device 401 can utilize at least one processing module to determine, based on the user input in response to one or more prompts displayed by the GUI, a query expression entered by the user, resultant correctness requirement data 2553 for this query, and/or the execution cost requirement data 2555 of this query. For example, the client device 401 can store application data associated with the database system 10 that, when executed by at least one processor of the client device 401, causes the client device to present the prompts via GUI 405 and causes the client device to generate, based on user input to GUI 405, a query request for transmission that includes the query expression, resultant correctness requirement data 2553, and/or the execution cost requirement data 2555.

This query expression entered by the user, resultant correctness requirement data 2553 entered by the user, and/or the execution cost requirement data 2555 entered by the user can be transmitted by the client device to the database system 10 for receipt by the query processing system 2510 of the database system 10, for example, via external network(s) 17, system communication resources 14, wide area network(s) 22, and/or via another wired and/or wireless connection. Note that many different client devices 401 can be communicating with the query processing system 2510, each generating and sending queries for execution, and further sending resultant correctness requirement data 2553 and/or the execution cost requirement data 2555 for these requested queries.

As a particular example, as illustrated in FIG. 25E, the user enters a query expression such as SELECT AVG (COL1) FROM TABLE-A in response to a prompt to enter a query. The user enters a percentage of "10%" and a probability value of "0.9" in response to the corresponding prompt to enter these values, indicating that no more than 10% of required records can be missing or duplicated with minimum probability 0.9 in execution of the entered query. The user enters a time interval of 5 hours in response to the prompt to enter a maximum query execution time. The client device 401 determines the query expression as "SELECT AVG(COL1) FROM TABLE-A" based on the user input; determines the resultant correctness requirement data 2553 as requiring that no more than 10% of required records can be missing or duplicated with minimum probability 0.9; and determines the execution cost requirement data 2555 as requiring a maximum execution time of 5 hours.

This query expression, resultant correctness requirement data 2553, and execution cost requirement data 2555 is sent to the query processing system 2510. As illustrated, the query request sent to the query processing system 2510 includes the query expression, resultant correctness requirement data 2553, and the execution cost requirement data 2555. As used herein, the "query request" can optionally include and/or indicate the resultant correctness requirement data 2553 and/or the execution cost requirement data 2555 in this fashion, based on being supplied in addition to the query expression by the requesting entity via user input.

The query processing system 2510 receives this information in the query request from the client device 401. The query processing system 2510 generates query execution mode selection data 2513 as discussed previously, and executes the query indicated by the query expression in accordance with the query execution mode selection data 2513. As illustrated in FIG. 25E, the query execution mode selection data 2513 can be generated by applying the correctness-based requirement filtering module 2556 and the cost-based requirement filtering module 2558 of FIG. 25D based on the resultant correctness requirement data 2553 and execution cost requirement data 2555 received from the client device 401. For example, the resultant correctness requirement determination module 2552 and/or the cost requirement determination module 2554 of FIG. 25D can be implemented by the client device 401.

Other embodiments can have different types of prompts to enable the end user to supply different resultant correctness requirement data 2553 and/or the execution cost requirement data 2555 discussed herein. For example, the end user can enter and/or configure whether or not correctness is required, can enter a minimum correctness probability value, can enter a desired confidence interval for the query resultant being entirely correct, and/or can enter and/or configure other requirements regarding the probability of resultant correctness. Such user-supplied requirements can be compared to correctness probability value 2535 of query execution mode data 2522 of the set of query execution mode options, for example, to generate the correctness-based options subset 2557 to include only execution mode options with a correctness probability value 2535 or other correctness probability information that compares favorably to the user-supplied requirements regarding the probability of resultant correctness.

As another example, the end user can enter and/or configure how incorrect a query resultant for the query can be, such as the maximum number and/or percentage of missing records, maximum number and/or percentage of duplicated records, and/or maximum number and/or percentage of node failures that can be tolerated. Such user-supplied requirements can be compared to expected incorrectness level 2539 of query execution mode data 2522 of the set of query execution mode options, for example, to generate the correctness-based options subset 2557 to include only execution mode options with an expected incorrectness level 2539 that compares favorably to such user-supplied requirements regarding the acceptable level of query resultant incorrectness.

As another example, the end user can enter and/or configure an execution time limit, a fixed minimum and/or maximum amount of time for execution, a window of time, a scheduled execution deadline and/or end time, a confidence interval for the amount of time that the query's execution time should be expected to fall within, and/or other timing restrictions. Such user-supplied requirements relating to execution time can be compared to expected total execution time 2537 of query execution mode data 2522 of the set of query execution mode options, for example, to generate the cost-based options subset 2559 to include only execution mode options with an expected total execution time 2537 that compares favorably to such user-supplied requirements regarding the execution time limit.

In some cases, the user's configured resultant correctness requirement data 2553 and/or execution cost requirement data 2555 are both so restrictive that no query execution mode can be identified from the set of options that satisfies both requirements. In such cases, a notification can be transmitted to the client device 401 that indicates one of both requirements must be loosened to enable a query selection mode to be made, and the user can be prompted to enter new, less-restrictive requirements for transmission back to the query processing module 2510. Alternatively, some or all of the query execution mode option data can be stored by the client device enabling the client device to determine whether the entered requirements render a selection possible prior to transmission of the query request, for example, where execution of the application data causes the client device 401 itself to perform some or all of the functionality of the query execution mode selection module 2512 discussed herein.

In some embodiments, upon entering the user input utilized to generate the resultant correctness requirement data 2553, the client device 401 can determine a minimum expected total execution time 2537 that can be entered as execution cost requirement data 2555 to render at least one of the set of options in query execution mode option data 2520 as satisfying both the resultant correctness requirement data 2553 and the execution cost requirement data 2555. In the particular example illustrated in FIG. 25E, the GUI 405 may display a minimum expected total execution time 2537 of 3 hours upon the user indicating that no more than 10% of required records can be missing or duplicated with minimum probability 0.9, and selects the maximum execution time of 5 hours based on a requirement that the maximum execution time be greater than 3 hours for their resultant correctness requirement data 2553 to be satisfied.

For example, the client device 401 can generate the correctness-based options subset 2557 by implementing the correctness-based requirement filtering module 2556 via its own processing resources and by utilizing locally-stored query execution mode option data 2520, and can identify the expected total execution time 2537 in this filtered set of options that is greatest. As another example, the client device can utilize a deterministic function or store a mapping of all possible resultant correctness requirement data 2553 to minimum expected execution time possible, and can determine the minimum expected execution time for a given input identifying the particular resultant correctness requirement data 2553 by applying the deterministic function or stored mapping. This determined minimum expected total execution time 2537 can be displayed to the user after the resultant correctness requirement data 2553 in conjunction with the prompt to enter the execution cost requirement data 2555, for example, where the user cannot enter values to the GUI greater than the determined minimum expected total execution time and/or where the user is automatically prompted to loosen their entries for the resultant correctness requirement data 2553 if they attempt to enter a maximum execution time that is less than the determined minimum expected total execution time. In some cases, if the user first enters their maximum execution time or other execution cost requirement data 2555, the GUI can similarly present the loosest possible resultant correctness requirement data 2553 that can be entered by the user that will render at least one execution mode possible.

In some cases, the resultant correctness requirement data 2553 and/or execution cost requirement data 2555 can be entered as user preference data to be stored, for example, in profile data for the corresponding end user by the query processing system 2510. Rather than specifying these parameters for each individual requested query, the end user can enter resultant correctness requirement data 2553 and/or execution cost requirement data 2555 to the GUI 405 that is to be applied for all of their requested queries. In some cases, the resultant correctness requirement data 2553 and/or execution cost requirement data 2555 entered to GUI 405 can be specific to a particular type of queries, only to be applied in executing queries requested by the corresponding end user that match the query type. The end user can specify different resultant correctness requirement data 2553 and/or execution cost requirement data 2555 to be applied to each of a plurality of different specified query types via GUI 405.

At least one memory module of the query processing system 2510 can store some or all of this information as user profile information that is accessed by the resultant correctness requirement determination module 2552 and/or the cost requirement determination module 2554 to generate the resultant correctness requirement data 2553 and/or execution cost requirement data 2555 for a query request received from a particular end user. For example, a plurality of end users each have their own user profile information stored to configure their resultant correctness requirement data 2553 and/or execution cost requirement data 2555 based on their own interaction with GUIs 405 of their respective client devices 401.

Note that a client device 401 can similarly be utilized by an administrator to set resultant correctness requirement data 2553 and/or execution cost requirement data 2555 that must be adhered to by all queries and/or by particular types of queries. The same or similar GUI can be presented to enable the administrative user to configure resultant correctness requirement data 2553 and/or execution cost requirement data 2555 to be applied to a particular type of query, to be applied to a particular end user, and/or to be applied across all incoming queries. In particular, the administrator can interact with GUI 405 to set resource consumption requirements and/or execution time requirements that must be adhered to by incoming queries to ensure the system is not over-utilized, for example, by many users desiring very strict resultant correctness requirement data 2553. In some cases, threshold requirements set by the administrator can be sent to client devices 401 of end users and can be presented via GUI 405 when the end users set their resultant correctness requirement data 2553 and execution cost requirement data 2555, for example, where loosest-possible resultant correctness requirement data 2553 is presented based on the execution cost requirement data 2555 set by an administrator and/or where end users can only enter resultant correctness requirement data 2553 that renders possible at least one query execution mode, given the administrator-configured execution cost requirement data 2555.

FIG. 25F illustrates an embodiment of a query processing system 2510 that implements a selection score generating function 2561 to generate query execution mode selection data 2513. The final selection of a query execution mode is generated from a set of query execution mode options by generating a score, via a selection score generating function 2561, for each query execution mode in the set of query execution mode options. A final selection module 2562 can then select the query execution mode with highest or otherwise most favorable score of the set of query execution mode options. Some or all of the features of the query processing system 2510 of FIG. 25F can be utilized to implement the query processing system 2510 of FIG. 25A and/or any other embodiment of the query processing system 2510 discussed herein.

The selection score generating function 2561 can be performed for each of a set of query execution mode options. While FIG. 25F illustrates performance of the selection score generating function 2561 to evaluate all of the options 1-N indicated in the query execution mode option data 2520, the selection score generating function 2561 can alternatively be performed only on a pre-filtered subset of options, such as the, full correctness-based options subset 2557 of FIG. 25D, the full cost-based options subset 2559 of FIG. 25D, and/or the intersection of the correctness-based options subset 2557 and the cost-based options subset 2559 as described in conjunction with FIG. 25D. For example, the generated scores can be utilized to select one of the pre-selected, filtered set of options with a highest and/or otherwise most favorable corresponding score, where other options that were removed from consideration based on not adhering to the resultant correctness requirement data 2553 and/or the execution cost requirement data 2555 are not considered and will not be selected.

The selection score generating function 2561 can be performed upon resultant correctness guarantee data 2534 and/or the successful execution cost data 2536. More favorable resultant correctness guarantee data 2534, such as higher correctness probability values 2535 and/or lower expected percentages of expected incorrectness level 2539, can induce a more favorable score. Less favorable resultant correctness guarantee data 2534, such as lower correctness probability values 2535 and/or higher expected percentages of expected incorrectness level 2539, can induce a less favorable score. More favorable successful execution cost data 2536, such as lower expected total execution time 2537 and/or lower expected total resource consumption 2538, can induce a more favorable score. Less favorable successful execution cost data 2536, such as higher expected total execution time 2537 and/or higher expected total resource consumption 2538, can induce a less favorable score.

The desired trade-off between successful execution cost and resultant correctness guarantee can be reflected as a set of weights $W_A$ and $W_B$, respectively. For example, a ratio or other relationship between weights $W_A$ and $W_B$ can dictate the corresponding importance placed on successful execution cost vs. resultant correctness guarantee. Weights $W_A$ and $W_B$ can be configured via user input, predetermined, and/or automatically determined based on current resource utilization and/or based on the query request.

As a particular example, the weights $W_A$ and $W_B$ can be entered via user input to GUI 405 in response to a prompt to enter these weights in a similar fashion as presented in FIG. 25E, where the user supplies these weights for a given query and/or to be applied to all queries alternatively or additionally to entering resultant correctness requirement data 2553 and/or execution cost requirement data 2555.

As another example, the weight $W_A$ applied to successful execution cost can be automatically set to be higher relative to the weight $W_B$ applied to resultant correctness guarantee when system resources are more constrained to induce higher scores for query execution modes with favorable successful execution cost data 2536, where variation in resultant correctness guarantee has a smaller effect. The weight $W_A$ applied to successful execution cost data 2536 can then be lowered when system resources are less constrained to increase the effect induced by resultant correctness guarantee data 2534 when more system resources are available.

As another example, different end users, different types of query expressions, and/or different types of applications can have different corresponding weight ratios. The query request can thus be utilized to dictate the weights that will be used. For example, a first ratio of weight $W_A$ to weight $W_B$ as configured by one end user can be different from the ratio of weight $W_A$ to weight $W_B$ as configured by another end user, for example, based on their respective interaction with GUI 405 of their respective client devices 401. Query requests determined to be received from the first end user can have scores generated for the set of query execution mode options via applying the first ratio, whole query requests determined to be received from the second end user can have scores generated for the set of query execution mode options via applying the second ratio.

A particular example of a selection score generating function 2561 is illustrated in FIG. 25F. In this particular example, a score S for each option of the set of options being considered can be generated as $S=(W_A \times P)-(W_B \times C)$. P can be proportional to, is an increasing function of, and/or is based on the correctness probability value 2535 of the given query execution mode, and C can be proportional to, is an increasing function of, and/or is otherwise based on the expected total execution time 2537 and/or the expected total resource consumption 2538 of the given query execution mode. In this example, higher values of score S are more favorable than lower values of score S, for example, where the query execution mode with the highest and/or otherwise most favorable value of S is ultimately selected via final selection module 2562. Other embodiments can employ different linear and/or non-linear relationships that can optionally employ corresponding weights dictating relative importance of successful execution cost data 2536 and resultant correctness guarantee data 2534 in a same or different fashion.

Figure 25G:
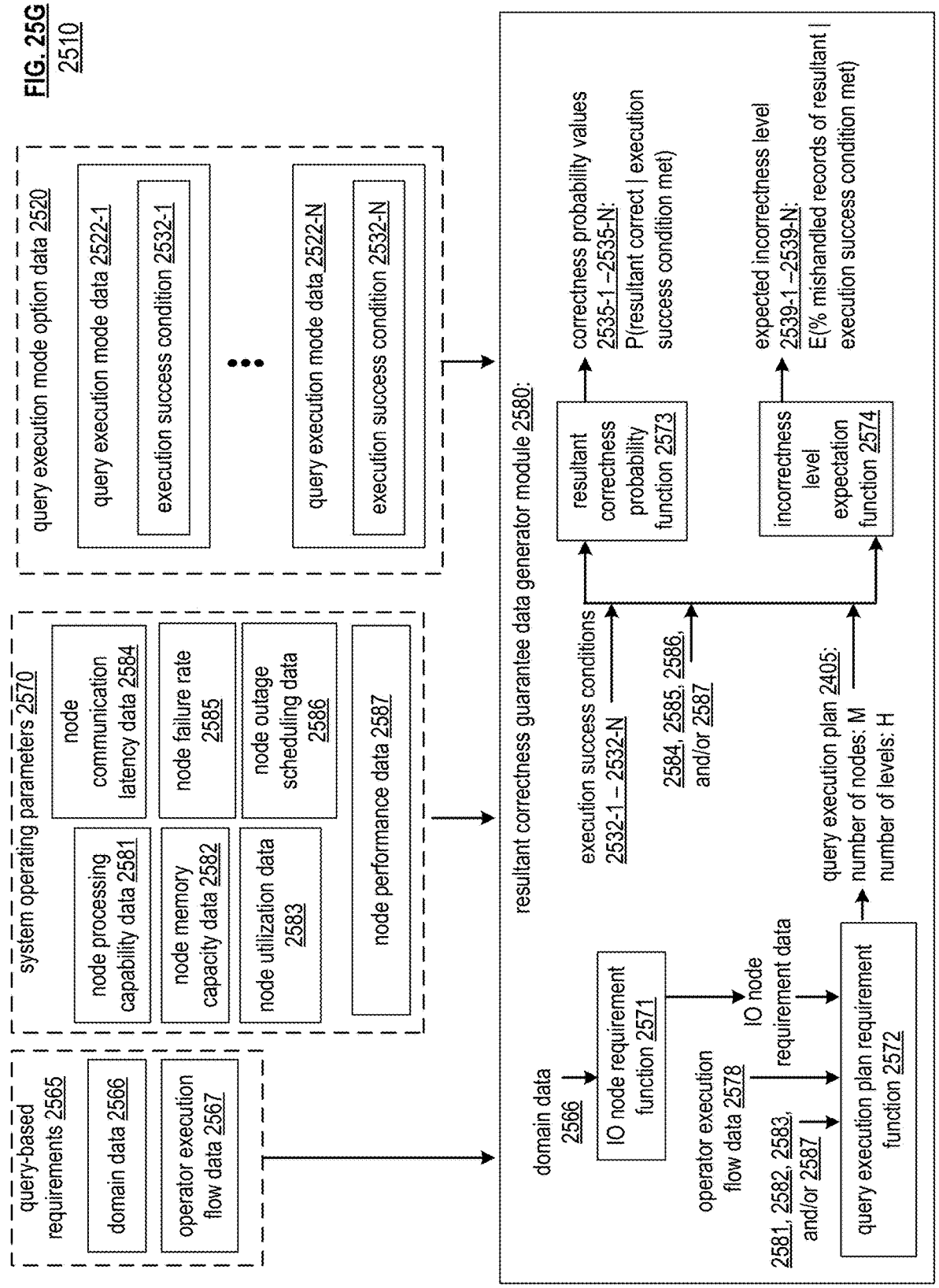
FIG. 25G is a schematic block diagram of a query processing system that implements a resultant correctness guarantee data generator module in accordance with various embodiments of the present invention.

FIG. 25G illustrates an embodiment of a query processing system 2510 that implements a resultant correctness guarantee data generator module 2580 to generate some or all of the resultant correctness guarantee data 2534 for some or all query execution modes 1-N in query execution mode option data 2520, such as some or all of the correctness probability values 3535-1-3535-N and/or some or all of the expected incorrectness level 3539-1-3539-N. Some or all of the features of the query processing system 2510 of FIG. 25G can be utilized to implement the query processing system 2510 of FIG. 25A and/or any other embodiments of the query processing system 2510 discussed herein.

The resultant correctness guarantee data generator module 2580 can utilize query-based requirements 2565 such as domain data 2566 of the query and/or operator execution flow data 2567. For example, the resultant correctness guarantee data generator module 2580 can be implemented for every incoming query request to generate the resultant correctness guarantee data 2534 based on requirements dictated by the query request as discussed previously, where the domain data 2566 of the query and/or operator execution flow data 2567 are determined for each incoming query. In other cases, a plurality of query categories with different sizes and/or types of domain data 2566 of the query and/or different complexities and/or types of operator execution flow data 2567 can be processed to predetermine resultant correctness guarantee data 2534 for each category, enabling selections to be made for incoming queries based on the resultant correctness guarantee data 2534 generated for the corresponding category that compares most favorably to the query. This preprocessing can be ideal as the resultant correctness guarantee data 2534 need not be re-processed for each incoming query.

The resultant correctness guarantee data generator module 2580 can alternatively or additionally generate the resultant correctness guarantee data 2534 based on system operating parameters 2570, which can include: node processing capability data 2581 for some or all nodes; node memory capacity data 2582 for some or all nodes; node utilization data 2583 for some or all nodes; node communication latency data 2584 for some of all nodes; node failure rate 2585 for some or all nodes; node outage scheduling data 2586 for some or all nodes; and/or node performance data 2587. This information can include individual data for particular nodes and/or can indicate aggregations and/or average. This information can correspond to measurements and/or predictions generated by the query processing system 2510 based on historical system operating parameters 2570.

The resultant correctness guarantee data generator module 2580 can alternatively or additionally to generate the resultant correctness guarantee data 2534 based on factors induced by the state of the database system 10. The resultant correctness guarantee data generator module 2580 can be implemented to utilize this state information per incoming query; can be implemented based on changes in system operating parameters and/or current system performance and/or utilization; and/or can be implemented at predefined time intervals and/or in accordance with a schedule. In either case, the current, projected, and/or most recent system operating parameters 2570 are utilized to generate the resultant correctness guarantee data 2534. In other cases, a plurality of different sets of system parameter categories can be processed to predetermine resultant correctness guarantee data 2534 for each category, enabling selections to be made for incoming queries and/or at times with various system conditions based on the resultant correctness guarantee data 2534 generated for the corresponding category that compares most favorably to determined current system operating parameters. This preprocessing can be ideal as the resultant correctness guarantee data 2534 need not be re-processed each time system operating parameters change.

The resultant correctness guarantee data generator module 2580 can alternatively or additionally utilize execution success conditions 2532, and/or other information such as the execution mode instruction data 2525, for each execution option mode to generate the resultant correctness guarantee data 2534. In cases where the execution success condition 2532 is a dynamic parameter that can be set for a corresponding query execution mode option, a set of resultant correctness guarantee data 2534 can be generated for this query execution mode option indicating different resultant correctness guarantee data 2534 induced by different values and/or conditions of the execution success condition 2532, and/or can indicate the resultant correctness guarantee data 2534 as a function of one or more selectable parameters that dictate the corresponding execution success condition 2532 for this query execution mode. The resultant correctness guarantee data generator module 2580 can alternatively or additionally be implemented to generate resultant correctness guarantee data 2534 for new and/or updated query execution modes included in the query execution mode option data 2520 to keep the query execution mode option data 2520 up to date.

The resultant correctness guarantee data generator module 2580 can implement a resultant correctness probability function 2573 to generate some or all of the correctness probability values 2534-1-2534-N based on corresponding execution success conditions 2532-1-2532-N. In particular, each correctness probability value 2535 can indicate and/or can be calculated as a conditional probability of the resultant being correct, given that the execution success condition 2532 is met, as resultants are not returned in executions where the execution success condition 2532 was not met.

Some or all correctness probability values 2535 can be further based on: system operating parameters 2570 that affect the ability of individual nodes and/or the system as a whole to meet the corresponding execution success conditions 2532-1-2532-N such as communication latency data 2584, node failure rate 2585, node outage scheduling data 2586, and/or node performance data 2587 of the current conditions and/or a corresponding one of a plurality of system operating parameter categories; a number of nodes M, number of query execution plan levels H, a distribution of the M nodes across the H query execution plan levels, a number of records to be accessed and/or other information regarding scale based on scale and/or corresponding query execution plan 2405 for the given query and/or based on a corresponding query category; and/or other information that affects whether a correct resultant will be generated, given the execution success condition 2532 is met. For example, the correctness probability values 2535 can increase in value and/or increase in favorability as: an increasing function of tightness of execution success conditions 2532; a decreasing function of communication latency of node communication latency data 2584, a decreasing function of node failure rate 2585, a decreasing function of number of node outages indicated in node outage scheduling data 2586; an increasing function of node performance indicated in node performance data 2587; a decreasing function of number of nodes, a decreasing function of number of query execution plan levels H, and/or a decreasing function of a number of records to be accessed.

The resultant correctness guarantee data generator module 2580 can alternatively or additionally implement a incorrectness level expectation function 2574 that generates expectation, standard deviation, and/or other distribution information regarding the amount of node failures and/or amount of missing and/or duplicated records of expected incorrectness level 2539 as discussed previously for some or all query execution mode data 2522-1-2522-N. The incorrectness level expectation function 2574 can generate some or all of expected incorrectness level 2539-1-2539-N based on corresponding execution success conditions 2532-1-2532-N. In particular, each expected missing records value and/or distribution of missing records indicated in expected incorrectness level 2539 can indicate and/or can be calculated as a conditional expectation and/or conditional probability distribution function, respectively, of the percentage of missing and/or duplicated records and/or percentage of records that are otherwise not reflected exactly once in the resultant, given that the execution success condition 2532 is met. This conditional expectation and/or probability distribution function is ideal, as resultants are not returned in executions where the execution success condition 2532 was not met.

In some cases, each expected missing records value and/or distribution of missing records indicated in expected incorrectness level 2539 can indicate and/or can be calculated as a conditional expectation and/or conditional probability distribution function, respectively, of the percentage of missing and/or duplicated records and/or percentage of records that are otherwise not reflected exactly once in the resultant, given that resultant is not correct and/or is not equivalent to the true resultant. This can be useful in cases where this information is utilized to determine the degree at which the resultant is incorrect in cases where the resultant is not equivalent to the true resultant.

Some or all of expected incorrectness level 2539 can be further based on: system operating parameters 2570 that affect the ability of individual nodes and/or the system as a whole to generate correct resultants such as node communication latency data 2584, node failure rate 2585, node outage scheduling data 2586, and/or node performance data 2587 of the current conditions and/or a corresponding one of a plurality of system operating parameter categories; a number of nodes M, number of query execution plan levels H, a distribution of the M nodes across the H query execution plan levels, a number of records to be accessed and/or other information regarding scale based on scale and/or corresponding query execution plan 2405 for the given query and/or based on a corresponding query category; and/or other information that affects how much missing information is expected, given the execution success condition 2532 is met. For example, the expected incorrectness level 2539, such as expected percentage of failed nodes and/or missing records, can decrease in value and/or increase in favorability as: an increasing function of tightness of execution success conditions 2532; a decreasing function of communication latency of node communication latency data 2584, a decreasing function of node failure rate 2585, a decreasing function of number of node outages indicated in node outage scheduling data 2586; an increasing function of node performance indicated in node performance data 2587; a decreasing function of number of nodes, a decreasing function of number of query execution plan levels H, and/or a decreasing function of a number of records to be accessed.

As illustrated in FIG. 25G, the number of levels H, number of nodes M, and/or other information regarding scale for a given query execution plan 2405 of a given query request and/or of a given category of query-based requirements 2565 can be automatically determined by the resultant correctness guarantee data generator module and/or another processing module of the query processing system 2510. A query execution plan requirement function 2572 indicating this number of required nodes M and/or number of levels H can be generated for a given query and/or given category of query types based on, for example: IO node requirement data indicating IO nodes required to access records of the corresponding query; operator execution flow data 2578 determined for the corresponding query such as query operator execution flow 2517 of FIG. 24C; node processing capability data 2581; node memory capacity data 2582; node utilization data 2583; and/or node performance data 2587. The IO requirement data can be generated via an IO requirement function 2571 based on domain data 2566 of the corresponding query category and/or determined for the particular incoming query.

FIG. 25H illustrates an embodiment of a query processing system 2510 that implements a successful execution cost data generator module 2590 to generate some or all of the successful execution cost data 2536 for some or all query execution modes 1-N in query execution mode option data 2520, such as some or all of the expected total execution times 3537-1-3537-N and/or some or all of expected total resource consumption 3538-1-3538-N. Some or all of the features of the query processing system 2510 of FIG. 25H can be utilized to implement the query processing system 2510 of FIG. 25A and/or any other embodiments of the query processing system 2510 discussed herein.

In a similar fashion as discussed with regards to the resultant correctness guarantee data generator module 2580, the successful execution cost data generator module 2590 can utilize query-based requirements 2565 such as domain data 2566 of the query and/or operator execution flow data 2567. For example, the successful execution cost data generator module 2590 can be implemented for every incoming query request to generate the successful execution cost data 2536 based on requirements dictated by the query request as discussed previously, where the domain data 2566 of the query and/or operator execution flow data 2567 are determined for each incoming query. In other cases, a plurality of query categories with different sizes and/or types of domain data 2566 of the query and/or different complexities and/or types of operator execution flow data 2567 can be processed to predetermine successful execution cost data 2536 for each category, enabling selections to be made for incoming queries based on successful execution cost data 2536 generated for the corresponding category that compares most favorably to the query. This preprocessing can be ideal as the successful execution cost data 2536 need not be re-processed for each incoming query.

In a similar fashion as discussed with regards to the resultant correctness guarantee data generator module 2580, the successful execution cost data generator module 2590 can alternatively or additionally generate the successful execution cost data 2536 based on system operating parameters 2570, which can include: node processing capability data 2581 for some or all nodes; node memory capacity data 2582 for some or all nodes; node utilization data 2583 for some or all nodes; node communication latency data 2584 for some of all nodes; node failure rate 2585 for some or all nodes; node outage scheduling data 2586 for some or all nodes; and/or node performance data 2587. This information can include individual data for particular nodes and/or can indicate aggregations and/or average. This information can correspond to measurements and/or predictions generated by the query processing system 2510 based on historical system operating parameters 2570.

In a similar fashion as discussed with regards to the resultant correctness guarantee data generator module 2580, the successful execution cost data generator module 2590 can alternatively or additionally generate the successful query execution cost data 2536 based on factors induced by the state of the database system 10. The successful execution cost data generator module 2590 can be implemented to utilize this state information per incoming query; can be implemented based on changes in system operating parameters and/or current system performance and/or utilization; and/or can be implemented at predefined time intervals and/or in accordance with a schedule. In either case, the current, projected, and/or most recent system operating parameters 2570 are utilized to generate the successful query execution cost data 2536. In other cases, a plurality of different sets of system parameter categories can be processed to predetermine resultant correctness guarantee data 2534 for each category, enabling selections to be made for incoming queries and/or at times with various system conditions based on the successful query execution cost data 2536 generated for the corresponding category that compares most favorably to determined current system operating parameters. This preprocessing can be ideal as successful query execution cost data 2536 need not be re-processed each time system operating parameters change.

In a similar fashion as discussed with regards to the resultant correctness guarantee data generator module 2580, the successful execution cost data generator module 2590 can alternatively or additionally utilize execution success conditions 2532, and/or other information such as the execution mode instruction data 2525, for each execution option mode to generate the successful execution cost data 2536. In cases where the execution success condition 2532 is a dynamic parameter that can be set for a corresponding query execution mode option, a set of successful execution cost data 2536 can be generated for this query execution mode option indicating different successful execution cost data 2536 induced by different values and/or conditions of the execution success condition 2532, and/or can indicate the successful execution cost data 2536 as a function of one or more selectable parameters that dictate the corresponding execution success condition 2532 for this query execution mode. The successful execution cost data generator module 2590 can alternatively or additionally be implemented to generate successful execution cost data 2536 for new and/or updated query execution modes included in the query execution mode option data 2520 to keep the query execution mode option data 2520 up to date.

In a similar fashion as discussed with regards to the resultant correctness guarantee data generator module 2580, the successful execution cost data generator module 2590 can determine a number of levels H, a number of nodes M, and/or other scale-based information regarding a query execution plan 2405 that would be required to execute a given query and/or to execute queries of a given query category for each of a plurality of different query categories. As illustrated in FIG. 25H and as discussed in conjunction with FIG. 25G, this information can optionally be determined based on performing a query execution plan requirement function 2572 upon: IO node requirement data indicating IO nodes required to access records of the corresponding query; operator execution flow data 2578 determined for the corresponding query such as query operator execution flow 2517 of FIG. 24C; node processing capability data 2581; node memory capacity data 2582; node utilization data 2583; and/or node performance data 2587. The IO requirement data can be generated via an IO requirement function 2571 based on domain data 2566 of the corresponding query category and/or determined for the particular incoming query.

The successful execution cost data generator module 2590 can implement a single execution attempt cost function 2595 that is utilized to generate a set of execution times per attempt 2596-1-2596-N and/or a set of resource cost per attempt 2597-1-2597-N for the set of query execution modes 1-N of the set of options. Each execution time per attempt 2596 and/or resource cost per attempt 2597 can be generated based on: a number of nodes M, number of query execution plan levels H, a distribution of the M nodes across the H query execution plan levels, a number of records to be accessed and/or other information regarding scale based on scale and/or corresponding query execution plan 2405 for the given query and/or based on a corresponding query category; and/or system operating parameters 2570 such as node processing capability data 2581; node memory capacity data 2582; node utilization data 2583; node communication latency data 2584; and/or node performance data 2587.

For example, the execution time per attempt 2596 and/or resource cost per attempt 2597 can decrease in value and/or increase in favorability as: a decreasing function of number of nodes M; a decreasing function of number of query execution plan levels H; a decreasing function of a number of records to be accessed; an increasing function of processing capability indicated in node processing capability data 2581; an increasing function of node memory capacity of node memory capacity data 2582; a decreasing function of communication latency of node communication latency data 2584; and/or an increasing function of node performance indicated in node performance data 2587. The execution time per attempt 2596 can be an average generated based on empirical data measured for previous execution attempts of the corresponding query execution mode for similar scale of queries over time.

The successful execution cost data generator module 2590 can implement an execution attempt success probability function 2591 to generate execution success probabilities 2592-1-2592-N for the set of query execution options 1-N. The execution success probability 2592 for a given query execution mode can indicate the probability that a given, single execution attempt of a query is successful, as deemed by the corresponding execution success condition 2532. Thus, this can correspond to calculating the probability that the corresponding execution success condition 2532 in a given, single execution attempt.

This execution success probability 2592 can be a function of system operating parameters 2570 that affect the ability of individual nodes and/or the system as a whole to meet the corresponding execution success conditions 2532-1-2532-N such as communication latency data 2584, node failure rate 2585, node outage scheduling data 2586, and/or node performance data 2587 of the current conditions and/or a corresponding one of a plurality of system operating parameter categories; a number of nodes M, number of query execution plan levels H, a distribution of the M nodes across the H query execution plan levels, a number of records to be accessed and/or other information regarding scale based on scale and/or corresponding query execution plan 2405 for the given query and/or based on a corresponding query category; and/or other information that affects whether corresponding execution success conditions 2532 will be met in a given execution attempt. For example, the execution success probability 2592 can increase in value and/or increase in favorability as: an decreasing function of tightness of execution success conditions 2532; a decreasing function of communication latency of node communication latency data 2584, a decreasing function of node failure rate 2585, a decreasing function of number of node outages indicated in node outage scheduling data 2586; an increasing function of node performance indicated in node performance data 2587; a decreasing function of number of nodes, a decreasing function of number of query execution plan levels H, and/or a decreasing function of a number of records to be accessed.

The successful execution cost data generator module 2590 can implement an expected number of attempts until success determination function 2593, which can be utilized to generate a set of expected number of attempts 2594-1-2594-N for each of the set of query execution modes 1-N. For example, the expected number of attempts 2594 for a given query execution mode can be calculated as a function of the execution success probability 2592, for example, in accordance with a geometric distribution based on the execution success probability 2592. For example, the expected number of attempts 2594 can be calculated as $(1-p)/p$, where p is equal to execution success probability 2592, and where the execution success probability 2592 is represented as a probability value between 0 and 1.

The successful execution cost data generator module 2590 can implement a total expected execution time function 2598, which can be utilized to generate some or all of the expected total execution time 2537-1-2537-N of query execution mode data 2522-1-2522-N included in the query execution mode option data 2520. The total expected execution time function 2598 can generate expected total execution time 2537 of a query execution mode as a function of the number of expected number of attempts 2594 determined for this query execution mode and further as a function of the execution time per attempt 2596 determined for this query execution mode. For example, if each execution attempt is known and/or assumed to be independent, the expected total execution time 2537 can be generated as the product of the expected number of attempts 2594 and the execution time per attempt 2596. The expected total execution time 2537 can otherwise increase as an increasing function of expected number of attempts 2594 and/or as an increasing function of execution time per attempt 2596. The expected total execution time 2537 can alternatively or additionally be based on an average total execution time generated based on empirical data measured over time for previous executions of the corresponding query execution mode for similar scale of queries.

The successful execution cost data generator module 2590 can alternatively or additionally implement a total expected resource consumption function 2599, which can be utilized to generate some or all of the expected total resource consumption 2538-1-2538-N of query execution mode data 2522-1-2522-N included in the query execution mode option data 2520. The total expected resource consumption function 2599 can generate expected total resource consumption 2538 of a query execution mode as a function of the number of expected number of attempts 2594 determined for this query execution mode and further as a function of the resource cost per attempt 2597 determined for this query execution mode. For example, if each execution attempt is known and/or assumed to be independent, the expected total resource consumption 2538 can be generated as the product of the expected number of attempts 2594 and the resource cost per attempt 2597. The expected total resource consumption 2538 can otherwise increase as an increasing function of expected number of attempts 2594 and/or as an increasing function resource cost per attempt 2597. The expected total resource consumption 2538 can alternatively or additionally be based on an average total resource consumption generated based on empirical data measured over time for previous executions of the corresponding query execution mode for similar scale of queries.

Figure 25I:
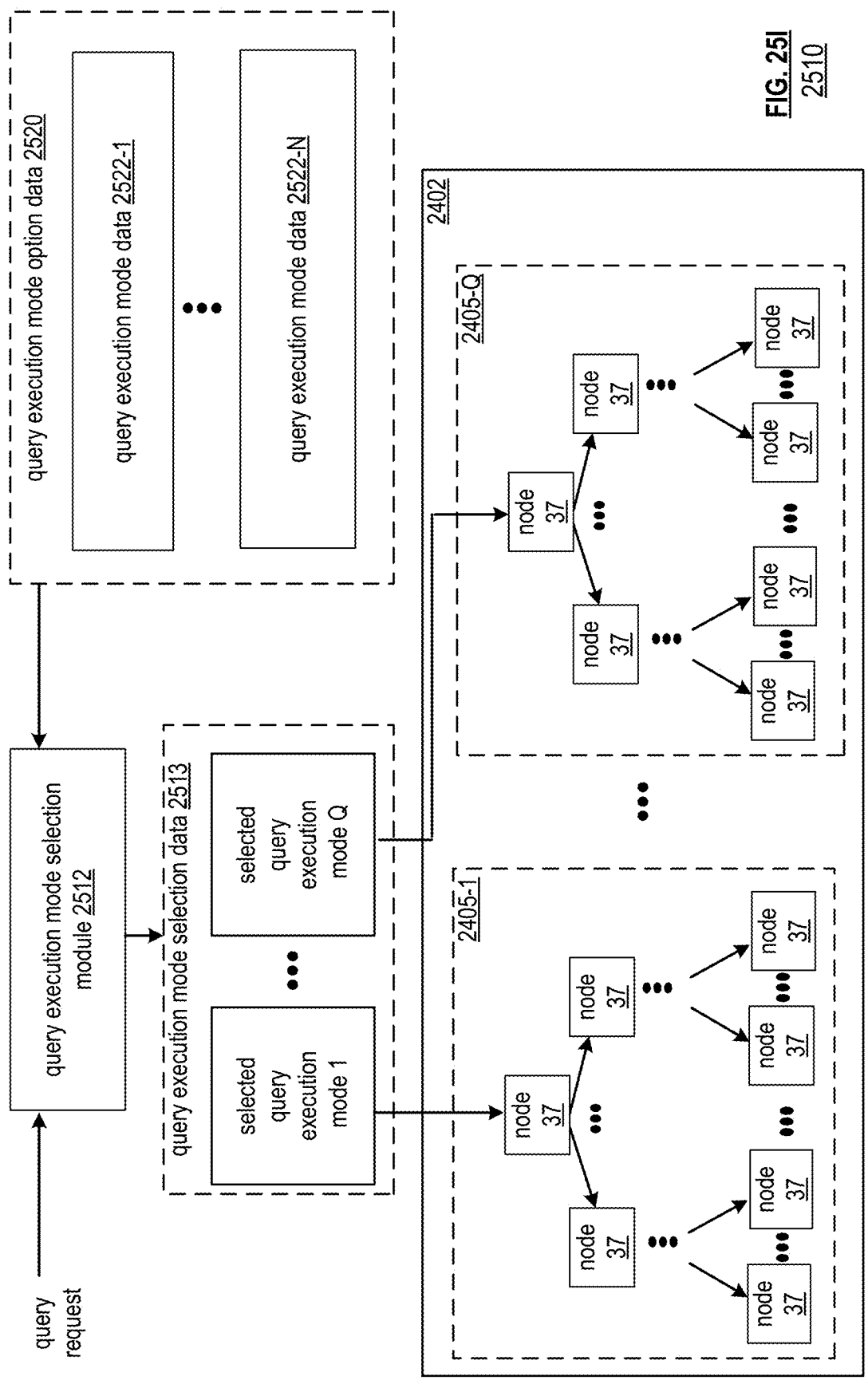
FIG. 25I is a schematic block diagrams an embodiments of a query processing system that implements a query execution mode selection module in accordance with various embodiments of the present invention.
Figure 25J:
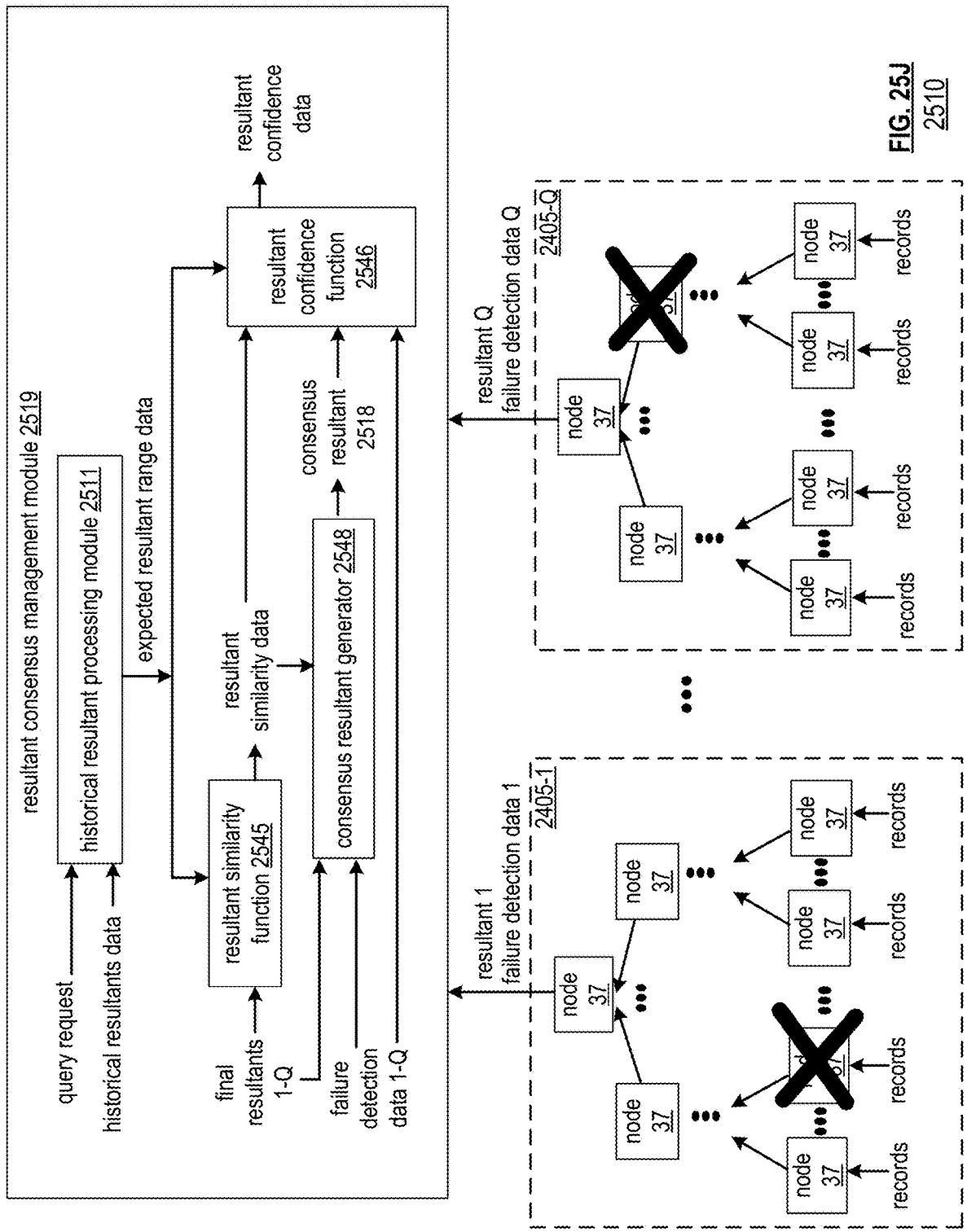
FIG. 25J is a schematic block diagram of a query processing system that implements a resultant consensus management module in accordance with various embodiments of the present invention.

FIGS. 25I and 25J illustrate embodiments of a query processing system 2510 that implement a query execution mode selection module 2512 that selects that the query be executed a plurality of times via the same or different query execution mode to generate a plurality of resultants. The final resultant for the query can then be dictated via a consensus of the plurality of resultants. This can further improve database systems by enabling the final resultant to have a higher probability of correctness and/or a lower expected amount of missing information, and/or can further improve database systems by reducing the total execution time when some or the plurality of executions are performed concurrently. Some or all features of the query processing system 2510 of FIGS. 25I and/or 25J can be utilized to implement the query processing system 2510 of FIG. 25A and/or any other embodiment of the query processing system 2510 discussed herein.

The query execution mode selection data 2513 can indicate a plurality of selected query execution modes 1-Q for a given query request. Some or all of the selected query execution modes 1-Q can correspond to a same query execution mode of the set of query execution mode options. Some or all of the selected query execution modes 1-Q can correspond to different query execution modes of the set of query execution mode options. For example, some modes can be selected due to having higher correctness probabilities and/or otherwise more favorable resultant correctness guarantee data 2534, while other modes can be selected due to having more favorable successful execution cost data 2536 to strike a desired balance between resultant correctness and execution cost.

Generating the query execution mode selection data 2513 can include selecting the value of Q. For example, Q is selected such that the aggregate execution time and/or aggregate resource consumption across all of the set of Q query execution modes does not exceed the execution cost requirement data 2555 of FIG. 25D, where Q cannot exceed a maximum value, for example dictated by the types of query execution modes in the selected set. As another example, resultant correctness of the consensus result can increase with the number of different resultants being evaluated to generate the consensus resultant. The value of Q can be selected such that the correctness probability value 2535 determined for the consensus resultant generated via the set of Q query execution modes meets the resultant correctness requirement data 2553 of FIG. 25D and/or such that the expected incorrectness level 2539 determined for the consensus resultant generated via the set of Q query execution modes' resultant correctness requirement data 2553 of FIG. 25D.

In some cases, the value of Q is set equal to and/or is determined based on the expected number of attempts 2594 of FIG. 25H that is calculated for of one or more types of query execution modes that are selected to be implemented, for example, such that one execution is expected to be included in the resulting set of Q resultants. This can be ideal in cases where each execution corresponds to a single execution attempt, for example, where resultants may not be generated and/or may correspond to resultants that don't meet desired criteria. In some cases, a binomial distribution can be determined from the execution success probabilities 2592 of one or more query execution modes to determine the probability that at least a threshold number of resultants meeting the corresponding execution success condition 2532 in embodiments where each of the selected executions and corresponding resultants corresponds to a single execution attempt.

In some embodiments, Q is selected such that the threshold minimum number of resultants meeting the corresponding execution success condition 2532 are expected to be met with at least a threshold probability. For example, a cumulative distribution function (CDF) for number of successes of a query execution mode can be generated and/or determined from the corresponding execution success probability 2592 calculated for this query execution mode as discussed in conjunction with FIG. 25H, for one or more of a set of possible values Q. The smallest value of Q that induces at least the threshold probability that at least the threshold number of executions of the total set of Q executions will meet the execution success condition 2532, as indicated by the CDF for this value of Q, can be selected. For example, if the execution success probability 2592 is equal to 0.5, the required threshold number of successful executions that meet the query condition is 4, and the required probability that at least these 4 successful executions be included in the set of Q execution attempts is 0.9, the value of Q is set to 12 because the probability that at least 4 successful executions be included in the set of 12 execution attempts is greater than 0.9, while the probability that at least 4 successful executions be included in a set of only 11 execution attempts is less than 0.9. The threshold probability and/or threshold value can be predetermined, can be set via user input, and/or can be determined automatically, for example, based on constraints induced by the execution cost requirement data 2555 that would induce a threshold maximum for the value of Q and/or otherwise prohibit Q from being too high.

In some cases, different possible combinations of the same or different number of Q query execution modes are included as options themselves in the query execution mode option data 2520. Alternatively or in addition, the resultant correctness guarantee data generator module 2580 and/or the successful execution cost data generator module 2590 are applied to one or more possible sets of Q query execution modes to generate correctness probability values 2535, expected incorrectness level 2539, expected total execution time 2537, and/or expected total resource consumption 2538 utilized to filter and/or score the options of execution that utilize a set of Q particular query execution modes to ultimately select which possible set of Q query execution modes is ultimately selected. This can be based on applying the correctness-based requirement filtering module 2556 of FIG. 25D to resultant correctness guarantee data 2534 generated for each set of Q options, based on applying the cost-based requirement filtering module 2558 of FIG. 25D to successful execution cost data 2536 generated for each set of Q options, and/or based on applying the selection score generating function 2561 to resultant correctness guarantee data 2534 and/or successful execution cost data 2536 generated for each set of Q options. In some cases, some of these sets of Q options include individual options of the query execution mode option data 2520, where Q is one. Different sets of options with different numbers Q can be evaluated in tandem to determine the selected value of Q and/or the final set of Q query execution modes that are included in query execution mode selection data 2513.

The selected set of query execution modes 1-Q indicated in query execution mode selection data 2513 can be implemented via a same and/or different query execution plan 2405 that includes identical sets of nodes 37, overlapping sets of nodes 37, and/or distinct sets of nodes 37. For example, query execution plan data 2540 of FIG. 25C is generated for each query execution modes 1-Q, where the resulting query execution plan data 2540 for each of the query execution modes 1-Q is communicated to the root node of a corresponding query execution plans 2405 of a set of corresponding execution plans 2405-1-2405-Q for downward propagation and/or is otherwise communicated to the set of nodes 37 of the corresponding query execution plans 2405. Some or all of the selected set of query execution modes 1-Q selected for a given query request are executed concurrently and/or are executed in overlapping time intervals. Alternatively, some or all of the selected set of query execution modes 1-Q in sequence on at a time, for example, if some or all of the same nodes 37 are utilized in the corresponding executions and/or if a large percentage of nodes 37 and/or resources of the database system are required to implement the corresponding query execution plan 2405 for a single one of the set of executions.

As illustrated in FIG. 25J, each of the set of Q executions can produce a resultant, for example, based on a mandated single attempted execution and/or after a series of attempts until the execution success condition 2532 is met for the each of the set of Q executions. In some cases, less that Q resultants are generated, for example, based on a mandated single execution attempt of each query execution 1-Q. In the corresponding query execution mode, where a single attempt of one or more query executions did not meet the execution success condition 2532 and thus a resultant was not generated for these executions. Note that various ones of the different executions 1-Q may have encountered some level of failure, where their query resultants are not guaranteed to be correct. However, determining similarities across different ones of the set of resultants, while accounting for different levels of failure encountered in the corresponding set of executions and/or while accounting for expectations for the true resultant based on similar, historical query executions, can be utilized to generate a consensus resultant for the query that is substantially correct, despite these failures.

The set of resultants 1-Q generated via the set of query execution plans 2405-1-2405-Q via execution of the given query can be sent to a resultant consensus management module 2519 of the query processing system 2510. The resultant consensus management module 2519 can generate a consensus resultant 2518 based on the set of resultants 1-Q via a consensus resultant generator 2548. The consensus resultant 2518 can be the resultant that is ultimately communicated to the end user and/or requesting entity associated with the query request and/or from whom the query request was received, for example, where the consensus result is transmitted to a client device associated with the requesting entity for display via a display device. In some cases, some or all of the raw resultants 1-Q are also communicated in conjunction with the consensus resultant 2518.

For example the consensus resultant generator 2548 can determine the mean, median, and/or mode of the set of resultants 1-Q and/or of one or more values indicated in the set of resultants 1-Q, where consensus resultant 2518 indicates and/or is determined based on the mean, median, and/or mode. In some cases, the resultant consensus management module 2519 determines an intersection of records indicated in sets of records for some or all resultants 1-Q, where the consensus resultant 2518 indicates only the records included in this intersection. In some cases, the resultant consensus management module 2519 determines a union of records indicated in sets of records for some or all resultants 1-Q, where the consensus resultant 2518 indicates all of the records included in this union. In particular, applying a union can be beneficial in some cases where different missing records 2427 of different executions 1-Q were intended to be in the true resultant, but were missing from at least one of the corresponding resultants 1-Q due to being included in missing records 2427 of the at least one of the corresponding resultants 1-Q.

In some cases, a resultant similarity function 2545 can be applied to generate resultant similarity data indicating subsets of resultants 1-Q that are similar by applying a clustering function, indicating outlier resultants in the set of resultants 1-Q, and/or otherwise indicating distribution information, clustered groupings and/or spread of the resultants 1-Q. This can be based on determining numbers of overlapping records in pairs and/or subsets of the set of resultants 1-Q, based on determining numbers of records included in different resultants being similar and/or matching for pairs and/or subsets of the set of resultants 1-Q, based on determining whether or not sets of records indicated in each of the set of resultants 1-Q match, based on determining difference in value, such as a value generated via an aggregation query operation, of one or more resultants, based on determining whether or not such values of one or more resultants match, and/or based on other similarity metrics.

The consensus resultant generator 2548 can further utilize the resultant similarity data in generating the consensus resultant data. For example, some of the resultants 1-Q can be filtered out and/or removed from consideration based on being outliers and/or based on being too different from most other resultants. As another example, a set of resultants in a same, large clustered grouping are considered, while other resultants are not considered. As another example, different ones of the set of resultants are weighted in generating the mean, mode, and/or median, and/or are otherwise weighed in their effect on the consensus resultant, where the weights are proportional to and/or based on a Euclidian distance and/or other distance function from a mean resultant across all resultants and/or a mean resultant within a particular clustered group of similar resultants. For example, the weights are higher, more favorable, and/or induce a greater effect on the final resultant for resultants that are most similar to most other resultants than for resultants that are less similar to most other resultants.

In some cases, a historical resultant processing module 2511 can be implemented by the resultant consensus management module 2519 to generate expected resultant range data indicating expected sets of records and/or values produced via aggregations that are expected to be in the true resultant for the query. This can be based on the query request, such as the query domain and/or the set of query operations included in the query. Historical resultant data generated previously for the same query operations and/or similar query operations upon the same set of record and/or similar set of records, such as a less recent version of the same table, can be utilized to determine this generate expected resultant range data. The resultant similarity function 2545 can generate the resultant similarity data further indicating and/or further based on how similar and/or dissimilar different resultants are from the expected resultant range data and/or whether or not each resultant falls outside a range of values and/or records indicated by the expected resultant range data. The consensus resultant generator 2548 can filter out and/or remove resultants from consideration that are dissimilar from the expected resultant range data by at least a threshold amount and/or that fall outside the expected resultant range data in generating the consensus resultant 2518. The consensus resultant generator 2548 can further generate the weights to be higher and/or more favorable for inducing greater effect on the consensus resultant for resultants that are more similar and/or fall within the expected resultant range data than resultants that are less similar and/or fall outside the expected resultant range data.

Failure detection data 1-Q can also be generated based on execution of the given query via the set of query execution plans 2405-1-2405-Q. For example, the failure detection data 1-Q can be based on metadata passing and/or checkpointing as indicated in the execution mode instruction data 2525 of the corresponding query execution mode. For example, each failure detection data can be based on the tracked failure detection data 3120 generated for each query execution 1-Q in accordance with the tracked failure detection of FIGS. 31A-31B. The failure detection data can indicate a number and/or percentage of failed nodes, a number and/or percentage of failed IO level nodes, and/or the number and/or percentage of missing information, such as the fraction of records in missing records 2427 relative to the aggregate number of records across all record sets 2455 required for the query. Such failure detection data generated in accordance with a query's execution via a query execution plan 2405 can be utilized in other embodiments discussed herein to determine whether the execution success condition 2532 was met and/or to determine whether re-execution is required.

The failure detection data can alternatively and/or additionally indicate and/or be based predicted level of failure when actual failure data is not detected and/or guaranteed. The failure detection data can indicate and/or be based on the correctness probability value 2535 and/or the expected incorrectness level 2539 of the corresponding query execution mode that was applied for the corresponding execution. These values can be further be based on query-based requirements 2565 induced by the given query and/or system operating parameters 2570 of the current system conditions, measured performance, and/or node conditions of the set of nodes utilized to implement the corresponding query execution plan 2405. For example, the correctness probability value 2535 and/or expected incorrectness level 2539 are retroactively computed as discussed in conjunction with FIG. 25G and/or are otherwise determined for the execution of the given query to determine expected levels of failure for execution of the given query, under the current system conditions, and/or under the given query execution mode.

The set of failure detection data 1-Q generated via the set of query execution plans 2405-1-2405-Q via execution of the given query can also be sent to and/or can be determined by the resultant consensus management module 2519, for example, in conjunction with receiving the resultants 1-Q. The consensus resultant generator 2548 can further utilize the set of failure detection data 1-Q to generate the consensus resultant 2518. For example, resultants generated with higher rates of actual and/or predicted node failure and/or missing information are filtered out and/or removed from consideration in generating the consensus resultant 2518. As another example, different ones of the set of resultants are weighted in generating the mean, mode, and/or median, and/or are otherwise weighed in their effect on the consensus resultant, where the weights are inversely proportional to and/or otherwise based on the rates of actual and/or predicted node failure and/or missing information indicated in the failure detection data for each corresponding execution. For example, the weights are higher, more favorable, and/or induce a greater effect on the final resultant for resultants with less predicted and/or detected failure levels than for resultants with less predicted and/or detected failure levels. The weighing and/or other effects induced by the failure detection data can be applied in tandem with the weighing and/or other effects induced by the similarity data.

In some cases, a resultant confidence function 2546 can be implemented by the resultant consensus management module 2519 to generate resultant confidence data indicating a level of confidence and/or probability that the consensus resultant is equivalent to the true resultant of the query. The resultant confidence data can further indicate distribution data, such potential level of variation in number of records in the set of records of the consensus resultant from the true resultant and/or potential level of variation of a value produced via an aggregation operation of the query indicated in the consensus resultant from the true resultant, such as confidence interval data indicating the range of such levels of variation at a given probability.

The resultant confidence data can be based on the correctness probability value 2535 and/or expected incorrectness level 2539 of the selected query execution modes that were utilized one or more of the set of resultants 1-Q that match the consensus resultant and/or were utilized to generate the consensus resultant. For example, if one or more query execution modes with more favorable correctness probability value 2535 and/or expected incorrectness level 2539 were utilized to generate the consensus resultant, the resultant confidence data can be more favorable than if query execution modes with less favorable correctness probability value 2535 and/or expected incorrectness level 2539 were utilized to generate the consensus resultant.

The resultant confidence data can be based on the expected resultant range data, the resultant similarity data, the failure detection data 1-Q, and/or the consensus resultant itself. For example, the resultant confidence data can indicate higher levels of confidence and/or otherwise be more favorable in cases where the consensus resultant is more similar to and/or falls within the expected resultant range data than cases where the consensus resultant is less similar to and/or falls outside the expected resultant range data. As another example, the resultant confidence data can indicate higher levels of confidence and/or otherwise be more favorable in cases where the resultant similarity data indicates many matching resultants and/or many very similar resultants than cases where the resultant similarity data indicates fewer and/or no matching resultants and/or less very similar resultants. As another example, the resultant confidence data can indicate higher levels of confidence and/or otherwise be more favorable in cases where the failure detection data 1-Q indicates lower levels of failure and/or is otherwise more favorable for one or more resultants utilized to generate the consensus resultant than cases where the failure detection data 1-Q indicates higher levels of failure and/or is otherwise less favorable for one or more resultants utilized to generate the consensus resultant. As another example, the resultant confidence data can indicate higher levels of confidence and/or otherwise be more favorable in cases where consensus resultant matches a higher number of the received resultants 1-Q than cases where the consensus resultant matches a lower number of the received resultants 1-Q.

The resultant confidence data can be communicated to the requesting entity in conjunction with the consensus resultant 2518, for example, where the resultant confidence data is sent to and displayed via the display device of a client device of the requesting entity. This can be useful in enabling the end user to assess whether the consensus resultant is sufficient and/or can aid the end user in determining the level of trust they should place in the consensus resultant. The failure detection data 1-Q and/or resultant similarity data can alternatively or additionally be communicated and/or displayed to the end user via a display device of the client device to provide more detailed information regarding successful execution of the query and/or level of variation in different resultants.

In some cases, the resultant confidence data can dictate that the consensus resultant is not sufficient, and further executions of the query are required. For example, a minimum resultant confidence threshold, such as a minimum probability value that the consensus resultant is equivalent to the true resultant, can be applied. The query execution mode selection module 2512 can be automatically be instructed to select one or more additional query execution modes for execution of the query in response to the resultant confidence data comparing unfavorably to the minimum resultant confidence threshold, For example, one or more query execution modes with more favorable resultant correctness guarantee data 2534 can be selected in this iteration based on the prior iteration resulting in an insufficient consensus resultant. In such cases, new resultants are generated via the additional query executions dictated by the newly selected one or more query execution modes for the query. These new resultants can then be utilized by the consensus resultant management module instead of or in addition to the original set of query executions 1-Q. Additional query executions can be deemed necessary over time until a consensus resultant with corresponding resultant confidence data that compares favorably to the minimum resultant confidence threshold is ultimately generated.

Figure 25K:
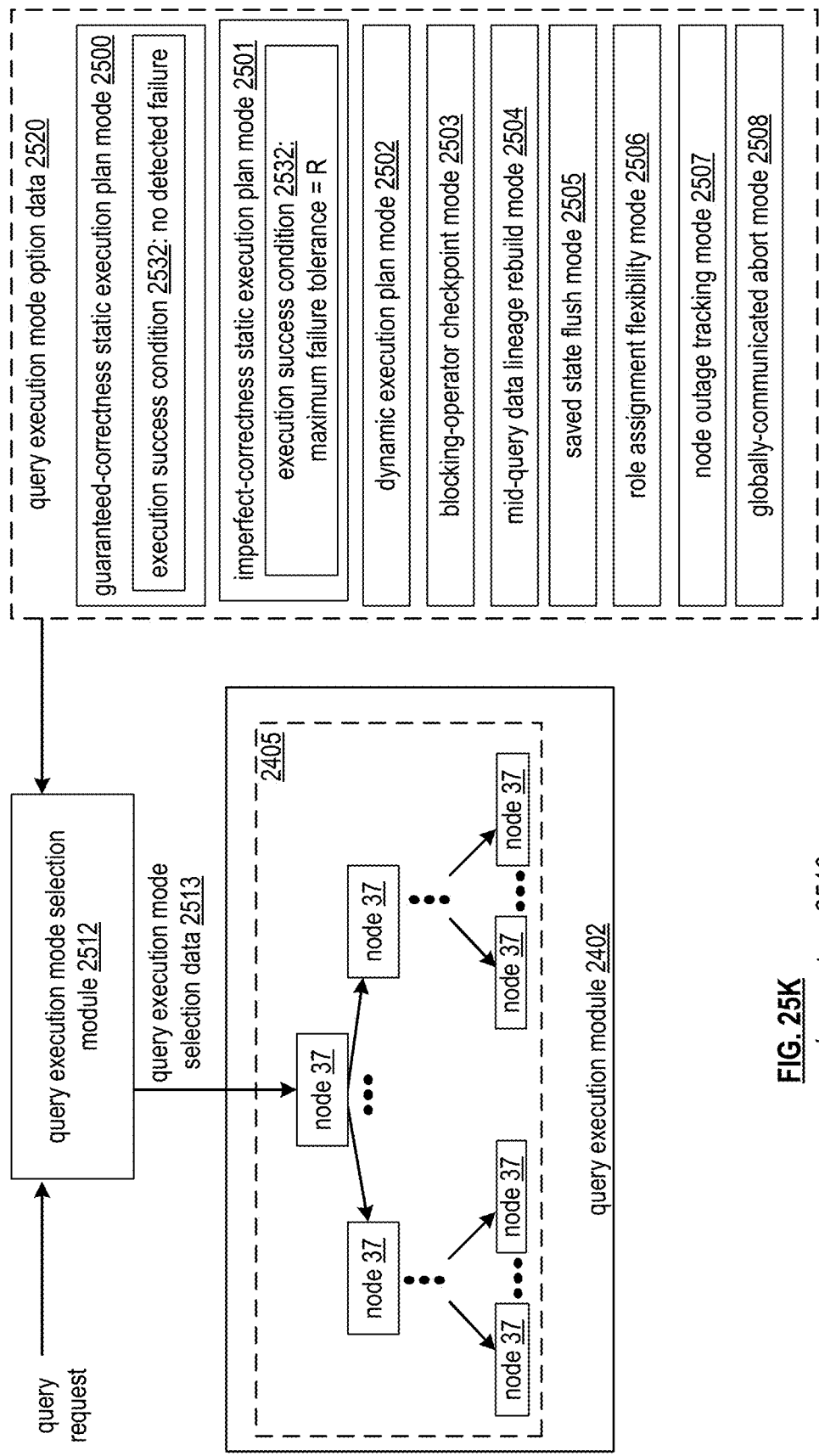
FIG. 25K is a schematic block diagrams an embodiments of a query processing system that implements a query execution mode selection module in accordance with various embodiments of the present invention.

FIG. 25K illustrates another embodiment of the query processing system 2510. Some or all features of the query processing system 2510 can be utilized to implement the query processing system 2510 of FIG. 25A and/or any other embodiment of the query processing system 2510 discussed herein.

As illustrated in FIG. 25K, the query execution mode option data 2520 can include query execution mode data 2522 corresponding to at least one of: a guaranteed-correctness static execution plan mode 2500; an imperfect-correctness static execution plan mode 2501; a dynamic execution plan mode 2502; a blocking-operator checkpoint mode 2503; a mid-query data lineage rebuild mode 2504; a saved state flush mode 2505; a role assignment flexibility mode 2506; a node outage tracking mode 2507; and/or a globally-communicated abort mode 2508.

The query execution mode selection data 2513 generated by the query execution mode selection module 2512 can indicate a selected one of these indicated options 2500-2508, and different incoming queries can have query execution mode selection data 2513 indicating different selected ones of these indicated options 2500-2508. Additional execution mode options not depicted in FIG. 25K can alternatively or additionally can be included in the set of execution mode options from which the selected execution mode of query execution mode selection data 2513 is selected. Some or all of these modes can have configurable parameters that can be selected by the query execution mode selection module 2512 in generating the query execution mode selection data 2513. Some query execution mode selection data 2513 can include multiple ones of these indicated options 2500-2508 as illustrated in FIG. 25I.

One or more of these query execution mode options 2500-2508 can have multiple renditions included in query execution mode option data 2520, for example, with different corresponding parameters such as different execution success conditions 2532. One or more additional modes can include some or all features of multiple ones of the set of query execution mode options 2500-2508, where these one or more additional modes are also indicated in the query execution mode option data 2520.

Some or all of these indicated options 2500-2508 can have corresponding query execution mode option data 2520 that is received, predetermined, configured, generated, calculated, and/or otherwise determined as discussed previously. In particular, query execution mode option data 2520 for some or all of these indicated options 2500-2508 can include: execution mode instruction data 2525 such as execution success condition 2532, checkpointing instructions 2526, metadata passing instructions 2527, and/or other instructions regarding execution of the corresponding mode; resultant correctness guarantee data 2534 such as correctness probability value 2535 and/or expected incorrectness level 2539; successful execution cost data 2536 such as expected total execution time 2537 and/or expected total resource consumption 2538; and/or other information that is received, predetermined, configured, generated, calculated, and/or otherwise determined, for example, in accordance with one or more other embodiments of the query processing system 2510 discussed in conjunction with FIGS. 25A-25J.

The guaranteed-correctness static execution plan mode 2500 can correspond to the guaranteed-correctness query execution mode discussed previously in conjunction with FIG. 24E, where the execution success condition 2532 requires no node failures were detected and/or otherwise occurred. This execution success condition 2532 can correspond to a success condition requiring that every node receive all required input data blocks, requires that every node process all required input data blocks to generate output blocks, and that every node sends all required output blocks to a next node in the query execution plan 2405 as discussed previously. The resultant correctness guarantee data 2534 of the guaranteed-correctness static execution plan mode 2500 can such indicate that the resultant is guaranteed to be correct. For example, the guaranteed-correctness static execution plan mode 2500 can have a correctness probability value of 1 and/or an expected incorrectness level value of 0. The successful execution cost data 2536 such as expected total execution time 2537 and/or expected total resource consumption 2538 can be determined as a function of query-based requirements 2565 such as query scale and/or system operating parameters 2570 as discussed previously.

The imperfect-correctness static execution plan mode 2501 can be implemented with a fixed and/or configurable maximum failure tolerance R. For example, the execution success condition 2532 can indicate a maximum number of node failures that is greater than zero and/or a maximum number of missing records that is greater than zero. This embodiment can correspond to renditions of the query execution plan 2405 of the guaranteed-correctness static execution plan mode 2500, where there is an acceptable level of failure for the query to succeed rather than requirement for the query to be re-executed in the case of any failure. Multiple renditions of the imperfect-correctness static execution plan mode 2501 can be included as options with different corresponding maximum failure tolerances.

Resultant correctness guarantee data 2534 for an imperfect-correctness static execution plan mode 2501 can indicate that correctness is not guaranteed, where correctness probability value 2535 is less than 1 and/or where expected incorrectness level 2539 is greater than zero, and where the correctness probability value 2535 and/or expected incorrectness level 2539 are a function of R or otherwise a function of the execution success condition 2532. The successful execution cost data 2536 for the imperfect-correctness static execution plan mode 2501 such as expected total execution time 2537 and/or expected total resource consumption 2538 can be determined as a function of: the execution success condition 2532 such as the value of R; query-based requirements 2565 such as query scale; and/or system operating parameters 2570 as discussed previously. The successful execution cost data 2536 for the imperfect-correctness static execution plan mode 2501 can be more favorable than successful execution cost data 2536 for the guaranteed-correctness static execution plan mode 2500 based on a non-zero level of failure tolerated and/or based on a lower number of execution attempts being expected to be required based on the non-zero level of failure tolerated.

Figure 26A:
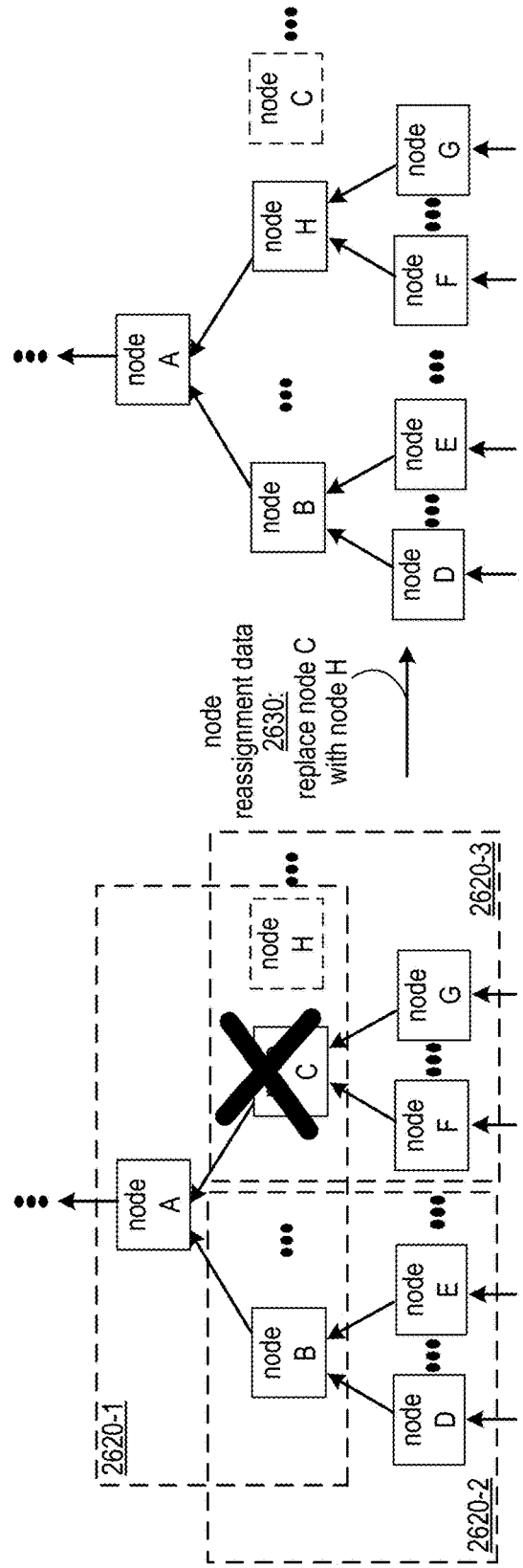
FIGS. 26A-26C are schematic block diagrams of embodiments of a query execution module that implement a node assignment module in accordance with various embodiments of the present invention.
Figure 26B:
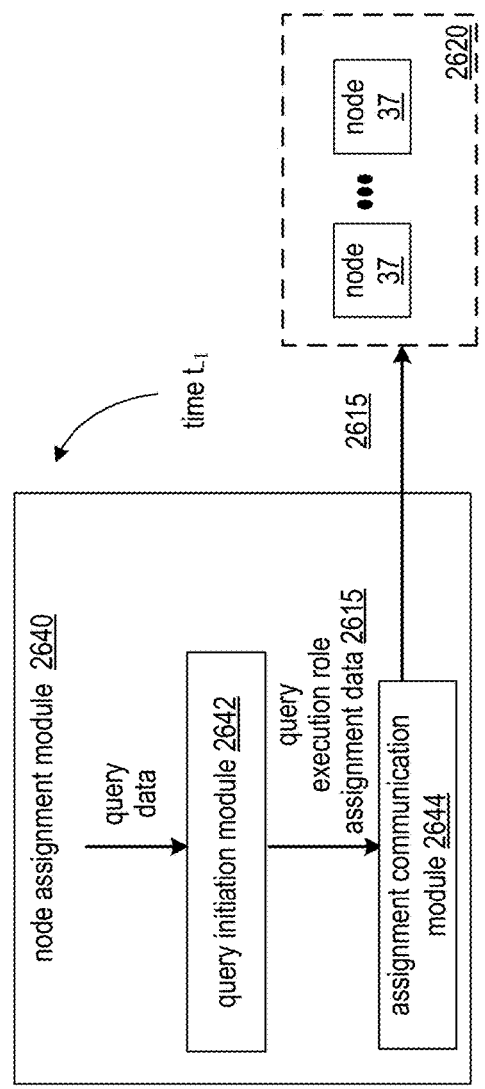
Figure 26C:
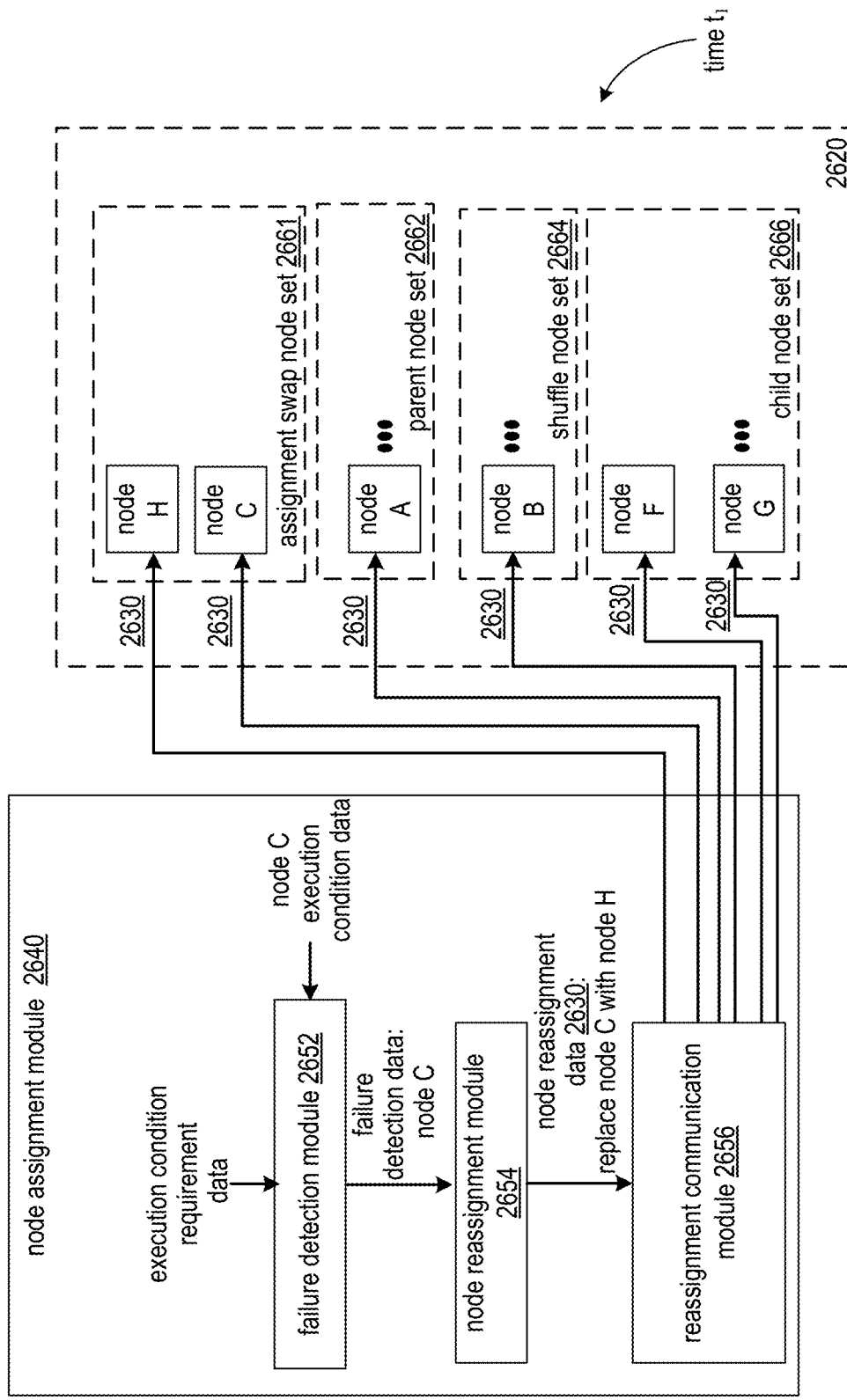

The dynamic execution plan mode 2502 can be implemented as discussed in conjunction with FIGS. 26A-26C, where selection of the dynamic execution plan mode 2502 in query execution mode selection data 2513 causes the query to be executed in accordance with some or all features discussed in conjunction with implementation of the dynamic execution plan mode 2502 for query execution as discussed in conjunction with FIGS. 26A-26C, The blocking-operator checkpoint mode 2503 can be implemented as discussed in conjunction with FIGS. 27A-27F, where selection of the blocking-operator checkpoint mode 2503 in query execution mode selection data 2513 causes the query to be executed in accordance with some or all features discussed in conjunction with implementation of the blocking-operator checkpoint mode 2503 for query execution as discussed in conjunction with FIGS. 27A-27F.

The mid-query lineage rebuild mode 2504 can be implemented as discussed in conjunction with FIGS. 28A-28D, where selection of the mid-query lineage rebuild mode 2504 in query execution mode selection data 2513 causes the query to be executed in accordance with some or all features discussed in conjunction with implementation of the mid-query lineage rebuild mode 2504 for query execution as discussed in conjunction with FIGS. 28A-29D.

The saved state flush mode 2505 can be implemented as discussed in conjunction with FIGS. 29A-29D, where selection of the saved state flush mode 2505 in query execution mode selection data 2513 causes the query to be executed in accordance with some or all features discussed in conjunction with implementation of the saved state flush mode 2505 for query execution as discussed in conjunction with FIGS. 29A-29D.

Figure 30A:
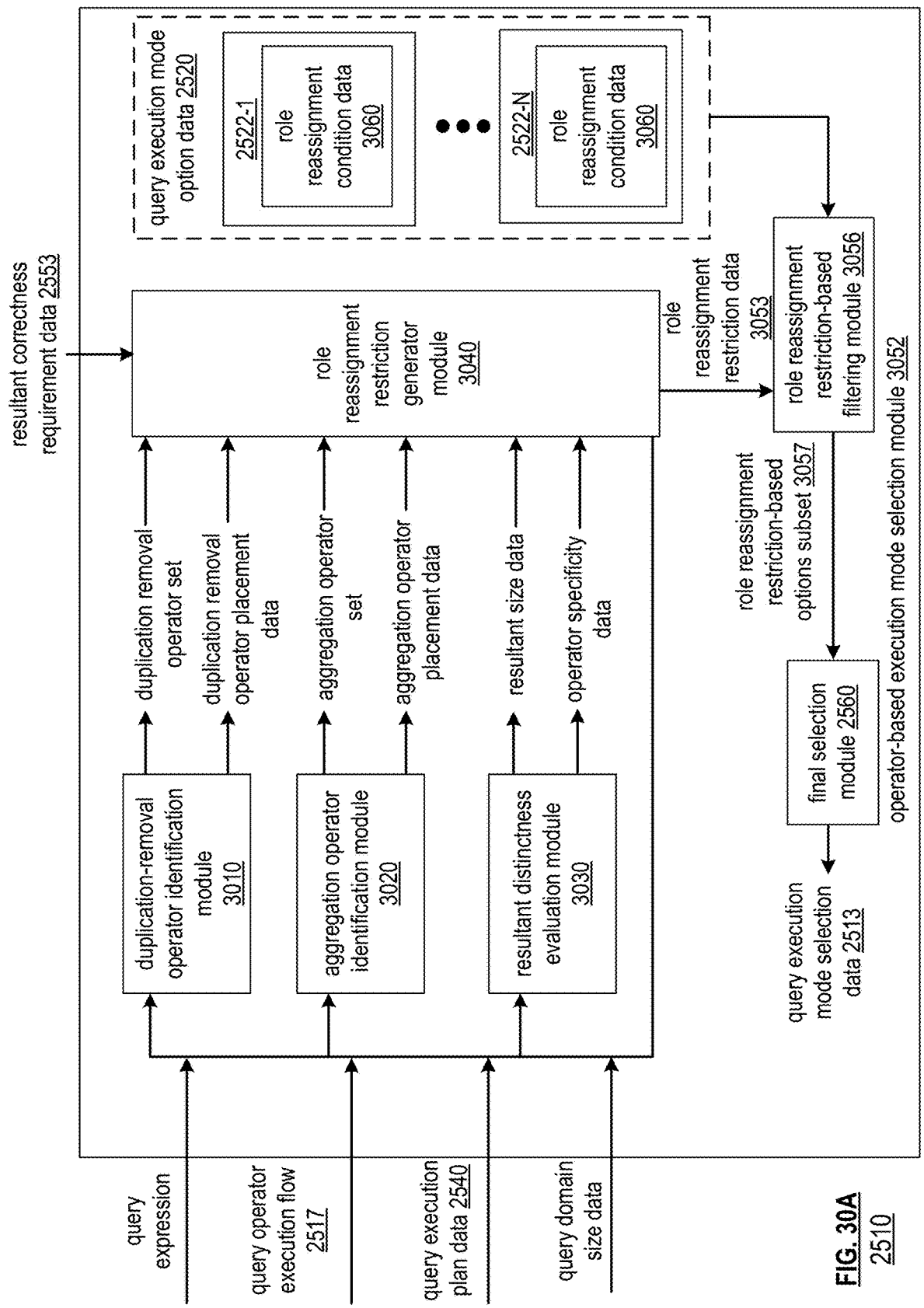
FIG. 30A is a schematic block diagram of an embodiment of a query processing system that implements an operator-based execution mode selection mode in accordance with various embodiments of the present invention.
Figure 30B:
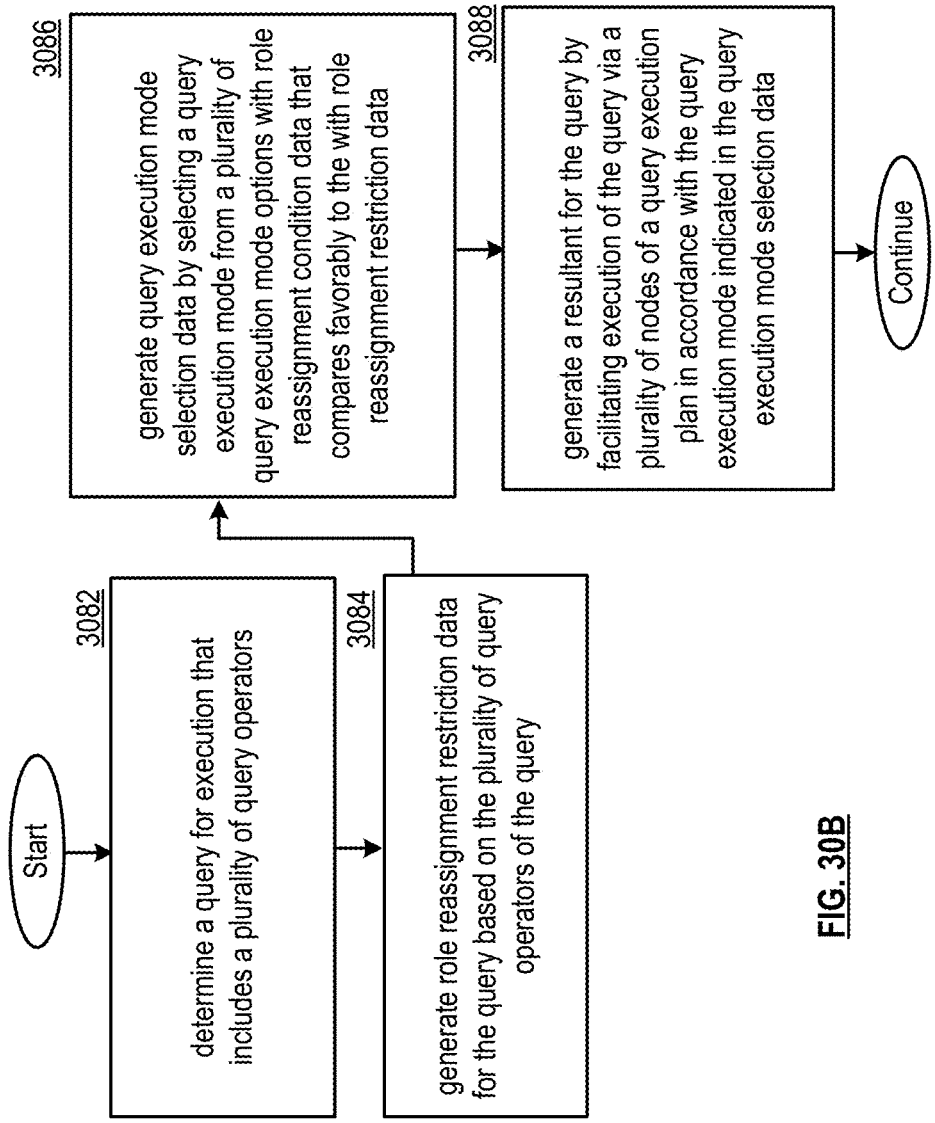
FIG. 30B is a logic diagram illustrating a method of selecting a query execution mode for execution of a query based on operators of the query in accordance with various embodiments of the present invention.

The role assignment flexibility mode 2506 can be implemented as discussed in conjunction with FIGS. 30A-30B, where selection of the role assignment flexibility mode 2506 in query execution mode selection data 2513 causes the query to be executed in accordance with some or all features discussed in conjunction with implementation of the role assignment flexibility mode 2506 for query execution as discussed in conjunction with FIGS. 30A-30B.

Figure 31A:
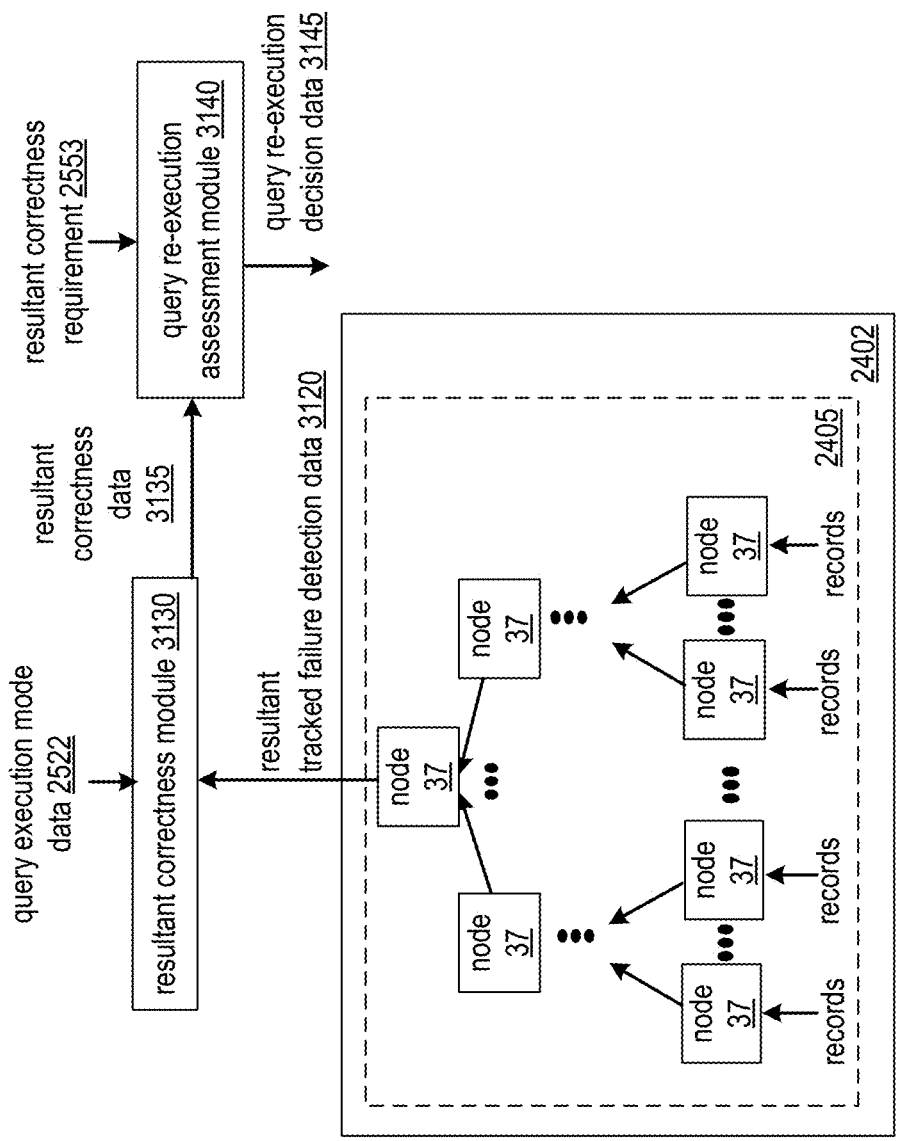
FIG. 31A is a schematic block diagrams of an embodiment of a query processing system that generates resultant correctness data for resultants generated via query execution in accordance with various embodiments of the present invention.
Figure 31B:
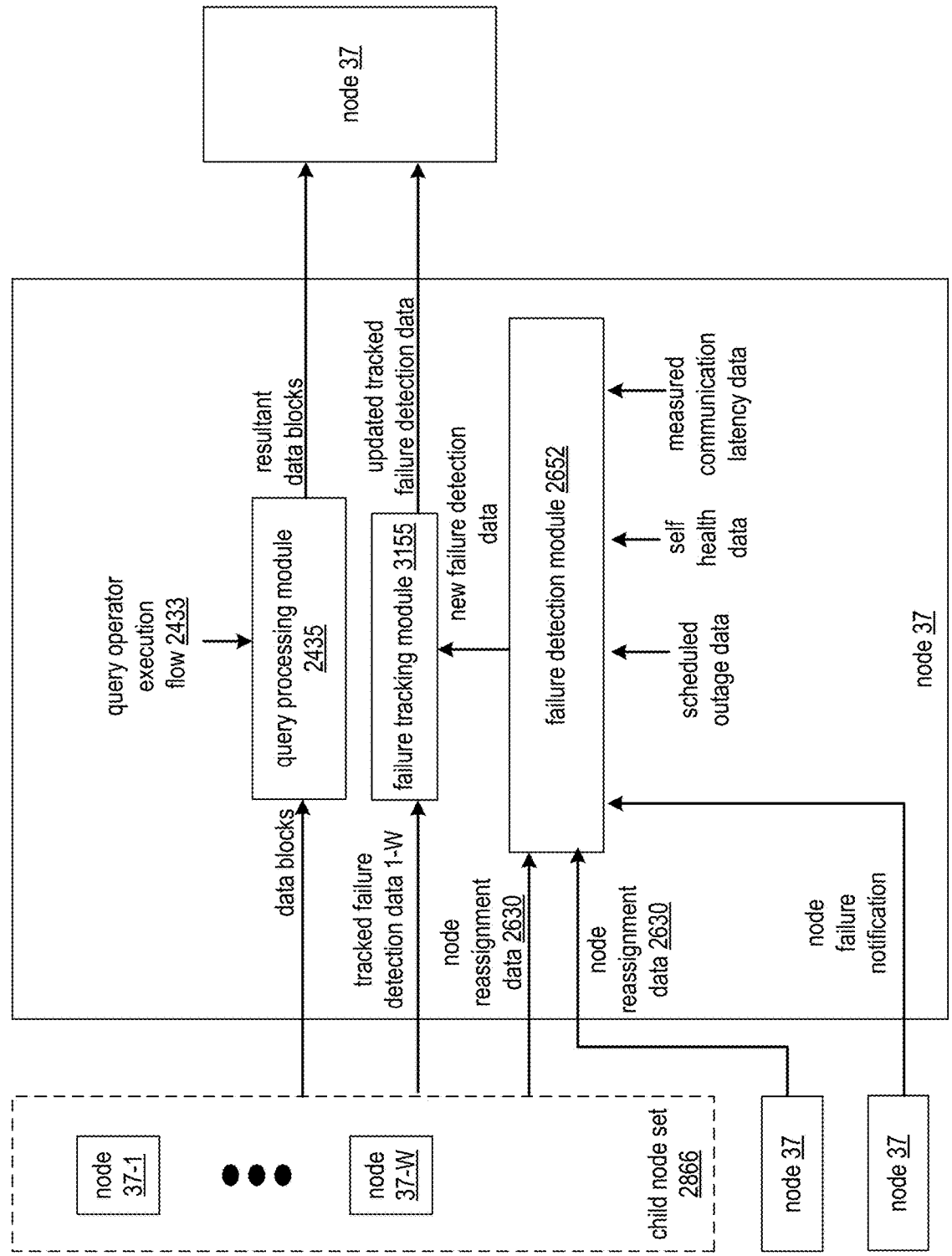
FIG. 31B is a schematic block diagrams of an embodiment of a node that implements a failure tracking module in accordance with various embodiments of the present invention.
Figure 31C:
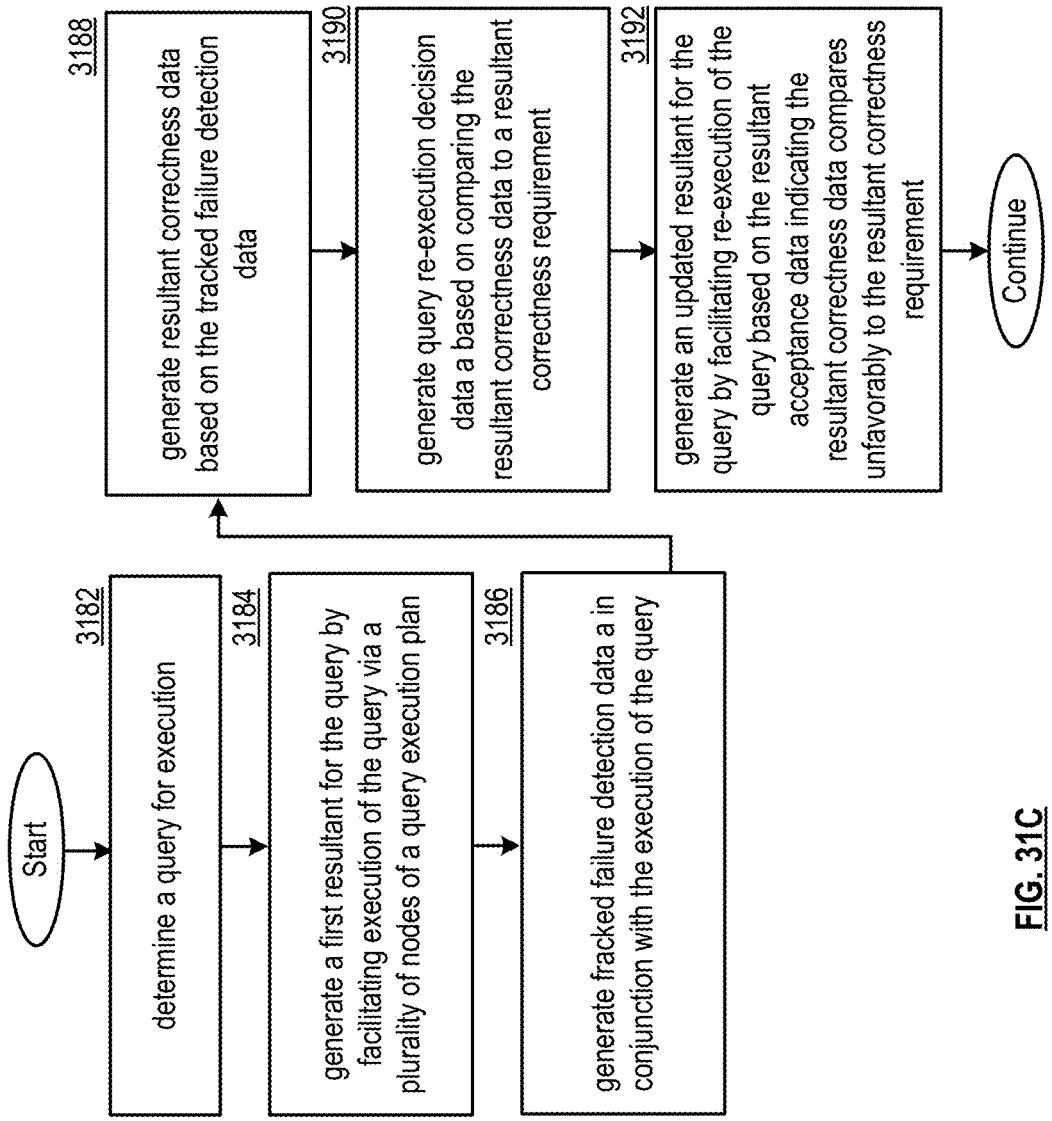
FIG. 31C is a logic diagram illustrating a method of tracking failure detection data during execution of a query in accordance with various embodiments of the present invention.

The node outage tracking mode 2507 can be implemented as discussed in conjunction with FIGS. 31A-31C, where selection of the node outage tracking mode 2507 in query execution mode selection data 2513 causes the query to be executed in accordance with some or all features discussed in conjunction with implementation of the node outage tracking mode 2507 for query execution as discussed in conjunction with FIGS. 31A-31C.

The globally-communicated abort mode 2508 can be implemented as discussed in conjunction with FIGS. 32A-32G, where selection of the globally-communicated abort mode 2508 in query execution mode selection data 2513 causes the query to be executed in accordance with some or all features discussed in conjunction with implementation of the globally-communicated abort mode 2508 for query execution as discussed in conjunction with FIGS. 32A-32G.

In various embodiments, a query processing module 2510 includes at least one processor and memory that stores operational instructions that, when executed by the at least one processor, cause the query processing module 2510 to execute some or all of the functionality described herein, for example, in conjunction with FIGS. 25A-25K. In particular, the operational instructions that, when executed by the at least one processor, can cause the query processing module 2510 to receive a first query request that indicates a first query for execution by a database system. A plurality of query execution mode options for execution of the first query via the database system can be determined, for example, as query execution mode option data 2520. A plurality of execution success conditions corresponding to the plurality of query execution mode options can be determined, for example as execution success conditions 2532. A plurality of resultant correctness guarantee data corresponding to the plurality of query execution mode options based on the plurality of execution success conditions can be generated, for example, as resultant correctness guarantee data 2534. Resultant correctness requirement data can be determined, for example, as resultant correctness requirement data 2553. Query execution mode selection data, such as query execution mode selection data 2513, can be generated by selecting a first selected query execution mode from the plurality of query execution mode options based on resultant correctness guarantee data corresponding to the first selected execution mode comparing favorably to the resultant correctness requirement data. A resultant for the first query can be generated by facilitating execution of the first query in accordance with the first selected execution mode, for example where a plurality of nodes 37 of a corresponding query execution plan 2405 execute the first query in accordance with the first selected execution mode to generate the resultant.

Figure 25L:
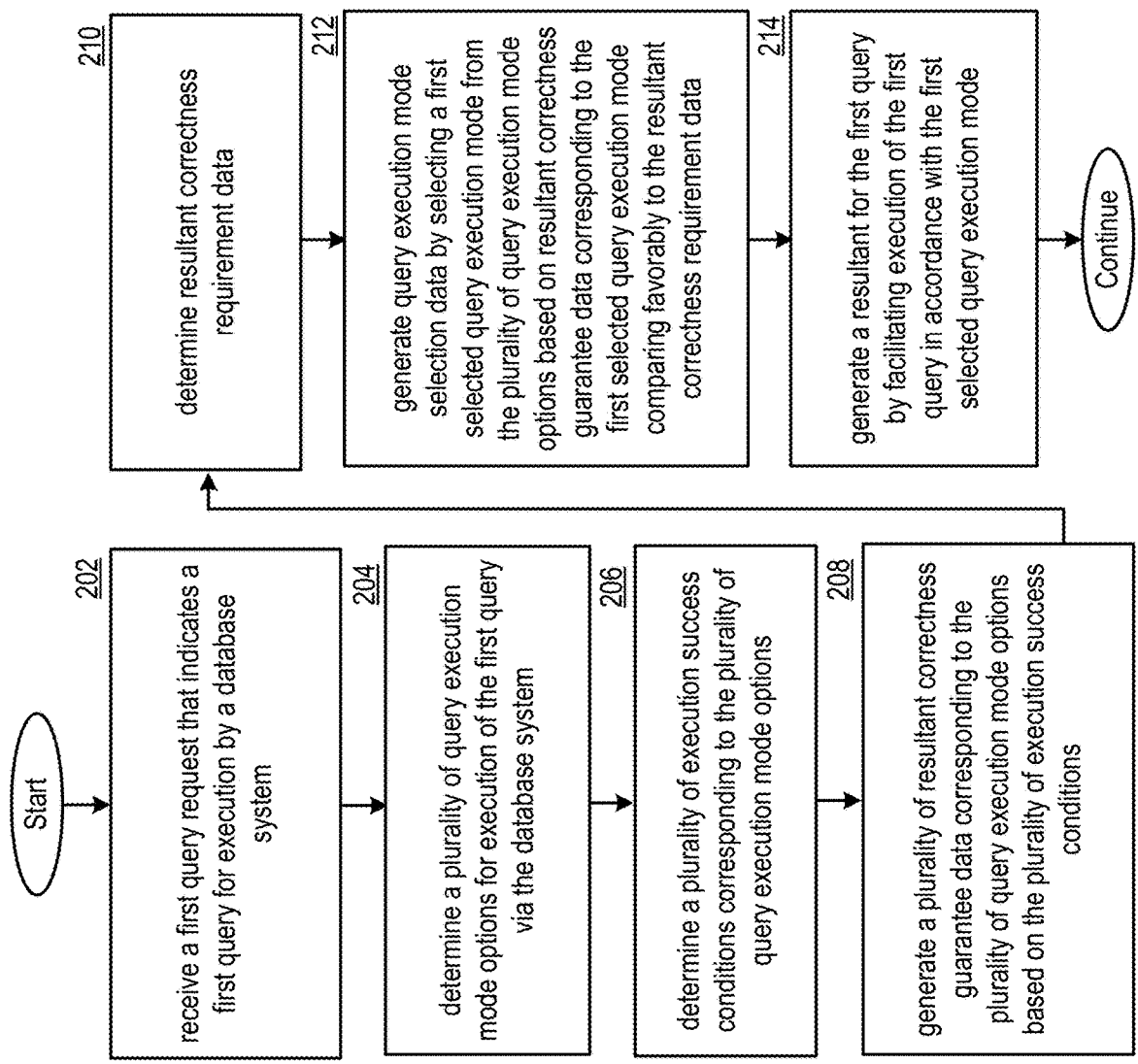
FIG. 25L is a logic diagram illustrating a method of selecting a query execution mode for execution of a query in accordance with various embodiments of the present invention.

FIG. 25L illustrates a method for execution by at least one processing module of a query processing module 2510. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 25L. Some or all of the method of FIG. 25L can otherwise be performed by the query processing module 2510, for example, by utilizing at least one processor and memory of the query processing module 2510 to implement the query execution module 2402, the query execution mode selection module 2512, the operator flow generator module 2514, the execution plan generating module 2516, the resultant correctness guarantee data generator module 2580, the successful execution cost data generator module 2590, and/or the resultant consensus management module 2519. Some or all of the steps of FIG. 25L can optionally be performed by any other processing module of the database system 10. Some or all of the steps of FIG. 25L can be performed to implement some or all of the functionality of the query processing system 2510 described in conjunction with FIGS. 25A-25K. Some or all steps of FIG. 25L can be performed by database system 10 in accordance with other embodiments of the query processing system 2510 discussed herein.

Step 202 includes receiving and/or otherwise determining a first query request that indicates a first query for execution by a database system, for example, where the first query request is received from a client device that generated the query and/or that is associated with a requesting entity. Step 204 includes determining a plurality of query execution mode options for execution of the first query via the database system, for example, as query execution mode option data 2520. Step 206 includes determining a plurality of execution success conditions, such as execution success conditions 2532, corresponding to the plurality of query execution mode options. Step 208 includes generating a plurality of resultant correctness guarantee data, such as resultant correctness guarantee data 2534, corresponding to the plurality of query execution mode options based on the plurality of execution success conditions, for example, by utilizing the resultant correctness guarantee data generator module 2580. Step 210 includes determining resultant correctness requirement data, such as resultant correctness requirement data 2553. Step 212 includes generating query execution mode selection data, such as query execution mode selection data 2513, by selecting a first selected query execution mode from the plurality of query execution mode options based on resultant correctness guarantee data corresponding to the first selected query execution mode comparing favorably to the resultant correctness requirement data, for example, by utilizing query operation mode selection module 2512. Step 214 includes generating a resultant for the first query by facilitating execution of the first query in accordance with the first selected query execution mode, for example, where a plurality of nodes 37 of a corresponding query execution plan 2405 execute the first query in accordance with the first selected execution mode to generate the resultant. The resultant can be transmitted to a client device, for example, for display via a display device and/or can be otherwise communicated with the requesting entity.

In various embodiments, the resultant correctness requirement data is determined for the first query based on the first query request. The method can further include receiving a second query request that indicates a second query for execution by the database system and determining second resultant correctness requirement data for the second query, based on the second query request, that is stricter than the resultant correctness requirement data. The method can further include generating second query execution mode selection data by selecting a second selected query execution mode from the plurality of query execution mode options based on second resultant correctness guarantee data corresponding to the second selected query execution mode comparing favorably to the second resultant correctness requirement data and based on resultant correctness guarantee data corresponding to the first selected query execution mode comparing unfavorably to the second resultant correctness requirement data. The method can further include generating a second resultant for the second query by facilitating execution of the second query in accordance with the second selected query execution mode.

In various embodiments, the method further includes determining first scale requirements based on the first query request, such as query-based requirements 2565. The first scale requirements indicate and/or be utilized to determine a required number of nodes for a query execution plan for execution the first query, a required number of levels of the query execution plan for execution of the first query, a required number of nodes required for each of the required number of levels, and/or a required number of records for access in execution of the first query via the query execution plan. The resultant correctness guarantee data is generated as a function of the required number of nodes for a query execution plan for execution the first query, the required number of levels of a query execution plan for execution of the first query, the required number of nodes required for each of the required number of levels, and/or the required number of records for access in execution of the first query indicated by the first scale requirements. Facilitating execution of the first query in accordance with the first selected query execution mode includes at least one of: facilitating implementation of the query execution plan with required number of nodes to execute the first query, facilitating implementation the query execution plan with required number of levels to execute the first query; facilitating implementation the query execution plan with required number of nodes for each of the required number of levels to execute the first query or facilitating implementation the query execution plan to access the required number of records to execute the first query.

In various embodiments, the method includes determining system operating parameters such as system operating parameters 2570. The system operating parameters can indicate node communication latency data, node failure rate, and/or node outage scheduling data. The resultant correctness guarantee data is generated as a function of the node communication latency data, the node failure rate, and/or the node outage scheduling data of the system operating parameters.

In various embodiments, the resultant correctness guarantee data corresponding to each of the plurality of query execution mode options includes and/or otherwise indicates a correctness probability value, such as correctness probability value 2535, indicating a probability that the resultant produced via execution of the first query in accordance with the each of the plurality of query execution mode options will be equivalent to a true resultant for the first query. The resultant correctness requirement data indicates a minimum correctness probability threshold requirement, and the first selected query execution mode is selected based on having a correctness probability value of its corresponding resultant correctness guarantee data that meets, exceeds, and/or otherwise compares favorably to the minimum correctness probability threshold requirement.

In various embodiments, generating the resultant correctness guarantee data corresponding to each of the plurality of query execution mode options includes calculating the correctness probability value as a conditional probability that the resultant produced via an execution attempt of the first query the each of the plurality of query execution mode options will be equivalent to the true resultant for the first query, given that the execution attempt compares favorably to the execution success conditions corresponding to the each of the plurality of query execution mode options. For example, the correctness probability value is calculated by utilizing the resultant correctness probability function 2573. Facilitating execution of the first query in accordance with the first selected query execution mode can include performing a plurality of execution attempts until a final execution attempt of the plurality of execution attempts compares favorably to the execution success conditions corresponding to first selected query execution mode.

In various embodiments, the resultant correctness guarantee data corresponding to each of the plurality of query execution mode options includes an expected incorrectness level indicating a percentage of records that are expected to be missing from representation in producing the resultant. The resultant correctness requirement data can indicate a maximum expected incorrectness level threshold requirement, and the first selected query execution mode can be selected based on having expected incorrectness level of its corresponding resultant correctness guarantee data that compares favorably to the maximum expected incorrectness level threshold requirement.

In various embodiments, the method includes generating a plurality of successful execution cost data corresponding to the plurality of query execution mode options, such as successful execution cost data 2536. The method can further include determining successful execution cost requirement data, such as execution cost requirement data 2555. Selection of the first selected query execution mode from the plurality of query execution mode options can be further based on successful execution cost data corresponding to the first selected query execution mode comparing favorably to the successful execution cost requirement data. In various embodiments, the successful execution cost data corresponding to each of the plurality of query execution mode options includes an expected total execution time for execution of the first query in accordance with the each of the plurality of query execution mode options and/or an expected total resource consumption for the each of the plurality of query execution mode options.

In various embodiments, the method includes generating a plurality of execution success probabilities corresponding to the plurality of query execution mode options based on the plurality of execution success conditions, for example, by implementing execution attempt success probability function 2591. The method can further include calculating a plurality of expected number of attempts corresponding to the plurality of query execution mode options based on the plurality of execution success probabilities, for example, by utilizing expected number of attempts until success determination function 2593. Each of the expected number of attempts can calculated as a function of a corresponding one of the plurality of execution success probabilities in accordance with a geometric distribution. The expected total execution time and/or the expected total resource consumption of each of the plurality of successful execution cost data can be generated as a function of a corresponding one of the plurality of expected number of attempts for a corresponding one of the plurality of query execution mode options. The expected total execution time and/or the expected total resource consumption of each of the plurality of successful execution cost data can be generated as a function of an execution time per attempt and/or resource cost per attempt, for example, determined based on system operating parameters 2570 and/or based on the first scale requirements determined based on the first query request.

In various embodiments, the method includes determining the first scale requirements based on the first query request. The successful execution cost data can be generated as a function the required number of nodes for a query execution plan for execution the first query, the required number of levels of a query execution plan for execution of the first query, the required number of nodes for each of the required number of levels, and/or the required number of records for access in execution of the first query indicated by the first scale requirements.

In various embodiments, a second query request is received that indicates a second query for execution by the database system. Second scale requirements are determined for the second query request, wherein the second scale requirements are greater than the first scale requirements. The method can include generating a second plurality of successful execution cost data corresponding to the plurality of query execution mode options based on the second scale requirements. The method can include generating second query execution mode selection data by selecting a second selected query execution mode from the plurality of query execution mode options based on second successful execution cost data corresponding to the second selected query execution mode comparing favorably to the successful execution cost requirement data and based on the successful execution cost data corresponding to the first selected query execution mode comparing unfavorably to the successful execution cost requirement data. A second resultant for the second query can be generated by facilitating execution of the second query in accordance with the second selected query execution mode.

In various embodiments, the method includes generating a plurality of scores for the plurality of query execution mode options, for example, by utilizing the selection score generating function 2561. Each of the plurality of scores is generated as a function of the resultant correctness guarantee data and the successful execution cost data of a corresponding one of the plurality of query execution mode options. Generating query execution mode selection data further includes selecting the first selected query execution mode based on the first selected query execution mode having a most favorable one of the plurality of scores. In some cases, the first selected query execution mode has a most favorable one of the plurality of scores of a filtered subset of query execution mode options with successful execution cost data that compares favorably to the execution cost requirement data and/or with resultant correctness guarantee data that compares favorably to the resultant correctness requirement data, where the first selected query execution mode is selected from this filtered subset.

In various embodiments, the method further includes determining a first weight corresponding to the resultant correctness guarantee data and determining a second weight corresponding to the successful execution cost data. A ratio between the first weight and the second weight corresponds to a configured relative importance between the resultant correctness guarantee data and the successful execution cost data. Each of the plurality of scores is generated based on applying the first weight to the resultant correctness guarantee data of the corresponding one of the plurality of query execution mode options and by applying the second weight to the successful execution cost data of the corresponding one of the plurality of query execution mode options.

In various embodiments, determining the resultant correctness requirement data includes receiving the resultant correctness requirement data from a client device. In various embodiments, determining the successful execution cost data includes receiving the successful execution cost data from a client device. For example, the client device generated the resultant correctness requirement data and/or the successful execution cost data based on user input in response to at least one prompt presented via a graphical user interface displayed by a display device of the client device. In various embodiments, the client device generated the first query request that indicated the first query for execution. In various embodiments, the first query request includes a query expression corresponding the first query, the resultant correctness requirement data, and/or the successful execution cost data based on user input to the graphical user interface indicating the query expression of the first query, the resultant correctness requirement data for the first query, and/or the successful execution cost data for the first query in response to at least one prompt displayed by the graphical user interface. In various embodiments, the resultant for the first query is transmitted to the client device for display via the graphical user interface.

In various embodiments, the plurality of query execution mode options includes a guaranteed-correctness static execution plan mode, such as guaranteed-correctness static execution plan mode 2500, and an imperfect-correctness static execution plan mode, such as imperfect-correctness static execution plan mode 2501. In various embodiments, the guaranteed-correctness static execution plan mode is selected in the query execution mode selection data based on the guaranteed-correctness static execution plan mode having corresponding resultant correctness guarantee data that compares favorably to the resultant correctness requirement data, and based on the imperfect-correctness static execution plan mode having corresponding resultant correctness guarantee data that compares unfavorably to the resultant correctness requirement data. The method further includes receiving a second query request that indicates a second query for execution by the database system and determining second resultant correctness requirement data for the second query. A second plurality of resultant correctness guarantee data corresponding to the plurality of query execution mode options can be generated, for example, based on second scale requirements determined for the second query. Alternatively, the resultant correctness guarantee data generated in step 208 can again be used.

In various embodiments, the method can include generating second query execution mode selection data by selecting the imperfect-correctness static execution plan mode from the plurality of query execution mode options based on the imperfect-correctness static execution plan mode having corresponding resultant correctness guarantee data that compares favorably to the second resultant correctness requirement data. For example, the imperfect-correctness static execution plan mode is selected for the second query and not the first query due to the second resultant correctness requirement data being less strict than the resultant correctness requirement data determined for the first query. The method can further include generating a second resultant for the second query by facilitating execution of the second query in accordance with the imperfect-correctness static execution plan mode based on the imperfect-correctness static execution plan mode being selected in the second query execution mode selection data.

In various embodiments, the plurality of query execution mode options includes a plurality of imperfect-correctness static execution plan modes, such as a plurality of imperfect-correctness static execution plan modes 2501. A first one of the plurality of imperfect-correctness static execution plan modes has first resultant correctness guarantee data, and a second one of the plurality of imperfect-correctness static execution plan modes has second resultant correctness guarantee data. The second resultant correctness guarantee data is less favorable than the first resultant correctness guarantee data, and both the first resultant correctness guarantee data and the second resultant correctness guarantee data indicate that production of a resultant that is equivalent to a true resultant is not guaranteed. In some cases, the second resultant correctness guarantee data is less favorable than the first resultant correctness guarantee data.

For example, the second resultant correctness guarantee data is less favorable than the first resultant correctness guarantee data based on the execution success condition 2532 of the second one of the plurality of imperfect-correctness static execution plan modes having a second maximum failure tolerance $R_2$ that is higher and/or less strict than a first maximum failure tolerance $R_1$ of the execution success condition 2532 of the first one of the plurality of imperfect-correctness static execution plan modes. For example, the execution success condition 2532 of the second one of the plurality of imperfect-correctness static execution plan modes indicates a greater number of allowed node failures and/or a greater number of missing and/or duplicated records than the execution success condition 2532 of the first one of the plurality of imperfect-correctness static execution plan modes.

In various embodiments, the first one of the plurality of imperfect-correctness static execution plan modes is selected in the query execution mode selection data based on the first resultant correctness guarantee data comparing favorably to the resultant correctness requirement data, and based on the second resultant correctness guarantee data comparing unfavorably to the resultant correctness requirement data, for example, due to being less favorable than the first resultant correctness guarantee data. A second query request can be received that indicates a second query for execution by the database system, and second resultant correctness requirement data is determined for the second query. A second plurality of resultant correctness guarantee data corresponding to the plurality of query execution mode options can be generated, for example, based on second scale requirements determined for the second query. Alternatively, the resultant correctness guarantee data generated in step 208 can again be used.

The method can include generating second query execution mode selection data by selecting the second one of the plurality of imperfect-correctness static execution plan modes from the plurality of query execution mode options based on the second resultant correctness guarantee data comparing favorably to the second resultant correctness requirement data. For example, the second one of the plurality of imperfect-correctness static execution plan modes with the less favorable second resultant correctness guarantee data is selected for the second query and not the first query due to the second resultant correctness requirement data being less strict than the resultant correctness requirement data determined for the first query. The method can include generating a second resultant for the second query by facilitating execution of the second query in accordance with second one of the plurality of imperfect-correctness static execution plan modes based on the second one of the plurality of imperfect-correctness static execution plan modes being selected in the second query execution mode selection data.

In various embodiments, generating the query execution mode selection data includes selecting a plurality of selected query execution modes from the plurality of query execution mode options, where the plurality of selected query execution modes includes the first selected query execution mode. The method can further include generating a set of resultants for the plurality of selected query execution modes by facilitating execution of the first query in accordance with each of the plurality of selected query execution modes, for example, concurrently and/or one at a time in sequence. The method can further include generating a consensus resultant from the set of resultants based on the set of resultants, for example, by implementing the resultant consensus management module 2519. In various embodiments, the method includes generating resultant confidence data for the consensus resultant based on a set of failure detection data generated via the execution of the first query in accordance with each of the plurality of selected query execution modes, resultant similarity data generated based on the set of resultants, and/or expected resultant range data generated based on historical resultant data.

In various embodiments, a non-transitory computer readable storage medium includes at least one memory section that stores operational instructions that, when executed by a processing module that includes a processor and a memory, cause the processing module to receive a first query request that indicates a first query for execution by a database system; to determine a plurality of query execution mode options for execution of the first query via the database system; to determine a plurality of execution success conditions corresponding to the plurality of query execution mode options; to generate a plurality of resultant correctness guarantee data corresponding to the plurality of query execution mode options based on the plurality of execution success conditions; to determine resultant correctness requirement data; to generate query execution mode selection data by selecting a first selected query execution mode from the plurality of query execution mode options based on resultant correctness guarantee data corresponding to the first selected execution mode comparing favorably to the resultant correctness requirement data; and/or to generate a resultant for the first query by facilitating execution of the first query in accordance with the first selected execution mode.

FIGS. 26A-26C illustrate embodiments of a query execution module 2402 that can dynamically reassign nodes 37 of a query execution plan 2405 being implemented by the query execution module 2402 to different query execution roles during execution of one or more queries. For example, some or all of the features discussed in conjunction with FIGS. 26A-26C can be utilized by the query execution module 2402 to implement a corresponding query execution plan 2405 to execute queries under the dynamic execution plan mode 2502 of FIG. 25K and/or one or more other query execution modes utilized to execute queries discussed herein. Some or all features of the query execution module 2402 discussed in conjunction with FIGS. 26A-26C can be utilized to implement the query execution module 2402 of FIG. 25A and/or any other embodiment of the query execution module 2402 discussed herein.

In some cases, when a node's degradation and/or failure occurs and/or is detected during execution of a query, rather than requiring a query be re-executed and/or accepting the corresponding loss and/or duplication of records in the final resultant, a new node can be assigned to replace the failed node in the corresponding query execution plan 2405 by taking on some or all of the corresponding query execution role that was originally assigned to the failed node in conjunction with participation in the query execution plan 2405. In some cases, this reassignment is in response to detection of a grey failure and/or in response to detecting a node that is processing/sending its data too slowly. In some cases, this reassignment is in response to detecting a node has gone offline, is not sending resultants, or has otherwise failed. In such cases, correctness may not be guaranteed.

In some cases, metadata or tracked lineage can be utilized to replicate, estimate, and/or determine some or all of the progress made by the failed node thus far. This can be based on the failed node and/or newly assigned node generating and/or determining the recovery node lineage 2830 as discussed in conjunction with FIGS. 28A-28C, based on the failed node and/or newly assigned node generating and/or receiving saved state data 2930 as discussed in conjunction with FIGS. 29A-29C, and/or based on the failed node and/or newly assigned node generating and/or determining checkpoint data 2750 discussed in conjunction with FIGS. 27A-27E. In some cases, some or all execution assigned the failed node can be reallocated to another node, for example, within the same storage cluster 35. In some cases, incoming data from child nodes in the query plan can be routed to the newly assigned node. In some cases, the newly assigned node can determine a proportion of incoming data that is missing, for example, based on already having been sent to the node that failed, as missing records 2427. In such cases, the assigned node can either re-request this missing data from its child nodes or can alternatively generate failure metadata, such as tracked failure detection data 3120 of FIG. 31A, indicating that this percentage of the incoming data blocks were never processed.

As illustrated in FIG. 26A a query execution module 2402 implements a particular query execution plan for execution of a given query. In this example, the query execution plan includes at least a set of nodes A, B, C, D, E, F, and G as illustrated in FIG. 26A. A different node H is not participating in the query as denoted by the dashed outline and as discussed in conjunction with FIG. 24A. For example, node H is not participating based on not being assigned to the query execution plan 2405 for participation in any of the levels 2410 and/or otherwise based on not being selected in a proper subset of a plurality of possible nodes 37 that are assigned to participate in the query execution plan 2405.

This plan can be initiated as discussed previously, where the nodes selected for the query execution plan 2405 determine their query execution role which can indicate: their corresponding level 2410 in the query execution plan 2405; their child own nodes at the immediately lower level 2410 from which data blocks are to be received; their own one or more parent nodes at the immediately higher level 2410 2410 from which data blocks are to be sent; segments to be retrieved and/or recovered in accordance with execution of the query at the IO level; a query operator execution flow 2433 to be applied to read records and/or incoming data blocks from child nodes to generate output data blocks; shuffle node set information regarding sending information within the same level to a set of other nodes in accordance with query operators such as JOIN operators; some of all of the query execution plan data 2540 of FIG. 25C; and/or other instructions regarding execution of the query.

As some time to after the query execution is initiated and/or after some or all nodes 37 in the query execution plan 2405 have begun their respective executions by receiving and/or processing incoming data blocks and/or read records, one or more nodes in the query execution plan can be determined to fail. In this example, at least node C is determined to fail after execution is initiated but before the final resultant is generated, for example, by a node assignment module 2640 of the query execution module as discussed in conjunction with FIGS. 26B and 26C. This failure of node C is denoted by the 'X' in FIG. 26A over node C at time $t_0$. Based on detecting failure of node C is scheduled, is predicted to be upcoming due to degrading conditions of node C, and/or has already occurred where node C is offline and/or otherwise incapable of executing the query as necessary, node reassignment data 2630 can be generated, for example, by a node assignment module 2640 of the query execution module 2402, to reassign some or all of the query execution role of node C to node H by replacing node C with node H in an updated version of the query execution plan 2405 to be applied for the remainder of the query's execution. For the remainder of the query's execution starting a time $t_1$ that is after time $t_0$, node H can perform some or all of the query execution role that was previously assigned to node C, where at least one output data block is generated by node H and utilized by node A that is eventually utilized to generate the final resultant of the query.

In some embodiments, such mid-query reassignment may mean that the ultimately produced resultant generated by the query execution plan 2405 is not guaranteed to be correct, for example, because: the failed node may have sent some output data blocks to a parent node in the query execution plan 2405 that are sent again to the parent node by the new node based on the new node executing the corresponding query execution role, causing some records to be duplicated; the new node may presume that some output data blocks were already sent to a parent node in the query execution plan 2405 that were never sent by the failed node, causing some records to be missing; one or more child nodes may have sent some or all output data blocks to the failed node for processing that were never processed, where these child nodes do not resend their output data blocks to the new node; and/or other information designated to be received by and/or processed by the failed nodes for transmission to other designated nodes in accordance with the failed node's role in the query execution plan 2405 is lost and/or duplicated by the new replacement node.

However, in cases where the resultant correctness requirement data 2553 for a given query indicates that complete query correctness is not required, facilitating dynamic execution plan mode 2502 to reassign nodes mid-query in cases of node failure can be ideal. In particular, applying node reassignment mid-query can improve the correctness—albeit without the guaranteed of being fully correct—of the final resultant that is ultimately generated over the case where a failed node is ignored and no attempt to replace and/or resume a failed node's role via a different node is put in place. In particular, the dynamic execution plan mode 2502 can improve the resultant correctness of the imperfect-correctness static execution plan mode 2501, where the dynamic execution plan mode 2502 can be determined to have more favorable resultant correctness guarantee data 2534 than the imperfect-correctness static execution plan mode 2501 for a single execution attempt and/or across multiple execution attempts until the same or different execution success condition 2532 is met. For example, the dynamic execution plan mode 2502 can similarly be implemented as multiple modes with multiple corresponding maximum fault tolerances R, such as multiple corresponding node failures and/or maximum number of missing and/or duplicated records prior to node replacement and/or expected after node replacement. However, due to the coordination required to communicate reassignment information mid-query, the dynamic execution plan mode 2502 can have less favorable successful execution cost data 2536 than the imperfect-correctness static execution plan mode 2501 for a single execution attempt and/or across multiple execution attempts until the same or different execution success condition 2532 is met.

FIGS. 26B and 26C illustrate a node assignment module 2640 of the query execution module 2402 that is utilized to assign and/or reassign nodes of a query execution plan 2405. For example, at least one processing module of the query execution module 2402 that and/or at least one computing device 18 of the query execution module 2402 can be utilized to implement one or more node assignment modules 2640 of the query execution module 2402, such as a node assignment module 2640 for each of a plurality of group of nodes 2620 of the query execution module 2402 and/or such as a node assignment module 2640 for each of a plurality of individual nodes 37 of the query execution module 2402.

As illustrated in FIG. 26B, a node assignment modules 2640 of the query execution module 2402 can include a query initiation module that determines, based on query data, such as query execution plan data 2540, that a query is to be initiated. The query initiation module can generate query execution role assignment data 2615 based on the query data and/or can query execution role assignment data 2615 from received query execution plan data 2540. An assignment communication module 2644 communicates the query execution role assignment data 2615 to some or all of a group of nodes 2620, such as a group of nodes in a same storage cluster 35. This can be performed at a time $t_{-1}$ that is prior to time to of FIG. 26A.

As illustrated in FIG. 26C, the same or different node assignment module 2640 can implement a failure detection module 2652 that generates failure detection data indicating one or more nodes 37 determined to be failing and/or to have already failed. This can be based on execution condition data received from and/or determined for one or more nodes. For example execution condition data of one or more nodes can be compared to execution condition requirement data to identify one or more nodes in the generated failure detection data as failing nodes based on these node being determined to have execution condition data that compares unfavorably to the execution condition requirement data and/or is otherwise determined to be failing based on failing to adhere to the execution condition requirement data. In this example, continuing from FIG. 26A, node C is identified in the failure detection data as failed based on being determined to have execution condition data that compares unfavorably to the execution condition requirement data.

The execution condition requirement data can be predetermined and/or can be determined in conjunction with the query execution plan data 2540. For example, the execution condition requirement data can be based on execution success conditions 2532 for the particular query execution mode being utilized to execute the corresponding query. In this fashion, different queries being executed under different query execution modes can have different execution condition requirement data based on these modes having different execution success conditions 2532. For example, different levels of predicted and/or impending node failure can be acceptable for different query execution modes as dictated by the corresponding execution condition requirement data, where some modes do not detect a failed node in node failure detection data unless it has been determined to fully fail, and where other modes detect a detect a "grey failure" node in node failure detection data based on determining this node has not fully failed, but is operating under inefficient and/or otherwise unideal conditions based on: being determined to process its data blocks too slowly that compares unfavorably to a processing efficiency threshold of the execution condition requirement data; being determined to have high communication latency that compares unfavorably to a communication latency threshold of the execution condition requirement data; being determined to have an expected amount of time remaining in its own execution of the query that is expected to elapse undergoing an outage is scheduled and/or predicted to occur; being determined to have processing and/or memory health that is determined to have degraded and/or that compared unfavorably to a processing and/or memory health threshold of the execution condition requirement data; being determined to be identified as a "grey failure" node that is still able to fulfil some level of operation and/or communication with other nodes at an unideal level as dictated by the execution condition requirement data; and/or being determined to underperform by failing to meet the requirements dictated by the execution condition requirement data. Any node deemed as a "failed node" and/or "failing node" as used herein can have been determined to have undergone a full outage and/or failure, a "grey failure" where some level of operation and/or query execution is still being performed, and/or can otherwise be determined to have execution condition data that fails to meet the execution condition requirement data.

A node reassignment module 2654 of the node assignment module 2640 can generate node reassignment data 2630 based on the failure detection data. The node reassignment module 2654 can select from a set of options and/or otherwise determine a node to replace the one or more nodes in the failure detection data. In this example, node H is selected to replace node C in the node reassignment data 2630 as illustrated in FIG. 26A. Node H can be selected: based on not already being included in the query execution plan 2405; based on having a highest performance and/or lowest level of current utilization of a set of node options; based on currently participating in execution of lowest number of queries of a set of nodes options; based on currently participating in execution of a number of queries that compares favorably to a maximum query participation threshold; based on already being selected and/or identified in the query execution plan data 2540 and/or in the query assignment data as being a predetermined backup for node C, for failed nodes in the group of nodes 2620-1, for failed nodes in the group of nodes 2620-3, and/or for any failed node of the query execution plan 2405; and/or based on other information. In other cases, a node that is already participating in the query execution plan 2405 can be selected to replace the failed node, for example, based on participating at a same level as a the failing node, an immediately higher level as a parent node of the failing node, and/or at an immediately lower level as a child node of the failing node, where the replacement node undergoes the role of the failed node in addition to its own assigned role.

The node reassignment module 2654 of the node assignment module 2640 can relay the node reassignment data to some or all nodes of one or more groups of nodes 2620. The node assignment module 2640 can send the node reassignment data 2630 to the failed node itself, for example, to notify the failed node that it should abort its execution of the query and/or send any current state information, saved state information, and/or checkpoint data to the new node indicated in the node reassignment data, for example, if the failed node is undergoing a grey failure and is thus still operational and/or capable of generating and/or sending this information. In this example, node C receives and/or otherwise determines the node reassignment data 2630 to determine that it is being replaced with node H.

The node assignment module 2640 can alternatively or additionally send the node reassignment data 2630 to the new node selected for replacement of the failed node to notify the new node that it should begin its execution of the query for all incoming data blocks it will receive and/or to begin its execution from the current state information, saved state information, and/or checkpoint data that is generated and/or sent from the failed node. This can include query execution role information regarding the execution of the query, such as the same query execution role assignment data 2615 that was originally sent to the failed node at the query's initiation in FIG. 26B. In this example, node H receives and/or otherwise determines the node reassignment data 2630 to determine that it is replacing node C for the remainder of the query. The new node and failed node can be included in an assignment swap node set 2661 that are included in one or more groups of nodes 2620 communicating with the node assignment module, where node C and node H are included in the assignment swap node set 2661 of this example.

The node assignment module 2640 can alternatively or additionally send the node reassignment data 2630 one or more nodes of a parent node set 2662 of the failed node to alert the one or more parent nodes that the failed node is replaced with the new node for the remainder of the query, to alert the one or more parent nodes that incoming data will be received from the new node rather than the failed node, and/or to instruct the alert the one or more parent nodes of the failed node to ignore data blocks received from the failed node and/or revert back to a state prior to the data blocks received from the failed node being processed. In this example, the node reassignment data 2630 is sent to node A because node A is the parent node of node C in the original query execution plan.

The node assignment module 2640 can alternatively or additionally send the node reassignment data 2630 one or more nodes of a shuffle node set 2664, such as some or all nodes at the same level 2410 of the query execution plan and/or that were initially assigned to send and/or receive data blocks from the failed node and/or otherwise exchange information with the failed node in accordance with the query execution plan 2405. The node assignment module 2640 can notify the one or more nodes in the shuffle node set 2664 that incoming data will be received from the new node rather than the failed node, and/or to instruct the one or more nodes in the shuffle node set 2664 to send data to the new node rather than the failed node. This can further include instructions to ignore data blocks received from the failed node and/or revert back to a state prior to the data blocks received from the failed node being processed. This can further include instructions to send data blocks to the new node that were previously sent to the failed node and/or to regenerate the data blocks that were previously sent to the failed node to be sent to the new node. In this example, the node reassignment data 2630 is sent to at least node B because node B is a shuffle node set 2664 with node C in the original query execution plan.

The node assignment module 2640 can alternatively or additionally send the node reassignment data 2630 one or more child nodes of a child node set 2666 of the failed node to alert the one or more child nodes that the failed node is replaced with the new node for the remainder of the query, to instruct the one or more child nodes to send any subsequently generated output data blocks to the new node rather than the failed node for the remainder of the query, to instruct the one or more child nodes to resend any data blocks of the query to the new node that were previously sent to the failed node, and/or to instruct the one or more child nodes to regenerate some or all data blocks that were previously sent to the failed node to be sent to the new node. In this example, the node reassignment data 2630 is sent to at least nodes F and G because nodes F and G are child nodes of node C in the original query execution plan.

Note that in some embodiments, not all nodes are notified of the reassignment, as the repercussions of the reassignment does not affect all nodes of the query execution plan 2405. In particular, nodes D and E may never receive notifications of the replacement of node C with node H as they need not be aware of this reassignment because they are not assigned any communication with node C in accordance with the query execution plan. The node assignment module 2640 can be configured to send the node reassignment data 2630 to only a subset of nodes in the original query execution plan that are determined to be assigned to receive data blocks from and/or send data blocks to the failed node as dictated by the original query execution plan.

The node assignment module 2640 can be implemented by some or all individual nodes 37 of the query execution plan 2405 via processing resources of each individual node 37. For example, nodes A, B, C, D, E, F, and G can each implement the node assignment module 2640 to determine their assignment to the given query, for example, based on their query execution role being communicated in query execution plan data 2540 propagated down the tree structure of the query execution plan. The node assignment module 2640 can be implemented by some or all individual nodes 37 that are not participating in the query execution plan 2405 via processing resources of each individual node 37. For example, node H implements its node assignment module 2640 to determine it is not participating in the query execution plan 2405 when the query is initiated prior to time to and/or to determine it has been assigned to replace node C in the query execution plan 2405 at time $t_1$.

For example, node C can implement the node assignment module 2640 to detect its own execution condition data compared unfavorably to the execution condition requirement data, for example, based on generating measurements of its own processing efficiency and/or its own communication latency, and/or based on identifying that it is predicted and/or scheduled to undergo an outage before completion of its execution of the query. Node C can then generate and communicate the node reassignment data 2630 with some or all of nodes A, B, D, E, F, G, and/or H.

As another example, node A can implement the node assignment module 2640 to detect the failure of node C based on not receiving all data blocks required from node C, based on determining that the rate at which data blocks are received from node C compares unfavorably to a threshold, and/or based on otherwise measuring and/or detecting that node C's execution condition data compared unfavorably to the execution condition requirement data. Node A can then generate and communicate the node reassignment data 2630 with some or all of nodes B, C, D, E, F, G, and/or H.

As another example, node B can implement the node assignment module 2640 to detect the failure of node C based on not receiving all data blocks required from node C in the shuffle set, based on determining that the rate at which data blocks are received from node C compares unfavorably to a threshold, and/or based on otherwise measuring and/or detecting that node C's execution condition data compared unfavorably to the execution condition requirement data. Node B can then generate and communicate the node reassignment data 2630 with some or all of nodes A, C, D, E, F, G, and/or H.

As another example, node F and/or node G can implement the node assignment module 2640 to detect the failure of node C based on not being able to connect with and/or not being able to transmit data blocks to node C, based on not receiving data receival confirmation from node C as expected and/or within an expected amount of time, and/or based on otherwise measuring and/or detecting that node C's execution condition data compared unfavorably to the execution condition requirement data. Node F and/or node G can then generate and communicate the node reassignment data 2630 with some or all of nodes A, B, C, D, E, F, G, and/or H.

As another example, node H can implement the node assignment module 2640 to detect the failure of node C based on measuring and/or detecting that node C's execution condition data compared unfavorably to the execution condition requirement data. In some cases, node H can allocate additional processing resources to monitoring execution conditions of nodes in one or more groups of nodes 2620 in which it is included such as group of nodes 2620-1 and 2620-3 for failure detection based on not being included in the query, based on being designated as a backup node for the one or more groups of nodes, and/or based on not being assigned to at least a threshold number of queries for execution, Node H can then generate and communicate the node reassignment data 2630 with some or all of nodes A, B, C, D, E, F, and/or G.

Alternatively or in addition, the node assignment module 2640 is implemented by a group of multiple nodes, such as nodes in a same storage cluster 35 and/or other predefined groups of nodes 2620, such as clusters of possible parent and child nodes that can be selected in the respective query execution plan 2405 as illustrated in FIG. 26A, where the query execution plan includes nodes included in groups of nodes 2620-1, 2620-2, and 2620-3. The nodes in each group of nodes 2620 can intercommunicate amongst themselves to resolve assignment for each query and/or to generate assignment rules and/or a predetermined function that is utilized to dictate whether each node will participate in any given query as a parent node and/or child node in the given group of nodes 2620 and/or to dictate whether each node is a "backup" node that can be reassigned to replace another node in the group of nodes 2620 when this other node is determined to fail. For example, node assignment, failure detection, and/or node reassignment can be determined within a particular group of nodes 2620 implementing node assignment module 2640 via execution of a consensus protocol amongst nodes in the group of nodes 2620; via assignment by a leader node of the group of nodes 2620; and/or based on backup nodes listed in query plan assignment data generated in a most recent iteration of a consensus protocol.

For example, the group of nodes 2620-1 can collectively implement the node assignment module 2640 to determine to replace node C with node H based on one or more nodes in the group of nodes 2620-1 detecting the failure of node C, and information regarding the replacement of node C with node H can be communicated to some or all of the group of nodes 2620-3, for example, where at least node F and node G receive a notification from a node in the group of nodes 2620-1 informing them that node C has been replaced with node H and that their output data blocks should be rerouted from node C to node H. As another example, the group of nodes 2620-3 collectively implement the node assignment module 2640 to determine to replace node C with node H based on the group of nodes 2620-1 detecting the failure of node C, and information regarding the replacement of node C with node H can be communicated to some or all of the group of nodes 2620-1, for example, where at least node A receives a notification from a node in the group of nodes 2620-3 informing them that node C has been replaced with node H and that they are assigned to receive and process input data blocks generated by and transmitted node H and/or that input data blocks that may be received from node C should be ignored and/or should not be processed.

In some cases, node C is determined to fail after the query's execution is initiated by the query execution module 2402 via query execution plan 2405, but before node C receives any input data from any child nodes and/or from nodes in a shuffle node set. In some cases, node C is determined to fail after receiving at least one data block but prior to generating and/or transmitting any output data blocks to any parent nodes and/or to any nodes in the shuffle node set. In some cases node C is determined to fail after transmitting a proper subset of required output data blocks to a parent node and/or to at least one nodes in the shuffle node set. In some cases, the progress that node C has made thus far prior to being deemed as failed can be utilized to determine what portion of execution is remaining and should be reassigned to node H. In some embodiments, such as cases where node C has fully failed and cannot relay any saved state data or checkpoint data, node H can determine and/or estimate the progress made by node C such as proportion of input nodes received and/or proportion of output nodes sent based on receiving information from child nodes of node C such as node F and/or node G indicating which and/or how much data was sent to node C already, and/or based on receiving information from parent nodes of node C such as node A indicating which and/or how much data was received from node C already. In some cases, the node reassignment module 2654 only generates the node reassignment data 2630 in cases where progress determined and/or estimated to be made by the failed node thus far is sufficiently small and/or compares favorably to a maximum progress threshold, where the replacement node is not assigned if the failed node was determined and/or estimated to have performed at least a sufficient amount of its processing prior to failure such that risk of excess duplication by the new node is more unfavorable that the expected amount of missing information that persists if the failed node's role is not reassigned.

Figure 26D:
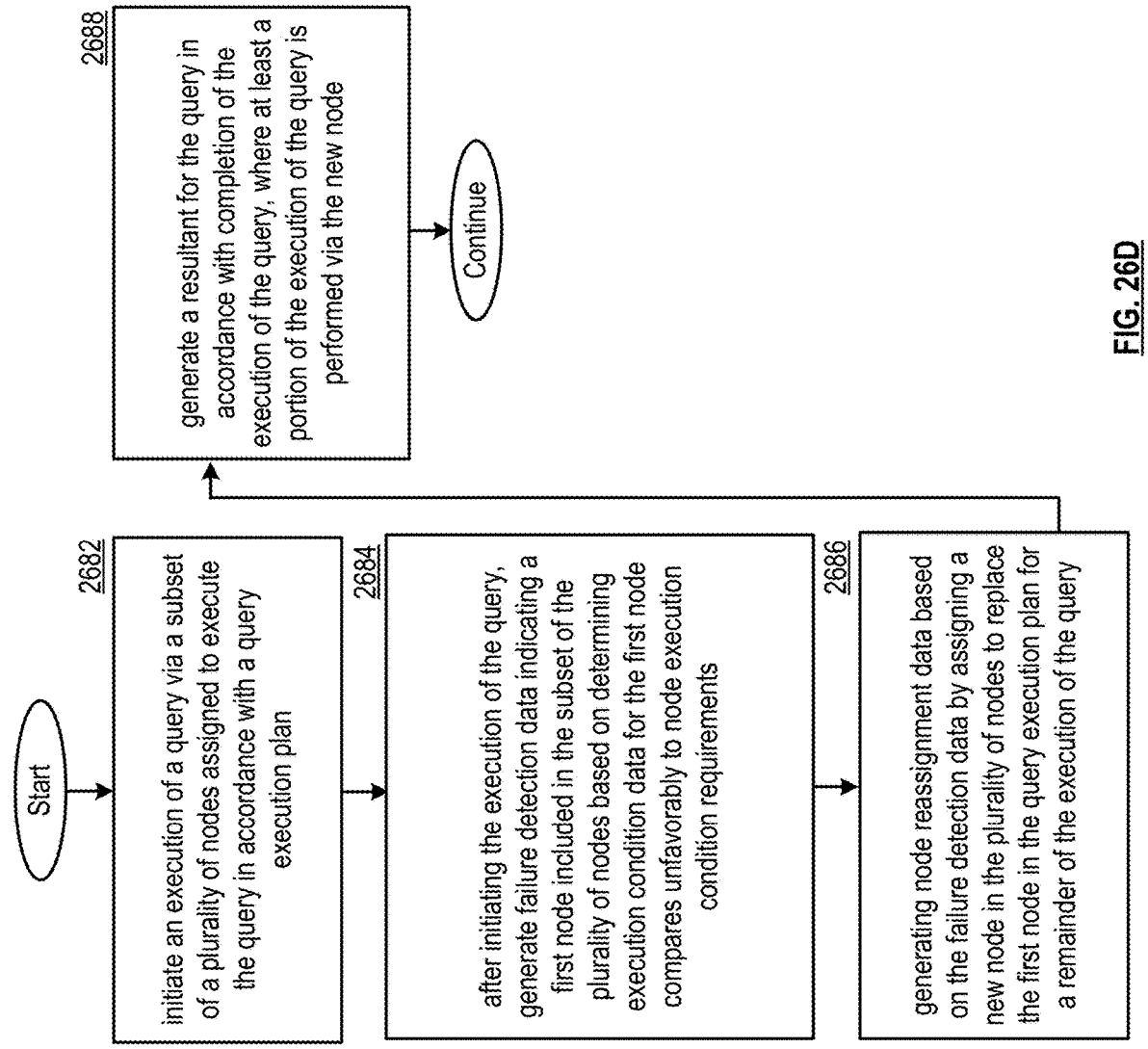
FIG. 26D is a logic diagram illustrating a method of reassigning a node during execution of a query in accordance with various embodiments of the present invention.

FIG. 26D illustrates a method for execution by at least one processing module of anode assignment module 2640. For example, the database system 10 can utilize at least one processing module of one or more nodes 37 of one or more computing devices 18, where the one or more nodes to execute operational instructions stored in memory accessible by the one or more nodes, and where the execution of the operational instructions causes the one or more nodes 37 to execute, independently or in conjunction, the steps of FIG. 26D. In particular, the node assignment module 2640 can execute the steps of FIG. 26D via implementation by a single corresponding node 37, where one or more nodes 37 each execute the steps of FIG. 26D. Alternatively or in addition, the node assignment module 2640 can execute the steps of FIG. 26D via implementation by a single group of nodes 2620, where one or more groups of nodes 2620 each execute the steps of 26D via multiple intercommunicating nodes 37 of the corresponding group of nodes 2620. Some or all of the method of FIG. 26D can be performed by the query execution module 2402, for example, by utilizing at least one processor and memory of the query execution module 2402 to implement multiple node assignment modules 2640 of multiple different nodes 37 and/or of multiple different groups of nodes 2620. Some or all of the method of FIG. 26D can be performed by a node assignment module 2640 for example, by utilizing at least one processor and memory of the node assignment module 2640 to implement the query initiation module 2642, the assignment communication module 2644, the failure detection module 2652, the node reassignment module 2654, and/or the reassignment communication module 2656 the node assignment module 2640. Some or all of the steps of FIG. 26D can optionally be performed by any other processing module of the database system 10. Some or all of the steps of FIG. 26D can be performed to implement some or all of the functionality of the query execution module 2402 and/or of the node assignment module 2640 of the query execution module 2402 described in conjunction with FIGS. 26A-26C. Some or all steps of FIG. 26D can be performed by database system 10 in accordance with other embodiments of the query execution module 2402 discussed herein.

Step 2682 includes initiating an execution of a query via at least a subset of a plurality of nodes assigned to execute the query in accordance with a query execution plan, for example, by utilizing the query initiation module 2642 and/or the assignment communication module 2644. For example, the execution of the query can commence via the query execution module 2402 where one or more nodes of the corresponding query execution plan 2405 perform some or all of their respective query execution roles. Step 2684 includes generating failure detection data after initiating the execution of the query, for example, by utilizing the failure detection module 2652. The failure detection data indicates a first node included in the subset of the plurality of nodes based on determining execution condition data for the first node compares unfavorably to node execution condition requirements. The first node can be a fully failed node or can be an operational node detected to be undergoing a grey failure. Step 2686 includes generating node reassignment data based on the failure detection data by assigning a new node in the plurality of nodes to replace the first node in the query execution plan for a remainder of the execution of the query, for example, by utilizing the node reassignment module 2654. Step 2688 includes generate a resultant for the query in accordance with completion of the execution of the query, for example, via the query execution module 2402, where at least a portion of the execution of the query is performed via the new node. For example, the first node does not perform all of its required tasks in accordance with its assigned query execution role based on failing and/or undergoing the grey failure, and/or based on determining some or all of its assigned query execution role is reassigned to the new node.

FIGS. 27A-27E illustrate embodiments of a query execution module 2402 that can leverage blocking operators of a query operator execution flow 2433 being implemented by the query execution module 2402 to generate checkpoint data for use in failure mitigation and/or recovery. For example, some or all of the features discussed in conjunction with FIGS. 27A-27E can be utilized by the query execution module 2402 to implement a corresponding query execution plan 2405 to execute queries under the blocking-operator checkpoint mode 2503 of FIG. 25K and/or one or more other query execution modes utilized to execute queries discussed herein. Some or all features of the query execution module 2402 discussed in conjunction with FIGS. 27A-27E can be utilized to implement the query execution module 2402 of FIG. 25A and/or any other embodiment of the query execution module 2402 discussed herein. Some or all features of the query processing module 2435 discussed in conjunction with FIGS. 27A-27E can be utilized to implement the query processing module 2435 of FIG. 24A of one or more nodes 37 and/or can otherwise be implemented by one or more nodes 37 participating in a query execution plan 2405 executed via any embodiment of the query execution module 2402 discussed herein.

Figure 27A:
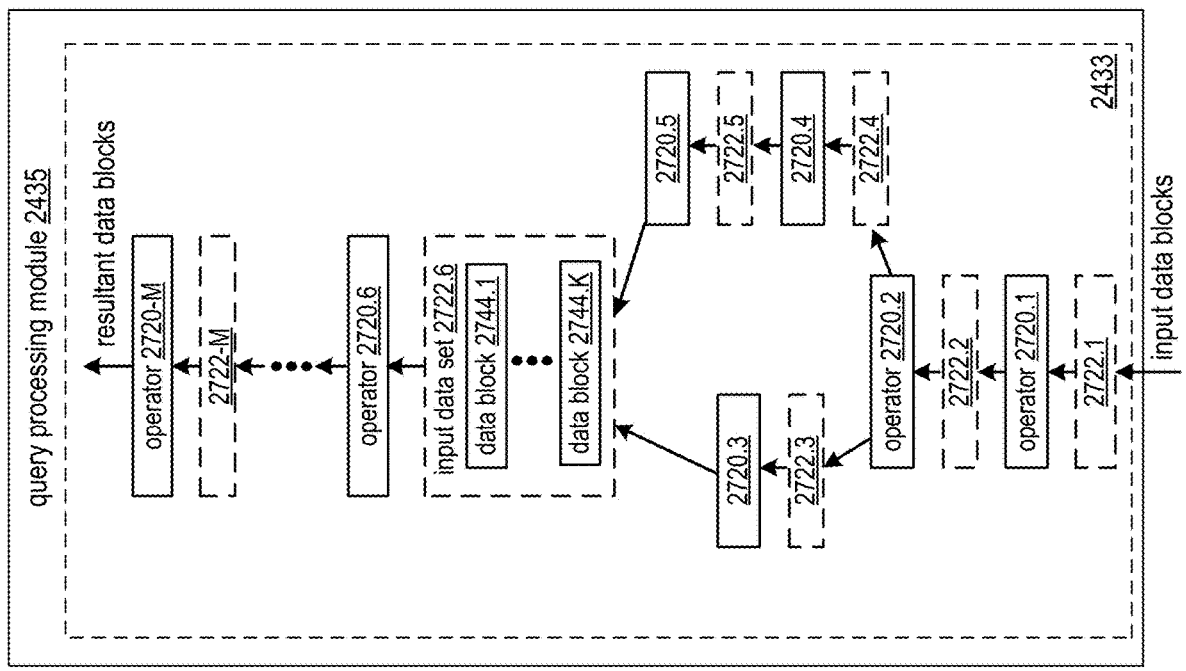
FIG. 27A is a schematic block diagram of an example query operator execution flow utilized by a query processing module in accordance with various embodiments of the present invention.

FIG. 27A presents an example embodiment of a query processing module 2435 that executes a query's query operator execution flow 2433 by performing a plurality of operator executions of operators 2720 of its query operator execution flow 2433 in a corresponding plurality of sequential operator execution steps. Each operator execution step of the plurality of sequential operator execution steps corresponds to execution of a particular operator 2720 of a plurality of operators 2720-1-2720-M of a query operator execution flow 2433. In some embodiments, the query processing module 2435 of FIGS. 27A-27E is implemented by a single node 37, where some or all nodes 37 such as some or all inner level nodes 37 utilize the query processing module 2435 as discussed in conjunction with FIG. 24B to generate output datablocks to be sent to other nodes 37 and/or to generate the final resultant by applying the query operator execution flow 2433 to input data blocks received from other nodes and/or retrieved from memory as read and/or recovered records. In such cases, the entire query operator execution flow 2517 determined for the query as a whole can be segregated into multiple query operator execution flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414.

Note that a query processing module 2435 of any node 37 utilized to implement a query execution plan 2405 executed via a query execution module 2402 can apply a query operator execution flow 2433 of a query via a plurality of sequential operator executions as discussed in conjunction with FIG. 27A to enable the corresponding node 37 to perform its corresponding assigned role in executing the query in accordance with any embodiment of the query execution module 2402 discussed herein. In other embodiments, the query processing module 2435 of FIGS. 27A-27E is otherwise implemented by at least one processing module the query execution module 2402 to execute a corresponding query, for example, to perform the entire query operator execution flow 2517 of the query as a whole.

The query processing module 2435 to performs a single operator execution by executing one of the plurality of operators of the query operator execution flow 2433. As used herein, an operator execution corresponds to executing one operator 2720 of the query operator execution flow 2433 on one or more pending data blocks 2744 in an operator input data set 2722 of the operator 2720. The operator input data set 2722 of a particular operator 2720 includes data blocks that were outputted by execution of one or more other operators 2720 that are immediately below the particular operator in a serial ordering of the plurality of operators of the query operator execution flow 2433. In particular, the pending data blocks 2744 in the operator input data set 2722 were outputted by the one or more other operators 2720 that are immediately below the particular operator via one or more corresponding operator executions of one or more previous operator execution steps in the plurality of sequential operator execution steps. Pending data blocks 2744 of an operator input data set 2722 can be ordered, for example as an ordered queue, based on an ordering in which the pending data blocks 2744 are received by the operator input data set 2722. Alternatively, an operator input data set 2722 is implemented as an unordered set of pending data blocks 2744.

If the particular operator 2720 is executed for a given one of the plurality of sequential operator execution steps, some or all of the pending data blocks 2744 in this particular operator 2720's operator input data set 2722 are processed by the particular operator 2720 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2720 has performed an execution upon a given data block 2744 to generate one or more output data blocks, this data block is removed from the operator's operator input data set 2722. In some cases, an operator selected for execution is automatically is executed upon all pending data blocks 2744 in its operator input data set 2722 for the corresponding operator execution step. In this case, an operator input data set 2722 of a particular operator 2720 is therefore empty immediately after the particular operator 2720 is executed. The data blocks outputted by the executed data block are appended to an operator input data set 2722 of an immediately next operator 2720 in the serial ordering of the plurality of operators of the query operator execution flow 2433, where this immediately next operator 2720 will be executed upon its data blocks once selected for execution in a subsequent one of the plurality of sequential operator execution steps.

Operator 2720.1 can correspond to a bottom-most operator 2720 in the serial ordering of the plurality of operators 2720.1-2720.M. As depicted in FIG. 27A, operator 2720.1 has an operator input data set 2722.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2722.1 may only include a proper subset of the full set of input data blocks required for execution of the query at a particular time due to not all of the input data blocks having been read and/or received, and/or due to some data blocks having already been processed via execution of operator 2720.1. In other cases, these input data blocks are read and/or retrieved by performing a read operator or other retrieval operation indicated by operator 2720.

Note that in the plurality of sequential operator execution steps utilized to execute a particular query, some or all operators will be executed multiple times, in multiple corresponding ones of the plurality of sequential operator execution steps. In particular, each of the multiple times a particular operator 2720 is executed, this operator is executed on set of pending data blocks 2744 that are currently in their operator input data set 2722, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2720 has an operator input data set 2722 that includes at least one data block 2744. At this given time, one more other ones of the plurality of operators 2720 can have operator input data sets 2722 that are empty. For example, a given operator's operator input data set 2722 can be empty as a result of one or more immediately prior operators 2720 in the serial ordering not having been executed yet, and/or as a result of the one or more immediately prior operators 2720 not having been executed since a most recent execution of the given operator.

Some types of operators 2720, such as JOIN operators or aggregating operators such as SUM, AVERAGE, MAXIMUM, or MINIMUM operators, require knowledge of the full set of rows that will be received as output from previous operators to correctly generate their output. As used herein, such operators 2720 that must be performed on a particular number of data blocks, such as all data blocks that will be outputted by one or more immediately prior operators in the serial ordering of operators in the query operator execution flow 2433 to execute the query, are denoted as "blocking operators." Blocking operators are only executed in exactly one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

FIGS. 27B-27E illustrate a particular example of a query processing module 2435 that generates checkpoint data based on execution of such blocking operators, for example, in conjunction with execution of queries under the blocking-operator checkpoint mode 2503 of FIG. 25K. In this particular example, at least two of the operators 2720 of the query operator execution flow 2433 correspond to blocking operators, denoted as blocking operator A and blocking operator B, where blocking operator A is serially before blocking operator B in the query operator execution flow 2433. Another operator C is also included the query operator execution flow 2433 serially after blocking operators A and B. One or more other operators 2720 of one or more parallel tracks can be included serially before operator A, serially in between operators A and B, and/or serially after operator C.

While blocking operator A is depicted as being serially before blocking operator B in a single track of the query operator execution flow 2433 in this example, in other cases, one or more such blocking operators utilized for generating checkpoint data as discussed herein can be included within one or more parallel tracks of the query operator execution flow 2433. In some embodiments, the query operator execution flow 2433 only includes one blocking operator utilized to generate checkpoint data.

Because blocking operators are not performed until all required data blocks are processed by previous operations in the query operator execution flow 2433, blocking operators included in query execution operator flows can be considered as inherent checkpoints, as all data must be received before the blocking operation is applied. In such cases, if a blocking operator does not receive all of its data, the query can be re-run up to the blocking operator, from output of a previous blocking operator starting from the operator following the previous blocking operator with saved resultant data, if applicable. If a blocking operator does receive all of its data, the blocking operation is performed, and a resultant is generated. This resultant can be saved as checkpoint data until a next blocking operator is successfully performed, where the checkpoint is updated. Multiple checkpoints for blocking operators performed on parallel tracks can be utilized as checkpoints for each track, if applicable. The number of blocking operators and/or predetermined effectiveness of usage of blocking operators as checkpoints based on their placement in the query operator execution flow of a particular query can be utilized to determine whether this mode of query execution that utilizes blocking operators as checkpoints is sufficient and/or if other checkpointing is necessary.

Figure 27C:
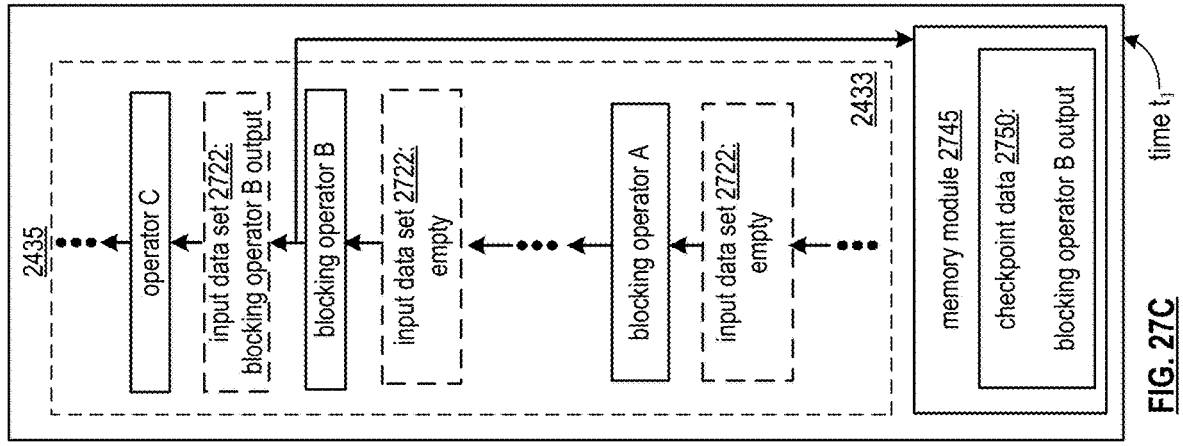
FIGS. 27B-27E are schematic block diagrams of embodiments of a query processing module that generates checkpoint data in accordance with various embodiments of the present invention.
Figure 27B:
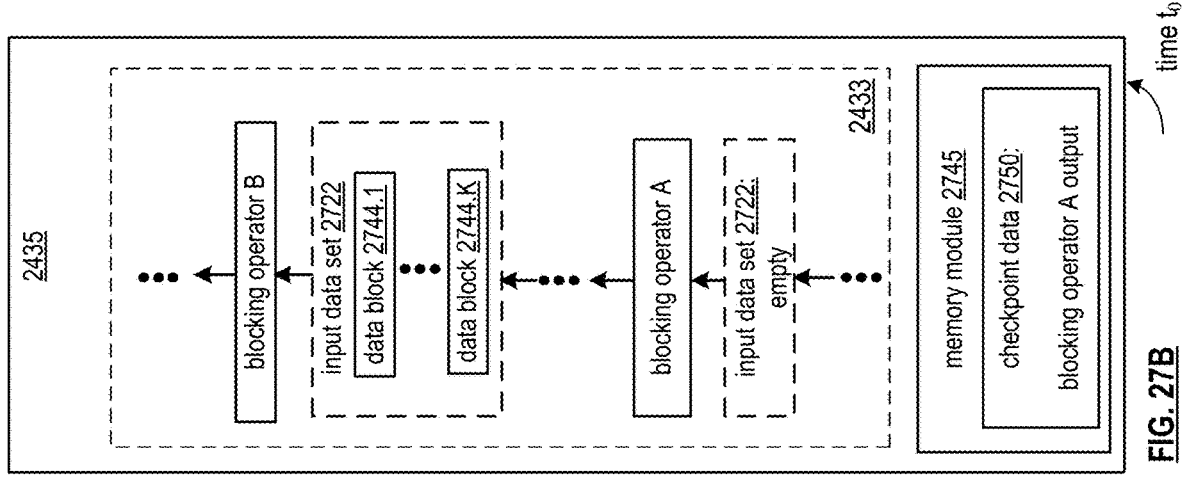

As the state of the query operator execution flow at time $t_0$, as illustrated in FIG. 27B, blocking operator A has already been performed, and the operator input data set 2722 for is thus empty. However, operator B has not yet been performed, for example, because its input data set 2722 of K pending data blocks 2744 does not yet include all required data blocks. A memory module 2745 included in and/or communicating with the query processing module 2435 can store the most up-to-date checkpoint data 2750 generate based on the most recently performed blocking operator of the query execution flow. At time $t_0$, the checkpoint data 2750 indicates the blocking operator output that was generated from blocking operator A. For example, prior to execution of blocking operator A, the checkpoint data 2750 is empty and/or otherwise is not based on blocking operator A's execution because blocking operator A was not yet performed.

In the case of a detected failure and/or reassignment, the checkpointing data 2750 can be utilized such that the entirety of the corresponding query operator execution flow 2433 need not be re-performed, and/or to indicate the progress of the corresponding node 37 in its execution of the corresponding query. In particular, in a recovery mode where re-execution of the query operator execution flow 2433 by the same or different node is required, this saved output that was generated from blocking operator A could be applied to the next operator that is serially immediately after blocking operator A in the query operator execution flow 2433, where any operators serially before and including blocking operator need not be re-performed.

As the state of the query operator execution flow at a time $t_1$ that is after time $t_0$, as illustrated in FIG. 27C, output to blocking operator B is generated via execution of blocking operator B upon all pending data blocks of its operator input data set 2722. For example, blocking operator B is executed at this time based on all required data blocks being received and/or based on all operators serially between blocking operator A and blocking operator B having undergone all necessary executions, where no more input data to blocking operator B will be generated. In response to generating the output to blocking operator B via execution of blocking operator B upon all pending data blocks of its operator input data set 2722, the output to blocking operator B is saved as checkpoint data 2750. As illustrated in FIG. 27A, the checkpoint data 2750 now includes blocking operator B output, which can replace the blocking operator A output and/or can supplement the blocking operator A output in the checkpoint data 2750. Note that this same output of blocking operator B is also added to operator input data set 2722 of operator C as one or more data blocks generated as output that are next processed via one or more executions of operator C.

Figure 27E:
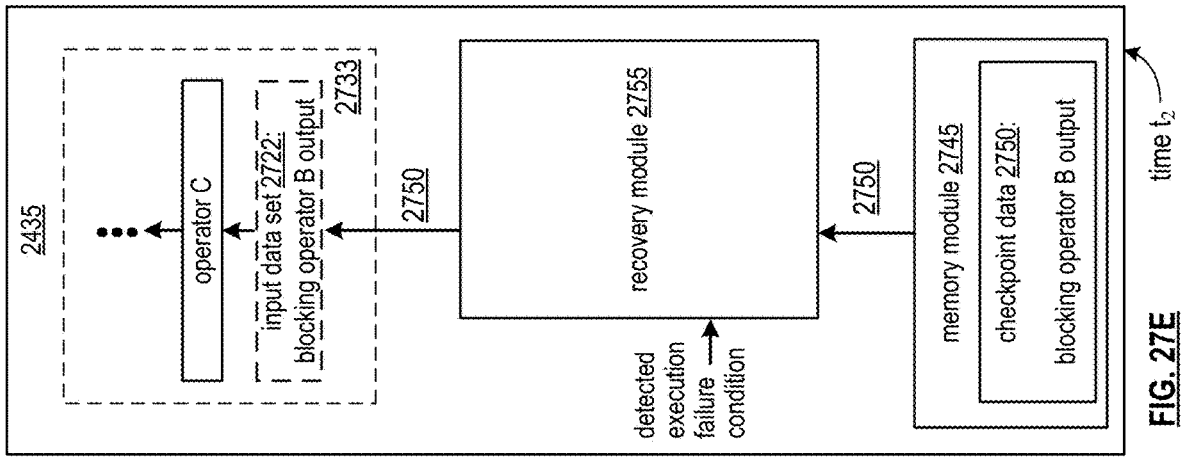
Figure 27D:
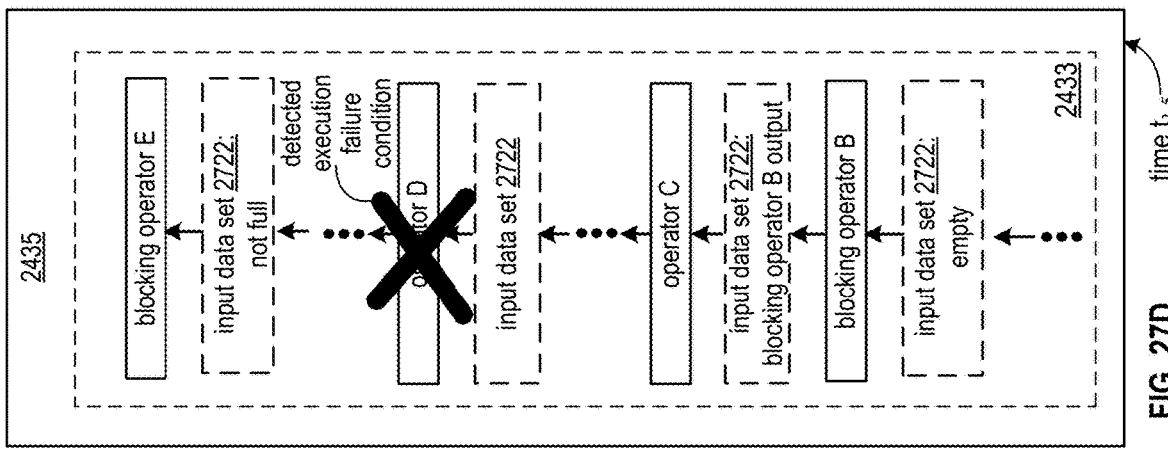

FIG. 27D illustrates a particular example of a failure that occurs in performing, or attempting to perform, one or more operator executions the query operator execution flow at a time $t_{1.5}$ that is after $t_1$ In this particular example, a failure occurs in performance of a particular operator D that is after the blocking operator B, but before a next blocking operator E. In the state of the query operator execution flow at $t_{1.5}$, some or all of the operator executions of operator C have been executed to populate the input data set of operator D to enable operator executions of operator D to be performed and/or attempted. Some data blocks may have propagated all the way to a next blocking operator E, which can be the first blocking operator after blocking operator B. However, blocking operator E is awaiting at least one data block at this point in time due some or all of operator D's executions not having yet been performed successfully. Blocking operator E's input data set 2722 is therefore not full, and blocking operator E has thus not been performed. As a result, blocking operator B is still the most recent blocking operator to have been performed and while not depicted in FIG. 27D, the checkpoint data 2750 still reflects blocking operator B's output that was generated and saved at time $t_1$ as illustrated in FIG. 27C.

Furthermore, in the state of the query operator execution flow at $t_{1.5}$, a failure occurs in at least one operator execution of the operator execution flow 2733. As illustrated in FIG. 27D, this failure can correspond to a failure at operator D in the operator execution flow 2733. In particular, an error or other failure in an attempted operator execution of operator D upon its input data blocks may have occurred and/or may have been detected by the query processing module 2435. As another example, at time $t_{1.5}$ when the query processing module 2435 is performing, has just performed, or is scheduled to attempt to perform an operator execution of operator D, some failure condition of the query processing module 2435 is detected. For example, a memory storing some of the input data blocks for operator D may have failed prior to operator D being performed upon these required input data blocks. This detected failure at operator C can trigger the query processing module 2435 to reset its query operator execution flow back to the most recently saved state by utilizing saved state data 2750, as illustrated in FIG. 27E.

At the state of the query operator execution flow at a time $t_2$ that is after time $t_1$, as illustrated in FIG. 27E, a recovery module 2755 of the query processing module 2435 is utilized to retrieve the checkpoint data 2750 in response to determining a detected execution failure condition. For example, this detected execution failure condition can correspond to the detected failure at operator D at time $t_{1.5}$ detected by the query processing module 2435 as illustrated in FIG. 27D, where time $t_2$ is after time $t_{1.5}$. Alternatively or in addition, other types of detected failure can trigger this retrieval the checkpoint data 2750 by recovery module 2755. For example, the detected execution failure condition can be detected by the query processing module 2435 based on the corresponding node 37 that implements the query processing module 2435 also implementing the failure detection module 2652 of FIG. 26C to generate any of the failure detection data described herein. Alternatively or in addition, this detected execution failure condition is detected by the query processing module 2435 based on receiving a failure notification from a different node. For example, the failure can correspond to a problem that was determined to have occurred strictly after time $t_1$, where the output of blocking operator B is believed to be accurate and/or unaffected by this failure condition. As a particular example, the failure can correspond to determining that a parent node designated to receive output of the given node has failed, did not receive some or all the outputted data blocks and/or has been reassigned, where output must be regenerated and retransmitted. The failure can otherwise correspond to any determination that the resultant data blocks for the query by query processing module 2435 via the corresponding query operator execution flow 2433 must be regenerated, and/or can otherwise correspond to any determination that the corresponding query operator execution flow 2433 must be reperformed.

The recovery module 2755 can facilitate a re-execution of the query operator execution flow 2433 in response to the detected execution failure condition by applying the blocking operator B output of checkpoint data 2750 to a truncated query operator execution flow 2733 of the query operator execution flow 2433, where the truncated query operator execution flow 2733 only includes the ordered set of operators 2720 of one or more parallel tracks that are serially after blocking operator B. In this case, the first operator of the truncated query operator execution flow 2733 is operator C based on being the first operator that is serially after blocking operator B in the full query operator execution plan 2433. The output of blocking operator B is applied as input data to the truncated query operator execution flow 2733 by being included in operator input data set 2722 of operator C, regardless of whether or not operator C was previously performed on some or all of the output of blocking operator B prior to time $t_2$ in the original execution after the output of blocking operator B was generated and previously added to the operator input data set 2722 of operator C in the query operator execution flow 2433 after time $t_1$.

This re-execution of the query by applying the checkpoint data 2750 to a truncated query operator execution flow 2733 can be performed by the same query processing module 2435, for example, of a same node 37. Alternatively, a different query processing module 2435, for example, of a new node reassigned to replace the original node that originally generated the checkpoint data 2750, can apply the checkpoint data 2750 to a truncated query operator execution flow 2733 based on receiving the checkpoint data 2750 and/or information regarding the truncated query operator execution flow 2733 from the original node. For example, the original node sends the checkpoint data 2750 and/or information regarding the truncated query operator execution flow 2733 to the new node based on receiving the node reassignment data 2630 and/or based on sending the checkpoint data 2750 and/or information regarding the truncated query operator execution flow 2733 as saved state data 2930 as discussed in conjunction with FIG. 29C.

In cases where the detected execution failure condition can correspond to the detected failure at operator D at time $t_{1.5}$ as illustrated in FIG. 27E, this re-execution of query operator execution flow 2433 can include re-executing operators after blocking operator B, including performing one or more operator executions of operator C and operator D upon their input data sets. If no failures are detected in the re-execution of these operators, and once all required data blocks are propagated upwards into the input data set 2722 of blocking operator E, this blocking operator E can be executed, and the checkpoint data 2750 can again be updated to reflect blocking operator E's output in a similar fashion illustrated in FIG. 27C. After updating the checkpoint data 2750 to reflect blocking operator E's output, blocking operator E's output can similarly be recovered in a similar fashion illustrated in FIG. 27C as needed in response to detecting any other failures at operators after blocking operator E in the query operator execution flow 2733.

Figure 27F:
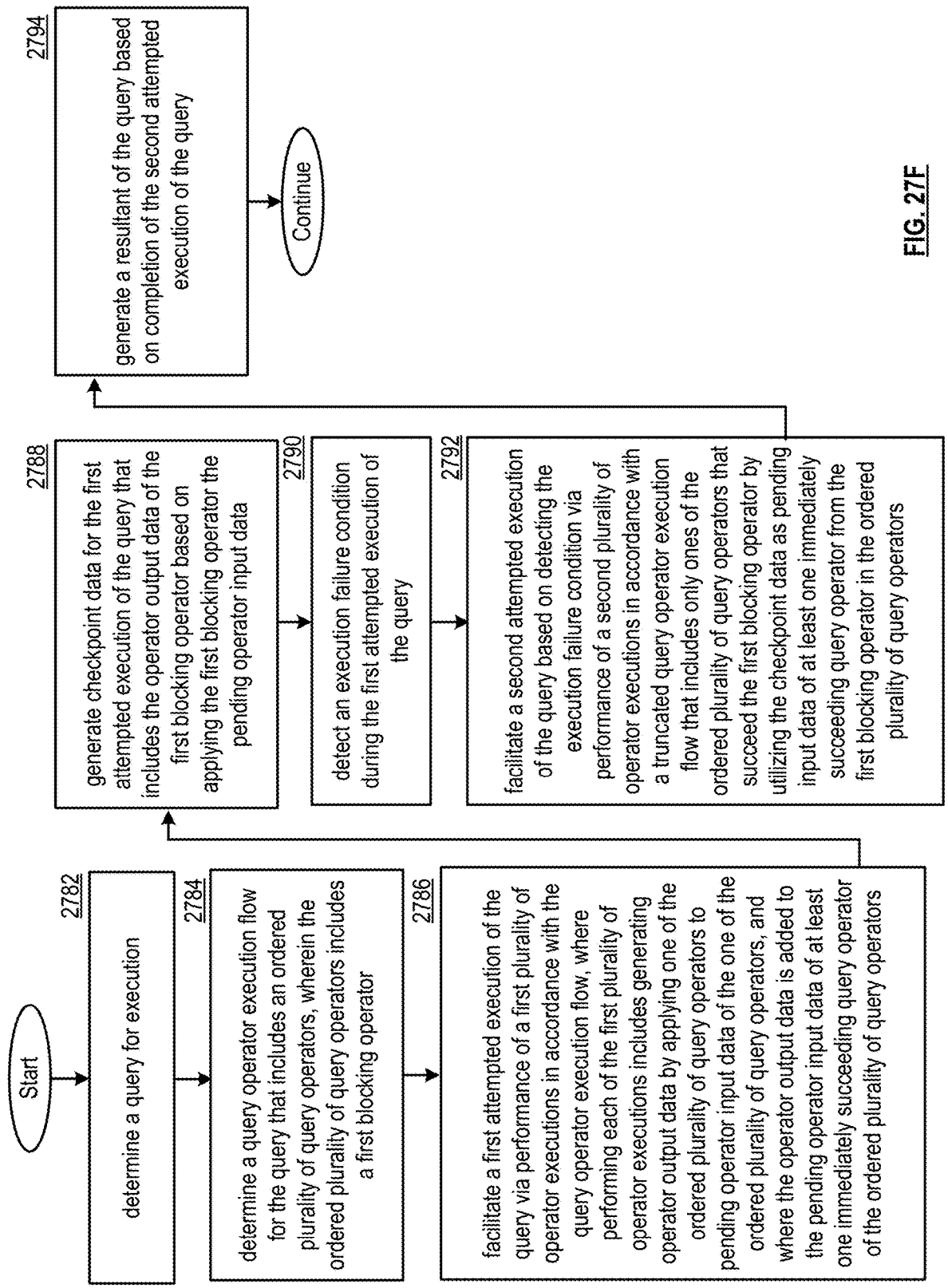
FIG. 27F is a logic diagram illustrating a method of generating and utilizing checkpointing data during execution of a query in accordance with various embodiments of the present invention.

FIG. 27F illustrates a method for execution by at least one processing module of a query processing module 2435. For example, the database system 10 can utilize at least one processing module of one or more nodes 37 of one or more computing devices 18, where the one or more nodes to execute operational instructions stored in memory accessible by the one or more nodes, and where the execution of the operational instructions causes the one or more nodes 37 to execute, independently or in conjunction, the steps of FIG. 27F. In particular, the query processing module 2435 can execute the steps of FIG. 27F via implementation by a single corresponding node 37, where one or more nodes 37 each execute the steps of FIG. 27F. Some or all of the method of FIG. 27F can be performed by the query execution module 2402, for example, by utilizing at least one processor and memory of the query execution module 2402 to implement multiple query processing module 2435 of multiple different nodes 37. Some or all of the method of query processing module 2435 be performed by query processing module 2435 for example, by utilizing at least one processor and memory of the query processing module 2435 to implement the memory module 2745 and/or the recovery module 2755. Some or all of the steps of FIG. 27F can optionally be performed by any other processing module of the database system 10. Some or all of the steps of FIG. 27F can be performed to implement some or all of the functionality of the query execution module 2402 and/or of a query processing module 2435 of the query execution module 2402 described in conjunction with FIGS. 27A-27E. Some or all steps of FIG. 27F can be performed by database system 10 in accordance with other embodiments of the query execution module 2402 discussed herein.

Step 2782 includes determining a query for execution. Step 2784 includes determining a query operator execution flow for the query that includes an ordered plurality of query operators, wherein the ordered plurality of query operators includes a first blocking operator. Step 2786 includes facilitating a first attempted execution of the query via performance of a first plurality of operator executions in accordance with the query operator execution flow, where performing each of the first plurality of operator executions includes generating operator output data by applying one of the ordered plurality of query operators to pending operator input data of the one of the ordered plurality of query operators, and where the operator output data is added to the pending operator input data of at least one immediately succeeding query operator of the ordered plurality of query operators. Step 2788 includes generating checkpoint data for the first attempted execution of the query that includes the operator output data of the first blocking operator based on applying the first blocking operator the pending operator input data.

Step 2790 includes detecting an execution failure condition during the first attempted execution of the query. Step 2792 includes facilitating a second attempted execution of the query based on detecting the execution failure condition via performance of a second plurality of operator executions in accordance with a truncated query operator execution flow that includes only ones of the ordered plurality of query operators that succeed the first blocking operator by utilizing the checkpoint data as pending input data of at least one immediately succeeding query operator from the first blocking operator in the ordered plurality of query operators. Step 2794 includes generating a resultant of the query based on completion of the second attempted execution of the query.

FIGS. 28A-28C illustrate embodiments of a query execution module 2402 that can rebuild lineage of data mid-query in response to failure based on tracking and/or otherwise determining data lineage. For example, some or all of the features discussed in conjunction with FIGS. 28A-28C can be utilized by the query execution module 2402 to implement a corresponding query execution plan 2405 to execute queries under the mid-query data lineage rebuild mode 2504 of FIG. 25K and/or one or more other query execution modes utilized to execute queries discussed herein. Some or all features of the query execution module 2402 discussed in conjunction with FIGS. 28A-28C can be utilized to implement the query execution module 2402 of FIG. 25A and/or any other embodiment of the query execution module 2402 discussed herein.

If failure is detected by a node and/or if a node is reassigned to replace a failed node, rather than re-executing an entire query, the lineage of data can be tracked and/or determined based on information received from other nodes. This can include information regarding which portions of data they did and didn't receive from the failed node and/or which portions of data they did and didn't send to the failed node. This can be utilized to determine which portions of data blocks need to be regenerated and/or resent by a replacement node, while also ensuring that data isn't duplicated. In some cases, the regeneration and/or re-sending of data can be localized to a small number of nodes within the query plan. While greater coordination and metadata passing may be required, this can save in the time and resources required to repetitively re-execute a query that is likely to fail at scale. In particular, a single execution of mid-query data lineage rebuild mode 2504 sacrifices execution cost and can thus have less favorable successful query execution cost data 2536 than other modes to improve resultant correctness, and can thus have more favorable resultant correctness guarantee data 2534.

As illustrated in FIG. 28A, a plurality of nodes 37 of a query execution module 2402 each generate data blocks 2810 sent to other nodes 37 in accordance with execution of a query. In particular, the plurality of nodes 37 can generate and route their data blocks 2810 in accordance with an execution of the query in accordance with a corresponding query execution plan 2405, for example, based on query execute roles assigned to each node and/or based on the query execution plan data 2540 communicated to the plurality of nodes 37. The same or similar example set of nodes A, B, C, D, E, F, G, and H as illustrated in FIG. 26A are presented in the example of FIG. 28A. Nodes D, E, F, and G are included at an IO level 2416 of the query execution plan 2405 and/or are otherwise responsible for record reads in accordance with the query. Nodes B and C are included in an inner level of the query execution plan. Note that one or more additional levels can be included between this level that includes node B and C and the IO level that includes nodes D, E, F, and G. Node A is included at the root level and/or at a next, higher inner level of the query execution plan where node A receives data from node B and node C to generate its output data blocks 2810. Node H does not participate in the original query execution plan 2405. Node C is detected and/or otherwise determined to fail at time $t_0$.

As illustrated in FIG. 28B, a set of nodes of a recovery node lineage 2830 can include the descendants of failed node C, including at least node F and node G and/or including any additional nodes at the IO level and/or at one or more levels between the IO level and the level that includes node C. In this example, note that nodes A, B, D, and E are not included in recovery node lineage 2830. For example, nodes A, B, D, and E are not included based on never having sent data blocks to node C directly, and based on never having sent data blocks to descendants of node C. For example, this lack of communication with node C directly or indirectly is based on nodes A, B, D, and E not being descendants of node C and further based on based on nodes A, B, D, and E not being included in shuffle node sets with node C or with any descendants of node C.

While not illustrated in the example presented in FIG. 28B, some nodes that are not direct descendants of the given node in a query execution plan 2405 are still determined to be included in the recovery node lineage 2830. For example, node B or other nodes at the same level as node C can be included in recovery node lineage 2830 in cases these nodes communicated with node C in accordance with a shuffle set of nodes communicating data within the same level. As another example, the recovery node lineage 2830 can include nodes D and nodes E in cases where these nodes D, E, F, and G are included in a same shuffle node set of nodes within the query execution plan level that includes nodes F and G. In particular, consider the case where nodes D and/or E sent data to nodes F and/or G in accordance with participation in the shuffle node set. For example, nodes D and/or E may have sent data to nodes F and/or G in accordance with execution of a JOIN operator. Nodes D and E are thus included in the recovery node lineage 2830 because they influenced the data blocks sent to node C by node F and node G, even though nodes D and E are not direct descendants of node C themselves. Thus, in some embodiments, any nodes included in the path of data propagation to the failed node C are also included in the recovery node lineage 2830 as described herein. This can include any nodes that sent data to node C in accordance with a shuffle node set that includes node C. This can include any nodes that sent data to descendants of node C in accordance with one or more shuffle node sets that include one or more descendants of node C.

The nodes of recovery node lineage 2830 can generate regenerated data blocks 2820, for example, by resending and/or fully regenerating all of their previously generated data blocks 2810. This can be based on nodes F and G performing record re-reads 2825 to re-perform the previous record reads 2815 of the query to generate their respective regenerated data blocks 2820, where any nodes in recovery node lineage 2830 at levels between the IO level and the level that includes node C generate their regenerated data blocks 2820 based on the regenerated data blocks 2820 received from their own child nodes. In some cases, the regenerated data blocks 2820 can be regenerated by children of node C based on their checkpoint data 2750 of FIGS. 27A-27E, for example, if they deem all of their input data and/or their own processing as not being corrupted by the detected failure.

In this example, node H has been assigned to replace node C and generates recovery data blocks 2822 based on all of the regenerated data blocks 2820 of the recovery node lineage 2830 to fully replace node C's role in the query execution plan 2405, for example, based on node reassignment data 2630 being generated to indicate that node C be replaced by node H as discussed in conjunction with FIGS. 26A-26C. In other embodiments, node C can generate the recovery data blocks 2822 based on the regenerated data blocks 2820 of the recovery node lineage 2830, for example, in cases where node C is still operational and generates the recovery data blocks based on the failure being temporary and/or in cases where the query execution plan is static.

Node A can generate its output data blocks 2824 by utilizing the recovery data blocks generated by node C in conjunction with the original data blocks 2810 that were received from node B in conjunction with processing original data blocks 2810 generated via its own set of descendants. In some cases, if any original data blocks were sent by node C prior to failure, these data blocks are disregarded and/or ignored by node A in generating its data blocks 2824 based on detecting and/or being notified of the failure. In some cases, if node A determines processed data and/or output its already generated is potentially corrupted, where the original incoming data from node B is not saved, regenerated data blocks can be generated for node A, for example, based on node A indicating its processed data is corrupted, where recovery node lineage 2830 of node A includes all of nodes B, D, E, F, and G based on all being descendants of node A. Either node C or node H can be included in the recovery node lineage 2830 of node A based on whether node C was replaced by node H in reassignment data.

In some cases, the highest node that receives corrupted data based on a failure of a descendant, but has not yet send any output data blocks 2810 to other nodes, is utilized as the top node from which the recovery node lineage 2830 is determined, for example, to mitigate the level resultant incorrectness and/or to guarantee resultant correctness. For example, tracked failure detection data of FIGS. 31A and 31B and/or other failure detection data generated and/or received by node C can be utilized by node C to determine that a failure occurred in one or more of its descendants. In such cases, node C may not have failed itself in FIG. 28A, but rather detected a failure of one or more of its descendants after beginning to process received data blocks 2810 but prior to sending any data blocks 2810 as output, thus making node C the top node from which the recovery node lineage 2830 is determined. In such cases, one or more of the nodes in recovery node lineage 2830 that failed may be replaced by a new node based on node reassignment data 2630, where this new node generates regenerated data blocks 2820 instead of the corresponding failed node.

In some cases, the nodes of recovery node lineage 2830 do not regenerate all of their data blocks, but only a subset of data blocks, for example, that were deemed to be missing from being received by node A based on the failure of node C. Increased metadata tracking and passing can be utilized to determine and/or estimate the subset of input data blocks of the input data blocks sent to node C that are not represented in the output generated by node C, for example, based on data blocks 2810 being tagged with information regarding their originating child node that generated the output data and/or the originating set of records from which they were generated. This tagging can include tracking of multiple nodes responsible for generated output data blocks from input data blocks, where the tagging includes information regarding each node involved in ultimately generating the corresponding output data block 2810 and/or the set of records represented and processed to ultimately generate the corresponding output data block 2810.

In such cases, the nodes of recovery node lineage 2830 can receive recovery instructions indicating only a subset of data be regenerated, where recovery data blocks 2822 supplement the originally generated data blocks 2810 of node C to complete and/or attempt to complete the required set of data blocks that node C was responsible for generating. In some cases, only a subset of the nodes in recovery node lineage 2830 need to generate their regenerated output data blocks 2820 based on some nodes in recovery node lineage 2830 being determined to have already had their data appropriately processed and sent to node A by node C prior to failure. For example if all records read by node F were appropriately processed via parent nodes of node F and by node C, but at least some records read by node G were appropriately processed via parent nodes of node G and by node C, node G can fetch re-read records 2825 while node F does not duplicate this step based on its originally read records already being represented in node C's output to node A.

FIG. 28C illustrates an embodiment of a lineage-based recovery module 2840, where at least one lineage-based recovery module 2840 is implemented by query execution module 2402. For example, some or all nodes 37 can implement their own lineage-based recovery module 2840. For example, the lineage-based recovery module 2840 of this example is implemented by node C, by node H, and/or by node A.

The lineage-based recovery module 2840 can implement the same or different failure detection module 2652 of FIG. 26C to generate failure detection data. In this case, the lineage-based recovery module 2840 determines that node C has failed based on execution condition data of node C and/or of one or more of its descendants comparing unfavorably to the execution condition requirement data. The lineage-based recovery module 2840 can implement a lineage determination module 2854 to generate recovery node lineage 2830. This can be based on knowledge of the query execution plan, can be based on query execution plan data 2540, and/or can be based on tracked data, such as tags and/or metadata applied to data blocks, where a tag to a data blocks indicates the originating records represented in the corresponding data block and/or indicates the path, such as a set of multiple nodes in accordance with the tree structure, that were involved in ultimately generating the data block 2810, beginning from an the IO level node.

The lineage-based recovery module 2840 can implement a re-execution communication module 2856 to generate and send re-execution instructions to some or all of the set of nodes indicated in the recovery node lineage 2830. As illustrated, the re-execution instructions can be sent only to a child node set of the node that implements the lineage-based recovery module 2840, where each child node generates and sends re-execution instructions to some or all of its own child nodes, and where such instructions propagate down the query execution plan via the tree structure until IO level nodes that are descendants of the originating node, such as node F and node G in this case, ultimately receive the re-execution instructions and re-read some or all of their assigned records as re-read records 2825 accordingly. For example, child nodes of child node set 2866 can implement the re-execution communication module 2856 of their own lineage-based recovery module 2840 to send re-execution instructions to some or all of their children in response to receiving re-execution instructions from a parent node. For example, the failure detection module 2652 can detect the failure and/or the lineage determination module can determine the recovery node lineage 2830 based on receiving the re-execution instructions from a parent node.

The re-execution instructions can indicate that originals data blocks 2810 must be by a corresponding node as regenerated data blocks 2820. Alternatively or in addition, the re-execution instructions can alternatively indicate that only a proper subset of the original data blocks 2810 be regenerated based on determining which data is missing and need be regenerated and/or based on determining which data was already sent to node A and thus mustn't be duplicated, for example, based on tracked data lineage of data blocks 2810 and/or other metadata tags of data blocks 2810.

Figure 28D:
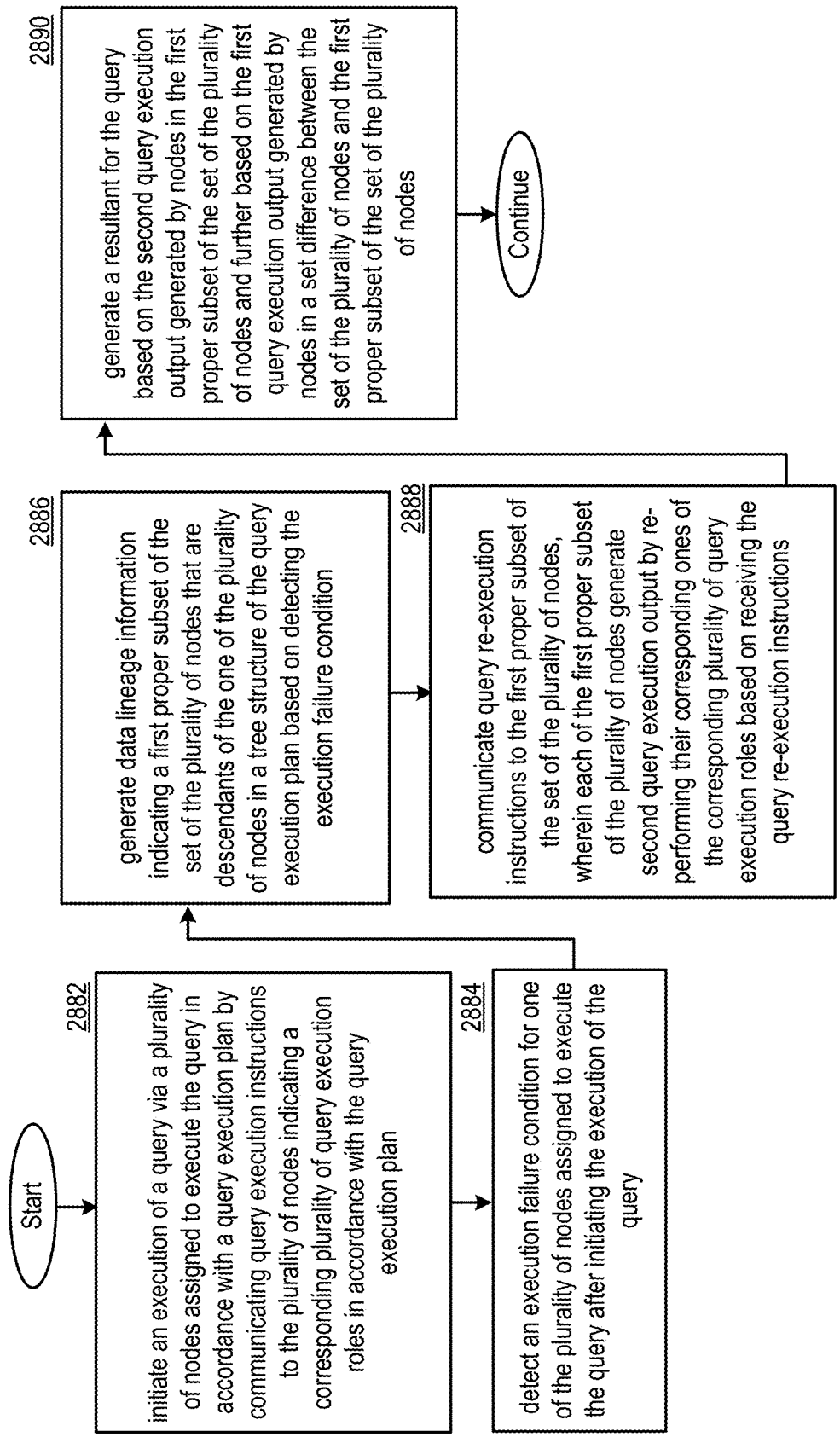
FIG. 28D is a logic diagram illustrating a method of facilitating lineage-based recovery during execution of a query in accordance with various embodiments of the present invention.

FIG. 28D illustrates a method for execution by at least one processing module of a query execution module 2402. For example, the database system 10 can utilize at least one processing module of one or more nodes 37 of one or more computing devices 18, where the one or more nodes to execute operational instructions stored in memory accessible by the one or more nodes, and where the execution of the operational instructions causes the one or more nodes 37 to execute, independently or in conjunction, the steps of FIG. 28D. In particular, the lineage-based recovery module 2840 can execute the steps of FIG. 28D via implementation by a single corresponding node 37, where one or more nodes 37 each execute the steps of FIG. 28D. Some or all of the method of FIG. 28D can be performed by the query execution module 2402, for example, by utilizing at least one processor and memory of the query execution module 2402 to implement multiple lineage-based recovery modules 2840 of multiple different nodes 37. Some or all of the method of FIG. 28D can be performed by a lineage-based recovery module 2840 for example, by utilizing at least one processor and memory of the lineage-based recovery module 2840 to implement the failure detection module 2652, the lineage determination module 2854, and/or the re-execution communication module 2856. Some or all of the steps of FIG. 28D can optionally be performed by any other processing module of the database system 10. Some or all of the steps of FIG. 28D can be performed to implement some or all of the functionality of the query execution module 2402 and/or of the lineage-based recovery module 2840 of the query execution module 2402 described in conjunction with FIGS. 28A-28C. Some or all steps of FIG. 28D can be performed by database system 10 in accordance with other embodiments of the query execution module 2402 discussed herein.

Step 2882 includes initiating an execution of a query via a plurality of nodes assigned to execute the query in accordance with a query execution plan by communicating query execution instructions to the plurality of nodes indicating a corresponding plurality of query execution roles in accordance with the query execution plan. Each of at least a set of the plurality of nodes generates first query execution output by performing their corresponding ones of the corresponding plurality of query execution roles based on receiving the query execution instructions. Step 2884 includes detecting an execution failure condition for one of the plurality of nodes assigned to execute the query after initiating the execution of the query. Step 2886 includes generating data lineage information indicating a first proper subset of the set of the plurality of nodes that are descendants of the one of the plurality of nodes in a tree structure of the query execution plan based on detecting the execution failure condition. Step 2888 includes communicating query re-execution instructions to the first proper subset of the set of the plurality of nodes, wherein each of the first proper subset of the plurality of nodes generate second query execution output by re-performing their corresponding ones of the corresponding plurality of query execution roles based on receiving the query re-execution instructions. Step 2890 includes generating a resultant for the query based on the second query execution output generated by nodes in the first proper subset of the set of the plurality of nodes and further based on the first query execution output generated by nodes in a set difference between the set of the plurality of nodes and the first proper subset of the set of the plurality of nodes.

FIGS. 29A-29C illustrate embodiments of a query execution module 2402 that can resume query execution of one or more queries by a new node based on saved state data received from a node determined to have an upcoming outage. For example, some or all of the features discussed in conjunction with FIGS. 28A-28C can be utilized by the query execution module 2402 to implement a corresponding query execution plan 2405 to execute queries under saved state flush mode 2505 of FIG. 25K and/or one or more other query execution modes utilized to execute queries discussed herein. Some or all features of the query execution module 2402 discussed in conjunction with FIGS. 28A-28C can be utilized to implement the query execution module 2402 of FIG. 25A and/or any other embodiment of the query execution module 2402 discussed herein.

Nodes with detected upcoming outages, such as scheduled outages or detection of degradation and/or grey failure conditions, can generate saved state data regarding their progress in execution of one or more ongoing queries thus far, where this saved state data is sent to and utilized by another, replacement node to facilitate the replacement node's resuming of the one or more ongoing queries. A final query resultant can be based on some resultant data blocks generated by a first node prior to an outage and can be based on some resultant data blocks generated by a replacement node that resumed the first node's query execution role, executing only a portion of the first node's query execution role based on the saved state data of the first node. The saved state data can be utilized to mitigate and/or eliminate the chance of missing data blocks and/or duplicated data blocks required by the query execution role originally assigned to the first node, as the replacement node can utilize the saved state data to determine which data blocks were already generated and/or transmitted to a parent node and/or shuffle node set, and to further determine which data blocks have yet to be generated and/or transmitted to the parent node and/or the shuffle node set.

In some cases, re-execution of a query can be averted in cases of node failure if the node failure is planned and/or known in advance. In particular, if a first node processing a query determines an outage is scheduled, or determines it is in a grey failure state by self-assessing its health, it can flush a saved state of its query operator execution flow, including any intermediate data blocks to be further processed, to a second node. Additional input blocks designated for this first node can also be routed to the second node and/or one or more third nodes in the query execution plan to which output data blocks should be routed can be informed that the remainder of its input data blocks to be received from the first node will instead be received from the second node. The second node can be in the same cluster as the first node, for example, assigned based on a consensus protocol mediated prior to or during the query. In some cases, query correctness can be achieved in this case, despite the greater coordination required.

In the example illustrated in FIG. 29A, a query execution module 2402 can execute a query via a query execution plan 25405 that includes a plurality of nodes 37 that includes at least nodes A, B, and C, but not node H. For example, the query execution plan 2405 can be determined by nodes 37 based on query execution plan data 2540. A first set of data blocks 2910 can be generated via some or all nodes in the query execution plan prior to time a time $t_0$. Nodes B and C generate output data blocks 2910 for transmission as input data blocks to node A, and node A generates its own output data blocks 2910 based on the input data blocks received from nodes B and C as discussed previously. For example, this can be the same or similar query execution plan 2405 of FIG. 26A and/or FIG. 28A. Note that output data blocks 2910 may not have yet been generated by some nodes prior to time to due to not having received input or still processing their input. Note that some nodes may have generated all of their output data blocks prior to time $t_0$. Note that the data blocks 2910 generated by some nodes prior to time to constitutes only a proper subset of the data blocks that are required to be generated by these nodes. In particular, the data blocks 2910 generated by node C prior to time to can constitute only a proper subset of the data blocks that are required to be generated by node C in accordance with its assigned execution role of the query execution plan 2405.

At time $t_0$, after the first set of output data blocks 2910 are generated by nodes of the query execution module 2402 in accordance with execution of a given query, node C generates saved state data 2930 that is sent to node H based on determining an upcoming outage. For example, node C detects its own upcoming outage by utilizing the failure detection module 2652. Node C can detect its own upcoming outage be based on measuring its own performance and predicting its own failure is upcoming with a probability that exceeds a failure probability threshold and/or predicting its own failure will occur in an expected amount of time that is predicted to be before to an expected amount of time remaining for node C's own execution of the query. Node C can detect its own upcoming outage based on a received and/or locally stored outage schedule indicating an upcoming scheduled outage. Alternatively or in addition, a different node such a node H or a node in node C's group of nodes 2620 detects execution condition data of node C compares unfavorably to the execution condition requirement, and this different node notifies node C of that is detected to be failing. Alternatively or in addition, node C generates and/or receives node reassignment data 2630 indicating node H has been assigned to replace node C for the remainder of node C's execution.

At a time $t_1$ that is after time to during the execution of the query by the query execution module 2402, other nodes in the query execution plan 2405 including nodes A and B continue their own respective executions by generating any remaining data blocks 2920 that were not already generated prior to time $t_0$, in accordance with their normal operation and/or their assigned execution role for execution of the query. Rather than node C also generating its remaining data blocks 2920, instead node H resumes node C's execution of the query by generating the additional data blocks 2920 to be sent to node A and/or to be sent to a shuffle node set. In particular, node H utilizes the saved state data 2930 received from node C to produce only the remaining data blocks 2920, without reproducing previously generated data blocks 2910 that were already generated by node C. In some cases, children of node C reroute their output data blocks 2920 to node H based on a receiving notification, such as the node reassignment data 2630 indicating node H replaces node C.

In some cases, data blocks 2910 generated and sent by node C and data blocks 2920 generated and sent by node H are mutually exclusive and collectively exhaustive with respect to the required set of data blocks for the query execution role originally assigned to node C and then transferred to node H. This is the ideal case, as this means all required data blocks can be utilized by node A, where no duplicates are present and thus all records are represented exactly once. In such cases, resultant correctness can be guaranteed assuming all other nodes operate correctly and/or similarly are reassigned with saved states in this manner.

However, due to delays in node H's notification to replace node C, delays in child nodes of node C determining to route their output to node H instead, and/or the saved state not being the most up to data saved state, data blocks 2910 generated and sent by node C and data blocks 2920 generated and sent by node H may have a non-null intersection and/or may not be collectively exhaustive with respect to the required set of data blocks for the query execution role originally assigned to node C, where some data blocks are thus missing and/or where some data blocks are thus duplicated. Thus, resultant correctness may not be guaranteed. Despite this, the resuming of the query from the saved state by node H can still improve the resultant correctness guarantee data 2534 compared to other query execution mode options where node C would not be replaced at all and where many more data blocks would thus be missing, and/or where node H re-executes all work assigned to node C and where many more data blocks would thus be duplicated. Furthermore, assuming that the resultant is still determined to still meet resultant correctness guarantee requirements based on the amount of duplicated and/or missing records being expected and/or determined to be sufficiently minimal, this mechanism can improve successful execution cost data 2536, despite the generation and transfer of the saved state data, because the query may not need to be re-executed by the entire query execution plan and/or because the query may not need to be re-executed by the node H, for example, via the lineage tracking discussed in conjunction with FIGS. 28A-28C.

FIG. 29C illustrates an embodiment of a query execution module 2402 that includes at least one node 37 that implements a saved state generator module 2950 to generate the saved state data 2930 and send the saved state data 2930 to a new node 37. Any node 37 discussed herein can implement the saved state generator module 2950 and/or the upcoming outage detection module of the node 37 presented in FIG. 29C.

The new node 37 can be designated to replace the node 37 based on node reassignment data 2630, for example, as illustrated in FIG. 29B where node H receives the saved state data 2930 from node C and then resumes node C's execution. In other cases, the new node 37 temporarily stores the saved state data 2930 for use by a different node. For example, the new node 37 later routes the saved state data 2930 to a third node 37 that is later assigned to replace the node 37, for example, if the given node has not received node reassignment data 2630 and thus does not know who to forward the saved state data 2930, where the new node is a predetermined and/or default node to whom the node's saved state data is designated to be sent for later reassignment. In other cases, the new node 37 temporarily stores the saved state data 2930 for use by the original node once it is back online, for example, if the outage is planned and is known and/or expected to be short in duration. In such cases, the new node 37 sends the saved state data 2930 back to node 37 once it is back online, where the original assigned node resumes from its saved state. In such cases, if memory is not compromised during these outages, the original node can alternatively save its saved state data 2930 in its own memory module such as memory module 2745 before going offline, where the original node fetches the saved state data 2930 from memory module 2745 once the outage is over to resume its own execution.

The saved state generator module 2950 can generate the saved state data 2930 based on pending data blocks included in some or all operator input data sets 2722.1-2722.M that reflect the current state of the query operator execution flow 2433 implemented by the query processing module 2435 of the node, for example, as discussed in conjunction with FIG. 27A. For example, the data blocks in operator input data sets 2722.2-2722.M include data blocks that were generated by the corresponding node via one or more operator executions of operators serially below the corresponding operator, and thus reflect progress made by the node in execution of the query thus far. Furthermore, the data blocks in operator input data sets 2722.1 include data blocks 2910 that were received from one or more child nodes of the given node and/or that were retrieved and/or from memory if the node is at the IO level, enabling the new node 37 to utilize this input, albeit not yet processed, in the corresponding query operator execution flow 2433 rather than having to re-fetch and/or re-request this information. The saved state generator module can alternatively and/or additionally include and/or indicate resultant data blocks 2924 that were generated via operator executions of the final operator 2720.M that have not yet been transmitted to the parent node and/or that were already transmitted but also cached in local memory, for example, to preemptively prepare the saved state data 2930.

For example, node H resumes query execution by determining the serialized and/or parallelized ordering of operators of the query operator execution flow 2433, and by populating each operator's operator input data sets 2722.1-2722.M with the pending data blocks of these operator input data sets indicated by the saved state data. The serialized and/or parallelized ordering of operators of the query operator execution flow 2433 can be determined by node H based on the query execution plan data 2540, based on the node reassignment data 2630, and/or based on being included in the saved state data 2930 generated by node C in addition to the corresponding pending data blocks of these operator input data sets indicated by the saved state data.

In cases that the resultant data blocks 2924 are indicated, node H can alternatively or additionally resume node C's execution based on determining not to regenerate and/or resend these resultant data blocks 2924. In some cases, node H implements the lineage determination module 2854 to re-generate some or all data blocks 2910 in addition to generating data blocks 2920, and then filters resultant data blocks 2924 from the re-generated data blocks 2910 to ensure the parent node does not receive duplicated data blocks. In some cases, node H implements the lineage determination module 2854 based on lineage tracking data indicated by lineage tags or other information indicated by of resultant data blocks 2924 to request re-generation of only data blocks via node C's descendants that were not already processed via query operator execution flow 2433 to generate the resultant data blocks 2924.

Alternatively or in addition, the saved state data 2930 can be generated to include the most recent checkpoint data 2750 generated as output of an execution of a corresponding blocking operator in the query operator execution flow 2433 as discussed in conjunction with FIGS. 27B-27E. For example, node H resumes node C's execution by applying the recovery module 2755 and performing only the truncated query operator execution flow 2733 that is strictly after the corresponding blocking operator as discussed in conjunction with FIG. 27E.

In some cases, the saved state data 2930 can be generated to include the current state of the node 37's execution multiple concurrently queries. For example, the node has begun performing the sequential plurality of operator executions for a plurality of query operator execution flows 2433 corresponding to a plurality of different queries, where the node has not finished performing the sequential plurality of operator executions for the plurality of currently executing queries and/or has otherwise not sent all of the resultant data blocks outputted by any of the plurality of currently executing queries. The saved state data 2930 can be generated to include pending data blocks of operator input data sets 2722.1-2722.M for each query, where different queries have different numbers of operators M; to include resultant data blocks 2924 for each query; and/or to include recent checkpoint data 2750 for each query. The new node 37 can resume all of the currently executing queries itself and/or a plurality of different new nodes can be reassigned to resume execution of different ones of the node's plurality of currently executing queries.

The saved state generator module 2950 can generate saved state data 2930 based on a generate saved state instruction generated by an upcoming outage detection module 2940. The upcoming outage detection module 2940 can be implemented by utilizing the failure detection module 2652 to determine an upcoming outage and/or can be implemented to rely on scheduled, planned outages alternatively or in addition to detected failure conditions that don't meet the execution condition requirement data. For example, upcoming outage detection module 2940 can receive and/or access stored scheduled outage data, such as scheduling of planned outages such as planned maintenance in predefined intervals and/or scheduling data for one or more upcoming planned outages such as planned maintenance. The estimated time to finish executing the given query can be automatically determined based on the current state of the query operator execution flow 2433 and/or an amount of pending input data to still be received, where the estimated time to finish executing is compared to a time of a scheduled outage. The generate saved state instruction is sent when the time of a scheduled outage is before and/or is scheduled to occur within a maximum threshold amount of time after the determined estimated time to finish executing the given query. Alternatively or in addition, upcoming outage detection module 2940 can monitor and/or measure current health data of the node itself to determine an upcoming outage and to send the generate saved state instruction when the current health data compares unfavorably to a threshold health level.

In other embodiments, the saved state data 2930 can be generated in predetermined intervals and/or can be generated in accordance with natural checkpoints by the saved state generator module 2950. For example, the saved state data 2930 is generated to include the checkpointing data 2750 of the blocking operators as discussed in conjunction with FIGS. 27B-27E when a blocking operator is executed. The most recent saved state data 2930 can be saved in local memory of the node 37, such as memory module 2745. Rather than generating current data, as there may not be time to fully generate new saved state data 2930, the upcoming outage detection module 2940 can generate an instruction indicating that the most recently generated saved state data 2930 saved in memory module 2745 be fetched from memory module 2745 and transmitted to the new node 37 based on determining an upcoming outage.

Figure 29D:
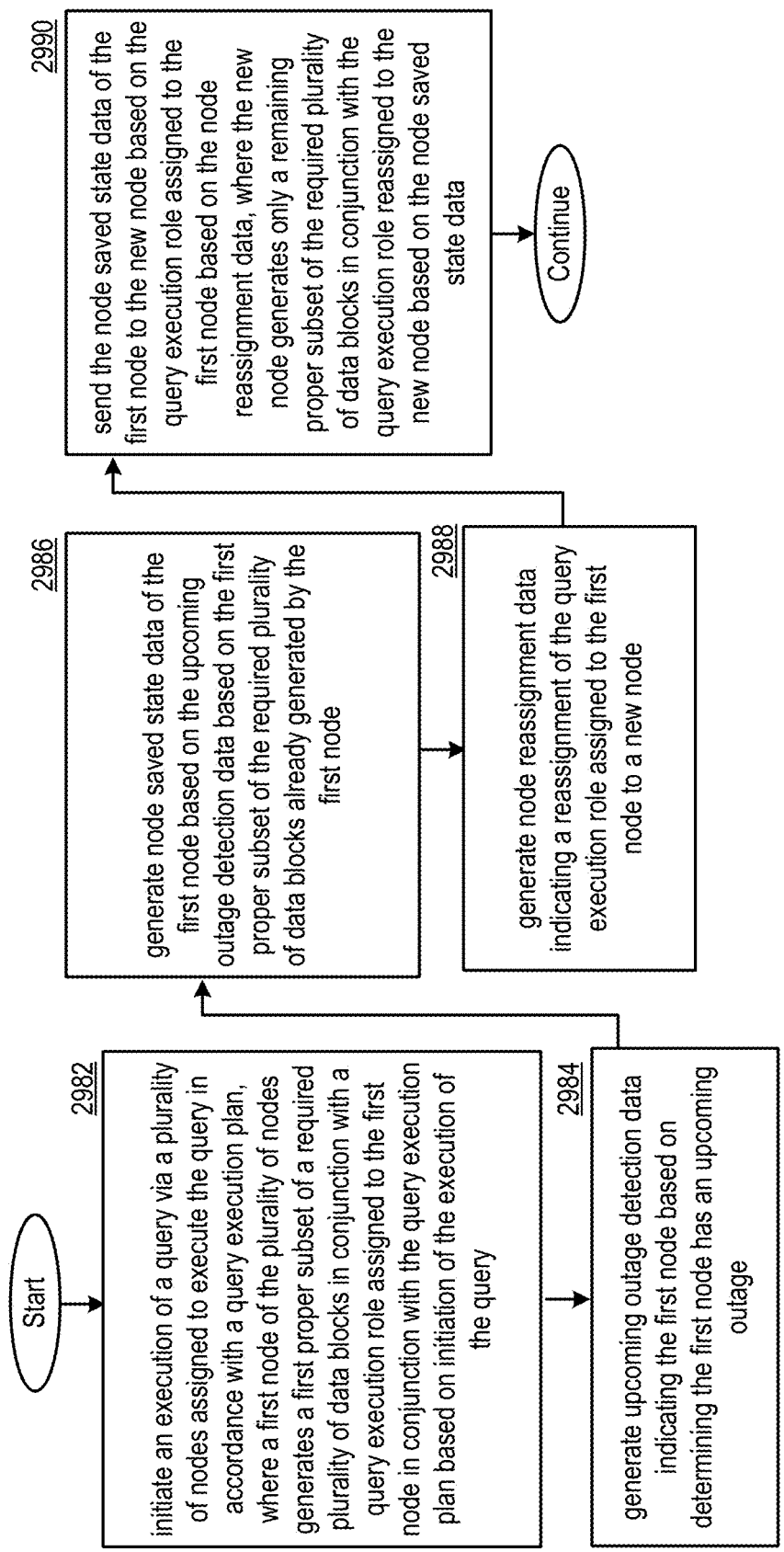
FIG. 29D is a logic diagram illustrating a method of generating and utilizing saved data during execution of a query in accordance with various embodiments of the present invention.

FIG. 29D illustrates a method for execution by at least one processing module of a query execution module 2402. For example, the database system 10 can utilize at least one processing module of one or more nodes 37 of one or more computing devices 18, where the one or more nodes to execute operational instructions stored in memory accessible by the one or more nodes, and where the execution of the operational instructions causes the one or more nodes 37 to execute, independently or in conjunction, the steps of FIG. 29D. In particular, the saved state generator module 2950 and/or the upcoming outage detection module 2940 can execute the steps of FIG. 29D via implementation by a single corresponding node 37, where one or more nodes 37 each execute the steps of FIG. 29D. Some or all of the method of FIG. 29D can be performed by the query execution module 2402, for example, by utilizing at least one processor and memory of the query execution module 2402 to implement multiple saved state generator modules 2950 and/or upcoming outage detection modules 2940 of multiple different nodes 37. Some or all of the steps of FIG. 29D can optionally be performed by any other processing module of the database system 10. Some or all of the steps of FIG. 29D can be performed to implement some or all of the functionality of the query execution module 2402, and/or of one or more nodes 37, of the saved state generator module 2950, and/or of the upcoming outage detection module 2940 of the query execution module 2402 described in conjunction with FIGS. 29A-29C. Some or all steps of FIG. 29D can be performed by database system 10 in accordance with other embodiments of the query execution module 2402 discussed herein.

Step 2982 includes initiating an execution of a query via a plurality of nodes assigned to execute the query in accordance with a query execution plan. A first node of the plurality of nodes generates a first proper subset of a required plurality of data blocks in conjunction with a query execution role assigned to the first node in conjunction with the query execution plan based on initiation of the execution of the query. Step 2984 includes generating upcoming outage detection data indicating the first node based on determining the first node has an upcoming outage. For example, the first node determines it has an upcoming outage or a different node determines the first node has an upcoming outage. The upcoming outage can be based on outage scheduling data, and/or can be based on detected health degradation and/or a grey failure of the first node, for example, by utilizing the failure detection module 2652. Step 2986 includes generating, for example, by the first node, node saved state data of the first node based on the upcoming outage detection data based on the first proper subset of the required plurality of data blocks already generated by the first node. Step 2988 includes generating node reassignment data indicating a reassignment of the query execution role assigned to the first node to a new node. For example, the node reassignment data is generated by the first node in response to determining its own upcoming outage, or the node reassignment data is generated by a different node in response to detecting the upcoming outage of the first node. Step 2990 includes sending, for example, by the first node, the node saved state data of the first node to the new node based on the query execution role assigned to the first node based on the node reassignment data. For example, the new node generates only a remaining proper subset of the required plurality of data blocks in conjunction with the query execution role reassigned to the new node based on the node saved state data.

FIG. 30A presents an embodiment of a query processing system 2510 that implements an operator-based execution mode selection module 3052 to generate query execution mode selection data 2513 for a given query based on operators included in the given query. For example, the query execution mode selection module 2512 of FIG. 25A implements the operator-based execution mode selection module 3052 of FIG. 30A, and/or otherwise performs some or all of the functionality of the operator-based execution mode selection module 3052 to generate the query execution mode selection data 2513. For example, some or all of the features discussed in conjunction with FIG. 30A can be utilized by the query execution module 2402 to implement a corresponding query execution plan 2405 to execute queries under a role assignment flexibility mode 2506 of FIG. 25K and/or one or more other query execution modes utilized to execute queries discussed herein. Some or all features of the operator-based execution mode selection module 3052 of the query processing system 2510 discussed in conjunction with FIG. 30A can be utilized to implement the query execution mode selection module 2512 of the query processing system 2510 of FIG. 25A and/or any other embodiment of the query processing system 2510 discussed herein.

As discussed previously herein, query execution plans 2405 include a plurality of nodes each assigned to perform a corresponding assigned execution roles, which can each indicate whether or not the corresponding node is assigned to any participating in the given query, one or more levels at which the node is participating, its parent node to which output data blocks are to be sent, its child nodes from which output data blocks are to be received, a set of records to be retrieved if the node is at the IO level, a query operator execution flow if the node is at the inner level, and/or other information, for example indicated by the query execution plan data 2540. The assigned execution roles for each node in a query execution plan 2405 can include and/or indicate data ownership of each node Data ownership can correspond to the distinct set of records each IO node is assigned to retrieve and/or can correspond to the full set of input data derived from the distinct set of records of descendant nodes in the IO level that an inner level node is assigned to process to generate a corresponding full set of output nodes. This data ownership can otherwise reflect the notion that each node is assigned to process each of a set of records in their raw and/or processed form exactly once to guarantee correctness of the resultant.

In particular, the strictest data ownership requirements can correspond to the requirement that each node be responsible for processing of each one of a required set of input data blocks exactly once, and also generating exactly one of a required set of output data blocks exactly once, for example, to guarantee resultant correctness based on each required record being reflected and/or processed exactly one to generate the true resultant of the query. These data ownership requirements can be indicated in the corresponding query execution role assigned to each node, where no nodes duplicate work and where data blocks are missing under the strictest data ownership requirements.

As discussed in conjunction with various query execution modes presented thus far, varying levels of execution role sharing and/or execution role reassignment between nodes in the query execution plan is allowed, where the corresponding data ownership is strictest in cases where the query execution plan is guaranteed to be static and is looser in cases where the query execution plan allows dynamic reassignment of node's corresponding roles mid-query. For example, in the guaranteed-correctness static execution plan mode 2500 and the imperfect-correctness static execution plan mode 2501, the nodes and corresponding roles in the query execution plan 2405 is static, where no level of execution role reassignment and/or execution role sharing is enabled. However, some level of execution role sharing and/or execution role reassignment between nodes is enabled in other execution plans, such as the dynamic execution plan mode 2502 and/or corresponding functionality of node reassignment discussed in conjunction with FIGS. 26A-26C; and/or the saved state flush mode 2505 and/or corresponding functionality of resuming query execution of another node from a saved state discussed in conjunction with FIGS. 29A-29C. Different execution modes can have different known and/or expected levels to which execution roles will be shared and/or reassigned between nodes. For example, multiple different versions of the dynamic execution plan mode 2502 can have different enabled levels of execution roles will be shared and/or reassignment, and/or the level of execution role sharing and/or reassignment can be a configurable parameter of the dynamic execution plan mode 2502.

These levels of sharing and/or reassignment can be based on the strictness of conditions in which the query execution module 2402, such as one or more individual nodes participating in the query execution plan, will initiate and/or facilitate reassignment and/or sharing of execution roles. For example, as illustrated in FIG. 30A, the query execution mode data 2522 of some or all of the set of options can include and/or indicate role reassignment condition data 3060, dictating the conditions that must be met for role reassignment to occur. These levels of sharing and/or reassignment, and/or the corresponding level of flexibility in data assignment, can otherwise be indicated and/or reflected based on reassignment modality of the corresponding query execution mode.

For example, reassignment of node's assigned execution roles in FIGS. 26A-26C occurs based on node reassignment data 2630 generated in response to an execution condition data comparing unfavorably to execution condition requirement data. In this case, the strictness and/or particular thresholds indicated in the execution condition requirement data can dictate the level to which node reassignment can occur and/or is expected to occur in query execution, and thus the role reassignment condition data 3060 can indicate and/or be based on the execution condition requirement data utilized by the failure detection module 2652 of nodes 37 in the corresponding mode to generate the failure detection data.

Loosening such execution condition requirement data means that conditions dictating failure and necessitating reassignment are stricter, thus causing the level of sharing and/or reassignment in query execution to be correspondingly lower. This can be ideal as it can lessen the rates of duplicated data and/or possibly lessen the rate of missing data that occur due to latency in communicating the node reassignment data to parent and/or child nodes, but also has drawbacks because queries will either need to be executed due to failed node roles not being reassigned or can instead lead to a higher rate of missing data in the resultant due to the failed node roles not being reassigned.

Conversely, tightening the execution condition requirement data means that conditions dictating failure and necessitating reassignment are looser, thus causing the level of sharing and/or reassignment in query execution to be correspondingly greater. This can be ideal as it can lessen the rates of missing data and/or requirements for query re-execution because failed nodes have their roles completed by replacement nodes, but also has drawbacks because queries because the increased level of reassignment can increase the rate of duplicated data in the resultant and possibly the amount of missing data.

In some cases, levels of role reassignment and/or data ownership requirements can be determined for a given query as role reassignment restriction data 3053 indicating an allowable level of role reassignment and/or an allowable amount of flexibility in data ownership. This can be determined on a per-query basis by a role reassignment restriction generator module 3040 that determines the role reassignment restriction data 3053 based on the given query and further based on the resultant correctness requirement data 2553, for example, which is fixed and/or is also set differently for different queries as discussed previously. In particular, the role reassignment restriction generator module 3040 can dictate the level of role reassignment that is allowed such that the resultant correctness requirement data 2553, such as a corresponding minimum threshold correctness probability value and/or a corresponding maximum threshold expected incorrectness level, is guaranteed and/or expected to be met for the given query. The role reassignment restriction data 3053 is then utilized by a role assignment restriction-based filtering module 3056 to generate a role reassignment restriction-based options subset 3057 by filter the set of query execution mode options to include only ones of the set of query execution mode options with role reassignment condition data 3060 that compares favorably to the role reassignment restriction data 3053 determined by the role reassignment restriction generator module 3040 for the given query. The same of different final selection mode 2560 of FIG. 25D can be utilized to select a query execution mode from this role reassignment restriction-based options subset 3057 to ultimately generate query execution mode selection data 2513. The different final selection mode 2560 can utilize the role reassignment restriction-based options subset 3057 instead of or in addition to the correctness-based options subset 2557 and/or the cost-based options subset 2559. In particular, the role reassignment restriction-based options subset 3057 can replace the correctness-based options subset 2557 as it was generated based on the query correctness requirement data 2553 itself, and can thus be considered a more accurate query correctness-based options subset 2557 that further considers query operators and corresponding levels of role reassignment that are allowed to adhere to the query correctness requirement data 2553.

In cases where the resultant correctness guarantee data 2534 of each of the query execution mode options is generated for a given query based on its corresponding operator execution flow as discussed previously, this query-based resultant correctness guarantee data 2534 generated for the set of options can inherently reflect the query-induced implications of role reassignment that affect the resultant correctness guarantee data 2534, and can be utilized instead of or in addition to the role reassignment restriction data, where the selected query execution mode is selected from the correctness-based options subset 2557 generated based on selecting modes with query-based resultant correctness guarantee data 2534 that compares favorably to the resultant correctness requirement data 2553.

The role reassignment restriction data 3053 can be generated by the role reassignment restriction generator module 3040 based on query operators. In particular, the role reassignment restriction data 3053 is tightened or loosened for different queries by leveraging the fact that different types of operator used in different queries inherently require different levels of data ownership requirements. In some cases, even when a fixed level of query correctness guarantee data is required across all queries executed by the system, particular operators of the query inherently necessitate different levels of data ownership requirements to meet the fixed level of query correctness guarantee data. For example, data blocks routed to a UNION DISTINCT operator can include inadvertently duplicated rows due to node role reassignment because the duplicated rows will be removed. Data blocks routed to an aggregating operator such as COUNT/AVERAGE can be performed on, for example, up to a predetermined threshold proportion of, duplicated rows/missing rows while still achieving an "accurate enough" result, for example, that meets resultant correctness guarantee requirements set by the user.

In cases where queries include such operators, compute assignment requirements, acceptable levels of reassignment, and/or other requirements indicated by the role reassignment restriction data 3053 can be loosened and/or otherwise adjusted based on operators of the query. For example, even under loosened data ownership conditions where node reassignment is more frequent, the resultant correctness requirement data 2553 can still be achieved due to the nature of these operators. For example, assignment changes, such as node reassignment as discussed in conjunction with FIGS. 26A-26C, can allowed mid-query to avoid re-execution due to a node failure and/or where a higher number of node failures are tolerated to deem a query execution successful under these conditions, as reflected by the role reassignment restriction data 3053.

However, in cases where a particular singular result is included in the resultant based on a MIN or MAX and/or where a small set of results is included in the resultant based on filtering parameters of a SELECT operator, where no aggregation is performed, the loosening of data ownership may be disallowed. For example, stricter role reassignment restriction data 3053 may be required in these cases to ensure that the resultant correctness requirement data 2553 will be met. In cases where the resultant is expected to be small based on the filtering parameters and/or domain data, the loosening of data ownership may similarly be disallowed.

In some cases, if the resultant is generated to include a large number of raw records, looser role reassignment restriction data 3053 may be allowed, as duplicates can be manually removed later and/or a UNION DISTINCT can be automatically applied at the end of the query operator execution flow if distinct instances of identical records do not need to be counted and/or distinguished. However, if an exact count via a COUNT operator is applied, stricter role reassignment restriction data 3053 may be applied because any duplicates would affect the value of the count. In some cases, requirements and/or implications regarding particular operators and/or their corresponding placement can be configured via user input by each end user based on the type of data being evaluated and/or the specificity required for the ultimate purpose and/or application of the resultants. For example, requirements and/or implications regarding particular operators can be configured via user input to GUI 405.

This use of query operators by the role reassignment restriction generator module 3040 can be achieved via a duplication-removal operator identification module 3010, an aggregation operator identification module 3020, and/or a resultant distinctness evaluation module 3030 implemented by the operator-based execution mode selection module 3052. The duplication-removal operator identification module 3010 can utilize the query expression, the full query operator execution flow 2517 and/or one or more corresponding node-executed query operator execution flows 2433 generated from the query expression, and/or some or all of query execution plan data 2540, and/or query domain size data indicating a known or expected number of records to be processed based on the query domain, to generate a duplication removal operator set and/or duplication removal operator placement data, indicating which duplication removal operators are included and/or where they are positioned in the serialized ordering of the query operator execution flow. For example, a duplication removal operator set and/or duplication removal operator placement data indicating that a UNION DISTINCT operator is placed near the top of the query operator execution flow of a given query can be utilized by the role reassignment restriction generator module 3040 to generate looser role reassignment restriction data 3053 than queries with no UNION DISTINCT operator and/or with UNION DISTINCT operators that are earlier in the query operator execution flow due to the fact that any duplicates generated inadvertently via node reassignment will be removed.

The aggregation operator identification module 3020 can utilize the query expression, the full query operator execution flow 2517 and/or one or more corresponding node-executed query operator execution flows 2433 generated from the query expression, some or all of query execution plan data 2540, and/or query domain size data to generate a aggregation operator set and/or aggregation operator placement data, indicating which aggregation operators are included and/or where they are positioned in the serialized ordering of the query operator execution flow. For example, a aggregation operator set and/or aggregation operator placement data indicating that an AVERAGE operator is placed near the top of the query operator execution flow of a given query can be utilized by the role reassignment restriction generator module 3040 to generate looser role reassignment restriction data 3053 than queries with no AVERAGE operator and/or with AVERAGE operators that are earlier in the query operator execution flow due to the fact that duplicates/missing data generated inadvertently via node reassignment will be less critical, where the average generated as output is expected to be substantially the same and/or similar.

The resultant distinctness evaluation module 3030 can utilize the query expression, the full query operator execution flow 2517 and/or one or more corresponding node-executed query operator execution flows 2433 generated from the query expression, some or all of query execution plan data 2540, and/or query domain size data to generate resultant size data and/or operator specificity data. For example, queries that generate specific data such as small sets of records in the resultant and/or that output a record based on a MIN or MAX operator, as indicated by the resultant size data and/or operator specificity data, can have stricter role reassignment restriction data 3053 generated by the role reassignment restriction generator module 3040 than queries with less specificity and/or larger sets of resultants indicated by their resultant size data and/or operator specificity data.

FIG. 30B illustrates a method for execution by at least one processing module of a query processing system 2510. For example, the database system 10 can utilize at least one processing module of one or more nodes 37 of one or more computing devices 18, where the one or more nodes to execute operational instructions stored in memory accessible by the one or more nodes, and where the execution of the operational instructions causes the one or more nodes 37 to execute, independently or in conjunction, the steps of FIG. 30B. Some or all of the steps of FIG. 30B can optionally be performed by any other processing module of the database system 10. Some or all of the steps of FIG. 30B can be performed to implement some or all of the functionality of the query processing module 2510 and/or the operator-based execution mode selection module 3052 described in conjunction with FIG. 30A. Some or all steps of FIG. 30A can be performed by database system 10 in accordance with other embodiments of the query processing module 2510 and/or the query execution mode selection module 2512 discussed herein.

Step 3082 includes determining a query for execution that includes a plurality of query operators. Step 3084 includes generating role reassignment requirement data for the query based on the plurality of query operators of the query. Step 3086 includes generating query execution mode selection data by selecting a query execution mode from a plurality of query execution mode options with role reassignment condition data that compares favorably to the role reassignment requirement data. Step 3088 includes generating a resultant for the query by facilitating execution of the query via a plurality of nodes of a query execution plan in accordance with the query execution mode indicated in the query execution mode selection data.

FIGS. 31A-31B illustrate embodiments of a query processing system 2510 that generates resultant correctness data 3135 for a resultant generated via execution of a given query based on tracked failure detection data 3120 generated via execution of the given query. For example, some or all of the features discussed in conjunction with FIGS. 31A-31B can be utilized by the query execution module 2402 to implement a corresponding query execution plan 2405 to execute queries under node outage tracking mode 2507 of FIG. 25K and/or one or more other query execution modes utilized to execute queries discussed herein. Alternatively or in addition, some or all of the features discussed in conjunction with FIGS. 31A-31B can be utilized by the query processing module 2510 to determine whether the execution success condition 2532 has been met based on determining whether the resultant correctness data 3135 compares favorably to the execution success condition 2532, and/or to determine whether a produced resultant is determined to meet query correctness requirement data 2553, for example, based on determining whether the resultant correctness data 3135 compares favorably to the query correctness requirement data 2553. Alternatively or in addition, some or all of the features discussed in conjunction with FIGS. 31A-31B can be utilized to determine whether re-execution of a query is required, for example, where re-execution to produce a new resultant to be utilized instead of the resultant and/or in conjunction with the resultant to produce a consensus resultant is determined to be necessary when the resultant correctness data 3135 compares unfavorably to the execution success condition 2532, and/or when the resultant correctness data 3135 compares unfavorably to the query correctness requirement data 2553 for the query. Some or all features of the query execution module 2402 discussed in conjunction with FIGS. 28A-28C can be otherwise utilized to implement the query processing module 2510 of FIG. 25A and/or any other embodiment of the query processing module 2510 discussed herein.

In cases where a set of failed nodes can be determined or estimated, and/or in cases where a set of missing/duplicated data can be determined or estimated, the root node and/or another element of query processing module 2510 can generate a metric indicating the level of known and/or estimated failure and/or a known and/or estimated level of resultant correctness in conjunction with generating a resultant. This can include determining failure is more severe if a node closer to the root failed, and less severe if an IO level node failed, as a smaller percentage of data was likely to be compromised in the latter case. This determination can be based on other nodes receiving/detecting indications of failure in data received from its children and/or receiving/detecting indications of failure of one or more of its children, where this information is propagated upwards to its parent node in conjunction with resultants. This determination can be based on otherwise communicating detected failures to the root node or other central entity via other nodes of the query execution module 2402. While this scheme requires some level of coordination/metadata tracking that may contribute to higher levels of successful execution cost data 2536, it can be ideal in generating more information regarding how detrimental the failure of a query is estimated to be, which can be useful in automatically determining, or determining in response to user review of this information, whether the estimated level of query correctness is sufficient or if the query must be re-run.

As illustrated in FIG. 31A, query execution module 2402 can be utilized to generate tracked failure detection data 3120 in addition to a resultant via execution of a given query, for example, by utilizing a plurality of nodes 37 of a query execution plan 2405. For example, the root node of the query execution plan 2405 generates and outputs the tracked failure detection data 3120 in conjunction with generating and outputting the final resultant as discussed previously. The tracked failure detection data 3120 can indicate and/or be based on: a number of nodes that were detected to fail; the placement of the failed nodes in the query execution plan, such as their corresponding level and/or an indication of the corresponding number of descendants at the IO level; a number of missing records and/or missing data blocks expected and/or determined, such as missing records 2427, based on one or more nodes that were detected to fail; a number of duplicated records and/or data blocks expected and/or determined to be represented in the final resultant based on reassignment of execution roles of one or more nodes that were detected to fail to other nodes; the level of node failure detected such as whether each node failure was a full failure or a grey failure; the level of recovery, checkpointing, reassignment, and/or resuming from saved state data that was achieved based on determining if and/or how the query execution module applied such measures in accordance with node reassignment of FIGS. 26A-26C, with blocking operator checkpointing of FIGS. 27A-27E, with lineage-based recovery of FIGS. 28A-28C, and/or with saved state data flushing of FIGS. 29A-29C; the level of impact the failure had to the query based on the operators in the query itself based on loosened data ownership requirements determined for the query discussed in conjunction with FIG. 30A; and/or other tracked and/or otherwise detected failure.

A resultant correctness module 3130 can generate resultant correctness data 3135 based on the tracked failure detection data 3120. For example, the root node itself can implement the resultant correctness module 3130. The resultant correctness module 3130 can further generate the resultant correctness data 3135 based on the query execution mode data 2522, such as the resultant correctness guarantee data 2534 in particular, of the corresponding query execution mode applied by the query execution module 2402 to generate the resultant for the query. The resultant correctness module 3130 can further generate the resultant correctness data 3135 based on the query execution plan 2405 of the corresponding query execution, such as a total number of participating nodes, total number of levels, and/or each nodes placement in the query execution plan. The resultant correctness module 3130 can alternatively or additionally generate the resultant correctness data 3135 further based on the resultant itself. The resultant correctness function can alternatively or additionally generate the resultant correctness data 3135 further based on the query itself, such as the query domain.

For example, the resultant correctness data 3135 can indicate and/or be generated as a function of: a number and/or percentage of nodes that were detected to fail as indicated in or determined from the tracked failure detection data 3120; the placement of the failed nodes in the query execution plan, such as their corresponding level and/or an indication of the corresponding number of descendants at the IO level fail as indicated in or determined from the tracked failure detection data 3120; a number and/or percentage of records and/or data blocks expected and/or determined to be missing in generating the final resultant, such as missing records 2427, based on one or more nodes that were detected to fail as indicated in or determined from the tracked failure detection data 3120; a number and/or percentage of records and/or data blocks expected and/or determined to be duplicated in generating in the final resultant based on reassignment of execution roles of one or more nodes that were detected to fail to other nodes as indicated in or determined from the tracked failure detection data 3120; the level of node failure detected such as whether each node failure was a full failure or a grey failure as indicated in or determined from the tracked failure detection data 3120; the level of recovery, checkpointing, reassignment, and/or resuming from saved state data that was achieved based on determining if and/or how the query execution module applied such measures in accordance with node reassignment of FIGS. 26A-26C, with blocking operator checkpointing of FIGS. 27A-27E, with lineage-based recovery of FIGS. 28A-28C, and/or with saved state data flushing of FIGS. 29A-29C as indicated in or determined from the tracked failure detection data 3120; the level of impact the failure had to the query based on the operators in the query itself based on loosened data ownership requirements determined for the query discussed in conjunction with FIG. 30A as indicated in or determined from the tracked failure detection data 3120; and/or other tracked and/or otherwise detected failure as indicated in or determined from the tracked failure detection data 3120.

For example, the resultant correctness module 3130 can indicate a probability that the resultant is correct and/or an expected level of incorrectness. These can be calculated in a similar fashion as discussed with regards to the correctness probability values 2535 and/or the expected incorrectness level 2539, for example, where a same or similar resultant correctness probability function 2573 of FIG. 25G and/or where a same or similar incorrectness level expectation function 2574 of FIG. 25G are applied as the resultant correctness module 3130, where the resultant correctness probability function 2573 and/or where the incorrectness level expectation function 2574 utilize actual levels of failure of the tracked failure detection data 3120 as input, such as actual tracked percentage of node failures and/or missing records, rather than the projected level of failure determined as a function of the node failure rate 2585 and/or the node outage scheduling data 2586 as discussed in conjunction with FIG. 25G. Alternatively or in addition, the same and/or similar resultant confidence function 2546 of FIG. 25J can be applied, for example, to a single resultant rather than a consensus resultant 2518, based on the tracked failure detection data 3120 of a single execution, where the resultant correctness data 3135 is based on the resultant confidence data outputted by the resultant confidence function 2546.

A query re-execution assessment module 3140 can generate query re-execution decision data 3145 indicating whether the query be re-executed based on the resultant correctness data 3135. For example, the root node itself can implement the query re-execution assessment module 3140. The resultant correctness data 3135 can be compared to a resultant correctness requirement 2553 of the query, where the query re-execution decision data 3145 indicates the query be re-executed when the resultant correctness data 3135 compares unfavorably to the resultant correctness requirement 2553. As another example, the resultant correctness data 3135 is compared to successful execution conditions 2532 of the query, where the query re-execution decision data 3145 indicates the query be re-executed when the resultant correctness data 3135 compares unfavorably to successful execution conditions 2532.

The resultant produced via the query execution module 2402 can correspond to a resultant generated via a single execution attempt, where the query re-execution assessment module 3140 is implemented by the query processing system 2510 determine whether the query needs to be re-executed based on evaluating the resultant correctness data 3135 against the execution success condition 2532. The resultant produced via the query execution module 2402 can alternatively or additionally correspond to an acceptable resultant, based on the execution success condition 2532 being determined to be met and thus the resultant was returned, where the acceptable resultant was generated via multiple execution attempts and/or a single execution attempts. Here, the query re-execution assessment module 3140 is implemented by the query processing system 2510 to perform the functionality of the query processing system 2510 as discussed previously in conjunction with FIGS. 25A-25K to determine whether the query needs to be re-executed via another set of one or more execution attempts for another resultant to be returned based on the execution success condition 2532 being met, where actual tracked failures are utilized in this regard.

Alternatively or in addition to automatically generating the query re-execution decision data 3145 via query re-execution assessment module 3140, the tracked failure detection data 3120 and/or resultant correctness data 3135 can be transmitted to a client device for display via a display device, for example, in conjunction with the resultant itself. This can enable an end user, such as a user that requested the query, to evaluate the tracked failure detection data 3120 and/or resultant correctness data 3135 and determine the level of trust to place in the resultant, and/or to determine for themselves whether a new resultant should be generated via re-execution of the query.

FIG. 31B illustrates an embodiment of a node 37 that is implemented by a query execution module 2402, for example, by participating in a query execution plan 2405 to facilitate execution of a query to generate the resultant evaluated for correctness in FIG. 31A. For example, some or all nodes 37 participating in the query execution plan 2405 to generate the resultant can be implemented as illustrated in FIG. 31B. The node 37 of FIG. 31B can be utilized to implement the node 37 of FIG. 24B. In particular, the node 37 can implement a failure tracking module 3155 and/or a failure detection module 2652 in addition to the query processing module 2435 that generates resultant data blocks from incoming data blocks of other nodes and/or from memory as discussed previously.

In particular, some or all nodes 37 participating in the query execution plan 2405 can implement the failure detection module 2652 of FIG. 26C to generate failure detection data indicating itself and/or a node with which it communicates in failure detection data as discussed previously. For example, the failure detection module 2652 generates its failure detection data based on self-health data such as measurements of its own processing health and/or its own performance degradation; based on scheduled outage data indicating any upcoming outages; based on measured communication latency data indicating its own failure and/or failure of another node with which it is communicating; based on node reassignment data 2630 received from another node; based on node failure detection received from another node that is or is not included in the query execution plan; and/or based on any other information utilized by the failure detection module 2652 as discussed previously in accordance with one or more other embodiments of the failure detection module 2652.

As illustrated in FIG. 31B, the failure detection data generated by the failure detection module 2652 can correspond to new failure detection data. This new failure detection data is utilized by a failure tracking module 3155 in conjunction with tracked failure detection data 1-W that is received from a set of nodes 1-W, such as child nodes or nodes in a node shuffle set. The failure tracking module 3155 can generate updated tracked failure detection data, for example, where the new failure data is appended to the tracked failure detection data 1-W and/or where the updated tracked failure detection data includes all tracked failure detection data 1-W as well as the new failure detection data. In some cases, if the detected failure in new failure detection failure is already indicated in the tracked failure detection data 1-W, the detected failure is indicated only once in the updated tracked failure detection data. The updated tracked failure detection data is then forwarded to another node 37, such as a parent node in the query execution plan 2405. In cases where no new failures are detected by a node 37 itself, the node simply forwards the tracked failure detection data 1-W received from other nodes without indicating any new detected failure and/or by appending new failure detection data that indicates no new failure was detected by this node. Nodes can continue forwarding their received tracked failure detection data in this fashion, adding new detection data as necessary, where the root node ultimately receives tracked failure detection data representing updated tracked failure detection data generated by some or all nodes in the query execution plan, such as all nodes in the in the query execution plan that have not failed and/or are otherwise operable to a point that they are capable of generating transmitting this information.

FIG. 30C illustrates a method for execution by at least one processing module of a query processing system 2510. For example, the database system 10 can utilize at least one processing module of one or more nodes 37 of one or more computing devices 18, where the one or more nodes to execute operational instructions stored in memory accessible by the one or more nodes, and where the execution of the operational instructions causes the one or more nodes 37 to execute, independently or in conjunction, the steps of FIG. 30C. In particular, the failure tracking module 3155 and/or the failure detection module 2652 can execute the steps of FIG. 30C via implementation by a single corresponding node 37, where one or more nodes 37 of a query execution module 2402 of the query processing system 2510 each execute some or all of the steps of FIG. 30C. Some or all of the method of FIG. 30D can be performed by the query execution module 2402, for example, by utilizing at least one processor and memory of the query execution module 2402 to implement multiple failure tracking modules 3155 and/or failure detection modules 2652 of multiple different nodes 37. Alternatively or in addition, some or all of the method of FIG. 30D can be performed by the resultant correctness module 3130 and/or the query re-execution assessment module 3140. Some or all of the steps of FIG. 30C can optionally be performed by any other processing module of the database system 10. Some or all of the steps of FIG. 30C can be performed to implement some or all of the functionality of the query processing module, such as the resultant correctness module 3130 and/or the query re-execution assessment module 3140 of the query processing module 2510, and/or of one or more nodes 37 of the query execution module 2402 of the query processing module 2510, as described in conjunction with FIGS. 30A-30B. Some or all steps of FIG. 30C can be performed by database system 10 in accordance with other embodiments of the query processing module 2510 discussed herein.

Step 3182 includes determining a query for execution. Step 3184 includes generating a first resultant for the query by facilitating execution of the query via a plurality of nodes of a query execution plan. Step 3186 includes generating tracked failure detection data in conjunction with the execution of the query, for example, via one or more failure tracking modules 3155 of one or more nodes 37 of the plurality of nodes. Step 3188 includes generating resultant correctness data based on the tracked failure detection data, for example, by utilizing the resultant correctness module 3130. Step 3190 includes generating query re-execution decision data based on comparing the resultant correctness data to a resultant correctness requirement, for example, by implementing the query re-execution assessment module 3140. Step 3192 includes generating an updated resultant for the query by facilitating re-execution of the query based on the resultant acceptance data indicating the resultant correctness data compares unfavorably to the resultant correctness requirement.

FIGS. 32A-32F illustrate an embodiment of a query execution module 2402 that facilitates local and/or global aborts of a query being executed. In some cases, for example, at scale, it can be ideal to facilitate global communication to some or all nodes in a query plan in response to detection of a failure mid-query, for example, if the query is expected to take a long time to execute, if the failure is detected early, and/or if the detected failure dictates that the query will need to be re-executed. Rather than requiring all other nodes to continue this lengthy processing of the query, it can be ideal in some cases for nodes to relay a message to the root node directly, to each of a plurality of compute clusters of the query execution plan 2405, such as different groups of nodes 2620 and/or other nodes with which the nodes is assigned to communicate in accordance with the query execution plan 2405. This information can be further relayed upon receipt by other nodes to ultimately communicate the abort to most or all nodes participating to enable many or all nodes to abort their execution of the query prior to completing their respective execution of the query so that they can better utilize their resources to process other queries that have not failed. In some cases, this can include an instruction that the query begin a next iteration of attempted execution.

FIGS. 32A-32D illustrate the propagation of a global abort over time in an example query execution plan 2405 that includes at least a set of nodes A, B, C, D, E, F, and G, implemented via a query execution module 2402 to execute a given query. The nodes generate data blocks 2810 to parent nodes by processing data blocks 2810 received from child nodes as discussed previously. In FIG. 32A, node C detects a failure condition, for example, via failure detection module 2652 of node C. In particular, node C can determine that this condition will render the resultant as unusable, for example, based on the corresponding query execution mode and/or based on node C determining that a successful execution conditions 2532 of the query execution mode will not be met due to the detected failure. Node C determines to abort its execution of the query in response, as denoted by the "X" in FIG. 32A, where node C does not process the query any further and/or does not send any more output data blocks 3210 to node A and/or does not process any more incoming data blocks from nodes F and G. Note that at time $t_0$, the other nodes A, B, D, E, F, and G continue to execute the query, assuming the query hasn't been completed, as they have no knowledge of the problem detected by node C at this time.

Node C is not designated to communicate with all nodes in the query execution plan, but does communicate with a set of local nodes that includes nodes A, F, and G based on node A being a parent of node C in the query execution plan and based on nodes F and G being child nodes in the query execution plan. Node C generates and transmits a query abort notification 3220 at time to for transmission to nodes A, F, and G, as denoted by the bolded arrow in FIG. 32A. In some cases, node C only generates and transmits a query abort notification 3220 if its own progress in execution of the query and/or a projected estimated amount of time remaining for all nodes to complete execution of the query compares favorably to an early execution condition. For example, the abort by other nodes is not initiated if the query execution is already estimated to be far along and/or if many nodes are predicted to be already finished with their execution. In some cases, a node only sends the query abort notification 3220 to child nodes when they have received less than a threshold amount of expected data blocks from the child nodes.

At time $t_1$, nodes A, F, and G receive and process the query abort notification 3220 sent by node C, and abort their respective execution of the query in response by ceasing generation of and/or processing of data blocks 2810, if their execution has not already completed. Note that nodes A, F, and G may receive and process the abort at slightly different times due to differences in communication latency and/or processing efficiency. Each node also forwards the query abort notification 3220 to their own respective parent and child nodes, except for node C because they received the query abort notification 3220 from node C. s Note that at this time, nodes B, D, and E continue processing and generating data blocks 2810, if their execution has not yet completed, as they still have no knowledge of the problem at this time.

At time $t_2$ node B receives and processes the query abort transmission send by node A, and aborts its respective execution of the query in response by ceasing generation of and/or processing of data blocks 2810, if its execution has not already completed. Node B forwards the query abort notification 3220 to their own respective child nodes. Node B does not send the query abort notification 3220 to its parent node, because it received the notification from node A. Note that at this time, nodes D and E continue processing and generating data blocks 2810, if their execution has not yet completed, as they still have no knowledge of the problem at this time.

At time $t_3$ all of the nodes D and E receives and processes the query abort transmission send by node B, and abort their respective execution of the query in response by ceasing generation of and/or processing of data blocks 2810, if their execution has not already completed. Nodes D and E forward the query abort notification 3220 to their own respective child nodes, but not to parent node B due to receiving the notification from node B. This process continues until all IO level nodes and the root node receives the transmission.

Other embodiments can utilize different mechanisms of routing the query abort notification 3220 than that illustrated in FIGS. 32A-32D. For example, a node that detects the query should be aborted can send the query abort notification 3220 to a designated central node, such as the root node at the root level, where this central node disperses the information, for example, where the root node propagates the information down the tree structure. In other embodiments, the query abort notification 3220 can be broadcasted and/or otherwise sent to larger set of nodes than just the local node set of parent and/or child nodes as depicted in FIGS. 32A-32D. In some cases, designated notification relay nodes of the query execution module 2402 are not designated for query execution and/or take on a lighter query execution role to enable all or a sufficient fraction of their resources to be designated for relay of notifications such as the query abort notification 3220. Each of these notification relay nodes can relay the query abort notification 3220, despite not being included in the query execution plan 2405, to other notification relay nodes and/or to a designated set of local nodes of the query execution plan 2405, for example, where some or all nodes participating in the query execution plan 2405 only receive the query abort notification 3220 but do not retransmit the query abort notification 3220 themselves.

In some cases, the query abort notification 3220 is not designated to be sent to all nodes, and only a subset of nodes such as the set of local nodes are alerted and abort their query. For example, the communication resources and/or time required to alert every node to abort can be less favorable than allowing some nodes to finish their execution of the query. This level of propagation of the query abort notification 3220, such as a number of hops and/or number of nodes from the first node that initiated the abort and/or from the root node, can be predetermined and/or can be determined as a function of an expected amount of time remaining to process the query. For example, the number of nodes from the first node that initiated the abort that the query abort notification 3220 will be propagated, and/or the number of nodes from the root node that received the query abort notification 3220 that the query abort notification 3220 will be propagated, can be determined as an increasing function of expected remaining execution time, where the first node or the root node includes information regarding the span of propagation in the query abort notification 3220 allowing relaying nodes to determine whether or not the query abort notification 3220 be further propagated or if its designated span has already been reached. Alternatively, each node, upon receiving the query abort notification 3220, can determine whether to retransmit to nodes in its local node set. This can be based on determining if the expected remaining execution time of the query execution, and/or of each node in its local node set's execution, compares favorably to an execution time remaining threshold, where a node only transmits the query abort notification 3220 to another node in its local node set when its expected remaining execution time exceeds or otherwise compares favorably to the execution time remaining threshold, and/or when its execution is determined to not be complete.

Figure 32E:
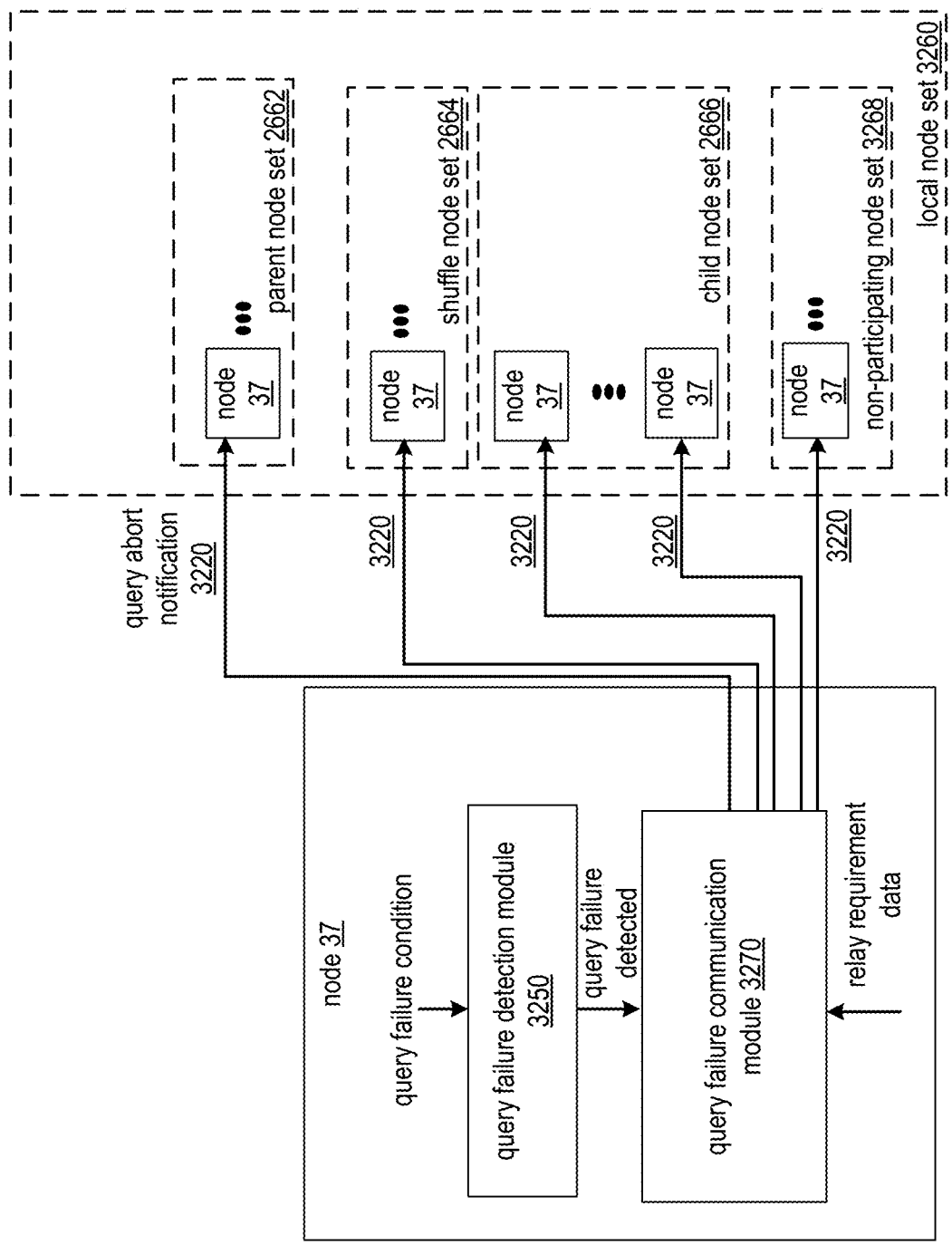

FIG. 32E illustrates an example embodiment of a node 37 of the query execution module 2402 that is operable to detect a failure condition necessitating query abort, and generating and sending the query abort notification 3220 to at least one other nodes 37 of a local node set 3260 in response. The node 37 of FIG. 32E can be utilized to implement some or all nodes 37 of a query execution plan 2405 operable to facilitate global aborts and/or can utilized to implement some or all embodiments of node 37 discussed herein.

A node 37 can utilize a query failure detection module 3250 to generate query failure detection data indicating that failure of the query is detected. This can be in response to receiving and/or determining a query failure condition. For example, the node 37 can determine an event and/or condition has occurred that compares unfavorably to the successful execution condition 2532 and/or can otherwise determine that the query execution has failed to a point that would render the resultant unacceptable and/or require the query to be re-run. The query failure detection module 3250 can determine a detected event and/or condition corresponds to a query failure condition based on comparing the detected event and/or condition to the successful execution conditions 2532 indicated in the query execution plan data 2540 received by the node 37 and determining the detected event and/or condition compares unfavorably to the successful execution conditions 2532. The query failure detection module 3250 can determine a detected event and/or condition corresponds to a query failure condition by a comparing the detected event and/or condition to other determined query execution requirements that are received, stored, and/or accessed by the node 37, where the detected event and/or condition is determined to corresponds to the query failure condition when the detected event and/or condition compares unfavorably to the determined query execution requirements. In some cases, the query failure detection data is generated by the query failure detection module 3250 in response to receiving a query abort notification 3220 from another node.

The query failure detection module 3250 can be the same and/or similar to the failure detection module 2652 and/or can determine the query failure condition has been met based on the same information and/or means as discussed with regards to the failure detection module 2652 detecting node failure. However, the query failure detection module 3250 and/or the corresponding query failure condition may be more stringent than the failure detection module 2652 and/or the corresponding execution condition requirement data. In particular, the failure detection module 2652 is operable to determine failure of individual nodes where execution query as a whole can still be successful, while the query failure detection module 3250 determines that the conditions are dire enough that the query as a whole will not be successful. In cases where the corresponding query execution mode necessitates that no node failures are allowed, the query failure detection module 3250 can be implemented by utilizing the failure detection module 2652. In some cases, the query failure detection module 3250 can receive the tracked failure detection data 3120 from nodes 1-W, and can determine that the query has failed if at least a threshold number of nodes, such as a maximum number of nodes indicated in the successful execution conditions 2532, have been detected to fail as indicated in the incoming tracked failure detection data 3120 from nodes 1-W.

In some cases, the query failure detection module 3250 can determine the query failure is detected based on receiving less than an expected amount of incoming data from child nodes by at least a threshold amount that dictates at least a threshold maximum amount of missing records indicated by the query failure detection module 3250 is believed to be missing in the lower than expected amount of incoming data. In some cases, the query failure detection module 3250 can determine the query failure is detected based on receiving more than an expected amount of incoming data from child nodes by at least a threshold amount that dictates at least a threshold maximum amount of duplicated records indicated by the query failure detection module 3250 are believed to be duplicated in the higher than expected amount of incoming data.

In response to determining a query failure is detected, a query failure communication module 3270 of the node 37 can generate the transmit a query abort notification 3220 to one or more nodes in the local node set 3260. The local node set 3260 can include: a set of one or more parent nodes 37 of the given node at a higher level than the given node in the query execution plan 2405 of a parent node set 2662; a set of one or more shuffle nodes 37 at the same level as the given node in the query execution plan 2405 that exchange information with the given node in the query execution plan of a shuffle node set 2664; a set of one or more child nodes 37 of the given node in a lower level than the given node the query execution plan 2405 of a child node set 2666; and/or set of one or more non-participating nodes 37 of a non-participating node set 3268 that are not participating in the query execution plan 2405 for the given query but are still locally accessible and/or otherwise operable to receive transmission directly from the given node. The local node set 3260 can include some or all nodes of the group of nodes 2620 to which the given node belongs. The local node set 3260 can include some or all nodes of multiple different groups of nodes 2620 to which the given node belongs.

Some or all of the local node set 3260 of a given node can be fixed across all queries based on the physical location and/or network communication location of the given node with respect to other nodes implemented by the query execution module 2402 and/or implemented by the database system 10 as a whole. Some or all of the local node set 3260 of a given node can be dynamic and based on different nodes assigned to different query execution plans, where the local node set 3260 of a given node is different for different queries to include nodes of different corresponding execution plans 2405 with which the given node is assigned to communicate and/or to include only nodes that are participating in the corresponding query execution plan.

In some cases, the local node set 3260 can include the root node, where all nodes are operable to transmit directly to the root node. In some cases, the local node set 3260 can include only nodes that the given node is operable to and/or assigned to communicate with directly, where the given node is not operable to and/or assigned to communicate directly with at least one non-local node of the query execution plan 2405. These non-local nodes thus can only receive transmission from the node 37, such as the query abort notification 3220, when relayed via nodes as nodes transmit only to their own local node sets. In other cases, in the case of an important notification such as a local abort, additional direct communication channels are facilitated to enable a given node to communicate outside their assigned set of nodes with which the communicate with in the query execution plan 2405, such as some or all additional nodes in the query execution plan, to enable these important notifications to be communicated to nodes more quickly and/or effectively.

As illustrated in FIG. 32E, the query failure communication module 3270 determine whether to transmit the query abort notification 3220 to some or all nodes in the local node set 3260 based on relay requirement data that is received and/or determined by the node, for example, in the query execution plan data 2540. For example, the relay requirement data can indicate the query abort notification 3220 only be transmitted to particular nodes; only be transmitted to parent nodes, only be transmitted to child nodes; only be transmitted to nodes that have not finished executing their portion of the query; only be transmitted to nodes that did not transmit the query abort notification 3220 to the given node; only be transmitted to nodes that are not expected to finish executing their portion of the query for at least a minimum threshold amount of time; only be transmitted to nodes that are determined and/or expected to have at least a threshold fraction of their own respective execution remaining; only be transmitted to nodes that also belong to other local node sets and can thus spread the notification to additional nodes; only be transmitted at all when the given node has not finished its own execution of the query; only be transmitted at all when the given node has at least at threshold amount of execution time remaining; only be transmitted at all when the given node has at least a threshold fraction of its own respective execution remaining; only be transmitted if the nodes health and/or current processing load compares favorably to a threshold; and/or based on other requirements dictating whether or not the query abort notification 3220 be sent to any nodes in the local node set 3260; whether or not the query abort notification 3220 be sent to each node based on individual criteria, and/or otherwise whether or not the query abort notification 3220 be sent to some or all node the local node set 3260.

FIG. 32F illustrates the how the query abort notification 3220 can be propagated via a plurality of overlapping local node sets 3260 to ultimately reach some or all nodes 37 in the query execution plan 2405. Each node 37, upon receiving the query abort notification 3220, can implement their own query failure communication module 3270 to generate and transmit the same or 6 to some or all nodes 37 of their own local node set 3260, as discussed in conjunction with FIG. 32E. These nodes can similarly utilize the same or different relay requirement data to determine whether it is appropriate to send the query abort notification 3220 to some or all nodes 37 of their own local node set 3260 as discussed in conjunction with FIG. 32E. In some cases, as illustrated in FIG. 32F, each node 37 receives the query abort notification 3220 from exactly one node. In some cases, due to the nature of spreading the query abort notification 3220, some node may receive the query abort notification 3220 from multiple nodes. In some cases, exactly one node in each distinct local node set 3260 is designated to communicate the query abort notification 3220 within its local node set 3260, where other nodes that receive this query abort notification 3220 only transmit the query abort notification 3220 to other local node sets 3260. In some cases, some or all local node sets 3260 of the query execution plan 2405 are designated such that each local node sets 3260 does not have more than one overlapping node with any other local node sets 3260 to facilitate this mechanism where exactly one node communicates within its local node sets 3260.

In some cases, as illustrated in FIG. 32F, a node communicates the query abort notification 3220 to a plurality of nodes of a plurality of different, non-overlapping local node sets 3260. For example, node 37-1, such as the node of FIG. 32E that originally detects and initiates the abort or a different node that received the notification from a node of a different local node set 3260 to which node 37-1 also belongs, sends the query abort notification 3220 to each of a set of nodes 37-2-37-X within a local node set 3260-1 that includes node 37-1. Note that node 37-1 may have also sent the query abort notification 3220 to nodes within one or more other local node sets 3260 to which it belongs. Each node 37-2-37-X sends the query abort notification 3220 to other nodes within each of their respective local node sets 3260-2-3260-X, respectively. Note that while each node 37-2-37-X also belongs to local node set 3260-1, these nodes do not send the query abort notification 3220 within local node set 3260-1, as the query abort notification 3220 was received from a node within local node set 3260-1 and is presumed to have already been communicated across nodes in local node set 3260-1, even if these nodes 37-2-37-X are configured to communicate with nodes 37-1-37-X. The nodes within each local node sets 3260-2-3260-X that receive the local aborts from nodes 37-1-37-X, respectively, can further propagate the query abort notification 3220 to nodes within different local node sets 3260 to which they belong, that don't include nodes 37-1-37-X. This propagation can continue until the query has elapsed execution, until all nodes receive the query abort notification 3220, and/or until nodes determine not to further transmit the query abort notification 3220 based on determining the relay requirement data is not met and/or is no longer met by the time they receive the query abort notification 3220.

Figure 32G:
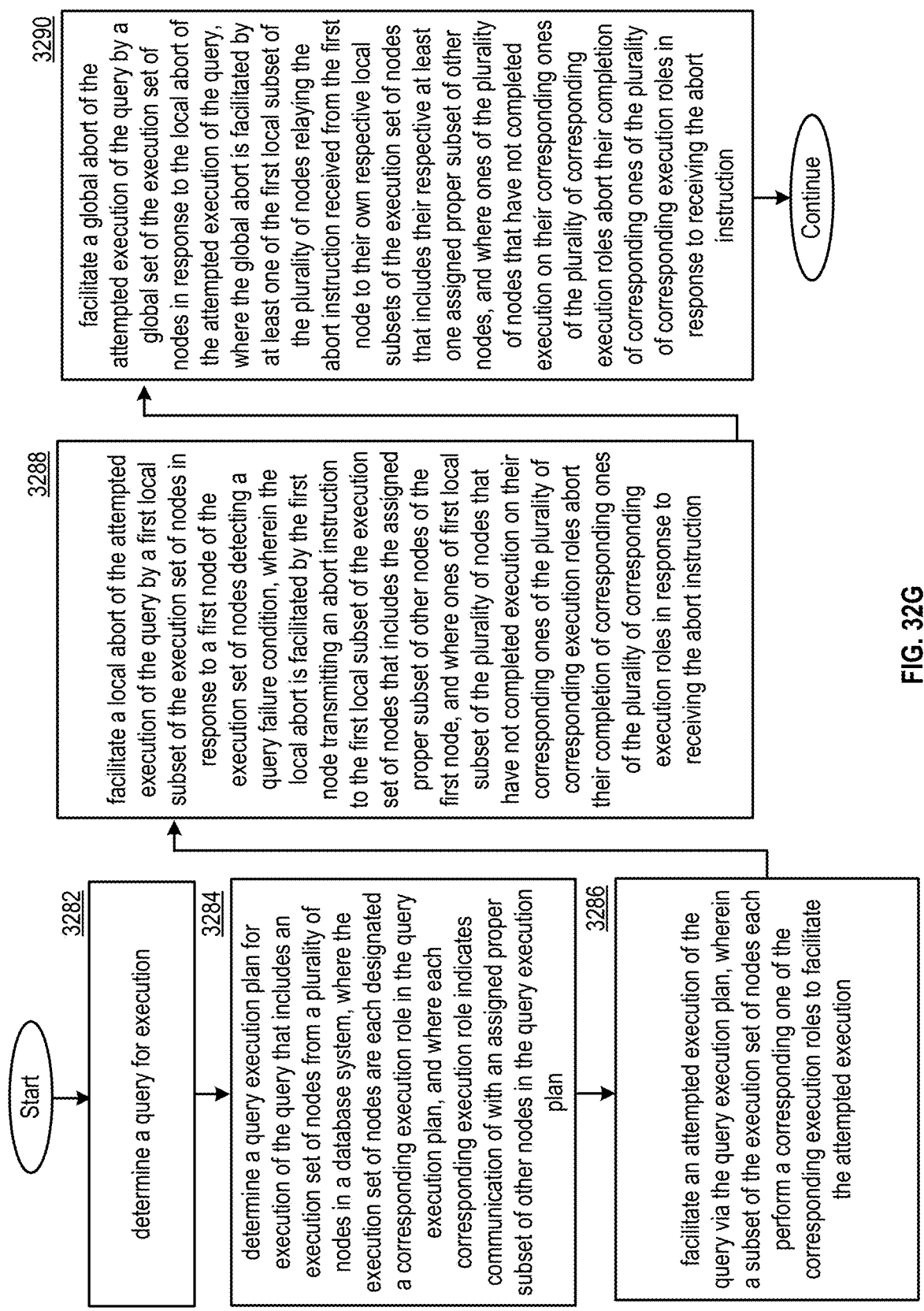
FIG. 32G is a logic diagram illustrating a method of communicating query abort notifications during execution of a query in accordance with various embodiments of the present invention.

FIG. 32G illustrates a method for execution by at least one processing module of a query execution module 2402. For example, the database system 10 can utilize at least one processing module of one or more nodes 37 of one or more computing devices 18, where the one or more nodes to execute operational instructions stored in memory accessible by the one or more nodes, and where the execution of the operational instructions causes the one or more nodes 37 to execute, independently or in conjunction, the steps of FIG. 32G. In particular, the query failure detection module 3250 and/or the query failure communication module 3270 can execute the steps of FIG. 32G via implementation by a single corresponding node 37, where one or more nodes 37 each execute the steps of FIG. 32G. Some or all of the method of FIG. 32G can be performed by the query execution module 2402, for example, by utilizing at least one processor and memory of the query execution module 2402 to implement multiple query failure detection modules 3250 and/or multiple query failure communication modules 3270 of multiple different nodes 37 of a single local node set 3260 and/or of multiple different local node sets 3260. Some or all of the steps of FIG. 32G can optionally be performed by any other processing module of the database system 10. Some or all of the steps of FIG. 32G can be performed to implement some or all of the functionality of the query execution module 2402 and/or of one or more individual nodes 37 as described in conjunction with FIGS. 32A-32F. Some or all steps of FIG. 32G can be performed by database system 10 in accordance with other embodiments of the query execution module 2402 discussed herein.

Step 3282 includes determining a query for execution. Step 3284 includes determining a query execution plan for execution of the query that includes an execution set of nodes from a plurality of nodes in a database system, where the execution set of nodes are each designated a corresponding execution role in the query execution plan. Each corresponding execution role can indicate communication of with an assigned proper subset of other nodes in the query execution plan, such as some or all nodes in a local node set 3260 and/or a group of nodes 2620. Step 3286 includes facilitating an attempted execution of the query via the query execution plan, where at least a subset of the execution set of nodes each performs a corresponding one of the corresponding execution roles to facilitate the attempted execution. Step 3288 includes facilitating a local abort of the attempted execution of the query by a first local subset of the execution set of nodes in response to a first node of the execution set of nodes detecting a query failure condition. The local abort is facilitated by the first node transmitting an abort instruction to the first local subset of the execution set of nodes that includes the assigned proper subset of other nodes of the first node. Ones of first local subset of the plurality of nodes that have not completed execution on their corresponding ones of the plurality of corresponding execution roles abort their completion of corresponding ones of the plurality of corresponding execution roles in response to receiving the abort instruction.

The method can optionally continue with step 3290, which includes facilitating a global abort of the attempted execution of the query by a global set of the execution set of nodes in response to the local abort of the attempted execution of the query. The global abort is facilitated by at least one of the first local subset of the plurality of nodes relaying the abort instruction received from the first node to their own respective local subsets of the execution set of nodes that includes their respective at least one assigned proper subset of other nodes. Each node of the execution set of nodes of the query execution plan that receives the abort instruction relays the abort instruction to its own respective local subset that includes their respective at least one assigned proper subset of other nodes. Ones of the plurality of nodes that have not completed execution on their corresponding ones of the plurality of corresponding execution roles abort their completion of corresponding ones of the plurality of corresponding execution roles in response to receiving the abort instruction.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a query processing module, comprising:
   receiving a first query request that indicates a first query for execution by a database system;
   determining a first plurality of query execution mode options for execution of the first query via the database system;
   generating first role reassignment restriction data for the first query based on a first plurality of query operators of the first query;
   selecting a first selected query execution mode from the first plurality of query execution mode options based on role reassignment modality corresponding to the first selected query execution mode comparing favorably to the first role reassignment restriction data; and
   generating a resultant for the first query by facilitating execution of the first query in accordance with the first selected query execution mode.

2. The method of claim 1, further comprising:
   receiving a second query request that indicates a second query for execution by the database system;
   determining a second plurality of query execution mode options for execution of the second query via the database system;
   generating second role reassignment restriction data for the second query based on a second plurality of query operators of the second query;
   generating second query execution mode selection data by selecting a second selected query execution mode from the second plurality of query execution mode options based on role reassignment modality corresponding to the second selected query execution mode comparing favorably to the second role reassignment restriction data; and
   generating a resultant for the second query by facilitating execution of the second query in accordance with the second selected query execution mode.

3. The method of claim 2, wherein the first plurality of query operators includes a first number of duplication removal operators and wherein the first role reassignment restriction data is generated based on the first number of duplication removal operators.

4. The method of claim 3, wherein the second plurality of query operators includes a second number of duplication removal operators and wherein the second role reassignment restriction data is generated based on the second number of duplication removal operators.

5. The method of claim 4, wherein when the second number of duplication removal operators differs from the first number of duplication removal operators, the second role reassignment restriction data differs from the first role reassignment restriction data.

6. The method of claim 5, wherein the second role reassignment restriction data is more restrictive than the first role reassignment restriction data.

7. The method of claim 5, wherein the second role reassignment restriction data is less restrictive than the first role reassignment restriction data.

8. The method of claim 1, further comprising:
generating a plurality of successful execution cost data corresponding to the plurality of query execution mode options; and
determining successful execution cost requirement data;
wherein selection of the first selected query execution mode from the first plurality of query execution mode options is further based on successful execution cost data corresponding to the first selected query execution mode comparing favorably to the successful execution cost requirement data, wherein the successful execution cost data corresponding to each of the first plurality of query execution mode options includes at least one of: an expected total execution time for execution of the first query in accordance with the each of the plurality of query execution mode options, or an expected total resource consumption for the each of the plurality of query execution mode options.

9. The method of claim 8, further comprising:
generating a plurality of execution success probabilities corresponding to the plurality of query execution mode options based on the plurality of execution success conditions; and
calculating a plurality of expected number of attempts corresponding to the plurality of query execution mode options based on the plurality of execution success probabilities, wherein each of expected number of attempts is calculated as a function of a corresponding one of the plurality of execution success probabilities in accordance with a geometric distribution;
wherein the at least one of: the expected total execution time, or the expected total resource consumption of each of the plurality of successful execution cost data is generated as a function of a corresponding one of the plurality of expected number of attempts for a corresponding one of the plurality of query execution mode options.

10. The method of claim 8, further comprising:
determining first scale requirements based on the first query request, wherein the first scale requirements indicate at least one of: a required number of nodes for a query execution plan for execution the first query, a required number of levels of the query execution plan for execution of the first query, or a required number of records for access in execution of the first query via the query execution plan;
wherein the successful execution cost data is generated as a function of the at least one of: the required number of nodes for a query execution plan for execution the first query, the required number of levels of a query execution plan for execution of the first query, or the required number of records for access in execution of the first query indicated by the first scale requirements; and wherein facilitating execution of the first query in accordance with the first selected query execution mode includes at least one of: facilitating implementation of the query execution plan with required number of nodes to execute the first query, facilitating implementation the query execution plan with required number of levels to execute the first query; or facilitating implementation the query execution plan to access the required number of records to execute the first query.

11. A query processing system comprises:
at least one processor; and
a memory that stores operational instructions that, when executed by the at least one processor, cause the query processing system to perform operations that include:
receiving a first query request that indicates a first query for execution by a database system;
determining a first plurality of query execution mode options for execution of the first query via the database system;
generating first role reassignment restriction data for the first query based on a first plurality of query operators of the first query;
selecting a first selected query execution mode from the first plurality of query execution mode options based on role reassignment modality corresponding to the first selected query execution mode comparing favorably to the first role reassignment restriction data; and
generating a resultant for the first query by facilitating execution of the first query in accordance with the first selected query execution mode.

12. The query processing system of claim 11, wherein the operations further comprise:
receiving a second query request that indicates a second query for execution by the database system;
determining a second plurality of query execution mode options for execution of the second query via the database system;
generating second role reassignment restriction data for the second query based on a second plurality of query operators of the second query;
generating second query execution mode selection data by selecting a second selected query execution mode from the second plurality of query execution mode options based on role reassignment modality corresponding to the second selected query execution mode comparing favorably to the second role reassignment restriction data; and
generating a resultant for the second query by facilitating execution of the second query in accordance with the second selected query execution mode.

13. The query processing system of claim 12, wherein the first plurality of query operators includes a first number of duplication removal operators and wherein the first role reassignment restriction data is generated based on the first number of duplication removal operators.

14. The query processing system of claim 13, wherein the second plurality of query operators includes a second number of duplication removal operators and wherein the second role reassignment restriction data is generated based on the second number of duplication removal operators.

15. The query processing system of claim 14, wherein when the second number of duplication removal operators differs from the first number of duplication removal operators, the second role reassignment restriction data differs from the first role reassignment restriction data.

16. The query processing system of claim 15, wherein the second role reassignment restriction data is more restrictive than the first role reassignment restriction data.

17. The query processing system of claim 15, wherein the second role reassignment restriction data is less restrictive than the first role reassignment restriction data.

18. The query processing system of claim 11, wherein the operations further comprise:
- generating a plurality of successful execution cost data corresponding to the plurality of query execution mode options; and
- determining successful execution cost requirement data;
- wherein selection of the first selected query execution mode from the first plurality of query execution mode options is further based on successful execution cost data corresponding to the first selected query execution mode comparing favorably to the successful execution cost requirement data, wherein the successful execution cost data corresponding to each of the first plurality of query execution mode options includes at least one of: an expected total execution time for execution of the first query in accordance with the each of the plurality of query execution mode options, or an expected total resource consumption for the each of the plurality of query execution mode options.

19. The query processing system of claim 18, wherein the operations further comprise:
- generating a plurality of execution success probabilities corresponding to the plurality of query execution mode options based on the plurality of execution success conditions; and
- calculating a plurality of expected number of attempts corresponding to the plurality of query execution mode options based on the plurality of execution success probabilities, wherein each of expected number of attempts is calculated as a function of a corresponding one of the plurality of execution success probabilities in accordance with a geometric distribution;
- wherein the at least one of: the expected total execution time, or the expected total resource consumption of each of the plurality of successful execution cost data is generated as a function of a corresponding one of the plurality of expected number of attempts for a corresponding one of the plurality of query execution mode options.

20. The query processing system of claim 18, wherein the operations further comprise:
- determining first scale requirements based on the first query request, wherein the first scale requirements indicate at least one of: a required number of nodes for a query execution plan for execution the first query, a required number of levels of the query execution plan for execution of the first query, or a required number of records for access in execution of the first query via the query execution plan;
- wherein the successful execution cost data is generated as a function of the at least one of: the required number of nodes for a query execution plan for execution the first query, the required number of levels of a query execution plan for execution of the first query, or the required number of records for access in execution of the first query indicated by the first scale requirements; and
- wherein facilitating execution of the first query in accordance with the first selected query execution mode includes at least one of: facilitating implementation of the query execution plan with required number of nodes to execute the first query, facilitating implementation the query execution plan with required number of levels to execute the first query; or facilitating implementation the query execution plan to access the required number of records to execute the first query.

* * * * *